US012676799B2

(12) United States Patent　　　(10) Patent No.:　US 12,676,799 B2
Soyarslan　　　　　　　　　　　　　(45) Date of Patent:　　　Jul. 7, 2026

(54) METHODS AND SYSTEMS FOR OBJECT-AWARE FUZZY PROCESSING BASED ON ANALOGIES

(71) Applicant: LEATRON LLC, Dover, DE (US)

(72) Inventor: Osman Levent Soyarslan, Istanbul (TR)

(73) Assignee: LEATRON LLC, Dover, DE (US)

( * ) Notice: Subject to any disclaimer, the term of this patent is extended or adjusted under 35 U.S.C. 154(b) by 69 days.

(21) Appl. No.: 19/005,625

(22) Filed: Dec. 30, 2024

(65) Prior Publication Data

US 2025/0141755 A1　　May 1, 2025

Related U.S. Application Data

(63) Continuation-in-part of application No. 18/583,521, filed on Feb. 21, 2024, now abandoned, which is a
(Continued)

(51) Int. Cl.
| | |
|---|---|
| *H04L 41/14* | (2022.01) |
| *G06F 9/30* | (2018.01) |
| *G06F 11/00* | (2006.01) |

(52) U.S. Cl.
CPC ........ *H04L 41/145* (2013.01); *G06F 9/30181* (2013.01); *G06F 11/006* (2013.01)

(58) Field of Classification Search
CPC ... H04L 41/145; H04L 41/16; G06F 9/30181; G06F 11/006; G06F 3/04842;
(Continued)

(56) References Cited

U.S. PATENT DOCUMENTS

| | | | |
|---|---|---|---|
| 6,877,137 B1 | 4/2005 | Rivette et al. | |
| 7,454,399 B2 * | 11/2008 | Matichuk | ............ G06F 9/45512 |
| | | | 706/14 |

(Continued)

OTHER PUBLICATIONS

International Search Report and Written Opinion, dated May 13, 2019, pp. 1-12, issued in International Application No. PCT/TR2018/050742, European Patent Office, Rijswijk, The Netherlands.
(Continued)

*Primary Examiner* — Michael Won
(74) *Attorney, Agent, or Firm* — Crowell & Moring LLC

(57) ABSTRACT

The current disclosure provides methods and systems that can manage the dynamic-uncertainty induced by resources of decentralized data networks, in order to ensure the stability and sustainability of task-oriented automated operations, such as operations conducted through intelligent agents. In contrast to the state-of-the-art object-based processing, the methods and systems enable object-aware processing, to ensure the establishment of stable and sustainable associations with physical and digital web-objects, while enabling those objects to be processed dynamically with full adaptability in response to contextual and structural alterations in real-time. Thus, the disclosure provides—both human and machine—users with the ability to develop and deploy modular systems capable of engaging any conceivable physical or digital interaction with the resources of a data network, such as dynamically linking and manipulating clusters of complex web-objects to execute complex tasks in complex and dynamic web environments—most importantly—stably and sustainably.

30 Claims, 27 Drawing Sheets

Related U.S. Application Data continuation-in-part of application No. 18/178,382, filed on Mar. 3, 2023, now Pat. No. 12,293,148, which is a continuation-in-part of application No. 16/886,265, filed on May 28, 2020, now Pat. No. 11,625,448.

(58) Field of Classification Search

CPC ...... G06F 9/451; G06F 40/103; G06F 40/123; G06F 40/14; G06F 40/169; G06F 40/216; G06F 40/30; G06F 3/0483; G06F 7/023; G06N 20/00; H04N 21/251; H04N 21/466; H04N 21/45; H04N 21/4662

See application file for complete search history.

(56) References Cited

U.S. PATENT DOCUMENTS

| | | | |
|---|---|---|---|
| 8,713,438 | B1 | 4/2014 | Broniek et al. |
| 12,406,194 | B1* | 9/2025 | Cosic ........................ G06N 5/04 |
| 2004/0001093 | A1 | 1/2004 | Sellers et al. |
| 2004/0205545 | A1 | 10/2004 | Bargeron et al. |
| 2004/0230917 | A1* | 11/2004 | Bales .................... G06F 3/0481 |
| | | | 715/854 |
| 2004/0261016 | A1 | 12/2004 | Glass et al. |
| 2005/0091027 | A1 | 4/2005 | Zaher et al. |
| 2005/0149868 | A1* | 7/2005 | Katayama ................. G06F 8/38 |
| | | | 715/700 |
| 2007/0174762 | A1 | 7/2007 | Plant |
| 2008/0119235 | A1 | 5/2008 | Nielsen et al. |
| 2009/0254540 | A1 | 10/2009 | Musgrove et al. |
| 2010/0070845 | A1 | 3/2010 | Facemire et al. |
| 2011/0258526 | A1 | 10/2011 | Supakkul et al. |
| 2012/0144286 | A1 | 6/2012 | Bank et al. |
| 2012/0191728 | A1 | 7/2012 | Libin et al. |
| 2013/0073993 | A1* | 3/2013 | Schimpf ................ G06F 3/048 |
| | | | 715/762 |
| 2014/0115441 | A1 | 4/2014 | Badoiu et al. |
| 2014/0344658 | A1 | 11/2014 | Srinivasan et al. |
| 2014/0380142 | A1 | 12/2014 | Mikutel et al. |
| 2015/0186350 | A1 | 7/2015 | Hicks |
| 2015/0278180 | A1 | 10/2015 | Nicholas, Jr. et al. |
| 2017/0006349 | A1 | 1/2017 | Song et al. |
| 2018/0173381 | A1 | 6/2018 | Bakker et al. |
| 2019/0147026 | A1 | 5/2019 | Jon et al. |
| 2019/0294660 | A1 | 9/2019 | DeVoe et al. |
| 2020/0073903 | A1 | 3/2020 | Jain et al. |
| 2022/0012379 | A1* | 1/2022 | Baqai ...................... G06F 30/12 |
| 2022/0067228 | A1* | 3/2022 | Anderson .............. G06F 30/12 |
| 2024/0135613 | A1* | 4/2024 | Ding ...................... G06T 11/60 |
| 2024/0232539 | A1* | 7/2024 | Venkateshwaran .... G06N 3/044 |
| 2024/0419907 | A1* | 12/2024 | Laprise ................. G01C 21/34 |
| 2025/0278175 | A1* | 9/2025 | Herman ................ G06F 3/0484 |
| 2025/0348925 | A1* | 11/2025 | Kulkarni ................ G06N 20/00 |

OTHER PUBLICATIONS

Kahan, J. et al., "Annotea: an open RDF infrastructure for shared Web annotations," dated Aug. 5, 2002, pp. 589-608, Computer Networks, Elsevier, Amsterdam, The Netherlands, XP004369434.

Glover, I. et al., "Online annotation—Research and practices," dated Aug. 23, 2007, pp. 1308-1320, Computers & Education, vol. 49, No. 4, Pergamon, Amsterdam, The Netherlands, XP022208849.

* cited by examiner

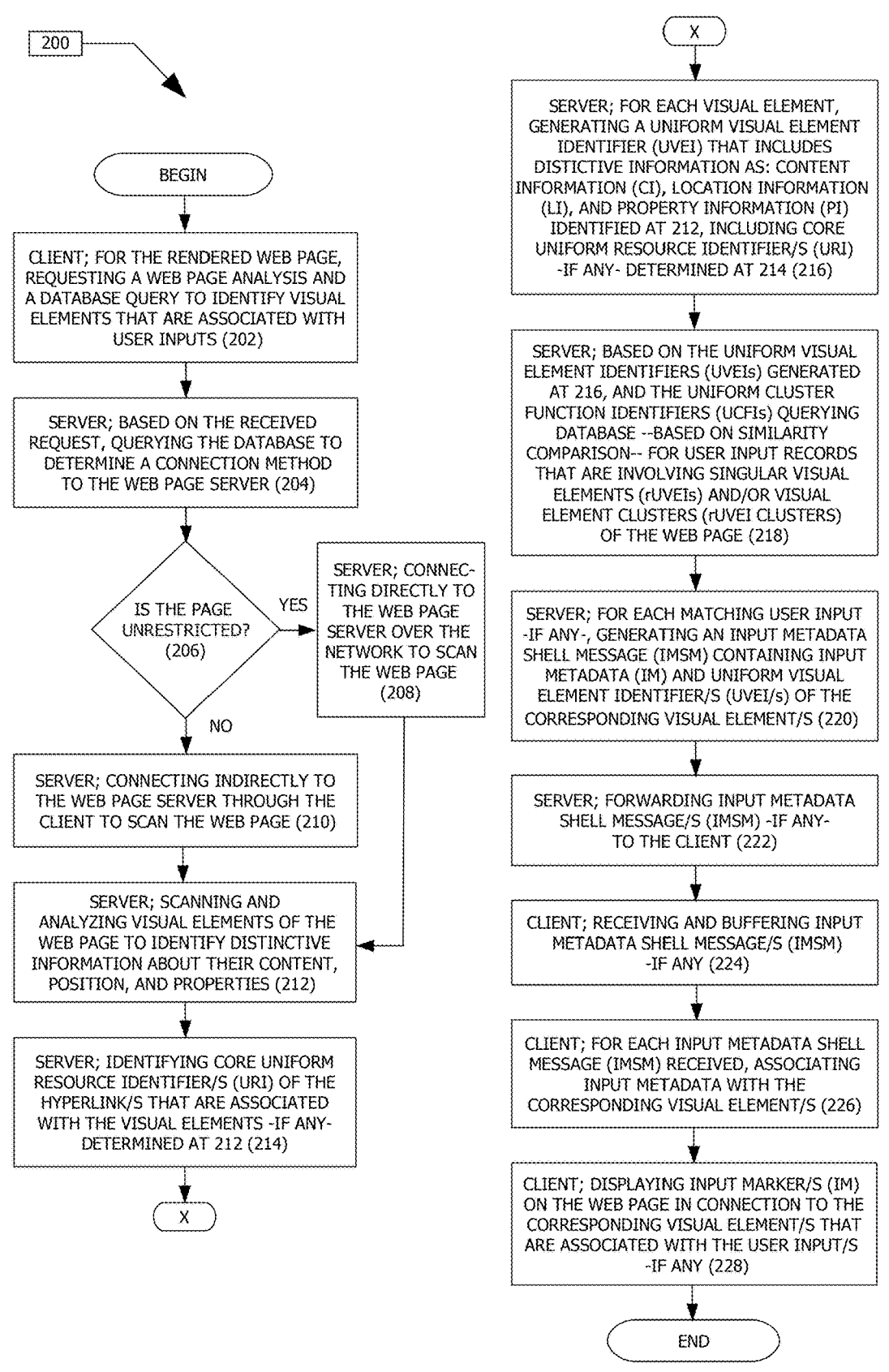

200

BEGIN

CLIENT; FOR THE RENDERED WEB PAGE, REQUESTING A WEB PAGE ANALYSIS AND A DATABASE QUERY TO IDENTIFY VISUAL ELEMENTS THAT ARE ASSOCIATED WITH USER INPUTS (202)

SERVER; BASED ON THE RECEIVED REQUEST, QUERYING THE DATABASE TO DETERMINE A CONNECTION METHOD TO THE WEB PAGE SERVER (204)

IS THE PAGE UNRESTRICTED? (206)

YES

SERVER; CONNEC-TING DIRECTLY TO THE WEB PAGE SERVER OVER THE NETWORK TO SCAN THE WEB PAGE (208)

NO

SERVER; CONNECTING INDIRECTLY TO THE WEB PAGE SERVER THROUGH THE CLIENT TO SCAN THE WEB PAGE (210)

SERVER; SCANNING AND ANALYZING VISUAL ELEMENTS OF THE WEB PAGE TO IDENTIFY DISTINCTIVE INFORMATION ABOUT THEIR CONTENT, POSITION, AND PROPERTIES (212)

SERVER; IDENTIFYING CORE UNIFORM RESOURCE IDENTIFIER/S (URI) OF THE HYPERLINK/S THAT ARE ASSOCIATED WITH THE VISUAL ELEMENTS -IF ANY- DETERMINED AT 212 (214)

X

X

SERVER; FOR EACH VISUAL ELEMENT, GENERATING A UNIFORM VISUAL ELEMENT IDENTIFIER (UVEI) THAT INCLUDES DISTICTIVE INFORMATION AS: CONTENT INFORMATION (CI), LOCATION INFORMATION (LI), AND PROPERTY INFORMATION (PI) IDENTIFIED AT 212, INCLUDING CORE UNIFORM RESOURCE IDENTIFIER/S (URI) -IF ANY- DETERMINED AT 214 (216)

SERVER; BASED ON THE UNIFORM VISUAL ELEMENT IDENTIFIERS (UVEIs) GENERATED AT 216, AND THE UNIFORM CLUSTER FUNCTION IDENTIFIERS (UCFIs) QUERYING DATABASE --BASED ON SIMILARITY COMPARISON-- FOR USER INPUT RECORDS THAT ARE INVOLVING SINGULAR VISUAL ELEMENTS (rUVEIs) AND/OR VISUAL ELEMENT CLUSTERS (rUVEI CLUSTERS) OF THE WEB PAGE (218)

SERVER; FOR EACH MATCHING USER INPUT -IF ANY-, GENERATING AN INPUT METADATA SHELL MESSAGE (IMSM) CONTAINING INPUT METADATA (IM) AND UNIFORM VISUAL ELEMENT IDENTIFIER/S (UVEI/s) OF THE CORRESPONDING VISUAL ELEMENT/S (220)

SERVER; FORWARDING INPUT METADATA SHELL MESSAGE/S (IMSM) -IF ANY- TO THE CLIENT (222)

CLIENT; RECEIVING AND BUFFERING INPUT METADATA SHELL MESSAGE/S (IMSM) -IF ANY (224)

CLIENT; FOR EACH INPUT METADATA SHELL MESSAGE (IMSM) RECEIVED, ASSOCIATING INPUT METADATA WITH THE CORRESPONDING VISUAL ELEMENT/S (226)

CLIENT; DISPLAYING INPUT MARKER/S (IM) ON THE WEB PAGE IN CONNECTION TO THE CORRESPONDING VISUAL ELEMENT/S THAT ARE ASSOCIATED WITH THE USER INPUT/S -IF ANY (228)

END

FIG. 2

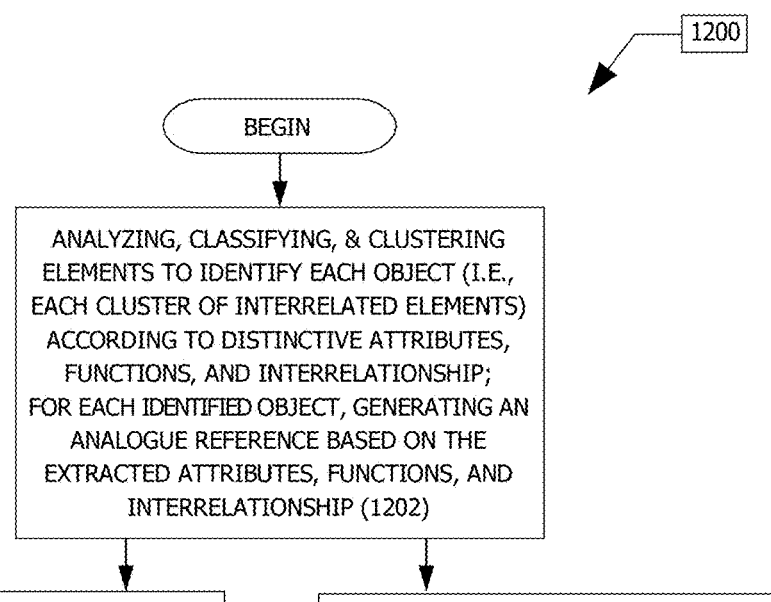

1200

BEGIN

ANALYZING, CLASSIFYING, & CLUSTERING ELEMENTS TO IDENTIFY EACH OBJECT (I.E., EACH CLUSTER OF INTERRELATED ELEMENTS) ACCORDING TO DISTINCTIVE ATTRIBUTES, FUNCTIONS, AND INTERRELATIONSHIP; FOR EACH IDENTIFIED OBJECT, GENERATING AN ANALOGUE REFERENCE BASED ON THE EXTRACTED ATTRIBUTES, FUNCTIONS, AND INTERRELATIONSHIP (1202)

IDENTIFYING AND FILTERING OBJECTS SUITABLE FOR MANIPULATION AMONG THE OBJECTS IDENTIFIED AT 1202; RECEIVING USER'S SELECTION OF AN OBJECT AS A ROOT-OBJECT; IN-COORDINATION WITH THE USER, DEVELOPING A SET OF EXECUTABLE INSTRUCTIONS (I.E., AN APPLICATION) TO MANIPULATE THE ROOT-OBJECT (1204)

COMPAIRING RECENTLY GENERATED ANALOGUE REFERENCES OF OBJECTS (OARs) WITH RECORDED ANALOGUE REFERENCES OF ROOT-OBJECTS (rOARs) TO DETERMINE ANALOGIES AND ASSOCIATE OARs WITH rOARs BASED ON PREDEFINED SIMILARITY THRESHOLDS (I.E., ASSOCIATING SUPER-OBJECTS WITH OBJECTS IN THE CONTEXT OF ANALOGIES) (1210)

ANALYZING THE APPLICATION DEVELOPED AT 1204; IDENTIFYING ATTRIBUTE/S AND/OR FUNCTION/S OF THE ROOT-OBJECT IN RESPECT WITH THE APP; GENERATING A NEW ANALOGUE REFERENCE FOR THE ROOT-OBJECT THAT COM-PRISES THE RELATED ATTRIBUTE/S AND/OR FUNCTION/S IDENTIFIED; DETERMINING SIMILA-RITY THRESHOLD & ADAPTATION RULES (1206)

FOR EACH SUPER-OBJECT, ADAPTING THE EXECUTION PROCEDURES FOR THE CORRES-PONDING OBJECT BASED ON I) THE DIFFEREN-CES BETWEEN THE ANALOGUE REFERENCE OF THE ROOT-OBJECT AND THE ANALOGUE REFERENCE OF THE CORRESPONDING OBJECT, AND II) ADAPTATION RULES IDENTIFIED AT 1206; AND EXECUTING THE APPLICATION (1212)

ENCAPSULATING I) THE SET OF EXECUTABLE INSTRUCTIONS DEVELOPED, II) THE ANALOG REFERENCE OF THE ROOT-OBJECT GENERATED, AND III) THE SIMILARITY TRESHOLD/S & ADAP-TATION RULES DETERMINED AT 1206 AS A SU-PER-OBJECT; ASSOCIATING THE SUPER-OBJECT WITH THE ROOT-OBJECT BY RECORDING THE SUPER-OBJECT AT A STORAGE MEDIUM (1208)

END

END

FIG. 12

OBJECTS

| | | |
|---|---|---|
| 18-08-1971 | ◄── ALBERTO BALSALM ──► | BERKELEY |
| | BIRTH DATE        BIRTH PLACE | |

CONCEPTS (CLASSES)

IS A

NUCLEAR CHEMIST

IS A SUBCLASS OF

IS A                IS A

DATE ◄── PERSON ──► PLACE

BIRTH DATE        BIRTH PLACE

FIG. 14

CONCEPTS (CLASSES)

T-OBJECT

OBJECTS / T-OBJECTS

IS A 18-08-1971 ◄── ALBERTO BALSALM^TO ~~~ BERKELEY

BIRTH DATE        BIRTH PLACE

IS AT LEAST G% SIMILAR
IN THE CONTEXT OF C1
TO

CONCEPTS (CLASSES)

IS AT LEAST N% SIMILAR IN
THE CONTEXT OF C2 TO A

IS A

NUCLEAR CHEMIST

IS A SUBCLASS OF

IS A                IS A

DATE ◄── PERSON ──► PLACE

BIRTH DATE        BIRTH PLACE

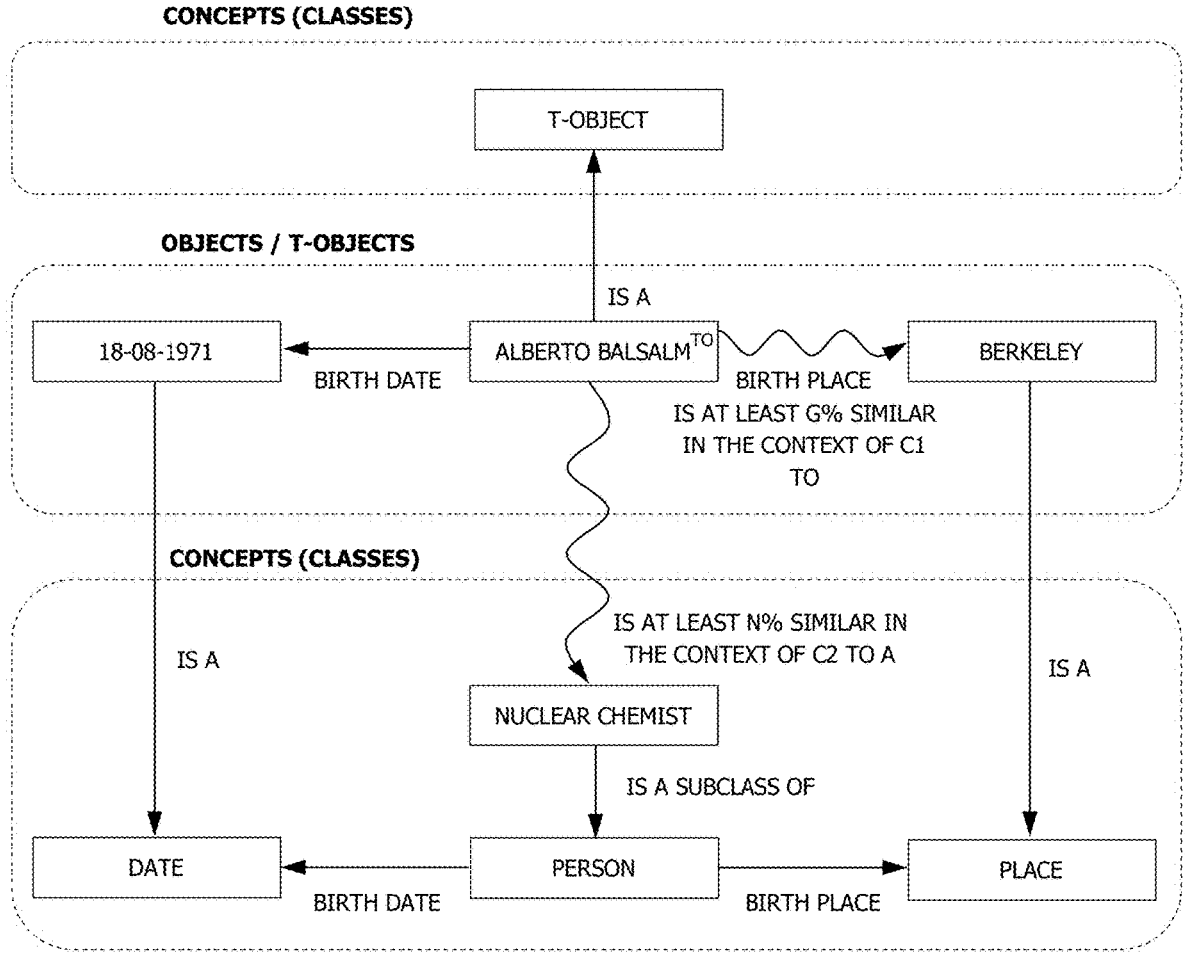

FIG. 15

Similarity Function of a Transforming-Concept (TC)
that is a Transforming-Subclass of a Concept ($C_B$)

For $t_0 \leq t < \infty$, TC is $100 \times S_{TC_j \sim C_B/C_B}(t)$ % similar to $\mathbf{C_B}$ in the context of $\mathbf{C_B}$

TC is defined for $ST \leq S_{TC_j \sim C_B/C_B}(t) \leq 1$ ∴ TC is a $t-$ subclass of $\mathbf{C_B}$ for $[ST, 1]_{Bound}$

Similarity Function of a Transforming Object (TO) with respect to
a Reference Object $(O_B)$ in the context of a Base Concept $(C_B)$

TO is defined for $0 \leq S_{TO_n \sim O_B/C_B}(t) \leq 1$, where n = 1,2,3,..., N For $t_0 \leq t \leq t_{14}$, TO is $100 \times S_{TO_n \sim O_B/C_B}(t)$ % similar to $O_B$ in the context of $C_B$

TO is defined to be associated with $O_B$ for $ST_W \leq S_{TO_n \sim O_B/C_B}(t) \leq 1$

Similarity Function of a Transforming Object (TO)
with respect to a Reference Concept ($C_B$)

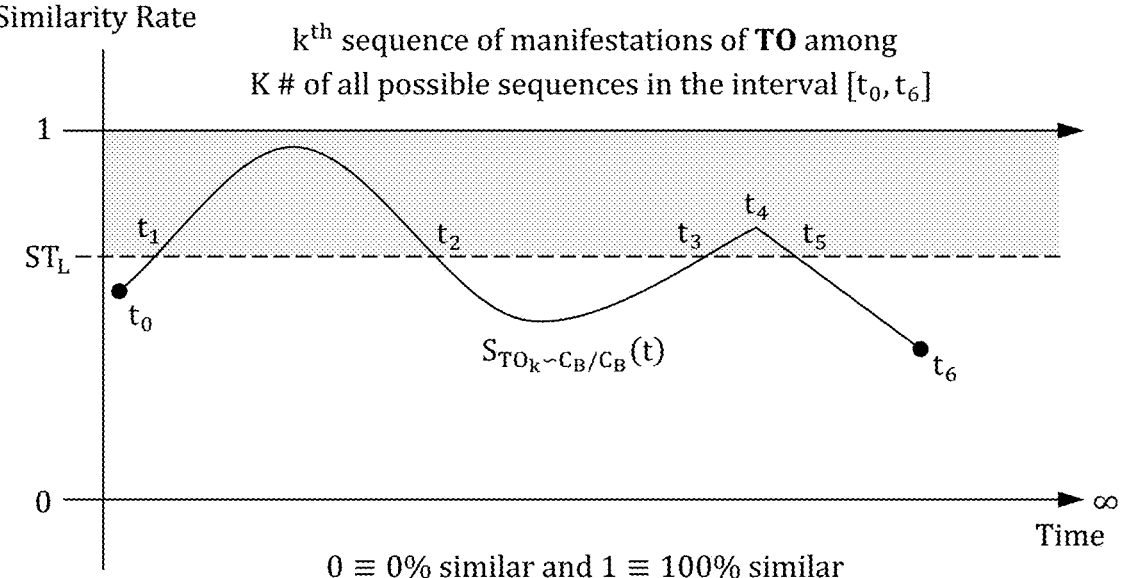

$$0 \equiv 0\% \text{ similar and } 1 \equiv 100\% \text{ similar}$$

TO is defined for $0 \leq S_{TO_k \sim C_B/C_B}(t) \leq 1$, where $k = 1,2,3,..,K$ For $t_0 \leq t \leq t_6$, TO is $100 \times S_{TO_k \sim C_B/C_B}(t)$ % similar to $C_B$ in the context of $C_B$

TO is defined to be associated with $C_B$ for $ST_L \leq S_{TO_k \sim C_B/C_B}(t) \leq 1$

FIG. 24

Similarity Function of a Transforming Concept (TC)
with respect to a Reference Concept ($C_B$)

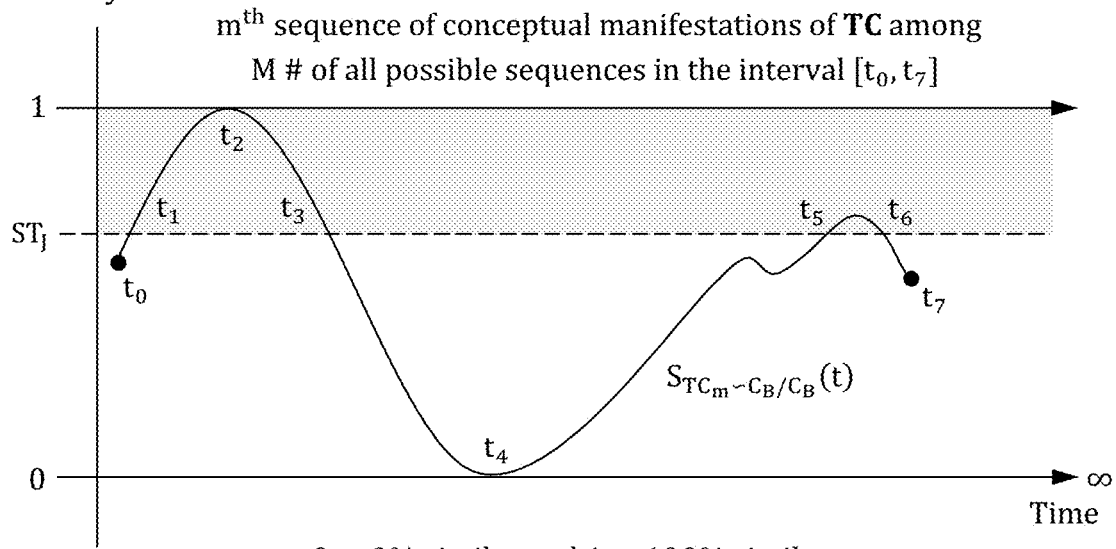

Similarity Rate $m^{th}$ sequence of conceptual manifestations of TC among
$M$ # of all possible sequences in the interval $[t_0, t_7]$ $0 \equiv 0\%$ similar and $1 \equiv 100\%$ similar

TC is defined for $0 \leq S_{TC_m \frown C_B/C_B}(t) \leq 1$, where $m = 1,2,3,..,M$ For $t_0 \leq t \leq t_7$, TC is $100 \times S_{TC_m \frown C_B/C_B}(t)$ % similar to $C_B$ in the context of $C_B$

TC is defined to be associated with $C_B$ for $ST_j \leq S_{TC_m \frown C_B/C_B}(t) \leq 1$

FIG. 25

An Example Similarity Function of a Particular Sequence of Manifestations
($TO_1$) of a Transforming Object (TO) with respect to a Reference Concept
($C_B$) in the Cartesian Coordinate System similarity $\to \infty \Rightarrow$ similarity rate $\to 100\%$ $\therefore \lim_{t \to t_1^+} S_{TO_1 \sim C_B / C_B}(t) \Rightarrow 100\%$ similarity rate

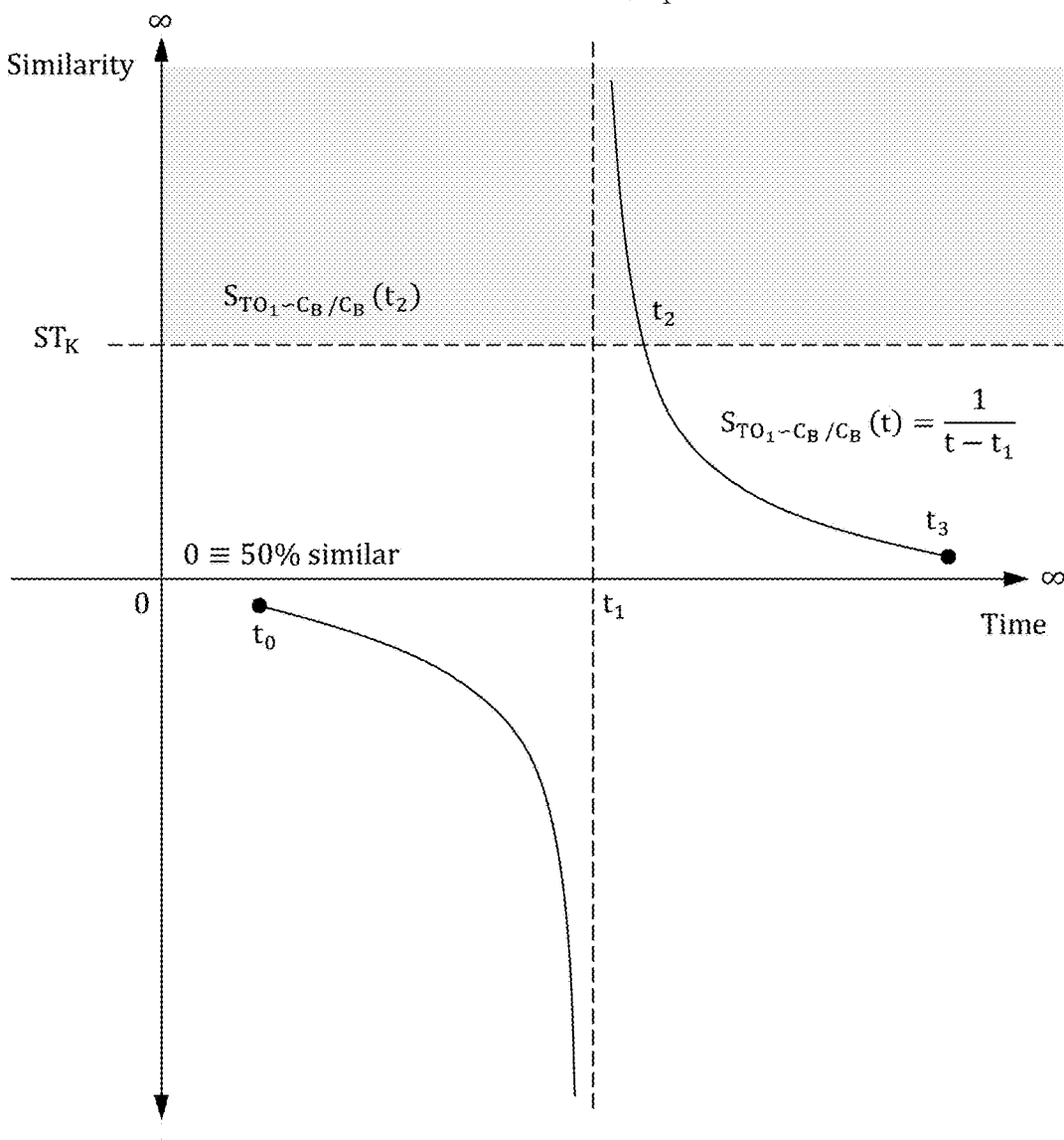

similarity $\to -\infty \Rightarrow$ similarity rate $\to 0\%$ $\therefore \lim_{t \to t_1^-} S_{TO_1 \sim C_B / C_B}(t) \Rightarrow 0\%$ similarity rate

FIG. 26

An Example Similarity Equation of a Particular Sequence of Manifestations (TO$_2$) of a Transforming Object (TO) with respect to a Reference Concept (C$_B$) in the Polar Coordinate System

$$S_{TO_2 \sim C_B/C_B}(\theta) = r(\theta) = \sin\theta, \text{ and } ST_K(\theta) = H, \text{ where } \theta \text{ represents time}$$

$0 \equiv 0\%$ similar and $1 \equiv 100\%$ similar

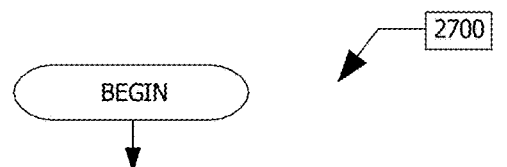

BEGIN

RECEIVING A SELECTION OF A USER THAT COMPRISES A CLUSTER OF VARIOUS OBJECTS THAT ARE SELECTED PURPOSEFULLY OR RANDOMLY AMONG A PLURALITY OF OBJECTS IN AN ENVIRONMENT; FURTHER RECEIVING A SET OF INSTRUCTIONS, I.E., PROCEDURES, DEVELOPED BY THE USER WITH RESPECT TO THE SELECTED CLUSTER IN ORDER TO PROCESS/MANIPULATE THE CLUSTER (2702)

ANALYZING, CLASSIFYING, & CLUSTERING ELEMENTS OF THE SELECTED CLUSTER TO IDENTIFY EACH SUB-CLUSTER OF INTERRELATED ELEMENTS IN RANK ORDER ACCORDING TO DISTINCTIVE ATTRIBUTES, FUNCTIONS, AND INTERRELATIONSHIP; FOR EACH IDENTIFIED SUB-CLUSTER, GENERATING AN ANALOGUE REFERENCE BASED ON THE EXTRACTED ATTRIBUTES, FUNCTIONS, AND INTERRELATIONSHIP (2704)

BASED ON THE ANALOGUE REFERENCES GENERATED AT 2704, ANALYZING THE SET OF INSTRUCTIONS AND EXTRACTING THE CONTEXT OF THE PROCESS, I.E., CONCEPTUALIZING THE PROCESS, WITH RESPECT TO THE SELECTED CLUSTER; HENCE, IDENTIFYING THE CONTEXT ($C_B$) OF THE PROSPECTIVE SUPER-OBJECT (2706)

BASED ON THE CONTEXT ($C_B$) IDENTIFIED AT 2706 AND THE ANALOGUE REFERENCES GENERATED AT 2704, CONSTRUCTING A MODEL OF THE SELECTED CLUSTER; ASSOCIATING ANY ESSENTIAL CONTENT -IF ANY- WITH THE CONSTRUCTED MODEL AND GENERATING THE ROOT-OBJECT ($O_B$) OF THE PROSPECTIVE SUPER-OBJECT (2708)

BASED ON THE ROOT-OBJECT ($O_B$) GENERATED AT 2708 AND THE CONTEXT ($C_B$) IDENTIFIED AT 2706, DETERMINING THE CRITICAL BOUNDARIES ($L_{BD}$, $U_{BD}$) AND THE OPTIMAL SIMILARITY THRESHOLD ($ST_{OP}$); BASED ON THE $L_{BD}$, $U_{BD}$, $ST_{OP}$ IDENTIFIED AND THE ASSESSMENT OF OPERATIONAL NEEDS, DECIDING ON THE SIMILARITY THRESHOLD (ST) (2710)

END

FIG. 28

BEGIN

IN AN ENVIRONMENT COMPRISING VARIOUS OBJECTS, I.E., SINGULAR ELEMENTS AND/OR CLUSTERS OF INTERRELATED ELEMENTS; ANALYZING, CLASSIFYING, AND CLUSTERING ELEMENTS TO IDENTIFY EACH OBJECT ACCORDING TO DISTINCTIVE ATTRIBUTES, FUNCTIONS, AND INTERRELATIONSHIP (2802)

FOR EACH IDENTIFIED OBJECT, GENERATING AN ANALOGUE REFERENCE $TO_n$ BASED ON THE EXTRACTED ATTRIBUTES, FUNCTIONS, AND INTERRELATIONSHIP, WHERE THE INTEGER VARIABLE 'n' REPRESENTS A SEQUENCE OF NUMBERS IN WHICH EACH NUMBER IS ASSIGNED RESPECTIVELY TO THE IDENTIFIED OBJECTS IN THE ENVIRONMENT (2804)

BASED ON THE ANALOGUE REFERENCES REPRESENTED BY $TO_n$ GENE-RATED AT 2804, COMPARING EACH OBJECT WITH EACH SUPER-OBJECT BASED ON THE ASSOCIATION RULE REPRESENTED BY THE MODEL $ST \leq S_{TO_n \sim O_B/C_B} \leq 1$ AND ESTABLISHING ASSOCIATIONS WITH THE OBJECTS THAT FULFIL THE CORRESPONDING CONDITION (2806)

FOR EACH ASSOCIATION ESTABLISHED AT 2806, COMPARING EACH ASSOCIATED PAIR IN THE CONTEXT OF EXECUTING THE CORRESPONDING INSTRUCTION SET AND EXTRACTING THE DIFFERENCE OF EACH OBJECT ($TO_n$) WITH THE CORREPONDING ROOT-OBJECT ($O_B$) OF THE CORRESPONDING SUPER-OBJECT IN SAID CONTEXT (2808)

BASED ON THE DIFFERENTIALS IDENTIFIED AT 2808 AND AUXILIARY RESOURCES OF THE SYSTEM; ADAPTING EACH INSTRUCTION SET – THAT IS INITIALLY DEVELOPED FOR THE CORRESPONDING ROOT-OBJECT ($O_B$) OF THE CORRESPONDING SUPER-OBJECT– FOR THE CORRESPONDING ANALOGOUS OBJECT ($TO_n$) THAT IS ASSOCIATED WITH THE CORRESPONDING SUPER-OBJECT AND EXECUTING THE CORRESPONDING SET OF INSTRUCTIONS OF EACH SUPER-OBJECT (2810)

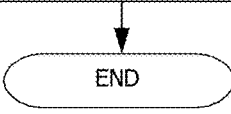

END

FIG. 29

Similarity Control of a Transforming Object $(TO_n)$ with respect to a Reference Object $(O_B)$ in the context of a Base Concept $(C_B)$ via Manipulating the Transforming Object $(TO_n)$

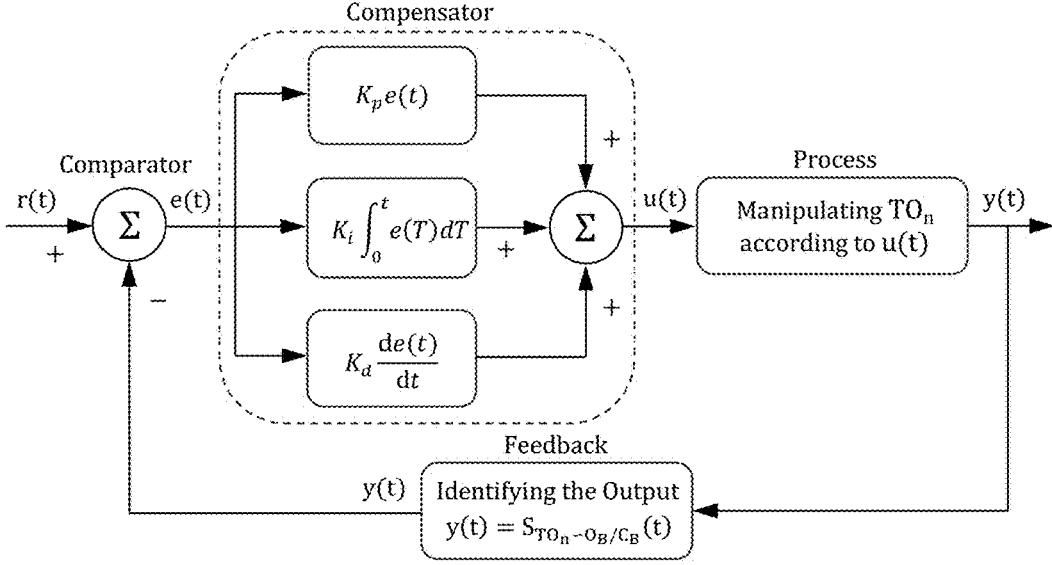

Setpoint / Reference: $r(t) = ST_W$;

Process Variable / Output : $y(t) = S_{TO_n\sim O_B/C_B}(t)$;

Error: $e(t) = ST_W - S_{TO_n\sim O_B/C_B}(t)$;

Control Input: $u(t) = K_p S_{TO_n\sim O_B/C_B}(t) + K_i \int_0^t S_{TO_n\sim O_B/C_B}(T)dT + K_d dS_{TO_n\sim O_B/C_B}(t)/dt$;

FIG. 30

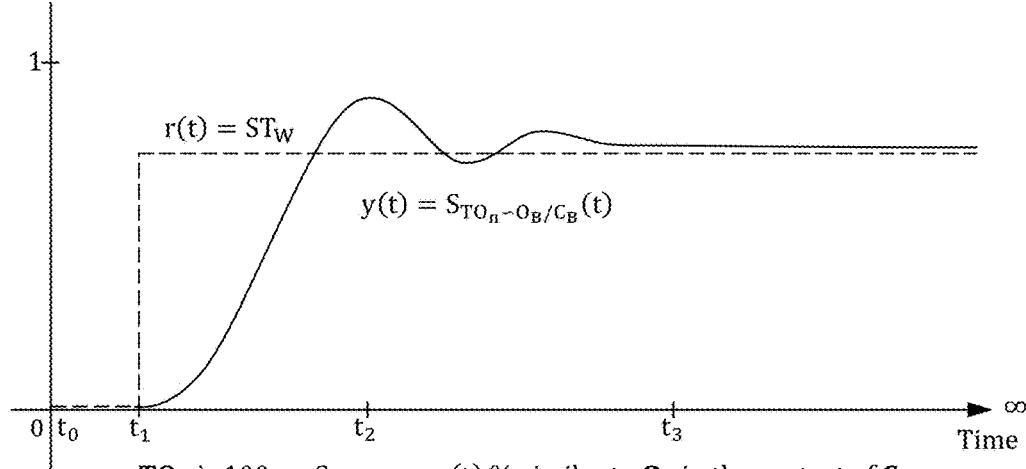

$TO_n$ is $100 \times S_{TO_n\sim O_B/C_B}(t)$ % similar to $O_B$ in the context of $C_B$ $TO_n$ is defined for $0 \leq S_{TO_n\sim O_B/C_B}(t) \leq 1$

FIG. 31

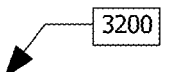
3200

FEEDBACK PROCESS: FOR $TO_n$ RELATIVE TO $O_B$ IN THE CONTEXT OF $C_B$, IDENTIFYING THE SIMILARITY RATE OF $TO_n|_{Cy_{k-1}}$, I.E., $y|_{Cy_{k-1}} = S_{TO_n|_{Cy_{k-1}} \sim O_B/C_B}$, FOR CYCLE k, WHEREIN THE POSITIVE INTEGER k DENOTES THE INDEX NUMBER OF THE CYCLE AND $TO_n|_{Cy_{k-1}}$ DENOTES THE DERIVATIVE OF $TO_n$ GENERATED AT k-1$^{th}$ CYCLE ($Cy_{k-1}$)) (3202)

COMPARATOR: FOR $r(t) = ST_W$, IDENTIFYING THE ERROR $e|_{Cy_k}$ FOR CYCLE k BY SUBTRACTING THE SIMILARITY RATE (I.E., SYSTEM OUTPUT IF k > 1 OR $S_{TO_n \sim O_B/C_B}$ IF k = 1) FROM THE VALUE OF SETPOINT, I.E., $e|_{Cy_k} = ST_W - S_{TO_n|_{Cy_{k-1}} \sim O_B/C_B}$ (3204)

COMPENSATOR: IDENTIFYING THE CONTROL INPUT FOR CYCLE k, WHEREIN $u|_{Cy_k}$ = PROPORTIONAL OUTPUT (P) + INTEGRAL OUTPUT (I) + DIFFERENTIAL OUTPUT (D); AND WHEREIN P $= K_p \, e|_{Cy_k}$ for k ≥ 1; I $= K_i \, ((e|_{Cy_k} - e|_{Cy_{k-1}})/2 + e|_{Cy_{k-1}}) \, \Delta t$ for k > 1, $e|_{Cy_k} \geq e|_{Cy_{k-1}}$ OR $K_i \, ((e|_{Cy_{k-1}} - e|_{Cy_k})/2 + e|_{Cy_k}) \, \Delta t$, for k > 1, $e|_{Cy_{k-1}} > e|_{Cy_k}$; D $= K_d \, (e|_{Cy_k} - e|_{Cy_{k-1}})/\Delta t$ for k > 1. (3206)

MAIN PROCESS / PLANT: MANIPULATING $TO_n$ FOR CYCLE k IN ORDER TO INCREASE OR DECREASE THE SIMILARITY RATE RELATIVE TO $O_B$ IN THE CONTEXT OF $C_B$, ACCORDING TO THE CONTROL INPUT $u|_{Cy_k}$ AND GENERATING T-OBJECT $TO_n|_{Cy_k}$ AS THE k$^{th}$ DERIVATIVE OF $TO_n$ (3208)

METHODS AND SYSTEMS FOR OBJECT-AWARE FUZZY PROCESSING BASED ON ANALOGIES

RELATED APPLICATIONS

This application is a continuation-in-part of U.S. patent application Ser. No. 18/583,521 filed Feb. 21, 2024, which is a continuation-in-part of U.S. patent application Ser. No. 18/178,382 filed Mar. 3, 2023, which is a continuation-in-part of U.S. patent application Ser. No. 16/886,265 filed May 28, 2020, now U.S. Pat. No. 11,625,448, all of which are hereby incorporated by reference.

TECHNICAL FIELD

This disclosure relates generally to data processing with respect to manipulation of digital, physical, and abstract resources—e.g., digital, physical, and hybrid web-objects—of decentralized data networks, such as documents, graphical user interfaces, application programing interfaces, digital entities, physical entities, hybrid entities, etc. that are resources of the Internet, the Internet of Things (IoT), or the Internet of Everything (IoE). More particularly, this disclosure focuses primarily on to identifying, interpreting, clustering, representing, reasoning, associating, and manipulating contextually and structurally complex and dynamic web-resources in order to provide a truly self-contained intelligent system wherein various networks of consistent and persistent interoperable sub-systems that are capable of performing complex web-based tasks may be formed. However, the disclosure transcends the field of focus and overlaps with a wide range of research fields from artificial general intelligence to cognitive science or from ontology to epistemology.

Keywords: Artificial General Intelligence, Fuzzy Set Theory, Fuzzy Knowledge Representation and Reasoning, Fuzzy Semantic Networks, Fuzzy Control Systems, Uncertainty Management in Data Processing, Soft Computing, Knowledge Based Systems.

BACKGROUND

The primary purpose of this disclosure is to provide a technological basis for the formation of a global network of interoperable automated agents that operate throughout the Web with the ability to interact with web-resources stably, sustainably, and independently—i.e., without any support from the providers of the resources such as integration APIs—in order to perform complex web-based tasks—from improving services to industrial automation, or from data mining to evaluation of information—at a level comparable to human experts. This goal is also in line with the most ambitious yet unrealized goal of the Semantic Web—the general purpose of which is to make Internet data machine-readable thus processable. Accordingly, both semantic technologies and semantic web technologies, especially, the ones related to 'semantic extraction' (i.e., automatically extracting structured information—or meaning—from unstructured data such as natural language texts, machine executable scripts, images, audios, videos, or any combination thereof such as user interfaces which comprise many types of unstructured data as components) and 'uncertainty reasoning' (i.e., methods designed for representing and reasoning with knowledge when Boolean truth values are unknown, unknowable, or inapplicable) predominantly define the state-of-the-art in the field of this disclosure.

In essence, state-of-the-art methodology—for making Internet data machine-readable and thus processable—rely on the development of ontologies related to web content, i.e., web-resources which are any identifiable resources (digital, physical, or abstract) present on or connected to the World Wide Web. In this way, machines can process knowledge itself through those ontologies, using processes similar to human deductive reasoning and inference. Besides utilizing semantic extraction, Semantic Web utilizes technologies such as Resource Description Framework (RDF), Web Ontology Language (OWL), and Extensible Markup Language (XML) which in coordination provide machine-readable descriptions that supplement or replace the content of web documents. Thus, content may manifest itself as descriptive data—describing the structure of the knowledge about said content—stored in web-accessible databases such as in the form of web annotations, or as markup within documents.

The general consensus with respect to the primary challenges for the Semantic Web is: i) vastness, i.e. the challenge of processing extremely big data; ii) vagueness, i.e., imprecise concepts, such as tall, short, hot, cold, etc.; iii) uncertainty, i.e., precise concepts with uncertain predicate values, such as the probability that 'A is B' is Y % instead of 'A is B'; iv) inconsistency, i.e., logical contradictions that inevitably arise in the process of developing and/or combining large ontologies; and v) maliciousness, i.e., intentionally misleading the consumer of the information by the producer of the information. W3C Incubator Group for Uncertainty Reasoning for the World Wide Web (URW3-XG) final report further combines these together under the single heading of 'uncertainty' to encompass a variety of aspects of imperfect knowledge, including incompleteness, inconclusiveness, vagueness, ambiguity, and others. More concretely, 'representing and reasoning' with 'uncertainty and vagueness' in ontologies, i.e., 'uncertainty reasoning', is accepted to be the most challenging problem of the Semantic Web. Commonly applied approaches to uncertainty reasoning include probability theory, possibility theory, fuzzy theory, and theory of belief functions.

It is obvious that if said ontologies can be developed then machines may semantically interpret and thus process web content. On the other hand, it is controversial whether said ontologies can ever be developed—especially deep enough to be useful. Or,—more interestingly—if developed, whether they can be maintained. The main cause of the latter—which is the problem that the current disclosure focuses on—is the chaotic nature of web content, i.e., uncertainty induced by the dynamicity of web-resources or in short dynamic uncertainty,—a relatively underestimated or underemphasized problem. Indeed, web-resources—even static ones—may be subjected to simple or complex alterations, i.e., adjustments, modifications, transformations, etc., that may occur progressively or abruptly both contextually and structurally, without any notification. Essentially, any automated reasoning system in an effort to deliver on the promise of the Semantic Web has to first and foremost deal with the challenge of representing and reasoning with 'uncertainty and vagueness induced by the dynamicity of web-resources' in ontologies regardless of the other imperfections of the knowledge itself. Therefore, state-of-the-art methodology—for making Internet data machine-readable and thus machine-processable—is problematic at the core.

Indeed, state-of-the-art methodology is proven to be only successful when applied to 'stable' web content, i.e., relatively static web-resources that provide adequate real-time information—such as through integration APIs—with respect to contextual and/or structural alterations whenever they occur. For example, Wikipedia has been successful in terms of Semantic Web compatibility. However, web-resources are mostly dynamic and complex both contextually and structurally, and most websites do not provide APIs for integration or what is provided may not be adequate and/or permanent. In general, websites have neither the ability nor the desire to cooperate. Furthermore, even absolutely static resources can be manually altered drastically. For example, a digital web-resource such as a static user interface can be altered by its provider both contextually and structurally. Or, even a physical web-resource connected to IoT such as a standard vehicle with a unique ID can be altered by the owner dramatically by extreme overhauling. In this context, for the execution of a certain task, for example, associating an agent with a web-resource—that is even assumed to be static—based on the existing ontologies may well lead to instability in the process. Thus, in practice, once a resource interacted with is altered, associations are often lost or incorrectly re-established and executed.

In conclusion, the Web is no more 'a web of documents'—as once described by Tim Berners-Lee in 2009—but a web of complex and dynamic interfaces provided in order to transceive complex and dynamic data or information to perform complex and dynamic processes during interactions with humans or machines. Moreover, these interfaces are evolving further to become personally adaptive intelligent interfaces that provide personalized experiences to their human or machine users. For example, adaptive websites provide dynamically altering web pages—both contextually and structurally—according to each corresponding user, such as based on web search history and real-time sentiment analysis. On the other hand, as stated before, even completely static web environments can be altered manually both structurally and contextually in time and the level of these alterations can be dramatic—especially if the intention is adversarial. Therefore, it is essential to assume that all web environments, i.e., all web-resources, are chaotic/unstable in nature. In this context, the fundamental problem with the state-of-the-art is the attempt to develop ontologies of inherently unstable content. Indeed, it is merely an engineering problem to provide said capabilities to any system that process environments ensured to be in absolutely steady state, i.e., environments where it is guaranteed that there will not be any alteration, such as the database of a search engine where the collected internet data is stored via web crawling and scrapping for processing.

SUMMARY

The current disclosure provides methods and systems that can manage the dynamic uncertainty induced by the resources of decentralized data networks, in order to ensure the stability and sustainability of task-oriented automated operations, such as operations involving intelligent agents. In contrast to the object-based state-of-the-art, the methods and systems enable object-aware processing based on a novel knowledge representation model 'Dynamically-Fuzzy Semantic Networks based on Analogies', to ensure the establishment of stable and sustainable associations with web-objects, while enabling those objects to be processed dynamically with full adaptability in response to contextual and structural alterations. Thus, the disclosure provides—both human and machine—users with the ability to develop and deploy modular dynamic systems capable of engaging any conceivable digital interaction with the resources of a data network, such as dynamically linking and manipulating clusters of complex web-objects to execute complex tasks in complex and dynamic web environments—most importantly—stably and sustainably.

From an industrial point of view, the disclosed methods and systems pave the way for the transformation of decentralized data networks, such as the Internet, into controllable and evolvable information spaces, i.e., where all information becomes subject to further processing in real-time in a stable and sustainable manner without any API support. Decentralized data networks—especially the Internet, the Internet of Things, or the Internet of Everything in general—have a tremendous potential that is currently idle or in its infancy in terms of independently operating task oriented interoperable automated agents. Disclosed technology, when combined with the state-of-the-art deep-learning techniques—such as 'generative pre-trained transformers' and 'large language models'—may lead to the formation of a global network of interoperable intelligent agents in a stable and sustainable manner—which is the ultimate goal of the Semantic Web. However, although this was the initial goal that was set out, the solutions developed have reached a scope far beyond the scope of that goal. Below is a metaphorical description of the essence of the problem that is being solved by the disclosed methods and systems.

In mythology, folklore and speculative fiction, shapeshifting is the ability to physically transform oneself through unnatural means, while gaining the features of the transformed entity. In this context, a shapeshifter is a person or being with the ability to change its physical form—along with the features that come with those forms—at will. For example, if a shapeshifting snake transforms into a bird, then it gains all the abilities that the bird possesses such as the ability to fly. Or if a shapeshifting bird transforms into an x-ray machine than it gains all the features that the x-ray machine possesses while losing the former abilities. Furthermore, a shapeshifter may also transform into currently unknown—in between—beings. Such as an x-ray machine that also has the features of a gaming console. Shapeshifting process can be intermittent or continuous, rapid or slow. While some shapeshifters must follow certain rules during their transformation processes and they are limited with respect to the scope of the transformations, others may not follow any rules and they can transform into all sorts of things—such as Aku of Samurai Jack, who does not follow any rules. Now, consider a hospital, where the doctors, nurses, caregivers who work in it are shapeshifters. Even the hospital itself including the equipment are shapeshifters. Fortunately, the director of the hospital is a normal human being who is in charge of everything and also responsible about the well-being of the patients who are also usually normal humans, but sometimes there may be patients who are shapeshifters as well. Just like any hospital it must be ensured that: patients receive the correct treatments; surgeries are performed flawlessly; patients are diagnosed correctly; the equipment work properly, the employees work in harmony, etc. The only tools that the director has are the agents at his disposal, who also act as a bridge between him and the rest of the hospital. Now consider the problem: How such a hospital that is full of chaos and all kinds of uncertainties can be managed by the director with the help of his agents stably and sustainably? The methods and systems described herein are designed and developed to solve this challenging problem. Finally, one might question whether such environments exist in real world. Although often overlooked, the real world is indeed full of such systems, from the internet to quantum mechanics, or from stock markets to human relations.

Below is the brief summary of the entire subject matter from the parent patent (Gen1) to the present continuation-in-part patent application (Gen4) in reverse order, wherein the disclosures Gen1 and Gen2 mainly involve the core methods, systems and principles in the context of processing web objects, while the disclosures Gen3 and the current disclosure Gen4 mainly involve generalization of those core methods, systems and principles to all objects while introducing further advanced methods, systems and principles including a novel ontological model.

Brief Summary of the grandchild—Gen3—Continuation-in-Part Patent Application (Pat. Ser. No. 18/583,521) and the following present—Gen4—Continuation-in-Part Patent Application: A) Methods and Systems for Object-Aware Fuzzy Processing based on Analogies involving Physical and Digital Objects: A.1) Modular subsystems consisting of super-objects based on web-objects to interact with physical, digital and abstract web-resources; A.2) A high-level architecture of an exemplary system processing both physical and digital objects. B) Ontological Consequences of the Disclosed Methods and Principles: B.1) 'Dynamically-Fuzzy Semantic Networks based on Analogies' a novel fuzzy semantic network involving Transforming-Objects, Transforming-Concepts, and Analogue Relations; B.2) Methods for semantic similarity comparison; B.3) Similarity functions of Transforming-Objects and Transforming-Concepts; C) Disclosed Ontological Model 'Dynamically-Fuzzy Semantic Relations based on Analogies' and the rule of Dynamically-Fuzzy Associations '$ST_w \leq S_{TO_n \sim O_B/C_B}(t) \leq 1$' in the context of Super-Objects: C.1) Methods for identifying the context ($C_B$), root-object ($O_B$), and similarity threshold (ST) of a super-object; C.2) Determinability of critical boundaries and the optimal value of similarity threshold in finite sets; C.3) Determinability of critical boundaries and the optimal value of similarity threshold in infinite sets; C.4) Methods with respect to deciding on the value of similarity threshold; C.5) Further methods with respect to identifying associations between objects and super-objects; C.6) Strategies related to conditions that are partially satisfied due to missing, incompatible, or insufficient components of associated objects and/or loss of components of associated objects during a process; C.7) Partial execution of a user generated application encapsulated in a super-object. D) Similarity Control of a Transforming-Object based on Manipulation of the Transforming-Object—An Introduction to the Calculus of Semantics in the context of Dynamically-Fuzzy Systems: D.1) A PID control system to control a transforming-object based on the manipulation of the transforming-object; D.2) Methods for the Feedback Process; D.3) Comparator; D.4) Compensator; D.5) Methods for the Main-Process. E) Comparison of the Disclosed Ontological Model with the State-of-the-Art. F) 'Similarity Inference' in the context of the Disclosed Ontological Model and 'Generalized Similarity Inference Rule'. G) Assessment of Utilizing the Disclosed Ontological Model as a Generalized Ontological Model for Explaining Everything.

Brief Summary of the parent—Gen1—Patent (Pat. No. 11,625,448) and the following child-Gen2-Continuation-in-Part Patent Application (application Ser. No. 18/178,382): As also fully disclosed in this current disclosure, according to the embodiments in said disclosures, the system controls web-objects to be interacted with by determining 'what exactly the objects of web resources are' at a contextual level and deciding 'how super-objects may interact with them' according to system-defined interaction rules. In this process, the system analyzes and interprets web-objects contextually, e.g., according to roles, functions, or other distinctive features, including identifying and clustering interrelated elementary objects, i.e., web-elements, in rank order and assigns each singular elementary object and each cluster of interrelated elementary objects an analogue reference, e.g., an UVEI or UEI, with respect to the corresponding context, and decide on the interaction possibilities accordingly. Thus, a user may select a web-object to manipulate and develop interaction procedures between the prospective super-object and the selected web-object with the assistance of the system. In this process, once the development of an interaction procedure between a prospective super-object and a web-object—such as a graphical user interface with a certain function, or a content with a certain context—is completed, the system records both the analogue reference of the web-object (e.g., UVEI/s, UCFI, etc.) and the interaction procedure regarding that object (e.g., a set of instructions to manipulate the web-object) as encapsulated within the prospective super-object. Following this step, the system establishes the association between the prospective super-object and the corresponding web-object by recording the super-object in a database. Similarly, once an interacted web resource is revisited and/or subsequently rendered, the system re-processes the entire operation of analyzing, interpretating and referencing in order to compare recently extracted analogue references of web-objects with previously recorded analogue references—encapsulated within the super—objects—to identify similarities within predefined similarity thresholds in the context of the predefined structure of said analogue references. Therefore, the system identifies components, i.e., web-objects, for re-establishing the associations with the corresponding super-objects. Following this step, the system adapts itself to the recent state of the components contextually according to the interpretation of the differences between 'the analogue references of associated web-objects' and 'the analogue references of the corresponding root objects' at the moment of encounter. And, for each associated web-object, the system executes the corresponding modified interaction procedure accordingly. Thus, for example, the system may identify a contextually and structurally altered complex component possessing a steady function and adapt the interaction procedures to the recent structure within a contextually and structurally altered complex web page when revisited, according to the embodiments in said disclosures. N.B.: This present disclosure includes said disclosures in full.

Re-Definition of Some of the Core Concepts: Within the context of this subject matter, due to the inadequacy of the existing definitions of some of the core concepts such as 'entities' and 'objects', a need for redefinition has emerged. A) Entities: An entity is either 'a conceptual entity' or 'a physical entity' or 'a hybrid entity that involves both conceptual and physical properties in a certain proportion', wherein 'conceptual entities' are subject to the 'rules of the governing concepts that they are included in' (e.g., mathematical concepts of the mathematics), 'physical entities' are subject to the 'laws of physics' (e.g. physical events of the physical universe/s) and 'hybrid entities' are subject to both the 'rules of the governing concepts that they are included in' and the 'laws of physics'. Exemplification: As an example of a hybrid entity, consider the case of a digital simulation of a physical event. A digital simulation is—generally—the outcome of a process that involves both conceptual entities such as algorithms and physical entities such as processors. Furthermore, the degree of approximation to reality of a simulation is determined by both the quality of algorithms and the capacity of the processing hardware involved. In this context, at least some of the digital entities may be considered as hybrid entities that are subject to the laws of computation involving both the rules of mathematics and the laws of physics. For purely physical and purely conceptual entities—again in the context of computation—a mechanical computer such as the 'Antikythera Mechanism', and an abstract machine such as the 'Turing Machine' may be considered respectively. N.B.: As a counter argument, it can be further proposed that a digital simulation process may not be that different than a mechanical simulation process such as the operation of the Antikythera Mechanism' once started. However, this may not be a valid argument for all cases; consider a digital simulator that involve conceptualization of the outcomes—such as in the form of a feedback loop—during a simulation process. In such a case the outcome is a product of both conceptual entities—such as a decision based on the conceptualization of an event—and physical entities—such as the electrons that interact with the semi-conductors in the transistor to execute the above decision. If one fails, the outcome is affected thus both entities must be evaluated as a whole. B) Objects: An object is either a full-object, or a semi-object, or a virtual-object, wherein a full-object is a pure physical entity, a semi-object is a hybrid entity, and a virtual-object is a pure conceptual entity that represents either a physical entity, or a conceptual entity, or a hybrid entity—while all related concepts such as 'instances' or 'individuals' must be considered accordingly. Exemplification: Consider the above example digital entities as digital-objects that involve either purely conceptual properties, or—in between—hybrid properties in certain proportions. N.B.: This definition of 'objects' obviously deviates from common informatics terminology (such as the OOP terms) that defines an object only as a pure concept that represents a physical or conceptual entity. On the other hand, defining 'objects' as 'concepts' while totally ignoring the concept of 'semi-objects' thus ignoring the concept of 'digital-objects'—which may involve both physical and conceptual properties at the same time as shown above—is a deficiency. Conclusions: i) An object may be purely physical, or purely conceptual, or hybrid—with certain proportions of both. ii) A digital-object may be purely conceptual or hybrid, but not purely physical, which provides the transition from the physical to the abstract. N.B.: It may be even further proposed to define 'digital-objects' as entities that cannot be purely conceptual either if any supporting evidence emerges about this matter. Last but not least, the terms 'web-resource' and 'web-object' may also be re-defined herein: A) Web-Resource: A web-resource is any identifiable resource (digital, physical, or abstract) present on or connected to the World Wide Web or any similar structure of a data network. B) Web-Object: A web-object is an object that is a resource or component of a resource of the Web. N.B.: None of these definitional alterations affect the essence of the disclosed methods, systems, principles, etc.

BRIEF DESCRIPTION OF THE FIGURES

FIG. 2 is a flowchart diagram illustrating an example process to identify and mark visual elements—of a rendered web page—that are associated with user inputs, i.e., super-objects;

FIG. 12 is a flowchart diagram illustrating an example process that includes steps with respect to processing of/interacting with any digital and/or physical object;

FIG. 14 is an example semantic network, i.e., knowledge graph, involving—semi-arbitrarily chosen—objects, concepts, and their relations, constructed according to the conventional ontological models;

FIG. 15 is an example semantic network—created by modifying the semantic network presented at FIG. 14—involving a 'transforming object' (t-object) and its relations;

FIG. 24 is a hypothetical similarity function of a transforming-object (TO) with respect to a reference concept—or base-concept—($C_B$) in the context of the same reference concept—or base-concept—($C_B$);

FIG. 25 is a hypothetical similarity function of a transforming-concept (TC) with respect to a reference concept—or base-concept—($C_B$) in the context of the same reference concept—or base-concept—($C_B$);

FIG. 26 is an example similarity function of a particular sequence of manifestations ($TO_1$) of a transforming object (TO) with respect to a reference concept—or base-concept—($C_B$) in the context of the same reference concept—or base-concept—($C_B$) in the cartesian coordinate system;

FIG. 28 is a flowchart diagram illustrating an example process that includes steps with respect to identifying the context ($C_B$), root-object ($O_B$), and similarity threshold (ST) of a super-object; and FIG. 29 is a flowchart diagram illustrating an example process that includes steps with respect to identifying associations between objects and super-objects based on the association rule '$ST \leq S_{TO_n \sim O_B/C_B} \leq 1$' and executing the corresponding set of instructions accordingly in an environment comprising both digital and physical objects including digital objects of resources of various data networks.

FIG. 30 is a block diagram illustrating an example feedback control system with respect to controlling the similarity of a transforming-object ($TO_n$) relative to a reference object ($O_B$) in the context of a base concept ($C_B$) via manipulating the transforming-object.

FIG. 31 is a graph representation of a hypothetical time response of a control system with respect to controlling the similarity of a transforming-object ($TO_n$) relative to a reference object ($O_B$) in the context of a base concept ($C_B$) via manipulating the transforming-object.

FIG. 32 is a flowchart diagram illustrating a cycle of an example process that includes steps with respect to similarity control of a transforming-object ($TO_n$) relative to a reference-object ($O_B$), in the context of a base-concept ($C_B$), for a setpoint ($ST_W$).

DETAILED DESCRIPTION

Figure 1:
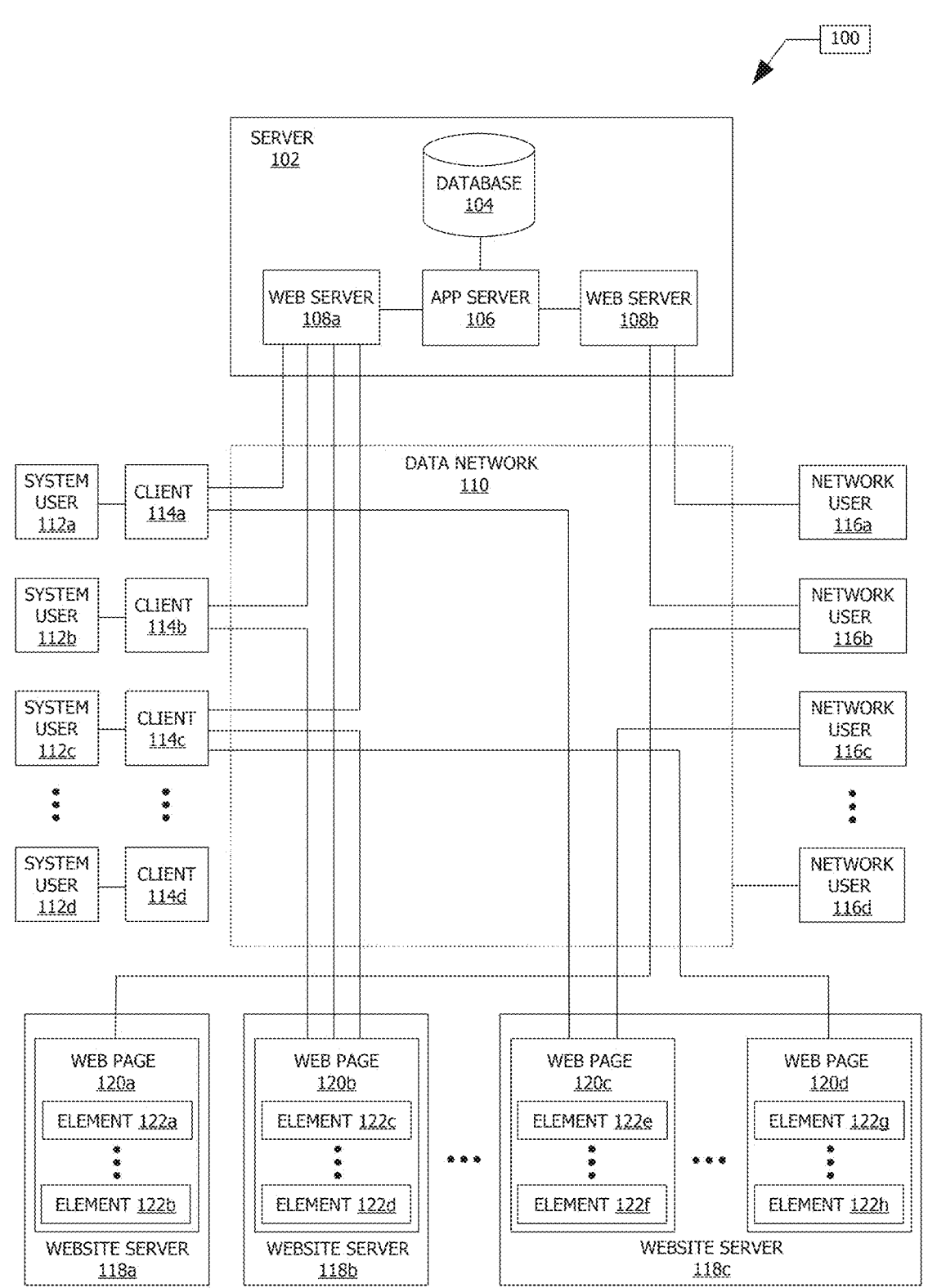
FIG. 1 is a high-level architecture of an exemplary system, according to an embodiment.

This disclosure includes: i) description of a novel web-based interaction framework, i.e., Superimposed Interaction Framework (SIF) or formerly named as Superimposed Communication Framework (SCF), and an example of the envisioned infrastructure to realize the promises of SIF, i.e., Semantic Web Infrastructure for Superimposed Interactions (SWISI) or formerly named as Semantic Web Infrastructure for Superimposed Communication (SWISC); ii) statement of the fundamental problems that the framework involves, i.e., the problem of ensuring the stability and sustainability of interactions; iii) statement of the design constrains and design parameters based on the problem statement; iv) description of the 'methods and systems for object-aware fuzzy processing based on analogies' involving only digital web-objects; v) description of the methods and systems for 'object-aware fuzzy processing based on analogies' involving digital and physical web-objects; vi) description of a novel ontological model involving a knowledge representation model 'Dynamically-Fuzzy Semantic Networks based on Analogies' and dynamically uncertain relations 'Dynamically-Fuzzy Semantic Relations based on Analogies' comprising transforming-objects, transforming-classes, and their analogue relations; and vii) description of further methods for 'object-aware fuzzy processing based on analogies' in the context of the disclosed ontological model.

Superimposed Interaction Framework—Interactions Based on Super-Objects:

The superimposed interaction framework promises the formation of interoperable modular sub-systems based on the establishment of dynamic associations between super-objects and web-objects. In essence, a super-object is a user generated set of instructions, i.e., a user generated application, that process/manipulate the web-object to which it is associated. Super-objects together with web-objects constitute the building blocks in the framework of Superimposed Interactions. More concretely, in the process of establishing associations to form modular sub-systems, if super-objects are conjunctional building blocks, then web-objects are reference building blocks, i.e., a base for reference. In this context, any web-object (digital or physical) existing in or connected to a data network may be used as a building block. By definition, a web-object can be any component of a web-resource from a single element, i.e., an elementary object, to a cluster of interrelated elements including the web-resource itself as a whole. Thus, any web-resource e.g., any web page, API, or a physical entity connected to said data network, can be included in any process partially or wholly as a web-object along with super-objects (provided that integration APIs or similar services are not used for any process related to ensuring stability and sustainability). In this context, super-objects that are directly associated with web-objects constitute the most fundamental layer of the superimposed interactions and their activity is considered as first-order interactions with web-objects or—shortly—they are considered as first-order super-objects. For example, a first-order super-object may be programmed to dynamically process particular images in dynamic websites in order to convert them from 2D to stereo 3D.

Similarly, super-objects that are directly associated with first-order super-objects are considered as second-order super-objects. For example, a second-order super-object may be programmed in association with the above mentioned first-order super-object—that converts 2D images to 3D—to enable users to annotate sections of 3D images with intelligent 3D post interfaces that can positionally organize the display of 3D annotations. However, if the adjunct super-object directly processes the web-object itself or its surrounding environment—such as adapting to the background to provide an improved user experience—then it is considered a first-order super-object. In principle, super-objects that are directly associated with n–$1^{st}$ order super-objects are considered as $n^{th}$ order super-objects and their activity is considered as $n^{th}$ order interactions with web-objects. For example, a third-order super-object may be programmed in association with the above mentioned second-order super-object—that enable users to annotate sections of 3D images—to further process the annotations or annotated sections, such as to collect statistical data.

Furthermore, super-objects may be used as junction points and users may interact with each other through first or higher order super-objects that act as network links. For example, a super-object may be programmed to dynamically process certain articles on news websites to identify and indicate inconsistencies or fallacies, and to respond critically according to the revisions that publishers make—if they do so. Further, an adjunct super-object may be programmed in association with the first order super-object to enable users—including the publisher and the reviewer—to communicate with each other, such as through adaptive post & comment interfaces, regarding the claimed fallacies right on the spot. In this context, the Superimposed Interaction Framework (SIF) also paves the way for web-wide social networking without borders—which herein referred to as Superimposed Networking. On the whole, the framework provides a multi-layered interaction environment, in which advanced modular sub-systems, e.g., automated agents, may be developed and deployed in association with any web-object—or any cluster of web-objects—of a data network in any imaginable way.

Figure 11:
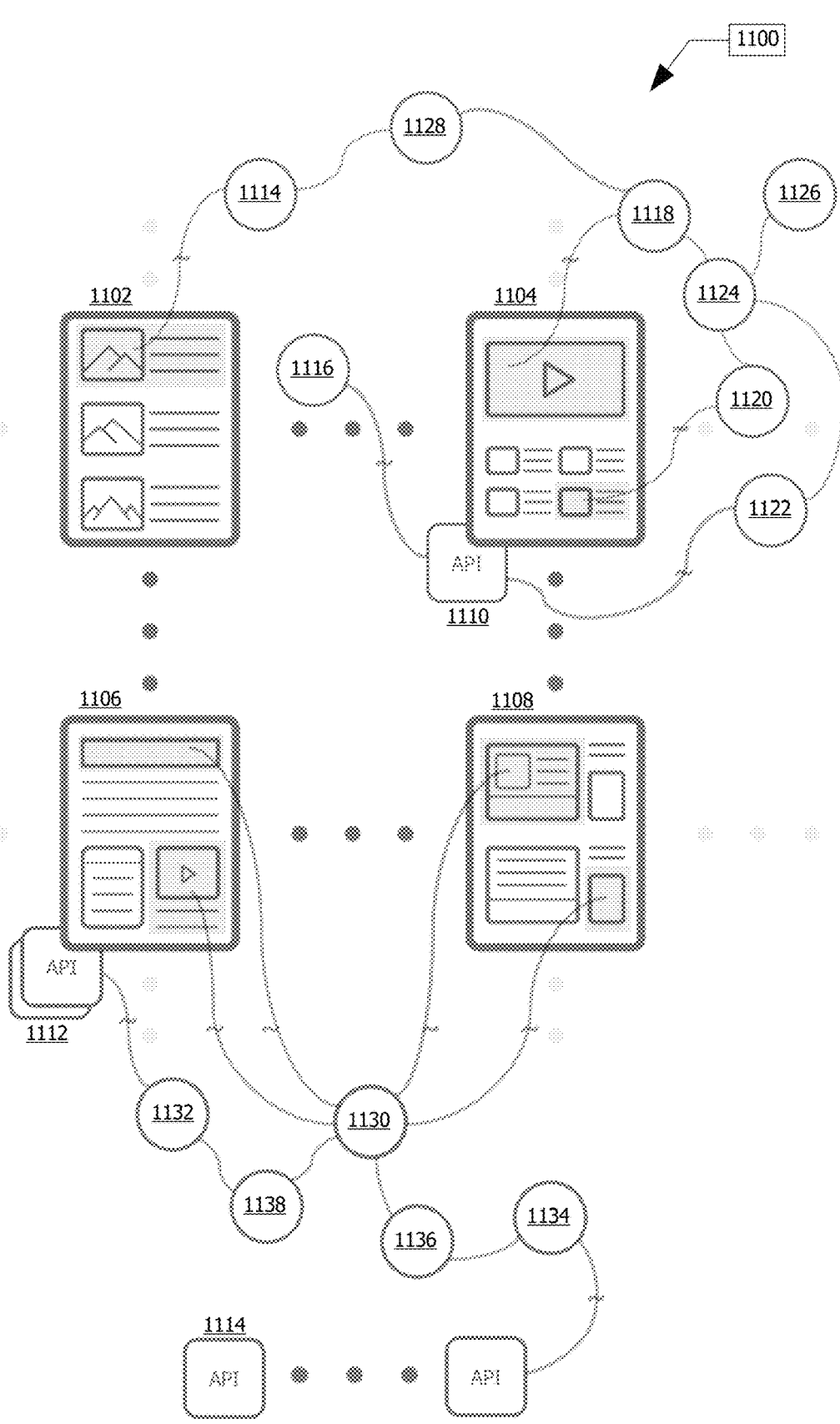
FIG. 11 is a diagram illustrating example modular subsystems created by super-objects on the basis of web-objects.

FIG. 11 is a diagram illustrating example modular subsystems created by super-objects on the basis of web-objects. The illustrated environment 1100 includes a plurality of web pages, APIs, and super-objects. 1102 and 1104 are dynamic web pages of two separate websites; namely an online review publishing website and an online video sharing website respectively. 1106 and 1108 are dynamic web pages of an adaptive website; namely a multi-purpose super-website for messaging, banking, shopping, social networking, etc. Each of the web pages is illustrated with various web-objects and the ones that are associated with super-objects are shaded in grey (1102a, 1102b, 1104a, 1104b, 1106a, 1106b, 1108a, and 1108b). 1110 and 1112 are APIs associated with 1104 and 1106 respectively. 1140 is a cluster of independent APIs provided by a third-party service provider. 1114, 1116, 1118, 1120, 1122, 1130, 1132, and 1134 are first-order super-objects. 1124, 1128, 1136, and 1138 are second-order super-objects and 1126 is a third-order super-object. Associations between first-order super-objects and web-objects are illustrated with dotted lines (including a sine wave symbol at the middle) representing the fuzzy nature of associations. Associations between super-objects themselves are illustrated with solid lines representing the precise nature of associations. N.B.: Establishment of analogue associations between super-objects are also possible; for example, to establish associations between super-objects of two or more rival SIF infrastructures that are not in coalition.

According to an embodiment, the super-object 1118 is associated with the video player interface 1104a (shaded in grey on the web page 1104) of the online video sharing website in order to dynamically integrate advanced features to the interface to be effective within the entire website, such as a color corrector or a 2D to 3D convertor, while collecting statistical data regarding the content played, such as viewing rates per-video. The super-object 1114 is associated with the link preview interface 1102b along with the search engine interface 1102a (both shaded in grey on the web page 1102) of the online review publishing website in order to dynamically manipulate the interfaces to use them as a source for retrieving metadata about services and products including their ratings and reviews. Because both the super-objects 1114 and 1118 also act as APIs of 1102a, 1102b, and 1104a, the super-object 1128 is developed and associated with both of them as a universal port to collect data and information in regard to 1102 and 1104a. In this context, 1118 is further modified to utilize the data and information provided by 1128 in order to process and display corresponding ratings and reviews of the videos that are being played. Similarly, 1114 is further modified also to utilize the data and information provided by 1128 in order to process and include the statistics collected by 1118. Meanwhile, said video sharing and review publishing websites decide to use 1128 to improve their services.

The super-object 1120 is associated with the core page of a particular video, thus it is also associated with the link preview of said video appearing on the page 1104 (shaded in grey)—as a preference of its developer. The super-object 1120 comprises only non-executable content, i.e., comprises no instructions, thus serves similarly to a conventional annotation, such as a post, comment, or tag. The super-objects 1116 and 1122 are individually associated with the API 1110 which is a service provided by the video sharing website that publishes the web page 1104. The super-object 1122 particularly acts as a universal API, i.e., provides API conformity among different conventions, in regard to the API 1110. The super-object 1124 is developed and associated with 1118, 1120 and 1122 in order to integrate the features of 1118 and 1122 while using the content shared in 1120 as a data input, such as to initiate a sub-process, etc. The super-object 1126 is developed and associated with the super-object 1124 in order to further enhance its capabilities. Meanwhile, the super-object 1130 is associated with various graphical user interfaces 1106a, 1106b, 1108a, and 1108b spread over two web pages of another website (shaded in grey on web pages 1106 and 1108), in order to dynamically manipulate the interfaces as a whole. Essentially, these are dispersed segments of a previously singular graphical user interface with which the super-object 1130 is associated. In addition, the super-objects 1136 and 1138 are developed and associated with the super-object 1130 in order to enhance and expand its abilities by utilizing the API 1112 provided by the same website and the cluster of APIs 1140 provided by a third-party website, according to the embodiment.

To recap, within the context of Superimposed Interaction Framework (SIF), super-objects may be associated with complex and dynamic web-objects—such as a structurally altering GUI, or a contextually altering HTML table in a structurally altering GUI, or an API, or combinations thereof—in complex and dynamic web environments—such as an adaptive website—to perform complex and dynamic tasks within the scope of accessible data/information—such as a dynamic task about data mining and analytics-stably and sustainably. Once super-objects are deployed in association with web-objects—which is herein referred to as first-order super-objects-users may further deploy higher-order super-objects in association with the first-order super-objects while interacting with each other through any super-object that act as a network link—such as through messaging interfaces provided. As a result, within the scope of the disclosed framework, an infinite array of associations may be established between or through web-objects in order to perform an infinite array of operations in relation to the corresponding web-objects. Thus, any identifiable web-object, such as a GUI, a table, an article, an API, etc. or any identifiable cluster of web-objects, such as a combination of GUIs, tables, articles, APIs, etc., may become a potential building block—besides the user-generated super-objects—for constructing complex modular sub-systems—such as, creating cascade data processing structures via super-objects that act as connectors and processors—in order to perform complex operations—similar to the concept of electronic sound generation by modular synthesis.

Semantic Web Infrastructure for Superimposed Interactions—an Example of the Envisioned Infrastructure:

'Semantic Web Infrastructure for Superimposed Interactions' or 'SWISI' is envisioned to be an intelligent intermediary powered by the disclosed methods and systems in order to realize the interaction mechanism that the super-imposed interaction framework offers, i.e., interaction based on super-objects. SWISI is envisioned to operate autono-mously between nodes of a data network, especially focus-ing on decentralized data networks where generally there is no coalition—and therefore no coordination—between server nodes, such as the Internet. In this context, SWISI may directly provide a coalition between client nodes through the client-side application of the system—such as embedded in browsers—in coordination with the server-side application. On the other hand, SWISI may indirectly pro-vide a coalition between server nodes by controlling the interactions between client nodes and server nodes in real-time, through the client-side application of the system in coordination with the server-side application. During this—inherently challenging—process, SWISI may utilize data/information accessible through browsers of client nodes, e.g., web pages and APIs,—but—without resorting to any support for integration from server nodes, such as utilizing integration APIs. Theoretically, SWISI may provide a full coalition between all nodes of a data network within the scope of all accessible data and information through brows-ers—or similar intermediaries. In this context, SWISI may act as a universal and highly capable 'dynamic integration API' between nodes of a data network without the need of any API support from any node for integration.

The Challenge of Ensuring the Stability and Sustainabil-ity of Interactions—The Problem of Dynamic Uncertainty:

Web-resources have evolved from relatively static docu-ments into dynamic interfaces and are becoming increas-ingly complex both contextually and structurally. Indeed, increasing the dynamicity in layout and content inherently enhances the efficiency of human-machine interactions by providing tailored experiences. For example, consider a GUI of an adaptive website that can configure itself in real-time according to the needs of its individual users, such as enhancing the users' ability to interact with the GUI itself, by smart alterations in terms of layout and features based on the feedback about the efficiency of the past and ongoing interactions. On the other hand, in contrast to the adaptive websites—which are obviously at the complex side of the spectrum-even the simplest static web documents can alter dramatically in time manually and these alterations can be complex. Furthermore, interaction possibilities can be infi-nitely many and they can be also extremely complex. To illustrate the complexity of the problem of 'ensuring stabil-ity and sustainability of interactions between super-objects and web-objects' the simplest possible case of 'annotating a static HTML page with very basic components' can be considered. Indeed, web annotations are among the simplest interaction options with web-resources since they require only the establishment of associations between web-re-sources—such as between a user generated content e.g. a comment and a web-object—without the additional opera-tions unique to super-objects.

As an exemplary case, annotating a static 'article page' consisting only of elementary web-objects, i.e., web ele-ments, namely, a header and a footer—as components of the page—, a heading, a couple of paragraphs, a picture, and a video—as components of the article—can be considered. For example, users can annotate components of the page—in whole or in part—such as, annotating the footer, the video, one of the paragraphs, or a sentence in one of the paragraphs, etc. Or users can annotate arbitrary clusters in the page such as, annotating the heading, the video, and the footer as a group selected randomly. Or users can annotate meaningful or purposeful clusters of the page such as, the article as a whole, i.e., the cluster including all web-objects related to the article such as the heading, the paragraphs, the picture, and the video, but, not extraneous content, such as ads or other links scattered in the article. Furthermore, users can annotate the objects of the page contextually, which can vary greatly from 'exact contents' to 'roles and functions' of singular or clustered elementary web-objects. For example, users can annotate the article based on its content, or they can annotate the article regardless of its content. Or, users can annotate the objects of the page structurally, such as annotating the frame of a GUI or the scrollbar of a table, etc. Consequently, as can be seen, despite the simplicity of the page, the interaction possibilities are quite rich.

On the other hand, contextual and structural alterations—which can occur manually in a static page—further increase the complexity of the problem. For example, contents of the web-objects can be altered slightly or drastically, and/or existing objects can be deleted, and new objects can be added. Further, relative positions of the elementary objects (i.e., elements) can be altered slightly or drastically, such as the layout of the components or the layout of the whole page can be altered. Further, object identifiers can be altered along with the previous alterations, and as a result, object model of the web page—such as the Document Object Model (DOM)—can be altered completely. Thus, the page can be altered deeply both contextually and structurally in various levels, and all of these alterations can occur simultaneously and rapidly. For example, the paragraphs of the article displayed in the page can be modified grammatically, or attributes of the image and the video—such as the resolution and format—can be altered. Further, the article itself can be rearranged so that the number of paragraphs can increase or decrease, or the image belonging to the article can be replaced with another one within the same context. Further, a new paragraph, image, or video can be added to the article that are out of context, such as hidden advertisement content meticulously inserted as if it was part of the article. Further, the position of the new paragraph, image, or video within the article can be altered, thus the structure of the article can be altered. In conclusion, as can be seen, despite the staticity and simplicity of said page, alteration possibilities-albeit manual—are quite rich, and these examples could be mul-tiplied further.

On the whole, both the interactions and alterations that can occur even in a simple web document can be very diverse and challenging. Besides,—as mentioned before—web-resources have evolved from static documents to highly capable dynamic user interfaces and the scope of the inter-action capabilities aimed to be provided by super-objects is far more complex than web annotations. In principle, the problem of 'maintaining associations with resources and adapting corresponding execution procedures to alterations', i.e., the problem of 'ensuring the stability and sustainability of interactions', increase exponentially as the dynamicity and complexity of web-resources and/or alterations increase.

In essence, the difficulty of ensuring the stability and sustainability of the interactions of a super-object depends on the task, environment, and alterations, which is a com-plex control problem involving multi-layered ontological problems, i.e., problems concerning existence and existen-tial assumptions of bonds between super-objects and web-objects. For example, in what context will the association be established; in what conditions will this association be preserved or terminated; if the association is preserved, how the task will be performed according to the current state. In this context, ensuring the stability and sustainability of a super-object may be defined briefly as 'controlling how that super-object interacts with exactly what' and 'maintaining that interaction despite contextual and structural alterations by adapting to said alterations during encounters in real-time'. Furthermore, besides prospective interactions between interactive web-objects and super-objects, some web-objects—interactive or not—may react with intelligent metamorphoses or transfigurations to the super-objects that they are associated with—for example—to destabilize the associations. For example, contextual and/or structural alterations related to a GUI and its surrounding environment may be adversarial interventions designed to destabilize the super-object with which the GUI is associated. In this context, a number of assumptions have been identified:

1. Assumption: Integration APIs are assumed to be always insufficient and/or unreliable to ensure the stability and sustainability of first order interactions. Rationale: Most websites do not provide APIs for integration or what is provided may not be adequate and/or permanent. Approach: Processing based on observable, reachable, fetchable data and information of web environments.

2. Assumption: Web environments are assumed to be always highly dynamic, even if they are static. Rationale: Any static web environment, including the web-objects within, can be manually altered, both contextually and structurally, at any time drastically. Approach: Real-time processing.

3. Assumption: Manifestations of web environments are assumed to be always unique and specific to users. Rationale: Most of the web environments are behind log-in-walls or paywalls, and exclusive to their users, and as a consequence different users have different access to web-objects. Approach: Processing web environments through clients individually.

4. Assumption: Alterations in web environments are assumed to be always adversarial responses in order to destabilize super-objects. Rationale: In order to be able to adapt to any alteration in any scenario, it is essential to assume that websites will react to super-objects with cleverly designed alterations to destabilize them. Approach: Processing web environments to semantically identify each web-object at each viewing/rendering/scanning of a client.

Consequentially, said assumptions can be ultimately combined and represented by a generalized assumption to constitute the fundamental axiom of the framework: 'Web-objects are assumed to always undergo unpredictable transformations in-between manifestations'. Or more concretely: 'a web-object is postulated to be a transforming-object—or a t-object in short—which is an object that is assumed to transform unpredictably between manifestations, appearances, or observations'. Indeed, web-objects can be intentionally programmed to alter unpredictably both contextually and structurally at each manifestation, thus can be programmed to transform unpredictably between manifestations—just like magical shape-shifters or transformers.

Design Constraints & Design Parameters—Limitations or Restrictions Imposed by Internal and External Factors:

To recap, web-resources have evolved from static pages to dynamic user interfaces, and they are evolving further to intelligent user interfaces that are capable of adapting to their users individually, providing personalized experiences. As a result, most of the web-resources are individualized, structurally complex and subject to frequent alterations both contextually and structurally. Furthermore, adversarial attempts of websites such as making specially designed alterations in web pages as an attempt to create confusion by/regarding contextual and structural alterations in the web page is a potential threat. Consequently, according to the—above-stated—generalized assumption, i.e., 'a web-object is an object that is assumed to transform unpredictably between manifestations, appearances, or observations', the key design parameters follows as: 'ensuring the stability and sustainability of interactions (i.e., 'controlling how super-objects interact with exactly what' and 'maintaining those interactions despite alterations') i) in real-time, ii) in any environment (e.g., rapidly and/or drastically altering complex web environments) iii) within any scenario (e.g., adversarial attempts of websites in order to destabilize the operations of the system) iv) in a self-contained manner (e.g., not utilizing integration APIs or similar services provided by websites)'.

In this context: i) Any approach based solely relying on pre-scanning, pre-analyzing, pre-organizing, or archiving web-resources as a primary method for the processes regarding establishing & maintaining associations, adaptation, etc. is incompetent and must be eliminated. For example, keeping track of the states and activities of web-resources by data crawling or scraping and utilizing the collected information in order to recover intended previous versions and/or identifying the correct representations of altered web-resources may provide a historical record that omits relevant details/information. Instead, each visited web-resource must be analyzed individually for each client at each viewing/rendering cycle. ii) Any approach based solely relying on collaboration with websites as a primary method in operations regarding establishing & maintaining associations, adaptation, etc. is incompetent and must be eliminated. Instead, the system must be able to be self-sufficient, i.e., self-contained, by using observable, reachable, retrievable data, and information of web-resources. In fact, the tools provided, such as integration APIs, are often insufficient or no tools are provided at all. Besides, even if a fully competent integration API is provided, its continuity cannot necessarily be guaranteed. iii) Any approach based solely relying on image processing, such as page view analyses based on computer vision algorithms, is incompetent and must be eliminated. To exemplify this argument, a web-object designed to perform a complex function—such as a graphical user interface (GUI) that includes forms and tables designed to operate some sort of complex interactive operation with users—may be considered. In such a scenario, the system must essentially analyze the related codes/scripts in order to identify the complete process besides analyzing visual features and aspects of the GUI. Furthermore, said GUI can be altered in such a way that it does not maintain its 'structural integrity' anymore. For example, the GUI can be divided into structurally different sub-clusters that are also positioned discretely in the page, which as a whole perform the same operation. Or the simplistic case of a video, such as an educational video shared in an educational website may also be considered. In such a case, depending on the process to be performed by the super-object to be associated, it can be essential to analyze the video content partially or wholly. Furthermore, said video can be altered in such a way that it does not maintain its 'contextual integrity' anymore. For example, the video can be re-edited without any reliable metadata regarding the context of the alteration. In such a scenario, the system must also analyze the altered video content in order to extract the context of the most recent version. Instead, each visited web-resource must be analyzed in-depth—both contextually and structurally including machine-readable content such as HTML and JavaScript code—for each client at each viewing/rendering cycle individually.

Note1: A 'design parameter' is a 'qualitative and/or quantitative aspect of a physical and/or functional characteristic of a system that is input to its design process'. Note2: A 'design constraint' is a limitation or restriction in the design process imposed by internal and external factors. Note3: Regarding the first assumption, web-objects-which may be digital, physical or combinations thereof—are assumed to be observable therefore ensuring the stability and sustainability of first order interactions is assumed to be feasible in terms of observability without utilizing integration APIs. Note4: According to the W3C standards, by definition, a web-resource is always identifiable by its identifier—such as its URI. However, a resource identifier may not be able to reliably convey information about the true nature—such as conceptual semantics—of a web-resource even if intended so—for example due to unpredictable alterations that may occur in the resource itself. Furthermore, it is virtually impossible to proactively identify and convey the contextual semantics of a web-resource—even an absolutely static one—that exists in an unpredictably variable environment—for example due to alterations in other resources that coexist and interact with the resource itself. Therefore, it can be deduced that epistemologically, except being a claim of the existence of an entity, resource identifiers—such as URIs—are generally useless.

In the following sections, the description of the methods and systems presented progresses gradually from associating non-executable—passive—super-objects (i.e., user generated contents) with digital web-objects to associating fully functional executable super-objects (i.e., user generated applications) with digital web-objects—including the adaptational and executional processes. Subsequently, the disclosure expands from interaction with digital objects to interaction with all kinds of objects. In this context, generalized methods and systems involving digital and physical web-objects are described and exemplified. Following that, a novel ontological model comprising transforming-objects, transforming-classes, and their analogue relations is described and exemplified. Lastly, further methods for 'object-aware fuzzy processing based on analogies' in the context of the disclosed ontological model is described and exemplified.

Methods and Systems for Object-Aware Fuzzy Processing Based on Analogies Involving Digital Objects—Interaction with Digital Web-Resources:

As a special case in terms of interaction with digital web-resources and excluding physical and abstract resources that are not represented by digital objects, according to various embodiments, visual objects, i.e., visual web-objects, are used as reference building blocks for associating super-objects since the majority of web-resources on the Web are graphical user interfaces, e.g., web pages. Nevertheless, any non-visual object that can exist in a web page—e.g., a script or markup—is comprised as the contents of visual objects—e.g., as the content of a component of a web page or as the content of the whole page itself.

Visual objects are objects on a web page that form the structure of the web page. According to Kudělka et al. (2010); Visual objects are independent in their content, have an ability to be classified in the meaning of their purpose, and identifiable in terms of labelling a certain physical part of the web page. Visual objects carry some information to a user and as a whole perform certain functions. A visual object generally performs one or more of the four basic functions: A visual object may be i) informative (e.g., may provide some basic semantic content to users), ii) navigational (e.g., may have a hyperlink to guide users to another object), iii) interactive (e.g., may have an interactive tool for users to communicate with the system), iv) decorative (e.g., may include elements for beautifying a page). Ref: Kudelka et al., 2010, Visual Similarity of Web Pages. In: AINSC volume 67, Springer. On the other hand, a web-object is essentially either a web element or a cluster of interrelated web elements, wherein a web element is an elementary or fundamental object that is not composed of other objects. In this context, a visual object is essentially either a visual element or a cluster of interrelated visual elements. More concretely, an elementary visual object is a visual element, and a meaningful cluster of elementary visual objects is a cluster of interrelated visual elements—wherein a meaningful cluster of elementary objects is not an arbitrary cluster but a cluster with a definable/identifiable role and/or function. In this context, visual elements are the visual building blocks of a web page, and any visual element of a web page may be used as a reference for associating super-objects.

Visual elements are defined to facilitate the description of the systems and methods of the current subject matter. According to various embodiments, a visual element is an elementary visual field that includes 'content' and 'visual aspects' of a web page element. For example, in the case of rendering hypertext markup language (HTML) and cascading style sheets (CSS), when laying out a document (i.e., web page), the browser's rendering engine may represent each HTML element as a rectangular box according to the standard CSS basic box model. While 'HTML element' provides the content, CSS determines the position and properties (size, border size, background color, etc.) of these example boxes. In principle, each CSS box (i.e., visual element field) with its content (i.e., content of visual element) is a visual building block (i.e., visual element) of a web page. Accordingly, every HTML element may correspond to a visual element, which may be a—singular—CSS box (i.e., visual element field) that includes the content of the corresponding HTML element (e.g., English text, markup text, hyperlink, image, audio, video etc.). Further, the same may apply for other markup languages supporting CSS, such as XHTML, XML, XUL, SVG, etc. Regarding the positioning of visual elements; In a web page, a visual element may have a fixed position (e.g., relative to canvas) or may be positioned relative to other visual elements (e.g., CSS structures). For example, a cluster of interrelated visual elements (e.g., a GUI object) may be positioned in a framing visual element, and that framing visual element may be positioned relative to another visual element (e.g., container of the header). In the case of rendering HTML and CSS, the layout of a web page may be specified by CSS. A rendering engine may interpret each style sheet and calculate precise graphical coordinates of CSS boxes (i.e., visual element fields) for the visual representation.

To elaborate on the characteristics of a visual element, according to the embodiments, content of a visual element may be textual, or visual, or audial, or combinations thereof. Alternatively, or in addition, a visual element may include no content at all, i.e., a visual element with null content. A content may be included to a visual element by various methods, for example by transclusion, i.e., inclusion of the content by reference, or embedding the raw data of the content into markup. Textual content of a visual element is character content that may be: i) text for humans (e.g., a paragraph of an article), and/or ii) text for machines (e.g., markup/script). Visual content of a visual element is any visual content excluding text (e.g., an image, an image sequence, a video without sound, etc.). Audial content of a visual element is any audial content (e.g., an audio file, a radio stream, etc.). A visual element may simultaneously contain textual, visual, and audial contents individually (e.g., a visual element may contain an image, an embedded invisible hyperlink, and a text simultaneously), or a visual element may contain textual, visual, and audial contents in a single pack (e.g., a single multimedia file containing text, audios, images, animations, videos, etc.). On the other hand, although a visual element with null content has no content at all, its field (i.e., visual element field) has properties such as, size and shape of the field, color and thickness of the border, color of the background fill, etc.

Note1: Although a textual content can be physically classified as a visual content, it is separated for clarity and simplicity. Note2: Besides the standard visual and audial interfaces, a computer system may also involve special interfaces such as, haptic or olfactive interfaces, and accordingly a visual element may also include other types of content according to data to be decoded. Note3: The web-resource interaction system is not limited with the use of visual elements as references. Embodiments may use any element of a web page as a reference for associating super-objects. However, based on the assumption that the use of visual elements may allow the visualization of the disclosed mechanisms more clearly, some of the example embodiments described herein solely use visual elements and/or clusters of visual elements as references for associating super-objects. Note4: Elements, i.e., elementary objects that are not composed of other objects, may vary from framework to framework. For example, while for CSS, each style sheet including its content-obviously excluding any other contained/framed style sheet and its content, if any—may be defined as a visual element, in another framework each individual pixel may be defined as a visual element. Note5: Especially in the case of physical elements, an element, i.e., elementary object, may be an integral part of another element or cluster of elements. For example, 3D printing technology enables production of objects with complex integrated components, such as internal components of rocket engine nozzles or silencers. In the context of the described methods and systems, objects can contain integrated elements, and such elements do not constitute an obstacle for the operations from a methodological point of view.

Expanding upon this introduction, a detailed description of the web-resource interaction system with respect to digital web-resources is presented through various examples, description and embodiments provided herein. According to various embodiments, the system includes a browser-based application at the client-side, that works in collaboration with an application server and a database server at the server-side. Client-side application, i.e., the client, in collaboration with the server-side application, i.e., the server, may perform processes within the system for enabling interaction of super-objects and/or users with elements of web pages and/or with other super-objects and/or users, on a data network. As described herein, FIGS. 2-5 provide respective example flowchart diagrams 200, 300, 400 and 500, which are configured to minimize the data processing load of the client-side, while maximizing the data processing load of the server-side. In other examples, other configurations are possible regarding the allocation of the processing load between client-side and server-side, including maximizing the processing load of the client-side, and minimizing the processing load of the server-side.

FIG. 1 is a high-level architecture of an exemplary web-resource interaction system 100. The system 100 shown is a configuration for illustrating the functionality with exemplary components and architecture. One of ordinary skill in the art will appreciate that the system may include other features, components and/or modules to illustrate the functionality described herein and is not limited to the components and architecture illustrated in FIG. 1.

The server 102 of the system 100 includes—or has access to—the database 104 (including the database server), the application server 106, and two separate web servers 108a and 108b. The data network 110 may include gateways, routers, other servers, and clients, etc. which are not shown. The system 100 includes N number of system users (112a, 112b, 112c, 112d) and their clients (114a, 114b, 114c, 114d), respectively. For example, the client 114a is the client of the system user 112a. The system 100 also includes a plurality of network users. Four of the M number of network users (116a, 116b, 116c, 116d) are shown in FIG. 1. A network user may refer to a data network user who is not a system user. According to various embodiments, a system user is also a network user, but a network user is not a system user. The system 100 include a plurality of website servers. Three of the K number of website servers (118a, 118b, 118c) are connected to the network 110 are shown in FIG. 1. The website server 118a is shown with a first web page 120a, which also includes L number of visual elements. Two of the L number of visual elements are shown as 122a and 122b. The website server 118b is shown with a second web page 120b, which also includes H number of visual elements. Two of the H number of visual elements are shown as 122c and 122d. The website server 118c may be a server of a social media network (e.g., Facebook, Twitter, Instagram, etc.). The website server 118c may store P number of web pages including a third web page 120c and a fourth web page 120d. Web pages 120c and 120d may be social media user pages which include various visual elements. Four of the W number of visual elements are shown as 122e, 122f, 122g and 122h. Clients 114a to 114d are uniform client-side applications working on the web browsers of the system users 112a to 112d, in collaboration with the server-side application, i.e., the application server 106. Web servers 108a and 108b are connection ports of the server 102 to the data network 110. The web server 108a is dedicated for the system users (clients), while the web server 108b is dedicated for the network users. In addition to these, all user inputs of the system 100 also have their own accessible conventional web pages (not shown). Network users may reach to these web pages, if there is no restriction put in place by the system user who created the associated user input. System users also have accessible home pages within the system 100, similar to the conventional social media websites where the posts of a system user are listed on a personal home page.

Network user 116a is connected to the server 102. Network user 116a may be browsing web pages containing user inputs of the system 100 or may be interacting with particular user inputs of a system user. Network user 116b is connected both to the server 102 and the web page 120a. Network user 116c is connected to the web page 120c only and not related with the system 100. Network user 116d is connected to the network 110 but not connected to the system 100 or any other web page shown.

Client 114a is connected to the server 102 and the web page 120c of the website server 118c. The web page 120c is a social media user page which is open to a closed subgroup only. While the client 114a has permission to reach to the web page 120c, the server 102's access is prohibited. The system 100 scans (probes) the web page 120c indirectly through the client 114a, i.e., the system uses the client 114a as a data link between the server 102 and the web page 120*c*. Thus, the server 102 may scan the source code of the web page 120*c* and/or communicate with the website server 118*c* to retrieve information about hyperlinks and visual elements associated with the web page 120*c*, such as 122*e* or 122*f*.

Client 114*b* is connected to the server 102 and the web page 120*b* of the website server 118*b*. The web page 120*b* is accessible by any network user including the system users (e.g., a news website). The server 102 is connected directly to the web page 120*b* known to be unrestricted for all network users with intent to reduce the data transfer load of the client 114*b*. In this case the system 100 scans (probes) the web page 120*b* directly. Thus, the server 102 may scan the source code of the web page 120*b* and/or communicate with the website server 118*b* to retrieve information about hyperlinks and visual elements associated with the web page 120*b*, such as 122*c* and 122*d*.

Client 114*c* is connected to the server 102, the web page 120*b* of the website server 118*b*, and the web page 120*d* of the website server 118*c*. The web page 120*d* is another user page which is not accessible by all network users. On the other hand, the web page 120*b* is accessible by any network user including the server 102. While the server 102 is indirectly connected to the restricted web page 120*d* through the client 114*c*, it is connected directly to the web page 120*b*, known to be unrestricted for all network users. Thus, the server may scan the source code of the web pages 120*b* and 120*d* and/or communicate with the website servers 118*b* and 118*c* to retrieve information about hyperlinks and visual elements 122*c*, 122*d*, 122*g* and 122*h* associated with the web pages 120*b* and 120*d*.

The system user 112*d* and the corresponding client 114*d* are not connected to the network 110. They are passive members of the system 100.

Within the communication structure of the system 100, and via the execution of the example methods 200, 300, 400 and 500 explained below, system users 112*a* to 112*d* may associate user inputs with the visual elements 122*a* to 122*h* of the web pages 120*a* to 120*d* and set up a superimposed social network on the web pages of the data network 110 through user inputs that act as network links. Similarly, system users 112*a* to 112*d* may reach to any user input that is associated with the objects of web pages of the data network 110. However, a network user who is not a system user may also connect to the system through a client that acts as a proxy server. In one embodiment, one of the clients of the system is used as a proxy server at the system, in which some of the network users, who are not system users, are connected to the system through this client and immediately become system users.

To elaborate the concept of superimposed networking: Any system user, who is connected to the data network 110 via a client, may be interconnected with other system users through the data network 110 via communication protocols (e.g., TCP/IP), and various user interfaces. In this context, user inputs possessing communication modules and interfaces may connect users with each other for communication, and user inputs may act as network links of an overlay social network on web-resources of a data network. For example, users may communicate through commenting, messaging, reacting interfaces deployed on user inputs, while adding some of the authors of the user inputs and/or comments on the user inputs to their follow list or friends list and join each other's social network. Therefore, system users may set up an overlay social network on web pages and connect with each other across the data network that the web-resource interaction system is included in. Accordingly, each user generated content or application that is associated with objects of web pages, may become a junction point connecting users. Furthermore, a system user may connect to the publisher/developer (e.g., author) of a user input through the corresponding user input via particular interfaces. For example, a user who is an author may have a unique user identifier stored in the database record of his/her user input, which is associated with one or more visual element/s of a web page, such that rendering of the web page displays the user identifier as available to another user who may provide a connection request to the web page (e.g. through a system's user interface displayed on the web page) to initiate communication (e.g. P2P communication). Furthermore, interaction through a user input may be allowed to all users or may be restricted for use by a closed subgroup only, thus, sub social groups may be formed.

For brevity, the web server 108*a* and the application server 106 are together hereinafter referred to as 'server', and the database server with the database 104 are together hereinafter referred to as 'database'.

FIG. 2 is a flowchart diagram 200 illustrating an example process to identify and mark visual elements—of a rendered web page—that are associated with user inputs.

The process begins with the manifestation/presentation of a web page by the web browser of a system user. At 202, for the rendered web page, the client requests a web page analysis and a database query from the server to identify visual elements that are associated with user inputs. Next, based on the received request, the server queries the database to determine a connection method in order to communicate with the web page server and scan the web page (204). In some embodiments, the server may connect directly to the target web page over the data network. In yet other embodiments, the server may connect indirectly to the target web page via linking up through the client, i.e., using client as a data link. Indirect connection is always reliable, because server may not have access to the target web page (e.g., the target web page may be a social media user page accessible to a closed subgroup only), or may have limited access, or there may be some restrictions for ordinary network users or for the system user itself. On the other hand, for various reasons such as reducing the data transfer load of the system user, the server may directly connect to the web pages known to be unrestricted for all network users (e.g., news websites, government websites, e-commerce websites, etc.). For this purpose, the system may use an URL list of unrestricted websites and may decide between direct or indirect connection by comparing the URL of the target web page with the URLs of the websites, i.e., domain names, in the list. In one embodiment, the server scans the unrestricted website list (UWL) for a match with the URL of the target website (204). Unrestricted website list (UWL), which includes the URLs of the websites that are known to be unrestricted for all network users (e.g., CNN.com, BBC-.com, etc.), may be generated and updated manually and/or by software algorithms working under the system.

Next, the server decides the connection method (206). If the target web page is unrestricted then the server connects to the target web page directly over the network to scan the web page directly (208). If the target web page is restricted, then the server connects to the target web page indirectly through the client to scan the web page indirectly (210). According to an embodiment, the server prefers to connect to any web page server indirectly only, because the indirect connection method provides a reliable communication mechanism for all cases and may be preferred if extra data transfer load of the client is not a concern.

At 212, based on the source code (which may specify the content, layout, and structure of the web page, and may define the meaning of each element) and/or any information retrievable from the web page server, the server scans the rendered web page and analyzes each visual element to identify distinctive information about its content, position, and properties, in order to generate a visual element identifier. Content of a visual element may be a text, an image, an audio, a video, a hyperlink, an application etc., and the source code may contain the content itself (e.g., a container including a text and a hyperlink) or the identifier/locator of the content for retrieving it from the website server (e.g., a container including an image or a video). Position of a visual element on a web page is the relative position of the visual element according to other visual elements. Properties of a visual element varies, e.g., size, shape, border width, background color, etc. of the visual element field. Content and properties of a visual element are solid references for identification in most of the cases. However, in some cases, relative position information may be the only reference to identify a visual element since position of a visual element is always distinctive,—as long as content, and/or layout, and/or structure of the web page does not alter in a way to invalidate it. For example, there may be multiple visual elements with identical properties and content. On the other hand, there may be cases where the position itself may not be sufficient to identify a visual element. For example, layout of web page may be changed in time. Accordingly, a visual element of a web page may be identified more accurately by referencing all variables (i.e., content, relative position, and properties) simultaneously, or one of them individually, or in any combination that fits the needs of the application.

Next, the server analyzes the resource identifiers (e.g., URLs) of the hyperlinks that are associated with visual elements—if any—determined at 212, and identifies the core resource identifiers (e.g., core URLs) (214). Core resource identifiers are resource identifiers of hyperlinks isolated from the additional extensions, e.g., subsequently added auxiliary extensions by search engines.

Next, for each visual element, the server generates a uniform visual element identifier (UVEI) that includes distinctive information about content—if any—, information about distinctive properties—if any—, and relative position information of the visual element identified at 212 including exact location information (e.g., URL) of the web page (216). The server also assigns an ID for each uniform visual element identifier (UVEI) generated. In one embodiment, a uniform visual element identifier (UVEI) of a visual element includes: i) A sample of the content, an attribute of the content (e.g., the media type) and the associated URI of a hyperlink—if any—determined at 212, as the content information (CI'); ii) Resource identifier of the web page (e.g., URL) and relative position information of the visual element with respect to other visual elements determined at 212, as the location information (LI), iii) Information about the properties of the visual element field determined at 212, as the property information (PI). While distinctive information about the position and location, i.e., 'relative position' and 'exact location', always exists (at least in the moment of rendering), 'distinctive information about content' and 'information about distinctive properties' of a visual element may or may not exist. In this context, for example, a uniform visual element identifier (UVEI) within the CSS structure may include: i) 'null content' as content information (CI'); ii) CSS properties such as style sheet dimensions and color, as property information (PI); iii) URL of the web page and the relative position information of the style sheet, as the location information (LI). In such a case, LI is the only distinguishing parameter if there are other elements with exactly the same PI, i.e., CSS properties, in the source. According to another embodiment, uniform visual element identifier (UVEI) may also include core resource identifier (e.g., core URL) of the associated hyperlink isolated at 214, for example, i) Core URL of the hyperlink K of visual element Z; ii) URL of web page Y of website X, and relative position information of visual element Z on web page Y; iii) Property A and B of visual element Z, according to the embodiment.

Next, based on the uniform visual element identifiers (UVEI) generated at 216, the server queries the database for user input records that are involving visual elements and/or hyperlinks—if any—of the web page (218). Thus, the server queries the database for identifying matches between new UVEIs (i.e., nUVEIs) and recorded UVEIs (i.e., rUVEIs) of the user input records that are including the locator (e.g., URL) of the web page in the rUVEIs, based on various comparison methods such as relative position comparison and/or comparison based on similarity analysis of contents, etc. Further, based on the uniform cluster function identifiers (UCFIs) generated at 306, the server may also query the database for user input records that are involving visual element clusters of the web page. In this context, for example, based on a functional similarity comparison, the server queries the database for identifying matches between new UCFIs (i.e., nUCFIs) and recorded UCFIs (i.e., rUCFIs) of the user input records that are associated with the web page. Process 300 may be executed after the execution of 216 where the UVEIs are generated, thus, following the execution of process 300, process 218 may be executed, according to the embodiments.

In some embodiments, only one visual element may be associated with a user input if the user input is a user generated content, while one or more visual elements may be associated with a user input if the user input is a user generated software application. In this scenario, for user generated contents, the server may include contents partially in the UVEIs as the content information (CI') by a predefined sampling procedure, for each UVEI generated at 216, and the server may execute a similarity comparison between the sampled contents included in the recently generated UVEIs (nUVEIs) at 216 and the sampled contents included in the recorded UVEIs (rUVEIs) of the rendered web page, which may represent interacted visual elements in the rendered web page. In other words, user input records may be stored to include the UVEIs of interacted visual elements which a user has interacted with to add user input thereto, e.g., into the database record of a user input. In addition, the server may also query database records for a match between the hyperlinks detected at 212 and interacted web pages, i.e., web pages associated with one or more user inputs. In this process, core URLs of the hyperlinks determined at 214, are compared with the URLs of the interacted web pages recorded in the database. Within an example scenario, for user generated software applications, the database may be also queried according to the cluster information (CI)—that is identified in process 300 according to positional and functional relationship of visual elements—besides the uniform visual element identifiers (UVEI) of the interacted visual elements. In this process, for each record of a user input associated with the web page, recently extracted cluster information (CI) is compared with the cluster information (CI) (or the portion related with the interacted cluster) that is recorded in the database in process 400, i.e., rUVEIs belonging to an interacted cluster are compared with each set of nUVEIs that belong to each identified cluster.—It should be noted herein that this comparison technique may be optimized by various sub-methods, such as preliminary image analyses based on computer vision techniques in order to eliminate irrelevant cluster pairs in the process of similarity comparison. In the process of identifying interacted clusters, cluster information (CI)—along with other information obtained at 300 such as, subjective function type (SFT), etc.—is used as a reference, in order to maintain the associations in case of occurrence of contextual and/or structural alterations in interacted clusters. Alternatively, or in addition, based on the uniform cluster function identifiers (UCFIs) generated at 306, the server may also query the database for user input records that are involving visual element clusters of the web page, i.e., querying the database for identifying matches between new UCFIs (i.e., nUCFIs) and recorded UCFIs (i.e., rUCFIs) of the user input records that are associated with the web page, based on a functional similarity comparison, according to the embodiments. In various embodiments, both user generated contents and software applications may be associated with singular visual elements, such as images, videos, paragraphs, or with clusters of interrelated visual elements, such as, link previews, social media posts, media players, tables, lists, articles, headers, footers, other predefined clusters etc.

Next, for each matching user input—if any—, the server generates an input metadata shell message (IMSM) containing input metadata (IMD), i.e., metadata of the user input, and uniform visual element identifier/s (nUVEI/s) of the corresponding visual element/s of the rendered web page (220).

Next, the server forwards input metadata shell messages (IMSM) to the client—if any (222). At this phase, no other information about the content of the user inputs is sent to the client. Thus, the process gains speed by decreasing the data transfer load. According to an embodiment, input metadata (IMD) contains brief information about the associated user input stored in the user input records of the database, e.g., publisher, heading, summary, popularity score, rank etc. of the user input. Next, the client receives and buffers input metadata shell messages (IMSM)—if any (224).

Next, for each input metadata shell message (IMSM) received, the client associates input metadata (IMD) with the corresponding visual element/s of the web page being rendered for the user (226).

Next, the client visually displays input markers (IM) on the web page in connection to the corresponding visual elements and/or clusters of visual elements that are associated with the user inputs—if any—in order to indicate the availability of the user inputs for user access (228). According to various embodiments, user input markers (IM) may be transparent, miniature, and/or inconspicuous icons marking discrete visual elements and/or clusters of visual elements of the web page in a manner which does not impede the usage of the web page. In one embodiment, the client places input markers (IM) at only certain points within visual element fields, e.g., top right corner of a visual element field. Thus, input markers (IM) may be integrated with the web page's sense of balance and esthetics due to their association with visual element fields. In case of a cluster of interrelated visual elements,—which are identified in the process 300—, the marker may be placed at a predetermined position, such as a top right corner, of the visual element field that is enclosing the group—if any. Else, the client may create a virtual frame that is enclosing the cluster of interrelated visual elements and mark it by the same way. Moreover, appearance of the input markers (IM) in an embodiment may vary and particular input markers (IM) may be used for particular user inputs. For example, in embodiments, while ordinary user comments that are associated with a visual element are marked with a circular input marker (IM), expert user comments associated with the same visual element are marked with a triangular input marker (IM) separately. Regarding the method of manipulation, client may change the source code of a page to include markings, or the browser may be programmed to mark the relevant positions without changing the source code. In case of HTML, the client may utilize DOM (Document Object Model) of the web page to manipulate the web page without changing the source code, according to the embodiments.

The process terminates after the execution of 228 unless the page is an infinite scrolling web page. In case of an infinite scrolling web page, for every additional manifestation of the web page the process loops between 212 to 228, i.e., all sub processes are executed in sequential order starting at 212 and ending at 228. As a result of the process 200, the client, in collaboration with the server, identifies and marks visual elements and/or clusters of visual elements that are associated with user inputs—if any—, according to an embodiment.

To elaborate on the process 200, i.e., the procedures to identify visual elements that are associated with user inputs in a rendered web page, and the primary function/purpose of the uniform visual element identifier (UVEI) concept: According to the embodiments, there may be two phases of identifying visual elements, and whenever a web page is rendered by a browser of a client, these procedures may be executed specifically for that client: Phase 1) 'Analyzing a web page that a user is viewing, and identifying each visual element; for each visual element, generating a uniform visual element identifier (UVEI) that includes distinctive information about content—if any—, information about distinctive properties—if any—, relative position information of the corresponding visual element (e.g., with respect to neighboring visual elements), and exact location information (e.g., URL) of the web page where the corresponding visual element belongs to. An UVEI identified in the phase 1 may also be called as 'new UVEI' or 'nUVEI', which is a temporary reference of a visual element particular to the viewing session of a rendered web page of a client. An nUVEI becomes a recorded UVEI (i.e., rUVEI) and becomes stationary, if it is recorded in the database (e.g., in a field of a user input record) to associate a user input with the corresponding visual element. Phase 2) 'Based on uniform visual element identifiers (UVEIs) of visual elements identified in phase 1 (i.e., nUVEIs), i) identifying visual elements that were previously interacted by comparing nUVEIs with rUVEIs stored in the database, and/or ii) identifying role/s of each visual elements and/or iii) identifying clusters of interrelated visual elements, and/or iv) identifying visual elements that are available for interaction. According to the embodiments, for each visual element, a uniform visual element identifier (UVEI) is generated in each viewing session of a client, because a stable reference—independent of source code dictated by website servers—is required, since content, and/or layout and/or structure of a web page (i.e., source code) may be altered—manually (e.g., by website admins) and/or automatically (e.g., by executing scripts/programs)—in progress of time, and such alterations may result in loss of association between the interacted visual elements and their corresponding user inputs associated therewith and stored in the database records. For example, element attributes may be changed in such a way that alteration invalidates a locator strategy. Accordingly, methods such as anchoring based on element IDs, or executing conventional fragment identification systems, may not work properly. Moreover, alterations can be done deliberately to jam such systems by more advanced procedures. For example, content of some visual elements of a web page may be altered in such a way that altered content (e.g., pictures, videos, etc.) may be identifiable only by the detailed analysis of the content itself. Consequently, any system depending on the identification of interacted visual elements based on source code of web pages is inevitably prone to loss of associations or false associations between the time the web page elements are interacted, and corresponding web pages are re-rendered. For example, associations may be lost, or user inputs may be associated with irrelevant visual elements. In principle, the UVEI serves as a stable reference to maintain that association by holding/containing any possible distinctive information about content and properties, and also relative position information of each visual element with respect to other visual elements. Thus, the UVEI creates a base for various locating/identifying strategies and procedures.

To elaborate on the subject of distinctive information about content of a visual element: According to the embodiments, distinctive information about content of a visual element may be the type of the content (e.g., media type), and/or general properties of the content (e.g., type, size, etc.), and/or the content itself,—and which can be considered a reliable reference for most of the cases if the extra data processing load is not a concern. Accordingly, a uniform visual element identifier (UVEI) of a visual element may include the content—of the visual element—itself partially or wholly as a reference for comparison. For example, if the content of a visual element is a text, a hyperlink, a script, or an image, then it may be included in UVEI directly. For larger files (e.g., audio or video files) where the data processing load may be a concern, general properties of the content (e.g., type, size, etc.) may be used in combination with the properties of the visual element. Furthermore, content—of a visual element—may be included in its UVEI partially, and sampling techniques may be used for estimation/approximation of the content, such as interpolation. On the other hand, not all visual elements do possess distinctive content. For example, in a web page, there may be multiple visual elements with identical content.

To elaborate on the subject of distinctive information about the properties of a visual element: According to the embodiments, distinctive information about properties of a visual element may be any property (e.g., shape, size, background, padding, border, margin size, etc.) of the visual element that are unique among all visual elements of a web page (e.g., a unique background color, size, font, etc.). For example, the size of a canvas element of a web page is a distinctive property for most of the cases since it contains all visual elements of a web page. On the other hand, not all visual elements possess distinctive properties. For example, in a web page, there may be multiple visual elements with identical properties. In the case of CSS, properties of a visual element field is as follows: animation properties, background properties, border properties, color properties, dimension properties, generated content properties, flexible box layout properties, font properties, list properties, margin properties, multi-column layout properties, outline properties, padding properties, print properties, table properties, text properties, transform properties, transitions properties, visual formatting properties, etc.

To elaborate on the subject of relative position information of a visual element: According to the embodiments, 'relative position information' and 'exact location information' of a visual element includes position of the visual element relative to other visual elements in a rendered web page, and the URL of the rendered web page that it belongs to. Unlike content and properties of a visual element, relative position information is always distinctive as long as content and/or structure of the web page does not alter in a way to invalidate it. In one embodiment, positioning rules of visual elements included in the string of relative position information of UVEIs are similar to the ones in the style sheets of CSS.

To elaborate on the subject of distinctive information in general: According to the embodiments, distinctive information about content, information about distinctive properties, relative position information, and exact location information that are all included in UVEI may be used in several combinations for associating/identifying interacted visual elements, according to needs. In all cases, 'exact location information' is essential,—even if the relative position of the visual element alters—, since it includes locator (URL) of the web page that the visual element belongs to. On the other hand, there can be special cases where content, properties, and relative position information of a visual element—all together—cannot be sufficient to identify the visual element depending on the level of alteration of content, and/or layout and/or structure of a web page. For example, there can be multiple visual elements with identical properties and content in a web page, where relative positions of visual elements alter frequently. Accordingly, maintaining associations in between interacted web page elements and their corresponding user inputs may not be possible in some special cases.

To elaborate on the possible identifying strategies: According to various embodiments, content of visual elements (which may be stored in the database within a corresponding UVEI generated by the system), may be used partially or wholly (e.g., depending on data size) as the primary reference for locating/identifying visual elements that are interacted, besides (or in addition to) the URL of the web page that the visual elements belong to. In this regard, content of a visual element may be included—partially or wholly—in the corresponding UVEI as the distinctive information about content. In embodiments, for associating user inputs with visual elements, and identifying visual elements that are associated with user inputs in web pages that are viewed by users; the system collects content fragments from visual elements that include media files, such as images, videos, audios, documents, etc. by appropriate sampling procedures particularly selected according to content properties (e.g., media type, size, format, etc.) of each visual element, and include collected content fragments to the corresponding UVEIs as the distinctive information about content, in order to reduce the data processing load. In this process, for content located in website servers (e.g., documents, videos, audios, or any kind of streaming media) the system fetch data from website servers for sampling (e.g., by sampling the first 'one second' of videos, or by sampling small segments from PDF documents, etc.). When the system queries the database for identifying interacted visual elements of a web page, recently generated UVEIs are compared with the recorded UVEIs of the said web page according to their content type (e.g., video with video, image with image, text file with text file, etc.). In this process, the system compares content fragments with each other according to their similarities, and for each tested pair calculates the similarity rate—or resemblance rate—based on the similarity analysis. If similarity percentage of a pair exceeds a predefined similarity threshold, then the system associates the pair, according to the embodiment. In such embodiments, various statistical similarity measures may be used as a base for similarity analysis of data sets, and various algorithms may be preferred or developed depending on the type of content (e.g., image, audio, video, text, etc.) of visual elements. Furthermore, even semantic similarity comparison may be used in some specific applications.

To elaborate on the subject of analyzing and identifying interacted visual elements, a hypothetical example is provided as following: In one embodiment, a system user SU interacts with a dynamic web page that he/she is viewing, by associating respective user inputs as APP1, POST1, and POST2, with a text T, which is the content of visual element VE1, with an image P, which is the content of visual element VE2, and with a video V, which is the content of visual element VE3. APP1 which is associated with the VE1 may be a translator program that translates text from one language to another and dynamically processes/manipulates the visual element in order to display the translated version of the original text. POST1 and POST2 which are associated with VE2 and VE3 respectively, are social media posts including pictures and ideas of SU about the content of the corresponding visual element. A database record is generated and stored by the system for each user input APP1, POST1 and POST2, wherein each record contains content information CI', property information PI and relative position information LI of VE1, VE2 and VE3 in their corresponding UVEIs respectively. Properties information PI may be all available information about the properties of VE1, VE2, and VE3. Image P and text T may be included as a whole to their corresponding database records in their corresponding UVEIs respectively,—due to their relatively small data sizes—, and video V may be included partially (e.g., by collecting samples from the source file of the video, which are fetched from the website server),—due to its relatively large file size—, as content information CI'. For example, in this process, the system may associate each post or application with the corresponding visual element in the rendered web page by recording the posts or applications with corresponding UVEIs to the database. In the first attempt, the website server alters the layout and structure of the said web page deliberately to jam the system including formal alterations in the source code, such as altering element IDs, content identifiers etc. As a result, relative positions and properties of VE1, VE2 and VE3 becomes altered including corresponding element IDs, content IDs etc., and they become the derivatives DVE1, DVE2, and DVE3 of the original visual elements (except the contents). When SU—or any other system user—views the web page (e.g., when the web page is rendered), the system generates new UVEIs (nUVEIs) of DVE1, DVE2, DVE3 and compares them with the user input database records involving UVEIs (rUVEIs) that include the URL of the said web page. In this process, the system compares the original text T with other texts, image P with other images and video V with other videos (by comparing sampled fragments) of the web page based on recorded UVEIs (rUVEIs) and recent nUVEIs. Based on the query, recorded UVEIs of VE1, VE2 and VE3, match with the recent nUVEIs of DVE1, DVE2, and DVE3 on content basis with a predetermined similarity level, such as a 100% similarity. Consequently, based on the similarity comparison of the content, the system successfully associates SU's user inputs with the corresponding visual elements in the rendered web page, and visually marks them. By selection of these markers, SU—or any other system user—may reach to the corresponding metadata. In the second attempt, the website server alters the content of DVE1 by slightly changing the text T (thus becomes T'), alters the content of DVE2 by slightly degrading the image quality of P—by processing the image—(thus becomes P'), and finally modifies DVE3 by transforming the visual element into a dynamic one that alters video content randomly in progress of time from a list that include N number of different videos. In addition to that, the website server also alters the layout and structure of the web page including radical alterations in the source code. As a result, relative positions, properties and contents of DVE1, DVE2 and DVE3 becomes altered and they become the derivatives DDVE1, DDVE2, and DDVE3. When SU—or any other system user—views the web page, the system generates new UVEIs (nUVEIs) of DDVE1, DDVE2, DDVE3 and compares them with the user input database records involving UVEIs (rUVEIs) that include the URL of the said web page. In this process, the system compares the original text T with other texts, image P with other images and video V with other videos. Based on the query, i) recorded UVEI of VE1, partially match with the recent UVEI of DDVE1, on content basis with X % similarity, ii) recorded UVEI of VE2, partially match with the recent UVEI of DDVE2, on content basis with Y % similarity, iii) recorded UVEI of VE3, does not match with the recent UVEI of DDVE3 initially but thereafter with 100% similarity, based on the comparison of the sampled fragments of video V (included in the UVEI of VE3) with altering video content in any visual element of the web page during the viewing. Consequently, based on the similarity comparison of the content, the system successfully associates SU's user inputs with the corresponding visual elements and visually marks them, because the similarity rates X and Y exceed the predefined similarity threshold. On the other hand, the system visually marks the dynamic visual element DDVE3 whenever video V is loaded and deletes the marker whenever video V is altered with another video. By selection of these markers, SU—or any other system user—may reach to the corresponding metadata. In the third attempt, the web page server alters the content of DDVE1 by significantly changing the text T' (thus becomes T") and alters the content of DDVE2 by significantly degrading the image quality of P' (thus becomes P"). Text T" and image P" diverge from originals in such a degree that similarity rates fall below the predefined similarity threshold. Consequently, while keeping the association of visual element DDVE3 with video V, the system terminates the association of visual elements DDDVE1 and DDDVE2 with text T and image P respectively, according to the embodiment.

According to the embodiments, the process of identifying/locating visual elements of web pages does not have to rely on any ID based on the source code of web pages (e.g., utilizing namespaces, etc.). If preferred, uniform visual element identifiers (UVEIs) of visual elements do not include IDs assigned by website servers such as fragment identifiers, content identifiers, etc. Methods and systems presented within the current disclosure include embodiments designed on the basis that source codes of web pages—including any ID assigned by website servers—can be deliberately changed to confuse, and/or damage, and/or jam such systems.

Alternatively, or in addition, the web-resource interaction system may also include processing IDs based on the source codes and is not limited to the methods presented.

Uniform visual element identifier (UVEI) is similar to URL, which is a reference to a web-resource that specifies its location on a data network, and a mechanism for retrieving it. According to various embodiments, uniform visual element identifier (UVEI) is also a reference to a visual element that specifies its location on a data network, and a mechanism for retrieving it. However, conceptually the difference between conventional URIs and UVEIs is radical. Firstly, each UVEI is generated by analyses of the corresponding visual element in order to extract distinctive information about its content, properties, and position within a framework of universal standards, and the UVEI of a visual element may be recorded as rUVEI and used as a reference for comparison of similitude with the distinctive information of each visual element extracted subsequently as nUVEIs when the corresponding source (e.g., a web page that the visual element belongs to) is re-rendered in order to identify a match. Secondly, similitude may be compared on the basis of content, role, function, etc., i.e., context thus, a visual element may be linked according to content, role, function, etc., i.e., context. In this regard, the UVEI mechanism described herein may be defined as a fuzzy logic referencing mechanism based on pure analogies (i.e., a comparison between one thing and another), by which 'a distinctive representation identified by the analyses of one thing' (i.e., an analogue) is compared with 'a distinctive representation identified by the analyses of another thing' (i.e., another analogue) based on similitudes or partial similarities (analogies) in order to associate/link the former with the latter.

The above-listed elaborations with respect to the process 200 is not limited with the embodiments provided, thus many more embodiments and implementations are possible.

Figure 3:
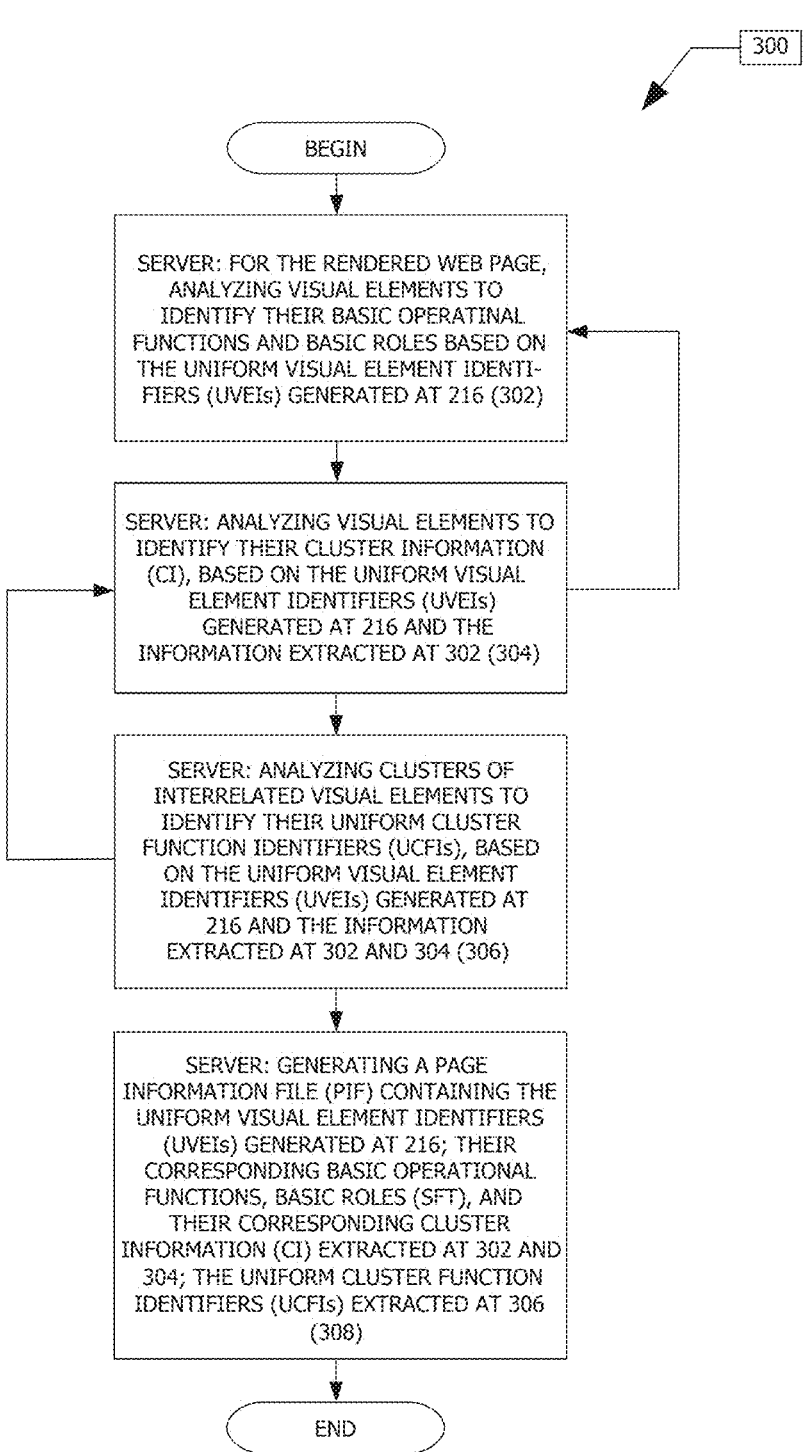
FIG. 3 is a flowchart diagram illustrating an example process to classify each visual element, and identify each cluster of interrelated visual elements including corresponding function of each, in a rendered web page.

FIG. 3 is the flowchart diagram 300 illustrating an example process to classify each visual element, and identify each cluster of interrelated visual elements including corresponding function of each, in a rendered web page, according to an embodiment;

The process begins after the execution of 216, in which the server generates a uniform visual element identifier (UVEI) for each visual element of the rendered web page. At 302, for the rendered web page, based on the uniform visual element identifiers (UVEIs) the server analyzes the visual elements to identify the role/function of each visual element, i.e., extracting basic operational function/s (BOF) described in the elaborations regarding 300 and the basic role (i.e., subjective function type classification) of each visual element.

According to various embodiments subjective function type is classified/categorized as main content, side content and auxiliary element. In this context, main content is the main subject of a web page, e.g., the subject matter presented for consideration of the viewers. For example, in a news web page, news articles, news videos, link previews of other news article pages or videos etc. are main contents. Side content is the subaltern subject of a website such as ads, extraneous announcements, or any other extraneous content. Finally, auxiliary element is any visual element without a subjective function. For example, visual elements that are graphic components of GUI elements are auxiliary elements, such as containers—like canvases and frames—, buttons, sliders, text fields, list boxes, icons, navigation links, search boxes, lines, special shapes, etc. are auxiliary elements. Subjective function type (SFT) does not overlap among the visual elements. A visual element is either main content, or side content, or auxiliary element. In embodiments, to identify subjective function type (SFT) of the visual elements of a web page, the server identifies only the side contents and auxiliary elements. The remaining visual elements of the web page fall into the main content class. In this regard, identifying any 2 of the 3 classes/categories is sufficient in order to identify corresponding subjective function type (SFT) of each visual element of a web page, according to the embodiments.

Next, the server analyzes each visual element to identify cluster information (CI) of visual elements (304). Cluster information (CI) is information about the relationship of a visual element with other visual elements in a rendered web page and used as a reference to group interrelated visual elements of the rendered web page. For example, a group of visual elements within a framing visual element (e.g., a container) are identified as positionally interrelated visual elements. Moreover, by frames within frames, or groups within groups, cluster information may also include ranks of interrelationship. For example, a search field and a search button lined up next to each other may be a first order cluster, while the entire navigation bar containing them besides some link buttons may be a second order cluster. In this context, the highest rank of interrelationship may correspond to all visual elements of the web page framed/enclosed by the canvas, i.e., the web page itself. According to the embodiments, analysis of visual elements to identify cluster information (CI) is based on relative positional relationship of visual elements (e.g., a group of visual elements that is framed by another visual element), or functional relationship of visual elements (e.g., a group of visual elements serving for a particular purpose regardless of their positions), or 'relative positional and functional' relationship of visual elements together (e.g., a group of visual elements lined up next to each other serving for a particular purpose).

In embodiments, the server may utilize DOM (document object model) of the rendered web page to analyze parent, child, and sibling node relations in order to identify the cluster information (CI) according to positional relationship of visual elements. Further, the server may utilize the classification of each visual element as 'basic operational function/s' (BOF) and 'subjective function type' (SFT) including any other information determined at 302, in order to identify the cluster information (CI) according to functional relationship of visual elements. Further, the server may also utilize the cluster information (CI) determined at 304 in a feedback loop structure, to identify the subjective function type (SFT) of previously unidentified visual elements, according to the embodiments. In various embodiments, cluster information (CI), identified according to 'positional+functional' relationship of visual elements, includes IDs of uniform visual element identifiers (UVEIs), where each cluster of 'first degree relative visual elements' is designated by a first order cluster ID—that is assigned for each first order cluster (i.e., first order sub-cluster), including information about the functional relationship of the visual elements—within the first order cluster—that is predicted or determined based on the interbedded process of 302 and 304 as discussed with reference to FIG. 3; and each cluster of 'second degree relative visual elements' is designated by a second order cluster ID—that is assigned for each second order cluster (i.e., second order sub-cluster), including information about the functional relationship of the first order sub-clusters—within the second order cluster—that is predicted or determined based on the interbedded process of 302 and 304; and so forth. Clustering based on 'relative positional and functional' relationship of visual elements (i.e., 'positional and functional' relationship in short) may be a more accurate and safer option than only 'relative positional' relationship of visual elements (i.e., only 'positional' relationship in short) for both normally structured web pages and structurally disorganized web pages with disorganized layouts. However, the interbedded process of 302 and 304 may impose more data processing load and thus it may be more time consuming. In order to gain speed and/or decrease the data processing load, the system may use artificial intelligence such as machine learning, and/or computer vison/pattern recognition algorithms to prefer only positional clustering and bypass the process 302 in order to identify the CI swiftly, and/or may decide which one to use according to the structure/layout of the rendered web page, based on a pre/rough analysis of the page. In one embodiment, the system scans and analyzes popular websites in order to identify and learn their page structures/layouts and use artificial intelligence to decide which method to be used, and records that decisions for each website and/or web page including their locators in a log that is stored in the database. Thus, the system may optimize the performance according to a predefined action.

Next, based on the uniform visual element identifiers (UVEIs) generated at 216; their corresponding basic operational functions (BOF) and basic roles (SFT), and their corresponding cluster information extracted at 302 and 304, the system may further analyze each identified cluster of interrelated visual elements to extract their high-level function/s (e.g., a standard video player with a color corrector and 2D to stereoscopic 3D convertor, or a search box with a search button within a container) (306). In this step, high-level functions of identified clusters may be extracted, for example, the high-level functions of high to low rank clusters may be 'a header' as the $N-1^{st}$ rank, 'a search box with a search button within a container in the header' as the $N-2^{nd}$ rank, 'only the search box with the search button' as the $N-3^{rd}$ rank, and 'only the search box' alone as the $N-4^{th}$ rank ($0^{th}$ rank for this case) respectively, where the $N^{th}$ rank cluster ($4^{th}$ rank for this case) represents the whole web page. According to various embodiments, the system may further perform additional semantic analyses for the extraction of high-level function/s of each cluster of interrelated visual elements. For example, via utilizing various artificial intelligence algorithms based on—such as—natural language processing, machine learning, pattern recognition, etc. Thus, even more accurate, detailed, and comprehensive UCFIs may be extracted. Upon the extraction of the high-level function/s of a cluster, the system generates a 'uniform cluster function identifier' (UCFI) that includes/represents the extracted function/s of the corresponding cluster and assigns the extracted/interpreted function/s, i.e., UCFI, as an analogue reference to be used for establishing associations with a cluster of interrelated visual elements besides the UVEIs of the visual elements belonging to the cluster. Further, the system may also utilize the uniform cluster function identifiers (UCFIs) in a feedback loop structure to identify—especially—functional relationship of visual elements whose functional relationship with other visual elements is previously unidentified. For example, a pair of distantly positioned but functionally related clusters (similar to that of header-footer relationship) may be identified in a web page. Thus, via utilizing the process 306, functional relationship of distantly positioned visual elements may be identified at 304, and further this information extracted at 304 may lead to the extraction of additional information at 306, and so forth.

Next, the server generates a page information file (PIF) containing uniform visual element identifiers (UVEIs) generated at 216 including their corresponding basic operational functions (BOF) and basic roles (SFT), and their corresponding cluster information (CI) extracted at 302 and 304; and the uniform cluster function identifiers (UCFIs) extracted at 306 (308). More precisely, page information file (PIF) may include information obtained in processes 302, 304, and 306 including i) basic operational function/s of each visual element; ii) basic role, i.e., subjective function type (SFT), of each visual element; iii) cluster information (CI) of each visual element—identified according to positional and/or functional relationship of visual elements—in order to extract clusters of interrelated visual elements; iv) the uniform cluster function identifiers (UCFIs) as contextual refences of clusters of interrelated visual elements and v) any other information may further be extracted or preferred. In this context, a client may use the information provided by a page information file (PIF) to reach all information extracted from the web page—so far—and may use this information for further analyses and/or as a further reference (e.g., via storing the PIF in the database and utilizing it later for constructing a reference that represents the initial state of the rendered web page). Thus, the client may identify for example the availability for interaction, according to a special (e.g., customized) or generalized predefined filtering criteria.

The process terminates after the execution of 308 unless the page is an infinite scrolling web page. In case of an infinite scrolling web page, for every additional manifestation of the web page the process loops between 302 to 308, i.e., all sub processes are executed in sequential order starting at 302 and ending at 308. As a result of the process 300, the client in collaboration with the server, classifies each visual element of a web page, and identifies each cluster of interrelated visual elements including corresponding function of each, thus provides information to the system, such as for enabling/disabling visual elements and/or clusters of visual elements for interaction according to a set of predefined interaction rules (i.e., identifying web-objects that are available to receive one or more user inputs), according to an embodiment.

To elaborate on the subjective function type (SFT): According to the embodiments, subjective function type (SFT) is a non-overlapping predetermined classification/categorization of each visual element in a web page according to its role. In an example, the predetermined classifications/categorization of the subjective function types may be based on three discrete types: i) main content, ii) side content, and iii) auxiliary element. According to this classification/categorization; an 'auxiliary element' is a visual element that possesses only operational function/s without a subjective function, while a 'main content' or a 'side content' is a visual element that possesses a subjective function besides its operational function/s, in which any additional function beyond operational functions is considered subjective. Essentially, this is a classification of 2 discrete—and naturally existing—parent types of page elements: i) elements without a subjective function; and ii) elements involving a subjective function besides their operational function/s.

A web page is an interface whose main purpose is to convey information to a user and receive information from the user. In this context, an auxiliary element is an element that provides only operational help and support in the process of conveying and receiving information without possessing a subjective function. For example; a check box for interaction, a frame grouping elements for ease of perception, an icon for attention, a background texture for decoration, a menu button or a search field for navigation are visual elements without a subjective function, and accordingly are auxiliary elements. However, a heading of a news item, a paragraph of an article, an image of a product or an add, a video of a movie, an audio of a musical piece, an application for gaming, a link preview of another web page, or a document including an e-book, are contents of visual elements possessing functions beyond operational functions about the web page and/or website that they belong to (e.g., content for the consideration of viewer/s), and accordingly are main or side contents. In this regard, while a visual element that functions as a navigation button including the name of the link location is an auxiliary element, a similar visual element that functions as a navigation button including a line of poetry or a mathematical formula—besides the name of the link location—is not, since the additional information that it is carrying is not operational, but for the consideration of the viewers, and accordingly, such a visual element is qualified as main or side content.

To elaborate on the principles to identify subjective function type (SFT): Similar to the visual objects as defined hereinbefore, a visual element may perform one or more of the four basic functions in a web page, besides a primal function: A visual element may be navigational, interactive, decorative, informative, or combinations thereof, and in addition to these four basic functions, a visual element inherently—and inevitably—performs an architectural/structural function by taking part in the formation of a web page,—just like a brick of a wall. These basic functions also define the said operational functions: i) Navigational: A navigational visual element helps viewers to navigate (e.g., through a hyperlink) in a single page and/or multiple pages of a website including links to external web pages. A navigational visual element may include visual/audial/textual content related to navigational processes including markup/script; ii) Interactive: An interactive visual element helps viewers to interact (e.g., through a form) with the web page, and/or with the web page server. An interactive visual element may include visual/audial/textual content related to interactive processes including markup/script; iii) Decorative: A decorative visual element carries content for beautifying a page. A decorative visual element may include visual/audial/textual content with decorative features including markup/script (e.g., a script for fetching images from the server); iv) Informative: An informative visual element provides informative content to users. An informative visual element may include visual/audial/textual content with informative features including markup/script (e.g., a script for fetching text from the server). N.B.: According to the embodiments, in order to simplify the process 302, informative content used in navigational and/or interactive processes without possessing a subjective function are excluded, and considered as content with navigational and/or interactive features (e.g., purely operational GUI elements such as, addresses, icons, etc.); v) Architectural: An architectural/structural visual element helps viewers to perceive layout and content of a web page more accurately, easily and enjoyably by separating segments, framing interrelated visual elements, etc. Only visual elements with null content are purely architectural (e.g., containers like frames, separators, canvases, etc.), and inherently, every visual element is also architectural by taking part in the formation of the web page. And lastly, a visual element may also possess more than one of these functions simultaneously. For example, a navigational visual element may also be decorative by involving an image for beautifying the page, while being informative by involving a text relevant with the link location, e.g., the summary of the content of the link location.

In principle, informative, navigational, interactive, decorative and architectural functions are all operational functions. However, informative function differs from the rest, because only informative content (e.g., a paragraph or an image) may involve a subjective function, and if this is so, then the visual element is considered as main or side content, else it is auxiliary element. In the context of operational and subjective functions, it can be deduced that any visual element with navigational, and/or interactive, and/or decorative, and/or architectural function/s cannot involve any sort of subjective function, i.e., only a visual element with informative function may involve a subjective function. Although this deduction is important in the process of identifying SFT classes/categories, some navigational, interactive, and decorative visual elements may also possess informative content and thus, informative function, as described in examples herein. Therefore, in various embodiments, functional analysis of each content of a visual element is made according to the basic operational functions, in order to identify their functional relation with the respective visual element.

According to the embodiments, for identifying subjective function type (SFT) of each visual element in a web page that a user is viewing, example rules are listed based on the definitions and deductions presented about SFT classification/categorization: i) Basic operational functions of visual elements are: informative, navigational, interactive, decorative, architectural functions; A visual element may possess one or more of these functions simultaneously, and it always possesses an architectural function; ii) Any additional function of a visual element beside its basic operational function/s is considered subjective, and therefore the visual element is considered subjective, i.e., possessing a subjective function; iii) An auxiliary element is a visual element without a subjective function; A 'main content', or a 'side content' is a visual element that involves a subjective function besides its operational function/s; iv) Any visual element with null content (i.e., without any textual/visual/audial content) is auxiliary element; v) Only informative content may involve a subjective function; vi) An informative visual element is an auxiliary element as long as its content does not involve any sort of subjective function; vii) Any visual element whose function is ambiguous is considered decorative, and therefore considered as auxiliary element.

To elaborate on the process 302 to identify subjective function type (SFT), and the process 304 to identify cluster information (CI), an exemplary interbedded procedure is presented according to the embodiments: In embodiments, for identifying roles, such as main contents, side contents and auxiliary elements of a web page, the following subprocesses are executed in the process 302; In step 302/1: each visual element that includes textual/visual/audial content,—including related markup/script—is identified by the system analyzing content properties and/or content itself (e.g., for markup/script), based on the uniform visual element identifier (UVEI) of each visual element. If a visual element includes textual/visual/audial content then it is flagged as 'unidentified element'; else, it is flagged as 'auxiliary element'. In this step, visual elements with null content are identified (e.g., containers, separators, frames, etc.), and which are considered purely architectural. Although they are null in content, they possess properties such as, size, border size, border color, background color, etc. In one embodiment, the system—roughly—estimates the possible roles of visual elements with null contents by comparing their properties and relative positions with the known web page layouts when rendered.

In step 302/2, among the 'unidentified elements' that are flagged in step 302/1, each visual element with navigational and/or interactive features without possessing a subjective function is identified by the steps: For each visual element among the 'unidentified elements' that are flagged in step 302/1; 302/2.1) detecting textual content—including markup/script—related with the execution of navigational and/or interactive processes; 302/2.2) detecting visual content that is a component of a navigational and/or interactive user interface (GUI), 302/2.3) detecting audial content that is a component of a navigational and/or interactive user interface (AUI); 302/2.4) detecting textual content that is a component of a navigational and/or interactive user interface (GUI); Following the execution of the steps regarding functional analysis 302/2.1 to 302/2.4, executing process 304 for identifying cluster information (CI); 304/1) i) analyzing the position of each detected visual element relative to other visual elements of the web page, ii) analyzing the properties of each detected visual element, and iii) based on the detected roles, relative positions, and properties identifying related visual elements for each detected visual element and grouping the interrelated ones; 302/2.5) for each detected visual element, deciding whether the visual element is auxiliary element or not, based on the steps 302/2.1, 302/2.2, 302/2.3, 302/2.4, 304/1 and by utilizing the information obtained in the step 302/1. Flagging each visual element as 'unidentified element' or 'auxiliary element' according to the decision.

In one embodiment, for each visual element flagged as 'unidentified element' at 302/1; Regarding the step 302/2.1, textual content including markup is analyzed to detect a hyperlink associated with the visual element for detecting a navigational feature (e.g., URL), and any script associated with the visual element is analyzed for detecting an interactive feature (e.g., JavaScript); Next, the system executes the steps 302/2.2, or 302/2.3, or 302/2.4, or combinations thereof according to the content of the analyzed visual element, (whether or not a navigational and/or interactive feature is detected). Regarding the step 302/2.2, visual content is compared with known graphic components of navigational and interactive GUI elements of web pages such as, buttons, search fields, special shapes, icons (like play, pause record icons)—if any. Further, if the visual element is detected as navigational and/or interactive at the step 302/2.1, then a similarity comparison may be also executed in between the visual content and known graphic components of GUI elements for identifying the purpose of unique images, e.g., special icons, logos, avatars, etc. Regarding the step 302/2.3, audial content is compared with known audial components of navigational and interactive AUI elements of web pages such as, audio like clicks, buzzers, etc.—if any; Regarding the step 302/2.4, textual content is analyzed in order to detect text used only as a component of the GUI that it belongs to, such as an address, an instruction, etc.—if any; Regarding the step 304/1, the position of each detected visual element relative to other visual elements of the web page is analyzed, and based on the detected roles and relative positions, related visual elements for each detected visual element is identified. Accordingly, framing visual elements, i.e., containers, and framed visual elements are identified as groups of interrelated visual elements—if any; Regarding the step 302/2.5, for each detected visual element, based on 302/2.1, based on

302/2.2, or 302/2.3, or 302/2.4 or combinations thereof, and based on 304/1 the system evaluates the obtained information and decides whether the analyzed visual element is auxiliary element or not. For example, based on the features of the visual elements that are enclosed by a container, and based on the relative position of the framing container, the system may predict the purpose of the enclosed group (e.g., a navigation bar, a header, a footer, a social media post, etc.) and may deepen its evaluation for the role detection of the visual elements within the enclosed group. For a visual element that is detected as possessing navigational and/or interactive features in 302/2.1, possible outcomes are as follows: i) if the content (visual, and/or audial, and/or textual) is a component of a navigational and/or interactive user interface, then the visual element is flagged as auxiliary element. ii) if any of the content (visual, and/or audial, and/or textual) is not a component of a navigational and/or interactive user interface, then the visual element is flagged as 'unidentified element'. For a visual element that is detected as 'not possessing' navigational and/or interactive features in 302/2.1, possible outcomes are as follows: i) if the content (visual, and/or audial, and/or textual) is a component of a navigational and/or interactive user interface, then—because its function is ambiguous—the visual element is flagged as auxiliary element; ii) if any of the content (visual, and/or audial, and/or textual) is not a component of a navigational and/or interactive user interface, then the visual element is flagged as 'unidentified element'; according to the embodiment.

In step 302/3, among the 'unidentified elements' that are flagged in step 302/2, each visual element with decorative features without possessing a subjective function is identified by the steps: For each visual element among the 'unidentified elements' that are flagged in step 302/2; 302/3.1) detecting visual content with decorative features; 302/3.2) detecting audial content with decorative features; 302/3.3) detecting textual content with decorative features; Following the execution of the steps regarding functional analysis 302/3.1 to 302/3.3, executing the process 304 for identifying cluster information (CI); 304/2) i) analyzing the position of each detected visual element relative to other visual elements of the web page, ii) analyzing the properties of each detected visual element, and iii) based on the detected roles, relative positions, and properties identifying related visual elements for each detected visual element and grouping the interrelated ones; 302/3.4) for each detected visual element, deciding whether the visual element is auxiliary element or not, based on the steps 302/3.1, 302/3.2, 302/3.2, 304/2, and by utilizing the information obtained in the steps 302/1 and 302/2. Flagging each visual element as 'unidentified element' or 'auxiliary element' according to the decision.

Various strategies may be applied for the detection of visual, audial and textual content with decorative features, without possessing a subjective function. One strategy may be comparing positions of the visual content relative to other visual elements containing visual content for detection of overlapping sections. For example, any visual content that is positioned under another visible content may be considered as background image, and thus decorative. Similarly, a background music may be considered as decorative. Another strategy may be using size and position factors together for identifying images like logos, icons, etc. For example, a visual element containing a relatively small sized image positioned at the top left of a web page without possessing navigational or interactive features may be considered as an ornamental image with pure decorative features. In some cases, separating decorative content from informative ones may require more effort, e.g., due to the similarities of contents. Semantic analysis of textual, visual, and audial contents may be used in such cases.

In one embodiment, for each visual element flagged as 'unidentified element' at 302/2; Regarding the step 302/3.1, visual elements including images or image sequences with overlaying visual elements including visible content upon them are detected, and also other images like icons, logos, etc. are detected based on their relative positions and their properties like size, shape, etc.; Regarding the step 302/3.2, audio used for decorative purposes such as background music, etc. are detected; Regarding the step 302/3.3, text used for decorative purposes such as, a background fill, ornamental patterns etc. are detected; Regarding the step 304/2, the position of each detected visual element relative to other visual elements of the web page is analyzed, and based on the detected roles and relative positions, related visual elements for each detected visual element are identified. Accordingly, framing visual elements, i.e., containers, and framed visual elements are identified as groups of interrelated visual elements—if any; Regarding the step 302/3.4, for each detected visual element, based on 302/3.1, or 302/3.2, or 302/3.3 or combinations thereof, and based on 304/2, and also utilizing the information obtained by the previous steps 302/1 and 302/2, the system evaluates all obtained information and decides whether the analyzed visual element is auxiliary element or not. For example, based on the features of the visual elements that are enclosed by a container, and based on the relative position of the framing container, the system may predict the purpose of the enclosed group (e.g., a header with a background picture or a canvas with ornamental patterns etc.) and may deepen its evaluation for the role detection of the visual elements within the enclosed group. For a visual element that is processed by the step 302/3, possible outcomes are as follows: i) if the visual element possesses only decorative function (i.e., visual, and/or audial, and/or textual content is decorative), then the visual element is flagged as 'auxiliary element'; ii) if the visual element possesses only navigational and/or interactive function/s with a decorative function, then the visual element is flagged as 'auxiliary element'; iii) else, the visual element is flagged as 'unidentified element'; according to the embodiment.

In step 302/4, among the remaining 'unidentified elements' that are flagged in step 302/3, each visual element with informative features without possessing a subjective function is identified by the steps: For each visual element among the 'unidentified elements' that are flagged in step 302/3; 302/4.1) detecting visual content with informative features without a subjective function; 302/4.2) detecting audial content with informative features without a subjective function; 302/4.3) detecting textual content with informative features without a subjective function; Following the execution of the steps regarding functional analysis 302/4.1 to 302/4.3, executing the process 304 for identifying cluster information (CI); 304/3) i) analyzing the position of each detected visual element relative to other visual elements of the web page, ii) analyzing the properties of each detected visual element, and iii) based on the detected roles, relative positions, and properties identifying related visual elements for each detected visual element and grouping the interrelated ones; 302/4.4) for each detected visual element, deciding whether the visual element is auxiliary element or not, based on the steps 302/4.1, 302/4.2, 302/4.3, 304/3, and by utilizing the information obtained in the steps 302/1, 302/2, and 302/3. Flagging each visual element as 'main or side content' or 'auxiliary element' according to the decision.

Various strategies may be applied for the detection of visual, audial, and textual content with informative features without possessing a subjective function. According to the processes 302/1, 302/2 and 302/3, architectural, navigational and/or interactive, decorative visual elements including ambiguous ones (which are flagged as decorative) are identified and flagged as auxiliary elements. In addition, at 302/3, 'navigational and/or interactive+decorative' visual elements are also identified (based on 302/2) and flagged as auxiliary elements. Any remaining visual element that is flagged in step 302/3 as 'unidentified element' possesses an informative function,—with or without other basic operational functions—, and may or may not have a subjective function. These visual elements may be: 'informative', 'informative+navigational and/or interactive', 'informative+decorative', or 'informative+navigational and/or interactive+decorative'. One strategy may be a rough elimination based on content type. Unlike text and images, most of the multimedia files (e.g., videos, audios, image sequences etc.) are main or side contents, and they may be flagged directly as main or side content. However, it is still possible to encounter with a video, audio or multimedia file in a web page that is used purely for operational purposes, e.g., an instructional video about an interactive feature of the web page, or an audio guide for navigating within the website. For precise identification of such content, semantic analysis may be a requirement. On the other hand, in steps 302/1, 302/2 and 302/3, since all operational functions of visual elements are identified (as architectural, navigational, interactive, and decorative respectively and the rest as informative), including clusters of interrelated visual elements (with the exception of the ones belonging to informative visual elements, which are being determined in this step), more practical approaches are also possible. In this context, one strategy may be identifying positional and functional relationship of the content with the cluster that it belongs to, based on: i) the properties of the content such as, size for images or number of characters for text; ii) previously identified function/s of the visual elements that are members of the cluster; iii) predicted or identified function of the cluster as a whole. For example, a relatively short text—that is purely informative without navigational and/or interactive features—positioned on the header may be considered as the name or label of the web page or website, and thus, informative content without a subjective function. However, a relatively long text positioned on the header may be considered as informative content with a subjective function. For example, it can be a quote or a message from the author of the web page. Further, clusters of visual elements with distinctive features may be defined to the system. For example, tables may be defined to the system, in which the content of a data cell element is informative with a subjective function, while the content in a column or row header (e.g., names of the variables) is informative without a subjective function. Furthermore, the system may identify the functions of higher rank clusters by prediction based on the identified functions of visual elements, identified functions of lower rank clusters, and consideration of the positional and functional relationship of lower rank clusters according to the know higher rank clusters with distinctive features. For example, a container including, a link preview with a commenting interface may be considered as a social network post. In general, this strategy may be applied for identifying text and/or image content of articles, social media posts, comments, comments related with the social media posts, etc. And may be supported with semantic analysis of contents.

In one embodiment, for each visual element flagged as 'unidentified element' at 302/3; Regarding the step 302/4.1, each visual element including an image is analyzed according to its content properties (e.g., size and shape), its positional and functional relationship with the cluster that it belongs to and predicted or determined function of the cluster as a whole—if available. Based on the analyses, each informative content without a subjective function is detected. All video and multimedia files, and all image sequences are considered as possessing a subjective function; Regarding the step 302/4.2, each visual element including a relatively small sized audio file is analyzed based on semantic analysis. Based on the analyses, each informative content without a subjective function is detected. The rest of the audio files—including the audio data of video files—are considered possessing a subjective function; Regarding the step 302/4.3, each visual element including text is analyzed according to its content properties (e.g., number of characters, words, sentences, etc.), its positional and functional relationship with the cluster that it belongs to and predicted or determined function of the cluster as a whole—if available. Based on the analyses, each informative content without a subjective function is detected; Regarding the step 304/3, the position of each detected visual element relative to other visual elements of the web page is analyzed, and based on the detected roles and relative positions, related visual elements for each detected visual element is identified. Accordingly, framing visual elements, i.e., containers, and framed visual elements are identified as groups of interrelated visual elements—if any; Regarding the step 302/4.4, for each detected visual element, based on 302/4.1, or 302/4.2, or 302/4.3 or combinations thereof, and based on 304/3, and also utilizing the information obtained by the previous steps 302/1, 302/2 and 302/3, the system evaluates all obtained information and decides whether the analyzed visual element is 'main or side content' or auxiliary element. For example, based on the features of the visual elements that are enclosed by a container, and based on the relative position of the framing container, the system may predict the purpose of the enclosed group and may deepen its evaluation for the role detection of the visual elements within the enclosed group. For a visual element that is processed by the step 302/4, possible outcomes are as follows: i) if the informative content of the visual element does not possess a subjective function (i.e., visual, and/or audial, and/or textual content without a subjective function) then the visual element is flagged as 'auxiliary element'; ii) if the informative content of the visual element does possess a subjective function (i.e., visual, and/or audial, and/or textual content with a subjective function) then the visual element is flagged as 'main or side content'; according to the embodiment.

In step 302/5, among the remaining visual elements that are flagged as 'main or side content' in step 302/4, each visual element with side content (i.e., extraneous content) is identified by the steps; For each visual element among the 'main or side contents' that are flagged in step 302/4; 302/5.1) detecting visual extraneous content; 302/5.2) detecting audial extraneous content; 302/5.3) detecting textual extraneous content; Flagging each detected visual element as 'side content' and flagging the rest as 'main content'. Since the cluster information (CI) is identified for all visual elements of the web page in the previous steps 302/1, 302/2, 302/3 and 302/4, and since the final decision step is needles, process 304 and the final step are eliminated.

Various strategies may be applied for the detection of side content, i.e., extraneous content. One strategy may be detecting third party websites, e.g., by analyzing download/upload activities. Another strategy may be detecting ads based on the industrial standards that are being used, such as standardized banner sizes, or add fields etc. Another strategy may be semantic analysis of textual, visual, and audial contents, which may be considered as the most reliable but the costliest in terms of the data processing load.

In one embodiment, for each visual element flagged as 'main or side contents' at 302/4; Regarding the step 302/5.1, image and field size of the visual element is compared with known industry standards and flagged as suspicious if it matches. Next, download/upload activities of the—suspicious—visual element may be inspected based on the related markup/script and fetched data. As a result, third party ad resource and visual extraneous content is detected; Regarding the step 302/5.2, audial extraneous content is detected by detecting $3^{rd}$ party streaming transmissions; Regarding the step 302/5.3, textual extraneous content is detected by semantic analysis; Regarding the outcome of the step 302/5, among the visual elements that are flagged as 'main or side contents' each visual element with 'side content' is identified, and accordingly each visual element with 'main content' is identified; according to the embodiment. In addition to all these, 'main content' may be sub-classified/sub-categorized and be used for further filtering of visual elements for interaction. In one embodiment, content published by the website (e.g., columns, articles, news items, etc.) and content published by the viewers (e.g., comments, etc.) are identified and only website's content is filtered for interaction (e.g., based on functional analysis, cluster information, etc.). In another embodiment, link previews of other web pages, and dynamic data displayed in tables (e.g., fetched data from the database of the website displayed in a HTML table upon a request) are identified and filtered out (e.g., based on functional analysis, cluster information, etc.).

To summarize the processes 302 and 304, which are interbedded according to the embodiment; In step 302/1, visual elements with null content, i.e., purely architectural visual elements, are identified, and the remaining visual elements may be flagged as 'unidentified element' and filtered for further evaluation. At this stage, 'unidentified elements' to be processed may include visual elements with navigational features, and/or interactive features, and/or decorative features, and/or informative features, or—as a special case—ambiguous features—which are considered as decorative—, with or without a subjective function. In step 302/2, visual elements with navigational and/or interactive features without possessing a subjective function are identified—if any. Furthermore, by the step 304/1 cluster information (CI) of the said visual elements are identified, and thus, clusters of interrelated visual elements regarding the said visual elements are determined—if any. In this process, any visual element containing a visual or audial or textual content that is not related with navigational and/or interactive functions is flagged as 'unidentified element' and filtered for further evaluation. In step 302/3, visual elements with decorative features without possessing a subjective function are identified—if any. Furthermore, by the step 304/2 cluster information (CI) of the said visual elements are identified, and thus, clusters of interrelated visual elements regarding the said visual elements are determined—if any. In this process, any visual element containing a visual or audial or textual content that is not related with the decorative functions is flagged as 'unidentified element' and filtered for further evaluation. In step 302/4, visual elements with informative features without possessing a subjective function are identified—if any—, and the rest of the visual elements are flagged as 'main or side content'. Furthermore, by the step 304/3 cluster information (CI) of the said visual elements are identified, and thus, clusters of interrelated visual elements regarding the said visual elements are determined—if any. In step 302/5, each visual element with side content is identified—if any—, and accordingly remaining ones are flagged as main content. As a result, the system identifies basic operational function/s of each visual element, while identifying any subjective function classified/categorized as main or side content, and determines clusters of interrelated visual elements, according to the embodiment. In one embodiment, in order to speed up the process 302/1 to 302/5, for the uniform web pages of websites (e.g., Twitter, Instagram, Facebook etc.), before executing 302/1, common objects of web pages are identified such as, header, footer, local navigation boxes, scan columns, etc., by comparing the web pages of the website. Next, based on the common visual elements, the system—roughly—estimates the possible roles of the visual elements by comparing their properties and relative positions in the rendered web page with known web page layouts.

The above-listed elaborations with respect to the process 300 is not limited with the embodiments provided, thus many more embodiments and implementations are possible.

Figure 4:
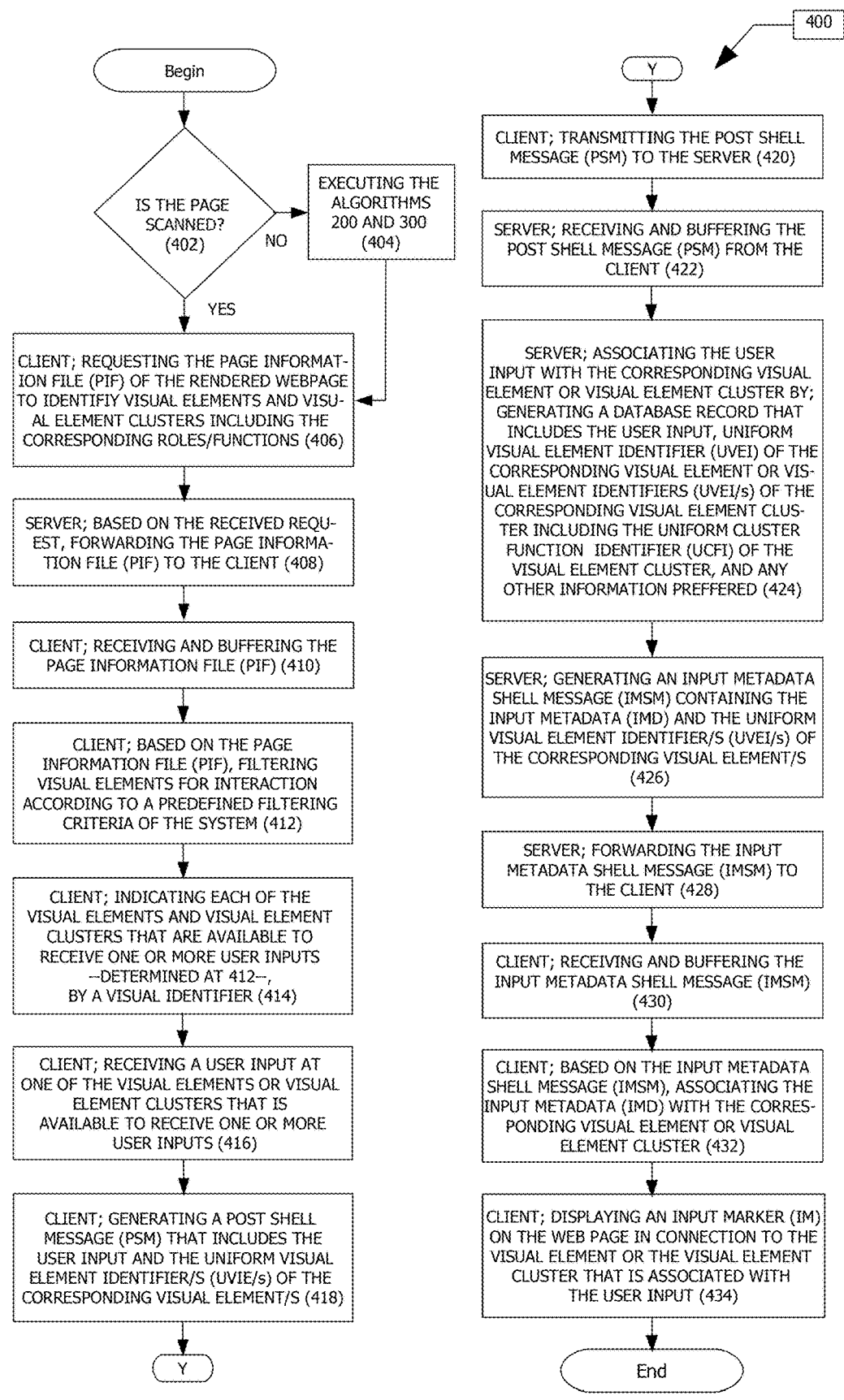
FIG. 4 is a flowchart diagram illustrating an example process to filter visual elements for interaction, and based on receipt of a selection by a user from among these filtered visual elements, to associate user inputs, i.e., super-objects, with selected visual elements of a rendered web page.

FIG. 4 is the flowchart diagram 400 illustrating an example process to filter visual elements and/or clusters of interrelated visual elements for interaction and based on user's selection among these filtered visual elements, to associate user inputs with selected visual elements and/or clusters of interrelated visual elements of a rendered web page, according to an embodiment.

The process begins with the request of a system user from the client to associate a user input with a visual element of a rendered web page. At 402, the client inquiries whether the rendered web page is scanned, i.e., processed by 200 and 300, or not. If the web page is not scanned, then the process 200 and the process 300 may be executed respectively at 404 before 406 is executed. Else, 406 is executed immediately after.

At 406, the client requests the page information file (PIF) of the rendered web page generated at 300 in order to contextually identify each visual element and cluster of interrelated visual elements via UVEIs and CIs including corresponding roles/functions of each, such as basic operational function/s (BOF), basic roles (SFT), and/or high-level function/s of each cluster of interrelated visual elements (UCFI), etc. Next, based on the received request, the server forwards the page information file (PIF) to the client (408), and the client receives and buffers the page information file (PIF) (410).

Next, based on the page information file (PIF), the client decides on the interactions, i.e., identifying the availability of each visual element and/or each cluster of interrelated visual elements for interaction according to a predefined filtering criteria of the system and flag the UVEIs as 'available' in the PIF, which is buffered in the client. More precisely, based on the role/function of each visual element and their interrelationship including the high-level functions of each corresponding cluster determined at 300, the client (or the server in another configuration) filters visual elements for interaction according to a predefined filtering criteria of the system, (e.g., as only main content, only side content, only auxiliary elements, or any combination thereof for associating user generated contents, and/or as clusters of interrelated visual elements according to their 'positional', or 'positional+functional' relations for associating user generated software applications), and enables filtered visual elements for interaction, while disabling the remaining visual elements (412). Filtering criteria of the embodiments may vary. For example, for associating user generated contents, in order to focus on contextual information of web pages, e.g., news, articles, comments, videos, social media posts, etc., only visual elements including main content may be available for interaction. According to various embodiments, for associating a user generated content, the system may allow selection of only one visual element among the filtered ones. However, for associating a user generated software application, the system may allow selection of a cluster of visual elements among the filtered ones, and thus, may associate a user generated software application with one or more visual elements. In this process, the system may utilize the interrelated visual elements that are identified and grouped at 300,—where the relationship may be positional, and/or 'positional+functional', and/or any other predefined relationship criteria—, and filters them for interaction, according to a predefined filtering criteria. For associating user generated software applications, predefined filtering criteria may be filtering only clusters with 'positional+functional' relations. However, predefined filtering criteria may be more specific about the clusters to be filtered for interaction. For example, some particular clusters with distinctive features may be predefined in the system,—which may be specific to certain websites or may be used in general—such as, link previews, social media posts, headers, footers, menu boxes, navigation bars, tables, commenting interfaces, etc., and they may be identified by analyzing the previously detected roles/functions and relations at 300 (FIG. 3), according to the embodiments. In such embodiments, general features of clusters may be defined and introduced to the system by 'positional and functional' relations of the visual elements together—instead of only positional—because layouts of clusters may alter in time. In this context,—for example—a social media post may be defined and introduced to the system as a cluster including at least 3 sub-clusters due to one of them including main content, one of them including author ID, and one of them including a commenting/reaction interface. Thus, the mediums/interfaces used in web pages such as, social media posts, link previews, commenting interfaces, tables, media players etc. may be introduced to the system according to their qualifications and characteristics instead of dictating raw positional data only,—which may be considered non-persistent for most of the cases. Alternatively, or in addition, the system may also enable a user to define a cluster of visual elements and introduce it to the system by manual selection of visual elements from among the visual elements of a rendered web page. Thus, a system user may define a unique cluster (e.g., according to its role and/or function) to be dynamically processed/manipulated by one or more software applications each developed for the defined cluster.

Next, the client indicates each of the visual elements and/or clusters of interrelated visual elements that are available to receive one or more user inputs—determined at 412—by a visual indicator, e.g., by highlighting the available (filtered) visual element field (414). Thus, the system user may select a visual element and/or a cluster of interrelated visual elements for associating a user input. In embodiments for associating user generated contents, the system highlights the available visual element fields in green, and for associating user generated software applications the system highlights the available visual element fields in blue.

Next, the client receives a user input for a visual element or a cluster of interrelated visual elements that is available to receive one or more user inputs (416). In various embodiments, system users create user inputs via an input interface that is particularly designed for generating user inputs. In embodiments, for enabling users to generate software applications, a software development tool is provided. According to the embodiments, the software development tool isolates a selected cluster, and indicates each sub-cluster according to the ranks of interrelationship within the selected cluster (similar to a DOM tree, where the document is the selected cluster), wherein a system user may include additional content—including scripts—, and/or alter the properties of visual elements, and/or add new visual elements, and/or define the fields or portions of the fields of visual elements to be dynamically processed/manipulated by the script that he/she is developing. In another embodiment, based on a user's selection of an available cluster, the system displays a list of—system executable—software applications that are particularly developed for the selected cluster of interrelated visual elements. Thus, the user may select an already existing user generated software application to process/manipulate a cluster.

Next, the client generates a post shell message (PSM) that includes all information pertaining to the user input and the uniform visual element identifier/s (UVEI) of the corresponding visual element/s including each corresponding subjective function type (SFT) and corresponding cluster information (CI) (418). In various embodiments, post shell message (PSM) also includes other information obtained in processes 302, 304, and 306 such as, basic operational function/s (BOF) of each visual element, and uniform cluster function identifier (UCFI) of each cluster of interrelated visual elements, etc.

Next, the client transmits the post shell message (PSM) to the server (420), and the server receives and buffers the post shell message (PSM) (422).

Next, in the case of establishing an association with a singular visual element, the server associates the user input with both the corresponding visual element and the hyperlink that is associated with the visual element—if any—by generating a database record that includes the user input (i.e., the content of user input such as images, texts, scripts, etc.), uniform visual element identifier (UVEI) of the corresponding visual element including its corresponding basic operational function/s (BOF), subjective function type (SFT) and corresponding cluster information (CI) and any other information preferred (424). In the case of establishing an association with a cluster of interrelated visual element, the system may associate the user input with the corresponding cluster of interrelated visual elements by generating a database record that includes the user input (i.e., the content of user input such as images, texts, scripts, etc.), the uniform cluster function identifier (UCFI) of the corresponding visual element cluster, each uniform visual element identifier (UVEI) of the visual elements that belong to the cluster including each corresponding basic operational function/s (BOF), subjective function type (SFT), and cluster information (CI), and any other information preferred (424).

In one embodiment, the server appoints a unique resource identifier (e.g., an URL) for the user input as the database ID and creates a database record for the user input under this ID where the server records all information according to the database fields of the user input such as UVEI, BOF, SFT, CI, UCFI of the associated visual element or the associated cluster of interrelated visual elements, contents of the user input, further interactions with the user input such as comments, etc. In this scenario database record of the user input may be updated whenever the user input is edited, or comments are added. In another embodiment, for each user input, a dedicated web page that includes the content of the user input may be generated also, and the web page may be addressed with the appointed resource identifier that is used as the database ID. In various embodiments, only one visual element may be associated with a user input if the user input is a user generated content, while one or more visual elements may be associated with a user input if the user input is a user generated software application. In addition to that, in case of user generated contents, subjective function type (SFT) and cluster information (CI) may be temporary references used for each viewing session of a client, and thus they are not recorded in the database and not included to post shell message (PSM). On the other hand, in case of user generated software applications, subjective function type (SFT) and cluster information (CI) may be permanent references used against contextual and/or structural alterations of interacted clusters of web pages/websites, and thus they may be included to post shell message (PSM) and recorded in the database. Thus, positional and functional relationship of visual elements within an interacted cluster may be used as a reference to identify the cluster if it alters, and further, may be used for adapting the associated software applications to the existing state of the altered cluster. For example, the structure/layout of uniform social media posts (e.g., post interfaces) of a social media website may alter in a way that relative positions of all sub-clusters such as, 'author information', 'main content', 'reaction interface', 'commenting interface' may completely change. Furthermore, content and properties of the visual elements, such as icons, shapes, background colors, etc., may also alter completely. However, the system may still identify the altered 'post interface' based on the analysis of the initial state and recent state according to the positional and functional relationship within the clusters of the pages of the said social media website, according to the embodiments.

Next, for the user input, the server generates an input metadata shell message (IMSM) containing input metadata (IMD), i.e., metadata of the user input, and uniform visual element identifier/s (UVEI) of the corresponding visual element/s (426).

Next, the server forwards input metadata shell message (IMSM) to the client (428), and the client receives and buffers input metadata shell message (IMSM) (430).

Next, for the input metadata shell message (IMSM) received, the client associates input metadata (IMD) with the corresponding visual element or cluster of interrelated visual elements of the web page (432).

Next, the client displays an input marker (IM) on the web page in connection to the corresponding visual element and/or cluster of interrelated visual elements that is associated with the user input (434).

The process terminates after the execution of 434. As a result of the process 400, the client, in collaboration with the server, associates a user input with a visual element and/or a cluster of interrelated visual elements that are available to receive one or more user inputs, according to an embodiment.

Figure 5:
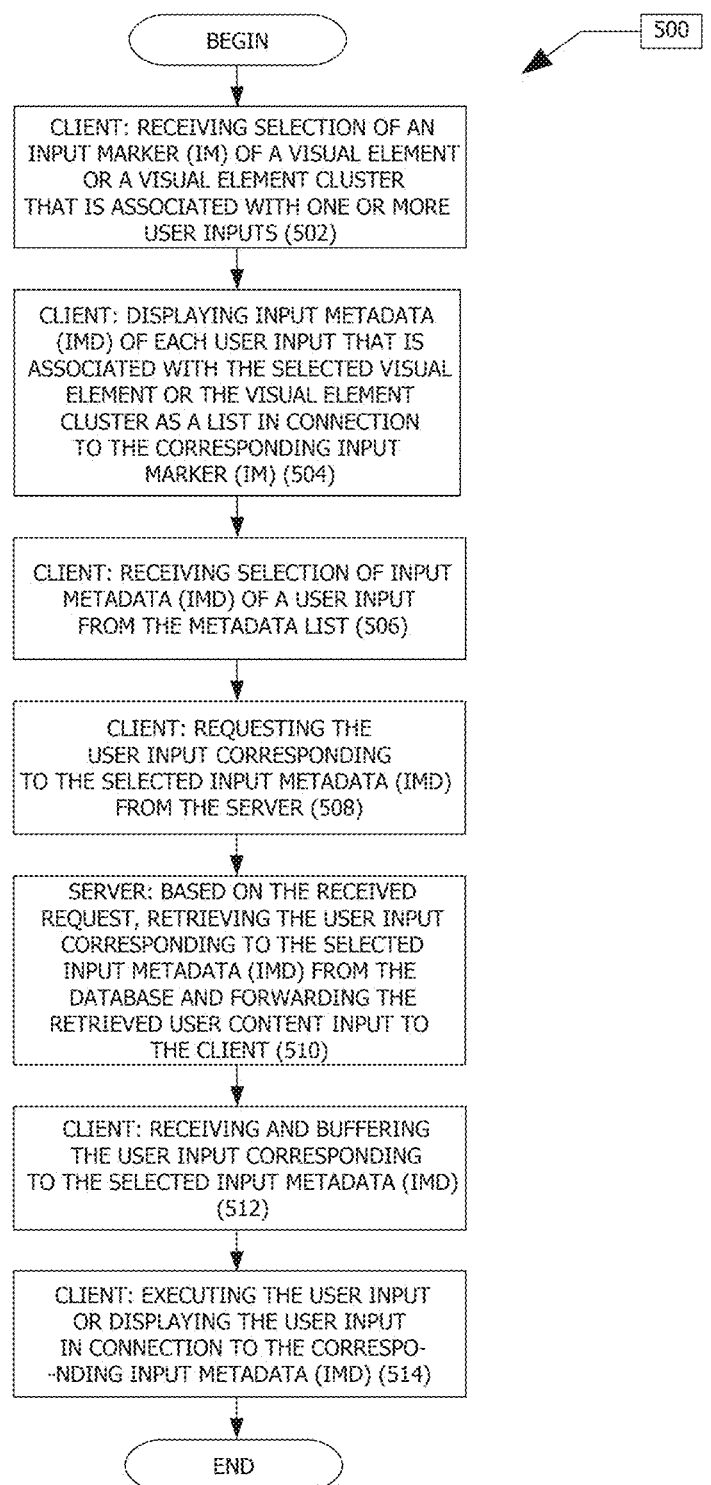
FIG. 5 is a flowchart diagram illustrating an example process to display metadata of user inputs, i.e., super-objects, to display content of user inputs, i.e., super-objects, and/or to execute program instructions of user inputs, i.e., super-objects, in connection with the corresponding visual elements of a rendered web page.

FIG. 5 is the flowchart diagram 500 illustrating a process to display metadata of user inputs, to display content of user inputs and/or to execute program instructions of user inputs in connection to the corresponding visual elements and/or clusters of interrelated visual elements of a rendered web page, according to an embodiment;

The process begins with the selection of an input marker (IM) of a visual element or a cluster of interrelated visual elements—of a rendered web page—that is associated with one or more user inputs, by the system user. In one embodiment, system user selects the input marker (IM) by clicking a pointing device. At 502, the client receives the selection.

Next, based on the received selection and input metadata shell messages (IMSM) received and buffered at 224 and/or 430, the client displays input metadata (IMD) of each user input that is associated with the selected visual element or cluster of interrelated visual elements as a list in connection to the corresponding/selected input marker (IM) (504). In one embodiment, N number of input metadata (IMD) is listed in rows for N number of corresponding user inputs. The user browses metadata list that is ranked according to various ranking algorithms for display on the web page. The list scrolls downward if needed. Input metadata (IMD) contains summary info such as heading, rank, popularity score, publisher etc., and the system user may decide whether to reach content pertaining to a user input or not according to metadata.

Next, the client receives selection of input metadata (IMD) of a user input from the metadata list (506). In one embodiment, a system user selects one of the input metadata (IMD) from the metadata list manually by a pointing device.

Next, the client requests content pertaining to the user input corresponding to the selected input metadata (IMD) from the server (508).

Next, based on the received request, the server retrieves the requested content pertaining to the user input corresponding to the selected input metadata (IMD) from the database and forwards it to the client (510).

Next, the client receives and buffers the content pertaining to the user input corresponding to the selected input metadata (IMD) (512).

Next, if the user input is user generated content, then the client displays the content pertaining to the user input in connection to the corresponding input metadata (IMD), else the client executes program instructions of the user generated software application in connection to the corresponding visual element and/or cluster of interrelated visual elements (514). As a result of the process 500, the client, in collaboration with the server, displays metadata and content of user inputs in connection to the corresponding visual elements and/or clusters of interrelated visual elements, and/or displays metadata of user generated software applications and executes the selected ones according to an embodiment.

Figures 6, 7:
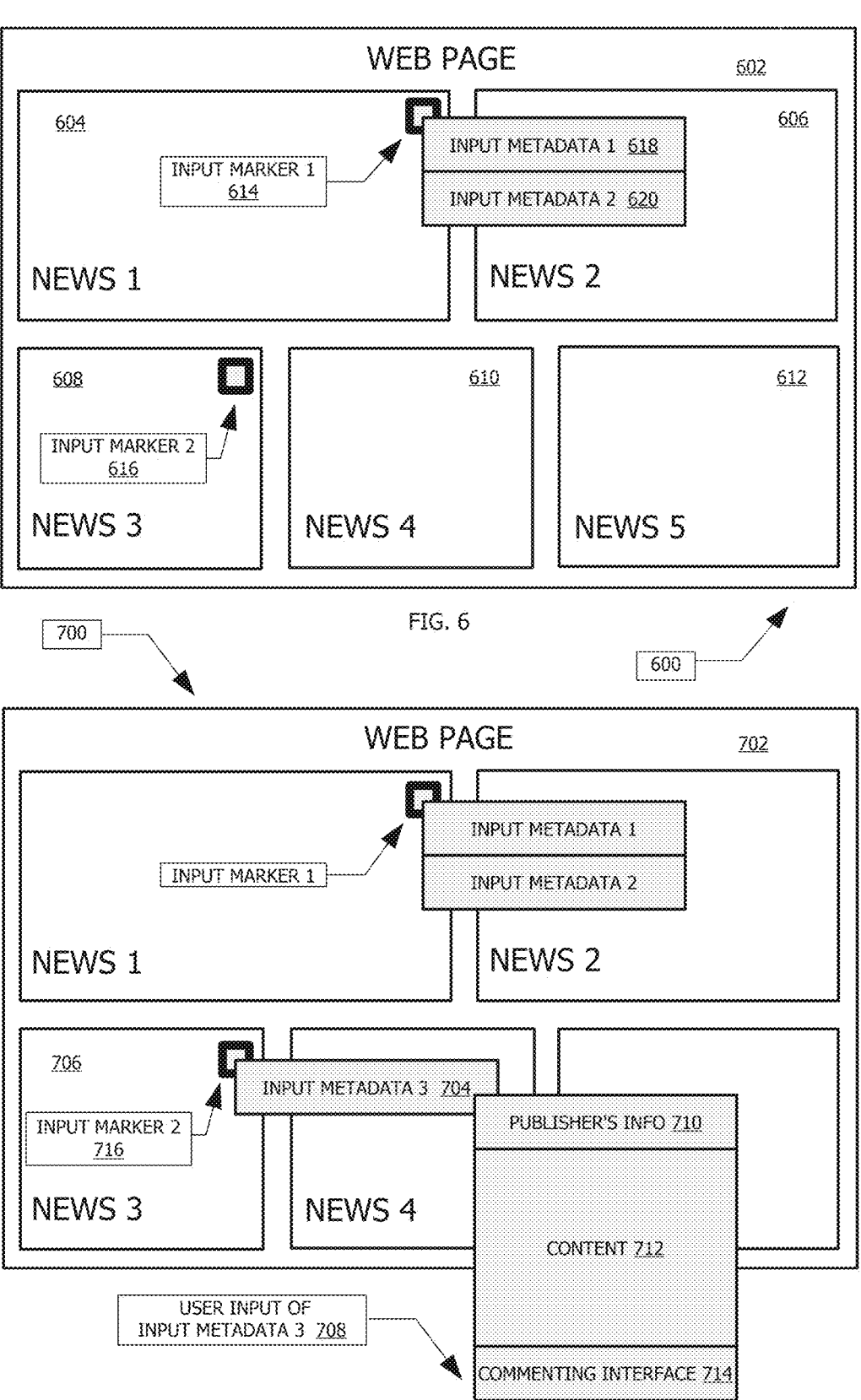
FIG. 6 is an exemplary user interface displaying a plurality of input markers (IM) and input metadata (IMD) of associated user inputs, i.e., super-objects, on a rendered web page.
FIG. 7 is an exemplary user interface displaying a user input, i.e., a super-object, corresponding to an input metadata (IMD)

FIG. 6 is an exemplary user interface 600 displaying a plurality of input markers (IM) and input metadata (IMD) of various user inputs that are associated with a web page 602, according to an embodiment. The web page 602 includes several visual objects, shown as 604, 606, 608, 610, and 612. A plurality of user inputs is associated with visual objects 604 and 608, and they are marked with input markers 614 and 616 respectively. 618 and 620 are input metadata (IMD) of previously received user inputs associated with the visual object 604. Input metadata 618 and 620 are displayed on the web page 602 as a list, in connection to the associated visual object 604. Infinite numbers of input metadata (IMD) associated with a visual object may be displayed by a system user via scrolling down the list.

FIG. 7 is an exemplary user interface 700 displaying a user input corresponding to a selected input metadata (IMD) at a web page 702, according to an embodiment. As shown, a system user selects input metadata 704 corresponding to the input marker 716 displayed in connection to the associated visual object 706 and based on the selection, the user input 708 that includes publisher's information 710, content 712, and a commenting interface 714, is displayed in connection to the corresponding input metadata 704 on the web page 702.

Figure 8:
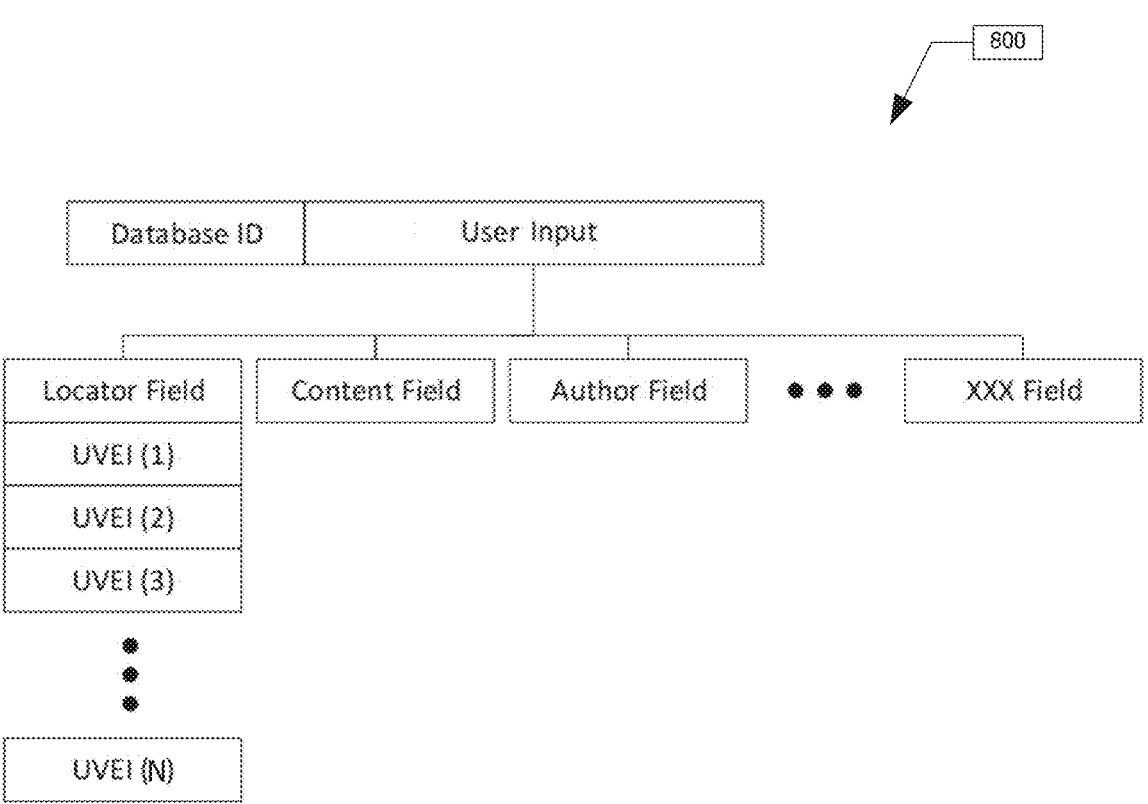
FIG. 8 is an exemplary database record structure representing a database record for a user input, i.e., a super-object.

FIG. 8 is an exemplary database record structure 800 representing a database record for a user input. As illustrated in FIG. 8, the database record structure 800 includes a database ID for each user input stored in the database. In database record structure 800, fields of a user input record are displayed as locator field, content field, author field, and any other field etc. The association of a user input may be identified by the UVEI/s recorded in the locator field. The content field includes the content of the user input. The database record structure 800 may also include an author field to identify the author of the user input, as well as other fields related to the user input or the author, such as a date of generation/revision of the user input, contact information for the author, and other such information. As discussed hereinbefore, the UVEIs stored in the database record structure 800 are only recorded UVEIs (rUVEIs) and a visual element with which a user has interacted is associated through an rUVEI, such as within the user input database record structure 800. In this regard, database is queried based on the comparison of rUVEIs with the nUVEIs that are identified in each viewing session of a client on a rendered web page. Any number of rUVEIs may be stored in the database record structure 800. A user input may be associated with a cluster of visual elements, thus multiple UVEIs may be recorded in the locator field of the user input record, and thus these UVEIs become rUVEIs. Alternatively, or in addition, a user input may be associated with only a single visual element through a single rUVEI, according to the embodiments.

Figure 9:
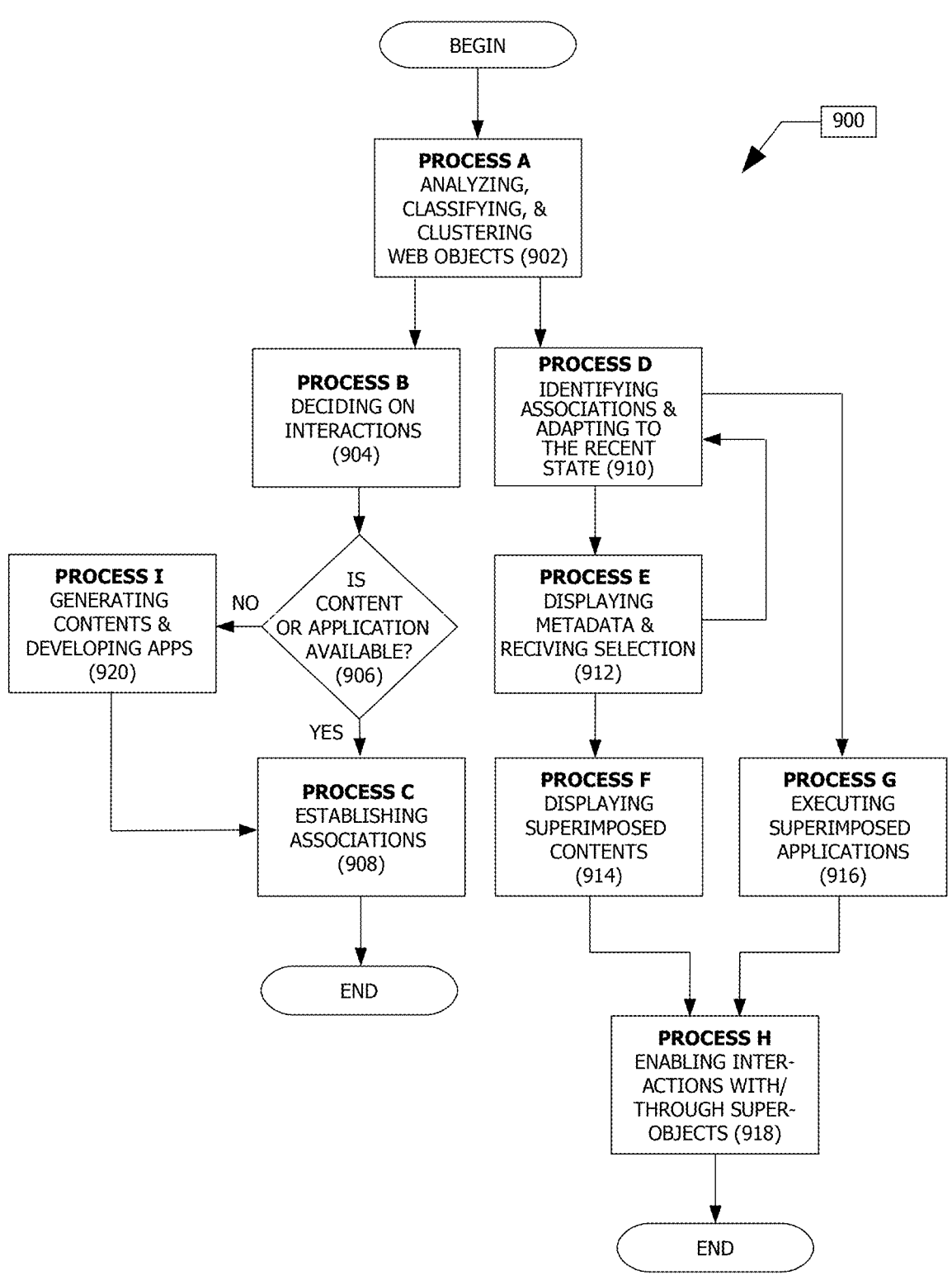
FIG. 9 is a flowchart diagram illustrating an example process that includes steps with respect to processing of/interacting with a rendered web page.

FIG. 9 is the flowchart diagram 900 illustrating an example process that includes steps with respect to processing of/interacting with a rendered web page, according to an embodiment. The process 900 includes the whole system as both the client and server executing the steps in coordination with each other while interacting with a system user through the client. Processes 902 to 920 are processes/steps A to I respectively (excluding the decision process/step 906 which is also a process/step of 900 but without an assigned letter for simplification of the description). The sequence of the steps A→B→C represents the process of establishing a new association between a super-object and a web-object (i.e., associating a user generated content or application with a web-object of a web page for the first time), while steps A→D represents the process of identifying pre-existing associations (i.e., identifying each association between existing super-objects and web-objects) and for each associated web-object, adapting to the contextual and/or structural alterations that occur between the initial state (i.e., the state when an association is first established) and the most recent state (i.e., current state). The process steps A→B→C as a whole may—in general—correspond to the processes 200, 300 and 400 as a whole, while the process steps A→D as a whole may—in general—correspond to the processes 200 and 300 as a whole. Both processes A→B→C and A→D are executed for each client individually at each viewing/rendering. The steps A→B→C and A→D together ensures the stability (consistency) and sustainability (persistency) of interactions. The steps E, F, and G are about recommending, previewing, displaying, and execution processes of super-objects, e.g., integrated contents or features; while the step H is about providing users with the ability to connect and interact with each other through super-objects. Finally, the step I is about generating contents and developing applications, i.e., generating prospective super-objects, to be associated with web-objects. In this context, the system also provides an intelligent tool for assisting both layman and expert users to develop applications that dynamically process/manipulate web-objects based on hybrid intelligence.

According to various embodiments, the process 900 begins with the rendering of a web page—partially or wholly—by the web browser of a system user.

Process A—902—includes the interbedded steps of analyzing, classifying, and clustering visual elements of the rendered portions of a web-resource that a user is viewing. In this process, the system analyses rendered visual elements for extracting corresponding UVEIs to be used as an analogue reference of the corresponding respective visual element for further analyses such as for classifying visual elements (i.e., elementary web-objects such as images, videos, audios, texts, etc.) into one or more of a plurality of predetermined classes (e.g., basic operational functions and subjective function types) and clustering interrelated visual elements (i.e., meaningful clusters of elementary web-objects, such as GUIs, forms, tables, lists, articles, etc.) according to their positional and/or functional relations in rank orders, including extracting/interpreting the role/function of each cluster in rank orders.

In the first sub-step of 902, the system analyzes each visual element individually, including related markup/script and fetched content (such as web images, videos, audios, etc.) to collect distinctive information about the visual element (i.e., to extract the basic context) and generates a 'uniform visual element identifier' UVEI for each of the identified visual elements, which uniquely identifies a corresponding one of the visual elements. More precisely, the system associates with each of the UVEIs, information regarding the web page, distinctive information and/or properties of content of the corresponding one of the visual elements, and a relative position information of the corresponding one of the visual elements. As a result, the system assigns a UVEI to each visual element (i.e., elementary visual object) to be used both as a base for further analysis and as a reference (e.g., an analogue) for establishing associations between super-objects and web-objects.

Next, based on the UVEIs generated, the system analyzes the visual elements for classifying each of the visual elements into one of the basic operational functions classified as, for example, navigational, interactive, informative, decorative, structural, or combinations thereof. In this process, the system may further classify each visual element into one of the basic roles, i.e., subjective function types classified as 'main content' and 'auxiliary element'. Subjective function type (SFT) is a non-overlapping classification of each visual element according to its basic role in a page. In this context, further sub-classes/sub-categories may be created according to the operational needs. For example, according to the embodiments, 'main content' may also be sub-categorized as 'main content' and 'side content' per se. According to the classification mechanism of the system: i) all elements possess one or more basic operational function/s; ii) an 'auxiliary element' is an element that possesses only operational function/s, i.e., having only an operational role without a subjective role; iii) a 'main content' or a 'side content' is an element that also possesses a subjective function besides operational function/s, i.e., conveying a subject matter, i.e., a matter presented for consideration of the viewers. For example, in YouTube™, a scroll bar or a play button may be identified as an auxiliary element, a video or a link preview of a video may be identified as a main content, while an ad or any other extraneous content may be considered as side content. As a result, the system classifies each visual element (i.e., each elementary visual object) into, for example, one or more of the basic operational functions and further classifies each visual element into, for example, only one of the subjective function types, i.e., one of the basic roles.

Further, in this process, based on the classification of the basic operational functions and utilizing the extracted information regarding the classification of the subjective function types, the system analyzes respective relative positions and respective functional relations of the elements with other elements, in order to cluster functionally interrelated elements in rank orders and extract the function of each cluster. In this context, unlike conventional segmentation of elements, clustering includes all ranks of interrelationship. For example, a search field and a search button lined up next to each other serving for the same purpose is a first order cluster, while the entire navigation bar containing these two elements besides a couple of link buttons is a second order cluster and so forth. Accordingly, the highest order cluster corresponds to all visual elements of a web page framed/enclosed by the canvas, i.e., the web page itself. Further, the system extracts high-level function/s of each identified cluster of interrelated visual elements and assigns a 'uniform cluster function identifier' (UCFI) for each as an analogue reference to be used for establishing associations with a cluster of interrelated visual elements—in addition to the set of UVEIs that belongs to the cluster.

Referring again to Process A: i) Uniform cluster function identifier (UCFI) may also be used for individual visual elements by considering each visual element as a zeroth order cluster. ii) The process of 'classifying and clustering' are interbedded processes, i.e., the information obtained in one process is used to obtain information in the other and vice versa, as shown with a loop in the flowchart 300 (FIG. 3). iii) Although insufficient, stand-alone analyses purely based on the page view (i.e., image processing based on computer vision such as implementing Gestalt Principles as proximity, similarity, continuity, and closure), may be used as a supportive process such as, in the process of identifying the positional interrelationship of visual elements, or as a preliminary analysis of web-resources in order to optimize the process of deep analysis of the HTML/JS code, fetched data, structure, etc.

As a result of Process A, i.e., the process of analyzing, classifying, and clustering web-objects, the system determines/interprets at a contextual level 'what exactly the web-objects are' in the rendered web page. Following the execution of Process A, the processes B and D may be initiated and executed independent of each other. In some examples, the processes B and D may be initiated simultaneously and executed independent of each other.

Process B—904—includes the step of deciding on interactions with respect to the rendered portions of the web-resource that the user is viewing. In this process, based on i) each UVEI generated; ii) the role of each visual element identified; iii) each cluster of interrelated visual elements identified including the corresponding UCFI; and iv) the predefined set of interaction rules that is set according to the operational and implementational needs; the system controls user interaction with web-objects—in respect of the development and deployment process of super-objects—by recommending interaction options and enabling/disabling web-objects for interaction according to the selected interaction type. The predefined set of interaction rules is a library of operational rules that is set for 'how a user can interact with which visual element or cluster of interrelated visual elements based on an interaction type'. In other words, for each interaction type—which represents a unique interaction option for either associating contents, or associating applications-special and general rules are assigned according to the interaction needs and based on the criteria of ensuring the stability and sustainability. For example, as a general rule, interaction with a cluster of randomly selected visual elements is prohibited-due to the violation of the stability/sustainability criteria—, unless a determinable function of the cluster is introduced into the system by the user. Or, for example, as a special rule, only visual elements with particular roles—such as only main content and side content—may be enabled for interaction. In this context, the system recommends interaction options to a user, and based on the preferences of the user, the system enables visual elements and/or clusters of interrelated visual elements for interaction and disables the rest (e.g., filtering visual elements for interaction) according to the corresponding interaction rules and indicates each available visual element or cluster of interrelated visual elements, e.g., with a visual indicator, for the selection of the user.

Referring again to Process B: i) Interaction rules that can be set are infinitely many and take shape individually according to the needs of each implementation possibility. ii) In order to reduce the processing load of the system, Process B may be initiated with a receival of an interaction request of the user.

As a result of Process B, i.e., the process of deciding on interactions, the system decides 'how the user can interact with web-objects in respect of the development and deployment process of super-objects' in the rendered web page. Following the execution of Process B, Process C may be initiated if the user wishes to associate a content or application that is available/ready for association.

Process C—908—includes the step of establishing associations. In this process, based on the receipt of the user's selection of a visual element or a cluster of interrelated visual elements, the system associates the prospective super-object developed by the user with the selected visual element or cluster of interrelated visual elements by generating a database record that includes the analogue reference of the visual element or cluster of interrelated visual elements being interacted with. In this context, for each super-object, a unique database record is generated, containing a locator field, a uniform cluster function identifier (UCFI) field, a content field, an author field, and/or any other field, etc. Analogue references are recorded under the locator field and uniform cluster function identifier (UCFI) field—or under any other field that is created for this purpose. If interacted web-object is a visual element, then the UVEI of the interacted visual element is recorded under the locator field, and the uniform cluster function identifier (UCFI) field remains empty—unless it is preferred to treat the interacted visual element as a cluster, i.e., a cluster that includes a single element, itself. If an interacted web-object is a cluster of interrelated visual elements, then each of the UVEIs belonging to the interacted cluster are recorded under the locator field, while extracted function of the interacted web-object is recorded under the uniform cluster function identifier (UCFI) field. Finally, the content of the super-object (e.g., general contents and/or executable contents such as a set of instructions for the system for execution) and information about the author are recorded under content field and author field respectively. In some embodiments, extracted basic operational functions and basic roles of visual elements are also included in the database records of super-objects to be used as further references. In this con-text, both basic operational function/s and basic role of a visual element are used as a secondary (supportive) reference for the establishment of an association, according to the embodiments.

In various embodiments, the primary reference used for establishing an association with a visual element is a UVEI, while the primary reference used for establishing an association with a cluster of interrelated visual elements is the extracted function of the cluster, i.e., the uniform cluster function identifier (UCFI), along with the UVEIs of the visual elements belonging to the cluster. According to other embodiments, uniform cluster function identifier (UCFI) is used as the only reference for establishing an association with a cluster. For example, a cluster identified as a GUI having the primary function of being a 'video player' with the secondary functions identified as being a color corrector and a 2D to stereoscopic 3D convertor. On the other hand, the UVEIs of the visual elements belonging to the cluster may be used only as a reference for the adaptation process between the initial state of the cluster—i.e., the contextual and structural state of the cluster when the super-object was associated with it—and the most recent state of the cluster—i.e., the contextual and structural state of the cluster when the web-resource that the cluster belongs to is re-visited/re-rendered. For example when the abovementioned GUI (video player) is re-visited; via i) constructing a reference that represents the initial state of the cluster based on the rUVEIs, ii) constructing a reference that represents the most recent state of the cluster based on the nUVEIs, iii) comparing the constructed references to identify the differences between the states, and iv) considering a predefined set of adaptation rules; the system may identify the adaptation procedures, thus the system may not only identify an altered cluster that was previously interacted, but may also identify how to dynamically process/manipulate the most recent cluster, according to the embodiments.

In addition, hybrid referencing is also possible via using both the reference of a visual element and the reference of a cluster of interrelated visual elements simultaneously to establish an association, such as, referencing a GUI with a certain function (e.g., a video interface) that includes a particular content (e.g., a particular video, such as '2001: A Space Odyssey'). Last but not least, analogue reference of a cluster of interrelated visual elements—which inherently may correspond to a set of analogue references to be chosen in various combinations for each super-object & web-object pair due to the very nature of contextuality—may be often a composite of multiple attributes, functions, roles, etc. For example, relative position or any feature of a web-object may also be used as a part of the reference. In this context, the system may suggest different combinations of references to the user and/or allow users to compose custom references for establishing associations. Further, non-existent features at the initial state of an interacted web-object may also be added to the reference. Furthermore, web-objects that do not yet exist may be introduced to the system in advance and based on such references the system may be programmed for possible interactions that may occur in the future. Therefore, the presented referencing mechanism herein,—which is in principle based on analogue references and analogies—, provides an extremely wide variety of association possibilities. In this context, the scope of a reference may be broadened up or narrowed down via subtraction/addition of further contexts. Furthermore, via addition of specific information to references, such as fragment IDs of web-resources, the references may be too narrowed down such that the analogue referencing mechanism described herein may act like a conventional referencing mechanism. In this context, the analogue referencing mechanism described herein is not an alternative to the conventional referencing mechanisms but a technological advancement that may also provide the solutions of conventional mechanism while enhancing the stability and sustainability of associations dramatically in extremely complex and dynamic web environments.

Referring again to Process C: i) According to the embodiments, 'a visual element' or 'a cluster of interrelated visual elements' may also be associated with 'a visual element' or 'a cluster of interrelated visual elements' based on the same principles and methods that are applied for associating a super-object with a web-object. ii) Because each UVEI also includes the relative position information of the corresponding visual element with respect to other visual elements, it may be possible for the system to construct a comprehensive reference for the initial state of a cluster based on recorded UVEIs (rUVEIs). On the other hand, cluster information (CI) may also be utilized in this process and cluster information (CI) of each visual element of an interacted cluster may also be included in the database record of the corresponding super-object if preferred, e.g., by adding a sub-field to the locator field of the database record structure 800 and storing thereto. iii) Once an association is identified between a super-object and a cluster of interrelated visual elements, in order to compare the initial state of the cluster with the most recent state, the system may construct a reference for the initial state of the cluster based on rUVEIs and construct a reference of the most recent state of the cluster based on nUVEIs. The reference for the initial state may be constructed since a UVEI (i.e., a uniform visual element identifier generated based on analyses and interpretation of the visual element) include contextual information ready for executing the process of comparison since each UVEI includes distinctive information extracted based on analyses, such as distinctive information about content of the corresponding visual element. iv) Constructing the initial state or most recent state of a cluster based on UVEIs is actually constructing a reference for each state for the process of comparison in order to identify the adaptation procedures to the most recent state rather than constructing the actual clusters themselves, since a UVEI includes only distinctive information—identified via analyses—rather than the whole content in most of the cases.

As a result of Process C, i.e., the process of establishing associations, the system associates a super-object with one or more web-objects in the rendered web page. Following the execution of Process C, the process terminates.

Process D—910—is executed following the execution of Process A. Process D includes the step of identifying already established associations, i.e., identifying each association between existing super-objects and web-objects and adapting to contextual/structural alterations of the web page content that may have occurred between the initial state and the most recent state of each associated web-object. In this process, based on the comparison of recently extracted analogue references with previously recorded analogue references (which comparison methods are described in the following sections), the system identifies associations between web-objects, i.e., visual elements or clusters of interrelated visual elements, and super-objects, i.e., user generated contents and/or applications. In this context, the system queries the database for records of super-objects that are associated with the web page and identifies each of them—if any. After the completion of the extraction of each reference of each visual element and each cluster of interrelated visual elements of the rendered web page in Process A, the system initiates the comparison process of recently extracted references with previously recorded references. For visual elements, the system compares each recorded uniform visual element identifier (rUVEI) with each recently generated uniform visual element identifier (nUVEI)—preferably between elements with similar properties in order to speed up the process. The system may also utilize the identified classes of visual elements, such as basic operational functions, subjective function types, etc., to optimize the process. For clusters of interrelated visual elements, the system compares each recorded 'uniform cluster function identifier' (rUCFI)—recorded under the cluster reference field of a super-object—with each of the recently extracted uniform cluster function identifiers (nUCFIs). Next, for a corresponding or matching couple (rUCFI and nUCFI), if the super-object is active, i.e., an application, then, based on the recorded uniform visual element identifiers (rUVEIs) the system constructs a representation of the initial state of the cluster (i.e. the contextual and structural representation of the interacted web-object at the instant when the association with the corresponding super-object is established for the first time) and compares it with the representation of the current state (i.e., the contextual and structural representation of the interacted web-object at the instant when the association with the corresponding super-object is re-established upon being subsequently rendered or viewed by another user) constructed based on the recently generated uniform visual element identifiers (nUVEIs) in order to identify a procedure to adapt the respective execution procedures of the associated application to the most recent state according to a predefined set of adaptation rules. In this context, the system may identify a structurally altered cluster (e.g., a GUI) with a steady function, and adapt itself to the recent structure within a contextually and structurally altered web page.

On the other hand, since the references (UVEIs and UCFIs) are collected/extracted/identified under different conditions they cannot be expected to match exactly for most of the cases. Therefore, the system evaluates the similitude levels of the references and decide whether there is a match. For example, the system may collect content fragments from visual elements that include media files, such as images, videos, audios, documents, etc.—by appropriate sampling procedures particularly selected according to the content properties such as media type, size, format, etc. of each visual element—and include the collected content fragments to the corresponding uniform visual element identifiers (UVEIs) as the distinctive information about content. In such a case, the system may compare content fragments with each other according to their similarities, and for each compared pair of collected content fragments for UVEIs calculates the similarity rate—or resemblance rate—based on the similarity analysis. If similarity percentage of a pair of collected content fragments for UVEIs exceeds a predefined similarity threshold, then the system associates the pair of collected content fragments and therefore the corresponding nUVEIs and rUVEIs. Accordingly, various statistical similarity measures may be used as a base for similarity analysis of datasets and various algorithms may be preferred or developed depending on the type of content (e.g., image, audio, video, text, etc.) of elements. Further, semantic similarity comparison of UVEIs, UCFIs, and/or parts thereof may be based on advanced AI algorithms. For example, functional similarities of two clusters may be compared (e.g., comparing the 'social media post interfaces' of Facebook™ and Twitter™, which have functional similarities at a certain level). In this context, the system may identify both a contextually and structurally altered cluster (e.g., a GUI) with slightly altered functions in such a degree that comparing the recently extracted UCFIs (nUCFIs) with UCFIs stored in the database as recorded UCFIs (rUCFIs) may result in exceeding a predefined threshold of similarity (i.e., identifying functionally analogous clusters and matching them based on a predefined threshold of functional similarity), thus the system may associate a super-object with the intended cluster and further may adapt itself to the most recent state of the cluster both contextually and structurally for execution-based on the comparison of the constructed representation of the initial state (via the corresponding rUVEIs) and constructed representation of the most recent state (via the corresponding nUVEIs) and also according to the predefined set of adaptation rules.

The predefined set of adaptation rules is a library of operational rules that is set as regulatory for the system to be used in the process of 'adapting the executional procedures of a super-object that is initially developed for the corresponding root-object' to 'the most recent state or to a viable analogue of that root-object'. For example, once an association is established between a super-object and a web-object in a target environment, based on the comparison of the initial and most recent state representations that are constructed from the corresponding rUVEI/s and nUVEI/s, adaptational rules are applied in the process of modifying the executional instructions—conveyed by that super-object—for the current state. In essence, each adaptation rule is set in accordance with both the root-object (e.g., in accordance with its content, structure, role/function, etc.) and the instructions to be executed (i.e., the user generated application developed) to dynamically process/manipulate that web-object. The adaptation rules of a user generated application in relation to the web-object to be dynamically processed/manipulated by the application is set in the process I, i.e., the process of generating contents and developing applications. According to various embodiments, adaptation rules are set individually for each application in accordance with the web-object to be dynamically processed/manipulated by the application. The process of adapting to a web-object is significantly more complex and challenging for clusters of visual elements (e.g., GUIs) than that of singular visual elements. In this process, based on the extracted information in the processes A→B→C and A→D, the system identifies possible contextual and/or structural alteration scenarios of a web-object to which a user generated application is associated. Next, in cooperation with the developer user, the system semi-automatically determines each adaptation rule that corresponds to an identified alteration scenario. For example, in the case of integrating a functional thumbs down button to a social media post interface, the system determines N number of permutations of structural alterations and accordance with input from the user, determines the position of the thumbs down button and the counter for each permutation. In this process, the user may introduce the positioning condition to the system of the thumbs down button and counter set, i.e., the sub-cluster. An exemplary instruction may be: define 'thumbs up button and its counter' as sub-cluster A (i.e., the already existing sub-cluster in the GUI); define 'thumbs down button and its counter' as sub-cluster B (i.e., the sub-cluster to be integrated by the system); if possible, position sub-cluster B to the right of sub-cluster A as the first choice; or position sub-cluster B to the left of sub-cluster A as the second choice; else (i.e., if not possible) identify the most similar layout arrangement of the GUI among the N number of layout permutations previously determined and position sub-cluster B accordingly. It is important to note that for complex clusters with many elements and features, such as graphical user interfaces (e.g., a social media post interface), even without the addition of any further elements into, total number of permutations of structural alterations (e.g., alterations in the layout of a GUI without the addition or reduction of visual elements) can be relatively large. Further, the cluster can be structurally divided into sub-clusters, each having different roles/functions and distant positions from each other. Furthermore, the total number of combinations of contextual alterations (e.g., addition of features or alteration of contents including a web image content of an auxiliary element such as a play/pause button icon) can be many, such as infinitely many. In this context, artificial intelligence algorithms may be further developed in accordance with the processes described herein in order to meet the operational needs. For example, based on prior operations with respect to adaptation of execution procedures, a training model—for training machine learning algorithms—may be developed.

Referring again to Process D: i) Adaptation rules that can be set may be infinitely many or less and may take shape individually or in groups according to each web-object and each application to dynamically process/manipulate that web-object. In this context, it is believed that the description—including the examples given—regarding the concept of 'setting and utilizing an adaptation rules library' fully enables implement of the systems and methods described herein without undue experimentation. ii) As shown in FIG. 9, for applications that are already associated with a web page and may be set to be executed directly, the system may bypass the step E—912—and directly execute the process G—916—for such applications. New applications selected in Process E may be processed in step D—before being executed in process G—in order to identify the corresponding adaptation rules of each. iii) Since a visual element may be technically considered as a single-element cluster, any process applied for a visual element cluster may also be applicable to a visual element, such as identifying UCFIs of visual elements and recording them as rUCFIs to be used as references, or setting up an interaction rule according to a user generated application that is associated with a visual element, etc.

As a result of Process D, i.e., identifying already established associations, the system identifies each web-object associated with at least one super-object—if any—and further adapts itself to the most recent state of the interacted web-object/s, and thus the system may execute the associated applications-properly—in the rendered web page. Following the execution of Process D, Process E may be initiated.

Process E—912—includes the step of displaying metadata of associated super-objects in a web page. In this process, based on identified associations in the web page that the user is viewing and based on 'user specific' recommendations of the system, the system displays metadata of super-objects for user's selection. For super-objects that are identified as available according to the recommendations, the system displays metadata in relation with the associated web-objects through intelligent interfaces for the selection of the user. In this context, the system may sort available super-objects according to their quality score, popularity, suitability, etc. and the highest-ranking ones may be displayed. Although the system may always display metadata of passive super-objects, as a special case for the active super-objects that have been previously associated, the system may automatically execute the applications without displaying any metadata and bypass this step in some examples.

As a result of Process E, i.e., displaying metadata of super-objects, the system enables the user to select super-objects to be display or executed based on the user specific recommendations of the system in the rendered web page. Following the execution of Process E, Process F—914—and/or Process G—916—may be initiated depending on, for example, the selection/s and/or instructions of the user.

Process F—914—includes the step of displaying passive super-objects, i.e., a super-object that has a null set of instructions. In this process, based on the user's selection of a preview of a passive super-object from a metadata list, the system displays the selected passive super-object through intelligent interfaces in relation with the web-object that the passive super-object is associated with. The system may be controlled to avoid interference with the content and structure of the web page, and instead only display markers that indicate the existence of associated metadata of passive super-objects and smart interfaces that convey user generated contents if preferred or required by the user and/or system. Such content manipulation controls may be configured in the system based on global system wide settings, country wide settings, statewide settings, city wide settings, content provider level settings, website level settings, web page level settings, web page element level settings or any other granularity and/or criteria that selectively avoids interference with the content and structure of web pages. For example, the system may be set to allow interference with the content and structure for a first country, uniform resource locator (URL), or web page and may be set to prohibit such activity for another country, URL and/or web page. In other words, the system may be configured to selectively allow or not allow direct content integration in web pages in order to maintain and control any legal, ethical, and/or fair use conditions that may be desired or present. In this context, for example, users may be prohibited to replace a web page content with a user generated one including replacement of advertisements.

As a result of Process F, i.e., displaying passive super-objects, the system enables users to view a user generated content that is selected from a metadata list that is related to a web-object in the rendered web page. Following the execution of Process F, Process H—918—may be initiated.

Process G—916—includes the step of executing super-objects. In this process, based on the adaptation procedures identified in Process D,—which are identified in order to adapt the respective execution procedures developed for the corresponding root-object (i.e., the initial state of the corresponding element or element cluster) to the most recent state—the system executes each super-object that is either selected from a metadata preview or already associated into the web page by the user.

As a result of Process G, i.e., executing super-objects, the system executes each selected user generated application that is developed to dynamically process/manipulate the associated web-object by adapting to the most recent state. Following the execution of Process G, Process H may be initiated.

Process H—918—includes the step of enabling interactions with/through super-objects. In this process, the system enables the user to connect and interact with other users through the super-objects that act as network links. For example, the user may interact with other users through commenting interfaces integrated with passive super-objects—similar to that of social media posts—and further may communicate with other users independently, for example, via private messengers operating on a peer-to-peer (P2P) basis. In this context, the system provides users with the ability to create a webwide social network upon web-resources through super-objects, thus providing a boundless and versatile social networking alternative, i.e., the super-imposed networking, to the conventional social networking alternatives provided mostly by the monopolistic websites such as Facebook™, Twitter™ Instagram™, etc. Furthermore, Process H enables further interactions with super-objects, such as enabling users to further associate user generated contents and applications, i.e., second-order super-objects, with first-order super-objects via utilizing the algorithms described herein—if needed—and/or other external applications and/or algorithms.

As a result of Process H, i.e., enabling further interactions with/through super-objects, the system i) enables the user to connect and interact with other users through super-objects and to interact with super-objects themselves via associating second-order super-objects with them in a rendered web page.

Process I—920—includes the step of generating contents and developing applications. In this process, the system enables the user to generate contents and develop applications to be associated with web-objects. In the process of generating contents, the system provides the user with tools to create, arrange, and edit texts, images, videos, audios, documents, etc. that may be separate and distinct from a web page and/or may be included in a web page. The processes to create, arrange, and edit texts, images, videos, audios, documents, etc., may be conventional processes, such as being similar to that of generating social media posts. In the process of developing applications, the system provides a set of tools and frameworks (e.g., a superimposed software development framework) in order to assist the user—who may be an expert web developer or a non-expert layman—to develop applications that dynamically process/manipulate visual elements and/or clusters of interrelated visual elements. In this context, based on the user's expertise level in programming, and also for example, his/her occupation, socio-economic class, fields of interest, etc. the system may share application examples—if any—according to the web-objects that the user wishes to process/manipulate, and further may assist him/her in the development process. Further, the system may utilize algorithms of explainable AI to help the user to understand and interpret the decisions or predictions made by the system. Thus, the user may debug and improve application performance. Furthermore, the system may utilize hybrid intelligence workflow patterns for the co-creation, deployment, and adoption. Thus, users' engagement, willingness to adopt and willingness to co-create may be increased. Furthermore, utilizing hybrid intelligence, the system, in collaboration with the user, may set adaptation rules individually for each application developed in accordance with the web-object to be processed/manipulated by the application—as elaborated in Process D.

Referring again to Process I: The superimposed software development framework (SSDF) is an envisioned framework to be provided by the system in order to facilitate the development of superimposed software applications. SSDF may leverage capabilities of the system (i.e., all operations performed based on the processes 902, 904, 906, 908, 910, 912, 914, 916, 918, etc.) such as the interpretations of web-objects based on analyzing, classifying, clustering, referencing, comparing, etc. In principle SSDF utilizes both the interpretations of the system such as UVEIs, BOFs, SFTs, Cls, UCFIs, and rule libraries such as system-defined interaction rules, in order to identify programming options for each identified visual element and/or cluster of interrelated visual elements in a web page. In this context, one of the interesting features of the SSDF is 'contextual programing' which emerges based on the above-mentioned facilities provided by the system. Contextual programing is a high-level programing approach which may enable both expert and non-expert (layman) users to develop user generated applications that process/manipulate web-objects. Alternatively, or in addition, such user generated applications may be retrieved from an applications library of pre-stored user generated applications. Such an applications library may be for access by a particular user, a group of users, and/or all users. Automated programming by the system of such user generated applications may include AI (artificial intelligence) algorithm-based population, by the system, of the user generated applications with webpage specific information obtained by the system's interpretation of web-objects and based on analyzing, classifying, clustering, analogue referencing, etc. For example, SSDF may recommend the user to adapt from the application library and/or develop an application for a particular GUI (e.g., a video player interface, a social media post interface, etc.) regardless of any web source and may automatically adapt the developed application for any web-resource that includes similar GUIs that are within the proximity of a certain similarity rate—or resemblance rate—that is set by, for example, the system, or the user, or the system and the user collaboratively together. Thus, the system may customize a developed application for a particular web page the user wishes to associate with the developed application according to the interpretation, by the system, of the web-objects of the particular web page based on AI, where the AI is further trained by the collaborative interaction of the user with the system during adaptation/development of the developed application for the particular web page. Alternatively, or in addition, the user may introduce to the system the function/s of a previously unidentified cluster (e.g., a table with certain functions) and the system/user may develop and/or adapt an application/program that process and manipulate similar clusters. Further, SSDF may use previously developed user generated application(s) from the library as samples/examples to identify and recommend programing possibilities to the users by utilizing AI algorithms (such as machine learning models) that may be specially developed for this purpose and further refined/taught based on the user interaction with the system—in respect of both development and deployment process of super-objects and interactions with deployed super-objects. Furthermore, SSDF may record each corresponding development and deployment process of user generated applications—that are developed in SSDF—to accumulate a big data of software development and deployment processes and may process the big data by specially designed advanced AI algorithms to extract information for conceptualization of software development ideas. Moreover, the system may automatically adapt such developed and associated applications according to changes in web pages as discussed herein.

As a result of Process I, i.e., generating contents and developing applications, the system enables the user—even if he/she is a layman—to develop web-based applications that dynamically process/manipulate web-objects,—thus enables the user to become a service provider—while providing a conventional tool for generating contents.

The steps A→B and A→D are automatically re-executed if the visited web page is subsequently rendered. However, the steps C, E, F, G, and H may be selectively re-executed according to the demand of the user while the user is browsing the rendered web page—without any subsequent renderings. For example, the user may wish to develop an application and may wish to associate the application with a web-object. Thus Process I and Process C may be re-executed. Or the user may wish to select, display, and execute other super-objects from various metadata lists that are associated with various web-objects. Thus, Process E, Process F, Process G, and Process H may be re-executed. The process 900 terminates when browsing of the visited web page is finalized, according to the embodiments.

According to the embodiments, as a result of the steps A→B→C, the system: i) controls web-objects to be interacted with by determining 'what exactly the objects of web resources are' at a contextual level and deciding 'how super-objects may interact with them' or equivalently 'how users may interact with them with respect to the development and deployment process of super-objects' according to system-defined interaction rules; and further ii) establishes associations between 'prospective super-objects developed' and 'corresponding web-objects interacted' via storing 'respective analogue references extracted' and 'interaction procedures developed' for each pair. As a result of the steps A→D, the system: i) re-establishes associations between super-objects and web-objects despite contextual and/or structural alterations—i.e., all kinds of alterations of objects in respective environments—via re-determining 'what exactly the objects of web-resources are' at a contextual level, and comparing 'recently extracted analogue references' with 'analogue references stored'; and further ii) adapts the interaction procedures developed for the initial state to the most recent state via constructing and comparing 'initial state representations' with 'most recent state representations' of the associated web-objects. Thus, as a result of the steps A→B→C and A→D, the system ensures the stability and sustainability of interactions between i) users and web-objects with respect to development and deployment processes of super-objects; and ii) super-objects and web-objects with respect to association and execution processes of super-objects.

More comprehensively, as a result of the steps A→B→C, or A→B→C and A→D→E→F→H, or A→D→G→H, or A→D→E→D→G→H, the system i) fully-automatically controls the interactions between super-objects and web-objects—particularly—in the process of associating and executing super-objects; ii) semi-automatically controls the interactions between users and web-objects—particularly—in the process of development and deployment of super-objects; iii) semi-automatically controls the interactions between users and super-objects—particularly—in the process of users' interaction with deployed super-objects; and iv) semi-automatically controls the interactions between users—particularly—in the process of users' interaction with other users through super-objects that act as network links. Thus, the system ensures the consistency and persistency of interactions for all crucial processes in any web environment, within any scenario, in real-time, in a self-contained manner while enabling human and machine users to select, display, execute, and interact with super-objects including interacting with each other through the super-objects that act as network links, according to the embodiments.

Figure 10:
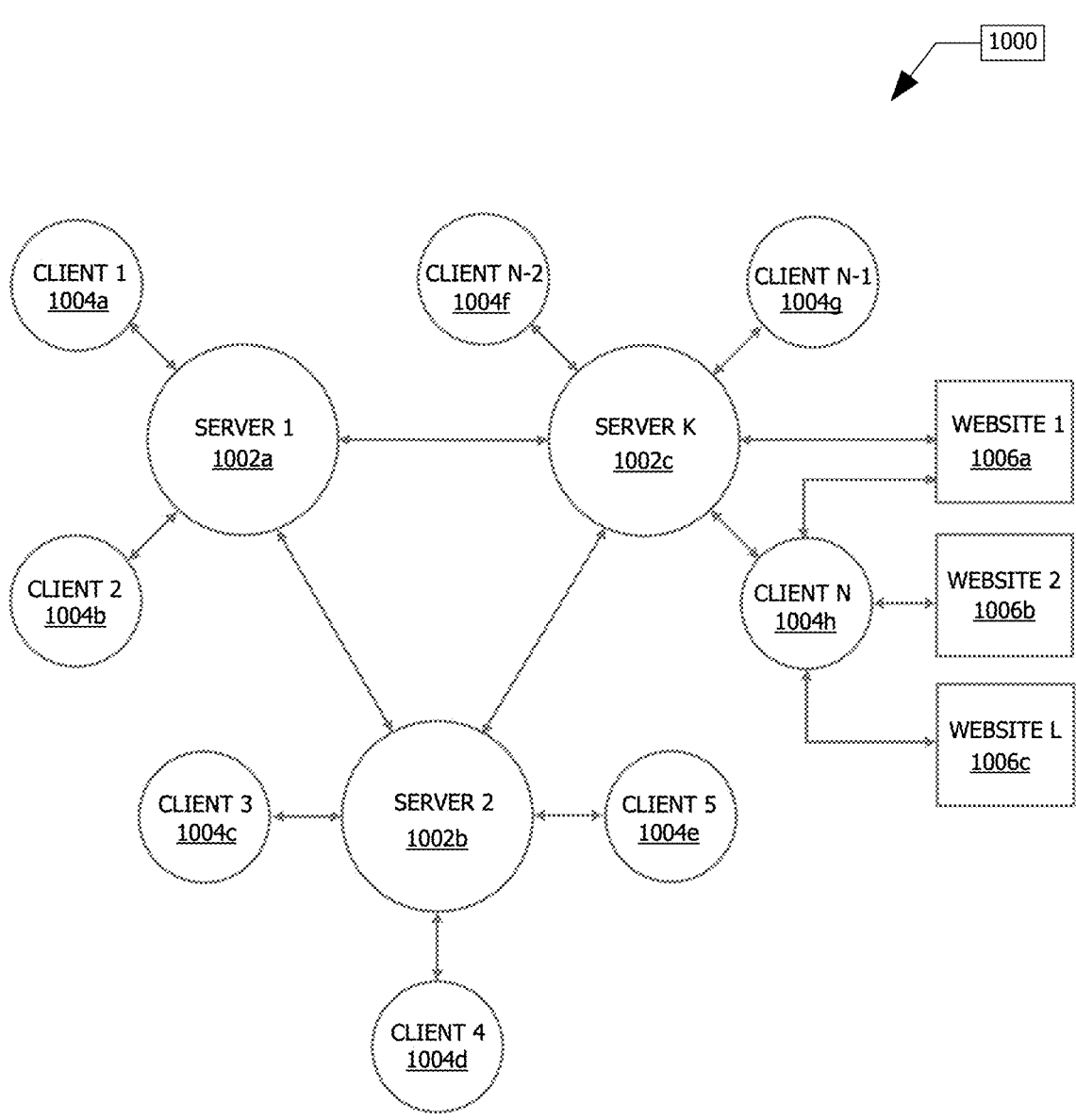
FIG. 10 is a high-level architecture of an exemplary system consisting of multiple servers deployed in various locations, according to an embodiment.

FIG. 10 is a high-level architecture of an exemplary web-resource interaction system 1000 consisting of multiple servers 1002 deployed in various locations working in sync with each other (for example, in an administratively decentralized federative structure), according to an embodiment. In this configuration 3 of the K number of servers (1002*a*, 1002*b* and 1002*c*) and 8 of the N number of clients (1004*a*, 1004*b*, 1004*c*, 1004*d*, 1004*e*, 1004*f*, 1004*g* and 1004*h*) are shown. Client N (1004*h*) is shown connected to 3 arbitrary websites (1006*a*, 1006*b* and 1006*c*) and Server K (1002*c*) is also shown directly connected to the arbitrary website 1006*a*. At least one client-side application is integrated with the corresponding web browser of each client and executed—along with the web browser—autonomously or in coordination with the server 1002 according to, or depending on, the operation. A server-side application may be executed by an application server in coordination with a database server and a web server. In essence, aside from being an intermediary for interaction, the primary task of a client N may be interaction control. On the other hand, a primary task of a server may be to provide a database and to perform database related operations in coordination with the clients connected. In this context, at each viewing/rendering of a web page, Client N (1004*h*) autonomously processes: i) analyzing, classifying, and clustering web-objects of the rendered portions of the web page; ii) deciding on interactions of the rendered portions of the web page; and iii) assisting users—if requested—in the process of generating contents and/or developing applications to be associated with the web-objects of the web page. On the other hand, Server K (1002*c*) and Client N (1004*h*) collectively process: i) establishing associations with web-objects; ii) identifying already established associations with web-objects; iii) displaying metadata of established associations of web-objects; iv) displaying passive super-objects according to the associations; and v) executing super-objects, including adapting the super-objects in accordance with the contextual and structural alterations of the web page. In this configuration data exchange between the system and the website servers may be, for example, provided primarily through the clients (shown with the network connections 1004*h* to 1006*a*, 1006*b* and 1006*c*). In such a scenario,—for example—a server may not be directly connected to and/or may not be in direct communication with web-resources, instead, access and data exchange may be provided through the clients only. This may minimize the system load—particularly data processing load—on the server side and could be inevitably essential for all personalized and restricted web-resources such as web pages of adaptive websites or individualized social media web pages. Even so, the server may also scan or otherwise communicate directly with the web-resources (shown with the network connection 1002*c* to 1006*a*), such as for preliminary analyses, or for allocating system load in a preferred proportion between the client side and server-side, where it is applicable, according to the embodiment.

Recap of the Processes related to Interaction with Digital Web-resources: According to various embodiments, the web-resource interaction system comprises the following processes: i) analyzing a rendered web page being viewed by a user; ii) identifying visual elements in the web page; generating, for each of the identified visual elements, uniform visual element identifiers (UVEIs), each of the UVEIs uniquely identifying a corresponding one of the identified visual elements; associating, with each of the UVEIs, information regarding the web page, distinctive information and/or properties of content of the corresponding one of the visual elements, and a relative position of the corresponding one of the visual elements in the web page; iii) classifying each of the visual elements into one of a plurality of predetermined classes; identifying, for each of the visual elements, cluster information to interrelate the visual elements within the web page, the cluster information identified for each of the visual elements based on respective relative position of the visual elements, respective functional relations of the visual elements with other visual elements, or both; iv) identifying, for each of the clusters of interrelated visual elements, function/s within the web page, and generating, for each of the clusters of interrelated visual elements, uniform cluster function identifiers (UCFIs), each of the UCFIs including a corresponding one of the function/s of clusters of interrelated visual elements; v) deciding on the visual elements and clusters of interrelated visual elements to identify those of the visual elements and clusters of interrelated visual elements suitable for user interaction in respect of the development and deployment process of super-objects, the decision is based on a set of predefined interaction rules comprising the cluster information and the classification of visual elements and the uniform cluster function identifiers (UCFIs) of clusters of interrelated visual elements; vi) receiving the user's selection of one of the visual elements or clusters of interrelated visual elements among the available ones for interaction; vii) assisting the user to develop an application that dynamically process and/or manipulate the selected visual element or cluster of interrelated visual elements; setting adaptation rules in coordination with the user for the user generated application according to the corresponding visual element or cluster of interrelated visual elements that the user generated application is to be associated with; viii) receiving an input representative of a user interaction with one of the visual elements or clusters of interrelated visual elements available for user interaction in respect of the development and deployment process of super-objects; ix) storing the user interaction with the one of the visual elements—e.g., script generated by the user in relation to the manipulation of the visual element—as a super-object in association with the corresponding one of the UVEIs; or, storing the user interaction with the one of the clusters of interrelated visual elements—e.g., script generated by the user in relation to the manipulation of the cluster of interrelated visual elements—as a super-object in association with the corresponding set of the UVEIs that belong to the cluster and recording the corresponding UCFI of the cluster and/or recording for each of the UVEIs that belong to the cluster the corresponding one of the identified classes and cluster information; x) re-analyzing the rendered web page being viewed by another user and/or when the web page is subsequently rendered; xi) re-identifying the visual elements in the web page; generating, for each of the identified visual elements, new uniform visual identifiers (nUVEIs), each of the nUVEIs uniquely identifying a corresponding one of the identified visual elements; associating, with each of the nUVEIs, information regarding the web page, distinctive information and/or properties of content of the corresponding one of the visual elements, and a relative position of the corresponding one of the visual elements in the web page; xii) re-classifying each of the visual elements into one of a plurality of predetermined classes; re-identifying, for each of the visual elements, cluster information to interrelate the visual elements within the web page, the cluster information identified for each of the visual elements based on respective relative position of the visual elements, respective functional relations of the visual elements with other visual elements, or both; xiii) re-identifying, for each of the clusters of interrelated visual elements, function/s within the web page, and generating, for each of the clusters of interrelated visual elements, new uniform cluster function identifiers (nUCFIs), each of the nUCFIs including a corresponding one of the function/s of clusters of interrelated visual elements; xiv) comparing the nUVEIs with UVEIs stored in a database as recorded UVEIs (rUVEIs) and associating the nUVEIs with the rUVEIs based on a pre-defined threshold of similarity; and/or comparing the nUCFIs with UCFIs stored in a database as recorded UCFIs (rUCFIs) and associating the nUCFIs with the rUCFIs based on a predefined threshold of similarity, thus re-establishing a previously established association between a super-object and a visual element or a cluster of interrelated visual elements—in the context of analogies; and xv) constructing based on rUVEIs the initial state representation and based on nUVEIs the most recent state representation of each cluster of interrelated visual elements that is associated with one or more user generated application; and comparing the initial state representation with the most recent state representation to identify contextual and structural differences—if any—between the states of each associated cluster of interrelated visual elements; and identifying a procedure to adapt the respective execution procedures to the most recent state of each associated cluster of interrelated visual elements according to the identified contextual and structural differences—if any—and a predefined set of adaptation rules defined for each corresponding user generated application and associated cluster pair; according to the embodiments. Methods and Systems for Object—Aware Fuzzy Processing based on Analogies involving Digital and Physical Objects—Interaction with Digital, Physical and Abstract Web-resources:

FIG. 12 is the flowchart diagram 1200 illustrating a process that includes steps with respect to processing of/interacting with any digital and/or physical object, according to an embodiment. The methods and principles used in process 1200 are the same methods and principles used in the processes described earlier, the only difference is that this time the process is applied to any digital or physical object in general, rather than specifically to digital objects.

The process begins with an encounter of the system with one or more object/s in an environment—which may be an automation system, such as a robot, encountering physical objects, such as physical structures. The system may involve various sensors, transducers, actuators, and controllers designed to interact with the environment, i.e., objects in the environment, to be used in the process of i) analyzing, classifying, and clustering elements in order to identify each sub-object that belongs to the main object that is being processed and ii) manipulating those elements in order to execute existing or future—executable—procedures developed.

At 1202, the system analyzes, classifies, and clusters elements to identify each object (i.e., each element and each cluster of interrelated elements) according to distinctive attributes, functions, and interrelationship. Next, for each identified object, i.e., for each element and cluster of inter-related elements, the system generates an analogue reference based on the extracted attributes, functions, and interrelationship. Following the execution of process 1202, process 1204 and process 1210 may be initiated individually and simultaneously since they are independent of each other.

At 1204, based on the analogue references generated at 1202, the system identifies and filters objects suitable for manipulation, for example, based on system-defined interaction rules. Next, the system receives user's selection of an object as a root-object. Next, in coordination with the system, the user develops a set of instructions, i.e., execution procedures or application, to manipulate the root-object. The process also includes generating contents related with the execution procedures or the application.

At 1206, the system analyzes the application developed at 1204 and identifies attribute/s and/or function/s of the root-object—specially—related with the application. Next, the system generates a new analogue reference for the root-object that comprises the related attribute/s and/or function/s identified. Next, based on the analogue reference of the root-object, the system determines similarity threshold/s & adaptation rules.

At 1208, the system encapsulates: i) the set of instructions developed including related contents created; ii) the analogue reference of the root-object generated; and iii) the similarity threshold/s and adaptation rules determined; at 1206 as a super-object. Next, the system associates the super-object with the root-object by recording the super-object at a storage medium.

As a result of 1202, 1204, 1206 and 1208 the system: i) controls objects to be interacted with via determining 'what exactly the encountered objects are' at a contextual level, and deciding 'how users may interact with them' according to system-defined interaction rules with respect to the development and deployment process of super-objects; and further ii) establishes associations between 'prospective super-objects developed' and 'corresponding objects interacted' via storing 'respective analogue references extracted' and 'interaction procedures developed' for each pair.

At 1210, the system compares recently generated 'analogue references of objects' (OARs) with 'recorded analogue references of root-objects' (rOARs) to determine analogies and associates OARs with rOARs based on pre-defined similarity thresholds. Next, for each matching pair, the system associates the super-object with the corresponding object. Thus, the system re-associates super-objects with objects in the context of analogies.

At 1212, for each super-object, the system adapts the execution procedures developed for the root-object to the corresponding object based on i) the difference between the analogue reference of the root-object and the analogue reference of the corresponding object, and ii) adaptation rules identified at 1206. Next, the system executes the new execution procedures accordingly.

As a result of 1202, 1210, and 1212 the system: i) re-establishes associations between super-objects and objects despite contextual and/or structural alterations—i.e., all kinds of alterations of objects in respective environments—via re-determining 'what exactly the objects are' at a contextual level, and comparing 'recently extracted analogue references' with 'analogue references stored'; and further ii) adapts the interaction procedures developed for the initial state to the most recent state via constructing and comparing 'initial state representations' with 'most recent state representations' of the associated objects.

Consequently, by the processes 1202→1204→1206→1208 and 1202→1210→1212, the system ensures the stability and sustainability of interactions with digital or physical objects in any environment, within any scenario, in real-time, in a self-contained manner.

Figure 13:
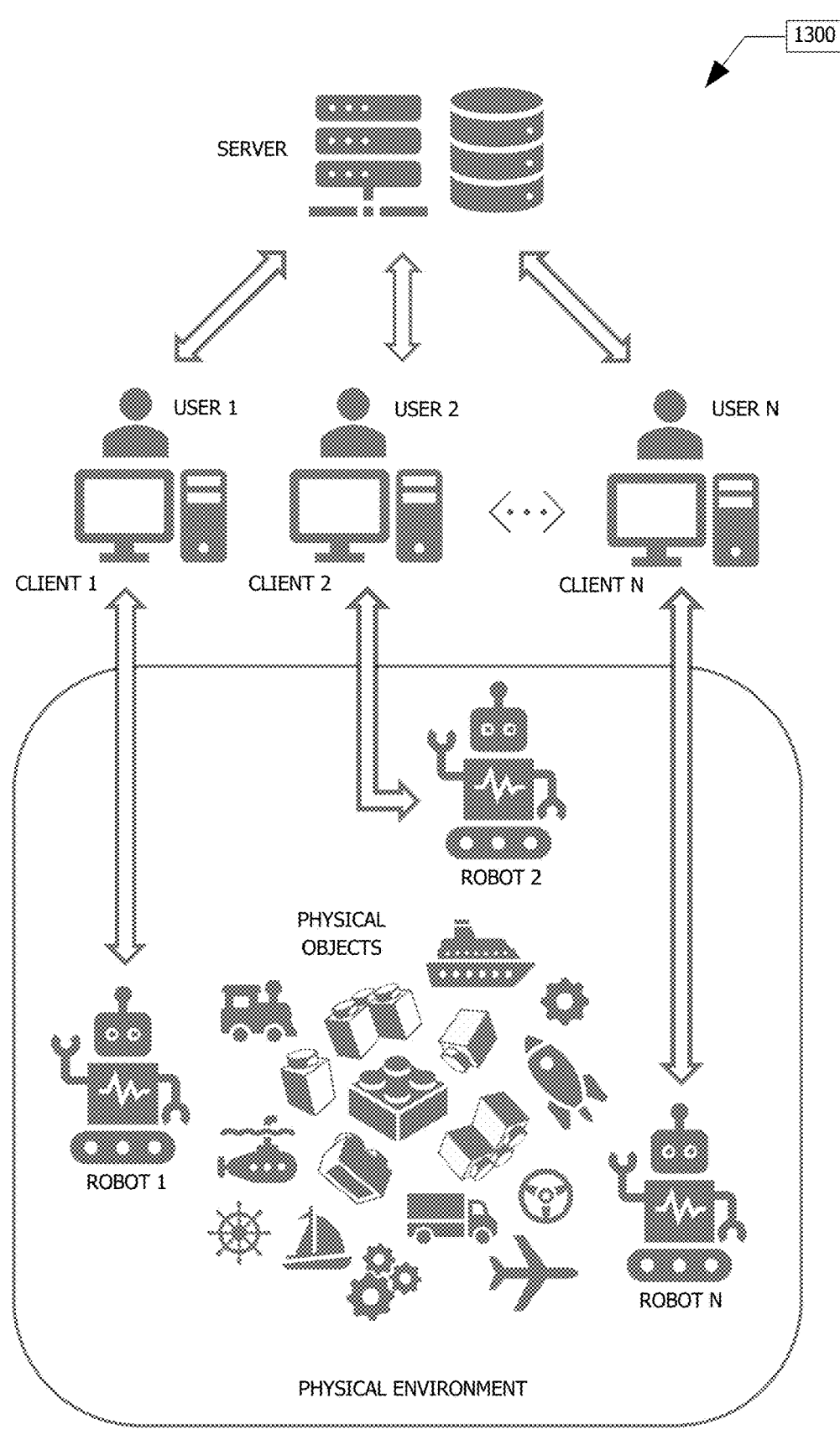
FIG. 13 is a high-level architecture of an exemplary system processing digital and physical objects, according to an embodiment.

FIG. 13 is a high-level architecture of an exemplary system processing both digital and physical objects, according to an embodiment. A server, N number of clients, N number of users, N number of robots, and various physical objects in a physical environment are shown. The server and the clients of the system are connected with each other through a data network, such as the Internet. Through the same—or another—data network, each client is further connected to a robot that performs at a remote environment where the robots interact with physical objects, such as lego structures that are created and modified by children at a playground. The robots are used as agents between the users and the objects in the environment—similar to the function of a browser in Web environments, according to the embodiment.

According to another embodiment, the robots are equipped with advanced optic, ultrasonic, and x-ray imaging sensors, robotic arms and end-effectors designed to interact specially with lego structures. Within the environment, all sorts of lego structures and pieces exist, such as planes, trains, automobiles, snow mobiles, houses, cities, robots, space stations, etc., including sub-structures such as engines, wings, tracks, etc., and all sorts of lego pieces, wherein each lego piece corresponds to an element, i.e., elementary object. By the optical, ultrasonic and x-ray imaging a robot may perceive each element in detail including the enclosed ones within lego structures. While, by robotic arms and end-effectors a robot may manipulate lego structures and pieces precisely, such as assembling, disassembling, installing, etc. The task of the robots may be: i) assisting users to create prospective super-objects that include digital and physical contents—such as links for the Internet of things (IoT) and other lego pieces or lego structures for coupling—and instructions with respect to lego pieces, sub-structures or whole structures—such as the brick, engine, or whole structure of a lego car; ii) associating prospective super-objects with corresponding lego structures, i.e., storing user interactions with corresponding lego structures such as storing a set of instructions developed to modify a particular sub-structure of a particular lego structure when encountered; iii) re-establishing associations during subsequential encounters with lego structures; iv) adapting execution procedures developed for the initial state to the most recent state of lego structures; and v) executing corresponding execution procedures for each association—such as executing particular instructions to modify a particular sub-structure of a lego structure with various lego pieces or sub-structures or whole structures included in the corresponding super-object; according to the embodiment. In the process, although the children may try to confuse the system by manipulating lego structures with clever alterations, the system may cope with such adversary interventions by the methods and principles described herein.

Recap of the Processes related to Interaction with Digital, Physical and Abstract Web-resources: According to various embodiments, the system comprises the following processes: i) analyzing an object or a cluster of objects encountered in a digital or physical environment; ii) identifying elements of the object/s; generating, for each of the identified elements, uniform element identifiers (UEIs), each of the UEIs uniquely identifying a corresponding one of the identified elements; associating, with each of the UEIs, information regarding the affiliated main object and the environment in which the main object is located, distinctive information and/or properties of content of the corresponding one of the elements, and a relative position of the corresponding one of the elements in the main object; iii) classifying each of the elements into one of a plurality of predetermined classes; identifying, for each of the elements, cluster information to interrelate the elements within the main object, the cluster information identified for each of the elements based on respective relative position of the elements, respective functional relations of the elements with other elements, or both; iv) identifying, for each of the clusters of interrelated elements, function/s within the main object, and generating, for each of the clusters of interrelated elements, uniform cluster function identifiers (UCFIs), each of the UCFIs including a corresponding one of the function/s of clusters of interrelated elements; v) deciding on the elements and clusters of interrelated elements to identify those of the elements and clusters of interrelated elements suitable for user interaction in respect of the development and deployment process of super-objects, the decision is based on a set of predefined interaction rules comprising the cluster information and the classification of elements and the uniform cluster function identifiers (UCFIs) of clusters of interrelated elements; vi) receiving the user's selection of one of the elements or clusters of interrelated elements among the available ones for interaction; vii) assisting the user to develop an application that dynamically process and/or manipulate the selected element or cluster of interrelated elements; setting adaptation rules in coordination with the user for the user generated application according to the corresponding element or cluster of interrelated elements that the user generated application is to be associated with; viii) receiving an input representative of a user interaction with one of the elements or clusters of interrelated elements available for user interaction in respect of the development and deployment process of super-objects; ix) storing the user interaction with the one of the elements—e.g., script generated by the user in relation to the manipulation of the element—as a super-object in association with the one of the UEIs; or, storing the user interaction with the one of the clusters of interrelated elements—e.g., script generated by the user in relation to the manipulation of the cluster of interrelated elements—as a super-object in association with the corresponding set of the UEIs that belong to the cluster and recording the corresponding UCFI of the cluster and/or recording for each of the UEIs that belong to the cluster the corresponding one of the identified classes and cluster information; x) re-analyzing an object or a cluster of objects re-encountered—or suspected to be interacted before—in a digital or physical environment; xi) re-identifying the elements of the object/s; generating, for each of the identified elements, new uniform element identifiers (nUEIs), each of the nUEIs uniquely identifying a corresponding one of the identified elements; associating, with each of the nUEIs, information regarding the affiliated main object and the environment in which the main object is located, distinctive information and/or properties of content of the corresponding one of the elements, and a relative position of the corresponding one of the elements in the main object; xii) re-classifying each of the elements into one of a plurality of predetermined classes; re-identifying, for each of the elements, cluster information to interrelate the elements within the main object, the cluster information identified for each of the elements based on respective relative position of the elements, respective functional relations of the elements with other elements, or both; iv) re-identifying, for each of the clusters of interrelated elements, function/s within the main object, and generating, for each of the clusters of interrelated elements, new uniform cluster function identifiers (nUCFIs), each of the nUCFIs including a corresponding one of the function/s of clusters of interrelated elements; xiv) comparing the nUEIs with UEIs stored in a database as recorded UEIs (rUEIs) and associating the nUEIs with the rUEIs based on a predefined threshold of similarity; and/or comparing the nUCFIs with UCFIs stored in a database as recorded UCFIs (rUCFIs) and associating the nUCFIs with the rUCFIs based on a predefined threshold of similarity, thus re-establishing a previously established association between a super-object and an element or a cluster of interrelated elements—in the context of analogies; and xv) constructing based on rUEIs the initial state representation and based on nUEIs the most recent state representation of each cluster of interrelated elements that is associated with one or more user generated application; and comparing the initial state representation with the most recent state representation to identify contextual and structural differences— if any—between the states of each associated cluster of interrelated elements; and identifying a procedure to adapt the respective execution procedures to the most recent state of each associated cluster of interrelated elements according to the identified contextual and structural differences—if any—and a predefined set of adaptation rules defined for each corresponding user generated application and associated cluster pair; according to the embodiments.

Ontological Consequences of the Disclosed Methods and Principles—Transforming-Objects, Transforming-Concepts, and Analogue Relations in the context of the novel ontological model Dynamically-Fuzzy Semantic Networks/ Relations based on Analogies':

In essence, an ontology involves representing knowledge in the form of a formal, explicit specification of concepts and relations between those concepts within a particular domain according to their properties. In other words, there are three main components to an ontology, which are i) concepts: the distinct types of things, i.e., classes or abstract objects, that exist in our data; ii) relations: properties that connect two concepts; and iii) attributes: properties that describe an individual concept. Within the context of ontologies, one of the approaches to represent knowledge is semantic networks or knowledge graphs. A semantic network involves representing knowledge through nodes and links, where nodes represent objects or concepts and links represent their relations.

FIG. 14 is an example semantic network, i.e., knowledge graph, involving—semi-arbitrarily chosen—objects, concepts, and their relations, constructed according to the conventional ontological models. The example semantic network presented at FIG. 14 has been modified gradually in FIGS. 15, 16 and 17 in order to describe the ontological consequences of the disclosed methods and principles.

In the example semantic network presented at FIG. 14, a person named 'Alberto Balsalm', the city of 'Berkeley' and the date '18-08-1971' are objects, while 'date', 'person', 'place', and 'nuclear chemist' are concepts, i.e., classes, of the semantic network. According to the semantic network, 'Alberto Balsam' is a 'nuclear chemist' whose birth date is '18-08-1971' and birthplace is 'Berkeley'. Further, the semantic network states that '18-08-1971' is a 'date' and 'Berkeley' is a 'place', while 'nuclear chemist' is a subclass of 'person', 'birth date' is a subclass of 'date' and 'birthplace' is a subclass of 'place'. N.B.: 18-08-1971 is a data object conveying a specific date information.

Semantically i) 'Alberto Balsam is a nuclear chemist' means that 'the object named Alberto Balsalm possesses all of the properties (attributes) of the concept of nuclear chemist', ii) '18-08-1971 is a date' means that 'the object named 18-08-1971 possesses all of the properties (attributes) of the concept of date', and iii) 'Berkeley is a place' means that 'the object named Berkeley possesses all of the properties (attributes) of the concept of place'. Further, i) 'nuclear chemist is a subclass of person' means that 'the concept of nuclear chemist possesses all of the properties (attributes) of the concept of person', ii) 'birthplace is place' means that 'the concept of birthplace possesses all of the properties (attributes) of the concept of place', and iii) 'birth date is date' means that 'the concept of birth date possesses all of the properties (attributes) of the concept of date', thus they are subclasses—or sub concepts—of their parent classes or parent concepts.

FIG. 15 is an example semantic network, i.e., knowledge graph, created by modifying the semantic network presented at FIG. 14 according to the disclosed methods and principles. The example semantic network involves a 'transforming-object'—or a 't-object' in short—and 'its analogue relationship with other objects and concepts', including a graphical method for representing t-objects and their analogue relations within semantic networks.

Transforming-objects or t-objects are instances of transforming-concepts, i.e., transforming-classes, or t-concepts in short. Concepts are distinct types of things, i.e., classes, that exist in a universe, where each individual concept has a unique set of attributes, i.e., a unique set of properties that describe that individual concept, in the universe to which it belongs. A transforming-concept is postulated to involve a unique set of conceptual states, wherein each state represents a unique set of properties that which is one of the possible concepts that can be manifested by the t-concept among the set of all possible concepts that can be manifested by the t-concept according to the rules dictated by the universe and the context that the t-concept is bounded within that universe. More precisely, if there are a total of N number of possible individual concepts that can be ever manifested by a t-concept within the context that the t-concept is bounded then there are N corresponding states, wherein each state represents a unique concept that can be manifested by the t-concept. Therefore, at the core, the determinant factors of a t-concept are the rules of the universe to which that t-concept belongs and the context by which the t-concept is bounded in that universe. In this context, a t-concept is identified to be related to another concept within a particular context if the similarity rate—with respect to the compared concept—is greater than or equal to a certain threshold of similarity, wherein the similarity threshold is dependent on the object being compared and the context that the similarity comparison is based on. N.B.: Described and formulated in detail in the following sections. Hence, the relationship of a t-concept with another concept—in the context of a particular concept—is neither binary, i.e., having the binary membership values 0 or 1, nor steady-fuzzy, i.e. having a certain fuzzy membership value in the unit interval [0, 1], but variably-fuzzy instead, i.e., having multiple fuzzy membership values in the unit interval [0, 1], each of which corresponds to a manifestation of each state of the t-concept. Consequently, a t-concept is a variable concept that may convey both known and unknown concepts in the context where it is bounded, thus the establishment of associations even with currently unknown concepts in a fuzzy manner is enabled. In this regard, a 'concept' is a special case of a t-concept possessing only one state in the context of the universe—as a whole—to which it belongs. Below are the core properties of the disclosed concept of 't-concept'.

In a universe wherein each concept comprises one or more elementary concepts, i.e., building block concepts that are not compositions of other concepts, (e.g., fundamental concepts, such as 'presence', 'absence', etc. or logical connectives such as 'and', 'or', 'not', 'if', 'then', etc.) and wherein each semantic relation comprises one or more elementary semantic relations (e.g., fundamental interactions such as basic interactions involving fundamental concepts), a t-concept possesses the following properties: i) Behavior: A t-concept is postulated to behave according to the rules dictated by the universe to which it belongs without the possibility to violate those rules; ii) States and Manifestations: A t-concept is postulated to involve multiple states, where each state represents a corresponding one of the possible conceptual manifestations of the t-concept, which may be any concept that is a member of the set of all possible concepts that the t-concept may involve according to the rules dictated by the universe and the context that the t-concept is bounded within that universe—to which the t-concept belongs; iii) Uncertainty: A t-concept is postulated to be transforming (or hopping) from one state to another with some degree of uncertainty, wherein that uncertainty is governed by the rules dictated by the universe and the context that the t-concept is bounded within that universe— to which the t-concept belongs, n.b., therefore, depending on the system, the spectrum of the degree of uncertainty may range from absolute predictability to absolute unpredictability; and iv) Relationship: A t-concept is defined to be related to another concept—or t-concept—if its similarity rate in the context of a reference concept is greater than or equal to a certain similarity threshold, i.e., 0<similarity threshold-≤similarity rate≤1, wherein the similarity threshold is dependent on the object being compared and the context that the similarity comparison is based on. N.B.: Described and formulated in detail in the following sections.

Similarly, a transforming-object, which is a digital and/or physical instance of a transforming-concept, is an object that is postulated to transform between manifestations, appearances, or observations (accordingly nicknamed as transformer inspired by the transforming biomechanical robot concept of Marvel Comics). Analogically, if a t-concept is a device that generates concepts within certain contextual boundaries then a t-object is a device that generates objects within certain contextual boundaries. More precisely, a t-object is an object that is postulated to involve multiple states within a certain context, where each state represents a corresponding one of the possible manifestations of the t-object—in accordance with the t-concept of which it is an instance—in a non-deterministic manner. Therefore, at the core, the determinant factors of a t-object are the rules of the universe to which that t-object belongs and the context by which the t-object is bounded in that universe. In this context, a t-object is identified to be related to another object within a particular context if the similarity rate—with respect to the compared object—is greater than or equal to a certain threshold of similarity, wherein the similarity threshold is dependent on the object being compared and the context that the similarity comparison is based on. N.B.: Described and formulated in detail in the following sections. Hence, the relationship of a t-object with another object—in the context of a particular concept—is neither binary, i.e., having the binary membership values 0 or 1, nor steady-fuzzy, i.e. having a certain fuzzy membership value in the unit interval [0, 1], but variably-fuzzy instead, i.e., having multiple fuzzy membership values in the unit interval [0, 1], each of which corresponds to a manifestation of each state of the t-object. Consequently, a t-object is a variable object that may convey both known and unknown objects in the context where it is bounded, thus the establishment of associations even with currently unknown objects in a fuzzy manner is enabled. In this regard, an 'object' is a special case of a t-object possessing only one state in the context of the universe—as a whole—to which it belongs. Below are the core properties of the disclosed concept of 't-object'.

In a universe wherein each object comprises one or more elementary objects, i.e., building block objects that are not compositions of other objects, and wherein each interaction comprises one or more elementary interactions e.g., elementary interactions between elementary objects, a transforming-object possesses the following properties: i) Behavior: A t-object is postulated to behave according to the rules dictated by the universe to which it belongs without the possibility to violate those rules; ii) States and Manifestations: A t-object is postulated to involve multiple states, wherein each state represents a corresponding one of the possible manifestations of the t-object, which may be any object that is a member of the set of all possible objects that the t-object may involve according to the rules dictated by the universe and the context that the t-object is bounded within that universe—to which the t-object belongs; iii) Uncertainty: A t-object is postulated to be transforming (or hopping) from one state to another with some degree of uncertainty, wherein that uncertainty is governed by the rules dictated by the universe and the context that the t-object is bounded within that universe—to which the t-object belongs, n.b., therefore, depending on the system, the spectrum of the degree of uncertainty may range from absolute predictability to absolute unpredictability; and iv) Relationship: A t-object is defined to be related to another object—or t-object—if its similarity rate in the context of a reference concept is greater than or equal to a certain similarity threshold, i.e., 0<similarity threshold≤similarity rate≤1, wherein the similarity threshold is dependent on the object being compared and the context that the similarity comparison is based on. N.B.: Described and formulated in detail in the following sections.

Note1: If a t-object or t-concept transforms within contextual boundaries, then it is said to be bounded. Similarly, if a t-object or t-concept transforms without any contextual boundaries, i.e., transforms within the context of the whole universe to which it belongs, then it is said to be unbounded. Note2: Each manifestation of a t-concept is assumed to be precisely perceivable, i.e., fuzziness or uncertainties caused by limitations with respect to perceivability is neglected, in order to ensure clarity in the descriptions. Note3: Each manifestation of a t-object is assumed to be precisely observable, i.e., fuzziness or uncertainties caused by limitations with respect to observability is neglected, in order to ensure clarity in the descriptions.

According to various embodiments, with respect to similarity comparison, such as between a manifestation of a t-object and a reference concept that identifies the context, a basic approach may be: For n, k∈Z+, ω∈ R|0≤ω≤1, P=0 or 1, Similarity Rate =

$$100\% \times (\omega_1 P_1 + \omega_2 P_2 + \omega_3 P_3 + \ldots + \omega_n P_n + \ldots + \omega_k P_k)/k,$$

where $P_n$ is the membership value of the object or concept— that is being compared—with respect to $n^{th}$ property of the reference concept (class), while $\omega_n$ is the weight of the same $n^{th}$ property. Further, property weightings $\omega$, which may be based on priority, reliability, consistency, etc., may be altered dynamically, such as based on particular outputs of the network that the object being processed belongs. Further, binary membership values P may be fuzzified into a fuzzy membership function, thus binary truth values (i.e., 0 or 1) can be transformed into fuzzy truth values (i.e., real numbers between 0 and 1). Thus, for the manifestations involving uncertainty with respect to properties—for example, when encountered with an unprecedented manifestation of a t-object involving properties that are absolutely novel to mankind—similarity rates may still be identified reliably, according to the embodiments. According to other embodiments, said rules for similarity comparison and relationship status may be modified in accordance with the applicational needs, such as each membership value $P_n$ of a t-object that is being compared with a reference concept, or object, or t-concept or t-object may also be required to individually exceed a minimum threshold in order to consider said t-object related to the reference concept.

In FIG. 15, 'Alberto Balsalm' is replaced with a hypothetical transforming 'Alberto Balsalm', which is indicated with "TO"—short for transforming-object—at the upper right corner of the identifier and the concept of t-object is added as a new class to the semantic network. According to the knowledge graph, t-Alberto Balsalm has a full membership to the 't-object' class, i.e., possessing all properties that the respective class—t-object—possesses. On the other hand, it can be deducted from the knowledge graph that t-Alberto Balsalm is a member of the 'bounded t-object' subclass of the 't-object' super-class since he is bounded at least with his birthday (crisp), place of birth (fuzzy) and education (fuzzy). According to the knowledge graph, t-Alberto Balsalm is not necessarily a nuclear chemist, rather he is at least N % similar—in the context of the concept of nuclear chemist ($C_2$)—to a nuclear chemist at all times where the degree of similarity alters between N % and 100% based on a certain similarity measure, while below N % it is defined that there exists no relationship. For example, t-Alberto Balsalm's education may transform gradually between nuclear physics (N %) and nuclear chemistry (100%), while the range in between may include all possible majors within the context including currently undefined or uninvented ones. N.B.: One of the significant features of the disclosed model/framework as stated before.

As presented on the knowledge graph, such analogue relations are indicated with a wavy arrow including 'a statement of similarity threshold' and whenever needed, also including 'a statement of respective context'. According to the embodiments, unlike an analogue relationship between 'an object and a concept' or 'a concept and a concept' where the context is defined by the concept—in the direction of the corresponding arrow—itself, an analogue relationship between two objects must include the respective context that the similarities are measured since objects are comparable to each other in many different ways. In this respect, according to the knowledge graph, t-Alberto Balsalm's birthplace is at least G % similar 'in the context of $C_1$ to the City of Berkeley. For example, the context $C_1$ may be a combination of topographic, demographic, architectural, and locational properties of a place. And t-Alberto Balsalm's birthplace may be transforming gradually between the City of Las Vegas (G %) and the City of Berkeley (100%) in the context of $C_1$.

More precisely, the modified semantic network states that any manifestation of t-Alberto Balsalm's birthplace possesses at least one subset of properties such that the subset as a whole (i.e., irrespective of the individual properties belonging to the set, which may alter at each manifestation) is at least G % similar to the properties of the city of Berkeley in the context of $C_1$, where $C_1$ is a reference concept—or a set of concepts—that define the context that the similarity comparison is based on. To generalize this statement, if 't-object A is said to be at least S % similar to object B in the context of concept C' then 'any manifestation of t-object A possesses at least one subset of properties such that the subset as a whole (i.e., irrespective of the individual properties belonging to the set, which may alter at each manifestation) is at least S % similar to the properties of object B in the context of C', where C is a reference concept (class) or a set of concepts (classes) that define the context that the similarity comparison is based on.

Figure 16:
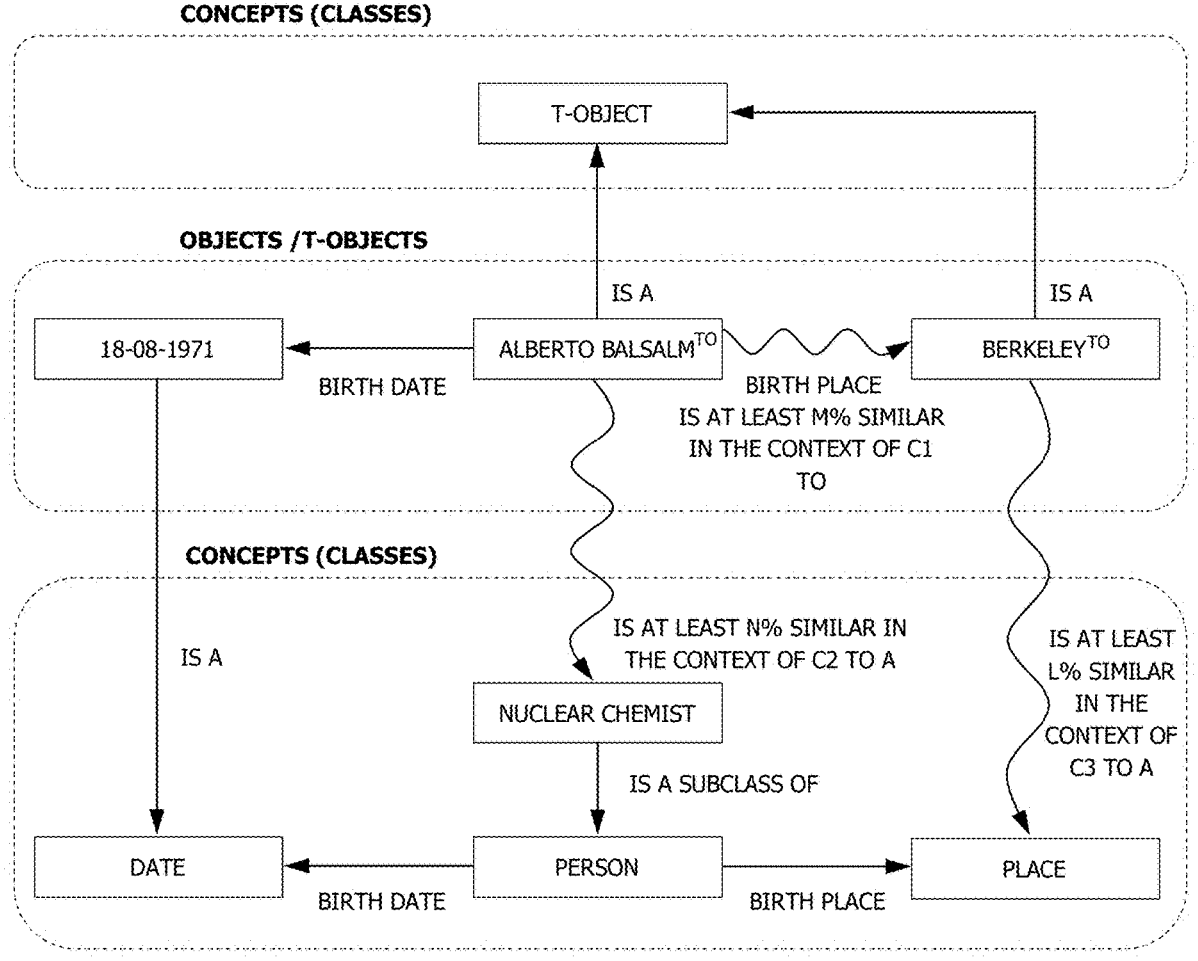
FIG. 16 is an example semantic network—created by modifying the semantic network presented at FIG. 15—involving further t-objects and their relations.

FIG. 16 is a slightly altered version of the semantic network presented at FIG. 15, where Berkeley is also replaced with a hypothetical transforming 'Berkeley' or t-Berkeley in short. According to the knowledge graph, t-Berkeley is at least L % similar—in the context of the concept of place ($C_3$)—to a place. More precisely, 'for any manifestation, t-Berkeley always possesses at least one subset of properties such that said subset as a whole—irrespective of the individual properties belonging to the set, which may alter at each manifestation—is at least L % similar to the set of all properties of the concept of 'place' as a whole'. To generalize this statement, If 't-object A is said to be at least S % similar to concept B' then 'for any manifestation, t-object A possesses at least one subset of properties such that said subset as a whole (i.e., irrespective of the individual properties belonging to the set, which may alter at each manifestation) is at least S % similar to the set of all properties of concept B as a whole'.

As indicated on the knowledge graph, t-Alberto Balsalm's birthplace is at least M % similar to t-Berkeley in the context of $C_1$, n.b., previous threshold G % is now M % in the same context. More precisely, for any manifestation, each of the 't-Alberto Balsam's birthplace' and 't-Berkeley' simultaneously possess at least one subset of properties such that each of the subsets as a whole—irrespective of the individual properties belonging to the set, which may alter at each manifestation—is at least M % similar to the other in the context of $C_1$, where $C_1$ is a reference concept (class) or a set of concepts (classes), that defines the context that the similarity comparison is based on. Hence, 't-Berkeley' is also at least M % similar to 't-Alberto Balsalm's birthplace' in the context of $C_1$, n.b., but not to t-Alberto Balsalm himself, thus the relationship cannot be represented with a double headed arrow. To generalize this statement, if 't-object A is said to be at least S % similar to t-object B in the context of concept C' then 'for any combination of manifestations of t-object A and t-object B, each of the t-object A and t-object B simultaneously possess at least one subset of properties such that each of the subsets as a whole (i.e., irrespective of the individual properties belonging to the set, which may alter at each manifestation) is at least S % similar to the other in the context of concept C, where C is a reference concept (class) or a set of concepts (classes) that defines the context that the similarity comparison is based on. Hence, 't-object B' is also at least S % similar to 't-object A' in the context of C, thus relationship may be represented with a double-headed arrow.

Figure 17:
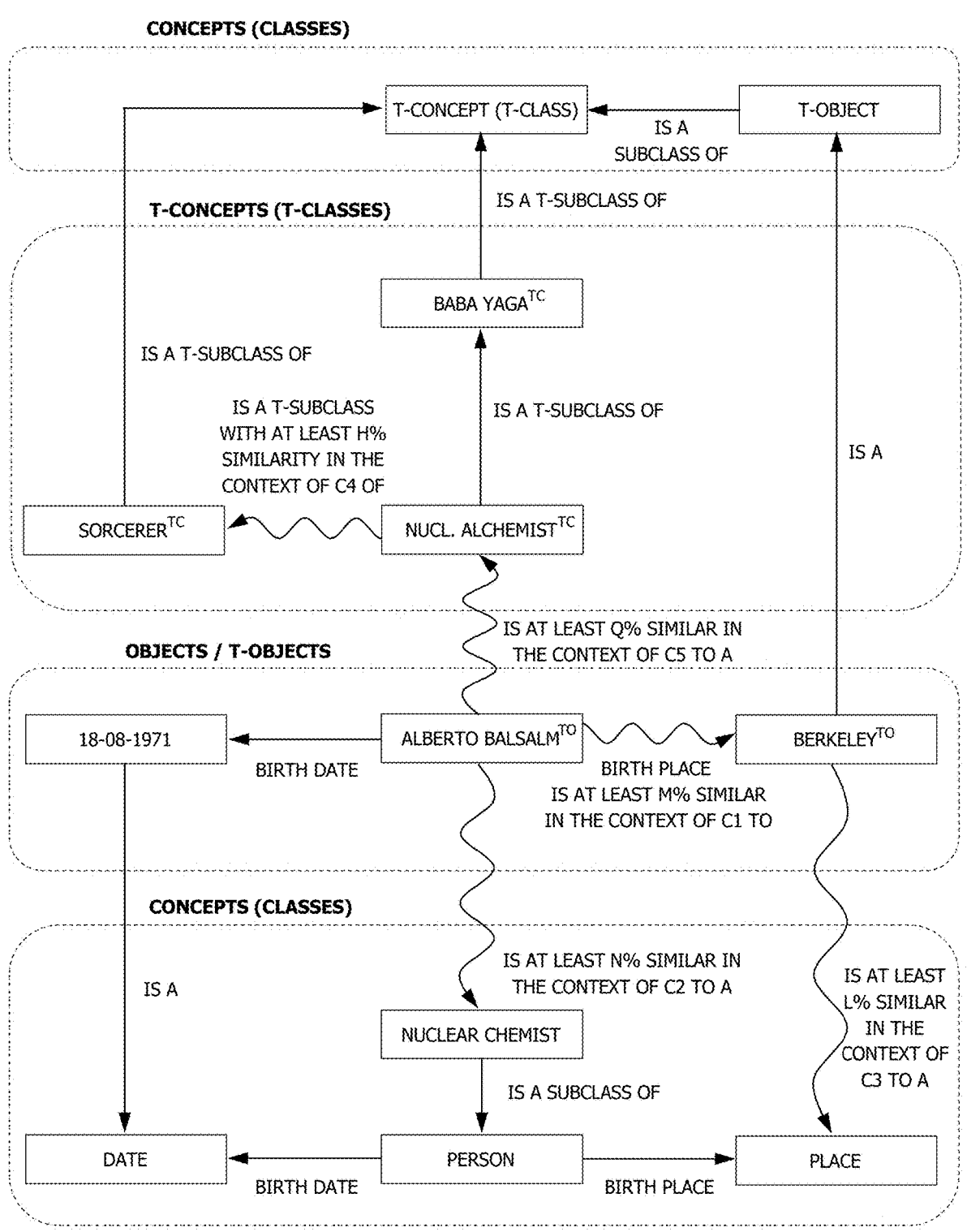
FIG. 17 is an example semantic network—created by modifying the semantic network presented at FIG. 16—involving 'transforming concepts' (t-concepts) and their relations.

FIG. 17 is an example semantic network, i.e., knowledge graph, created by modifying the semantic network presented at FIG. 16 to further involve 'transforming concepts'—t-concepts in short—or equally 'transforming-classes'—t-classes in short-according to the disclosed methods and principles. The example semantic network involves multiple t-concepts and their analogue relations with other objects, concepts, t-objects, and t-concepts, including a graphical method for representing t-concepts and their analogue relations within semantic networks—which is the same as that of the t-objects. In FIG. 17, hypothetical transforming-concepts—or transforming-classes—'Nuclear Alchemist', 'Sorcerer', and 'Baba Yaga' are presented, which are indicated with "TC"—short for transforming-concept or transforming-class—at the upper right corner of the identifier and the concept of 't-concept' is also added as a new class to the semantic network besides the transforming-subclasses, i.e., Nuclear Alchemist, Sorcerer and Baba Yaga. According to the knowledge graph, the concept of t-object is a subclass—or sub concept—of the concept of t-concept—or t-class. In other words, t-object has a full membership to the class of 't-concept, i.e., a full member possessing all properties that the respective class possesses. According to the knowledge graph, Baba Yaga is a transforming-subclass of t-concept with a full membership, such that each conceptual manifestation of Baba Yaga, with respect to attributes/properties, is at least 100% similar to the class of t-concept in the context of the concept of t-concept. In other words, for each conceptual manifestation of Baba Yaga, among all properties that the manifestation possesses, there exist a subset of properties that fulfills the 'at least 100% similarity in the context of the concept of t-concept' condition when compared with the properties of the corresponding manifestation—which can be any among all possible manifestations— of the t-concept—n.b., which is obviously the set of all properties that the t-concept possesses, for this particular case. Similarly, Sorcerer is a transforming-subclass of t-concept with a full membership, such that each conceptual manifestation of Sorcerer, with respect to attributes/properties, is at least 100% similar to the class of t-concept in the context of the concept of t-concept. In other words, for each conceptual manifestation of Sorcerer, among all properties that the manifestation possesses, there exist a subset of properties that fulfills the 'at least 100% similarity in the context of the concept of t-concept' condition when compared with the properties of the corresponding manifestation—which can be any among all possible manifestations— of the t-concept—n.b., which is obviously the set of all properties that the t-concept possesses, for this particular case. With respect to the analogies 'Nuclear Alchemist: Baba Yaga' and 'Nuclear Alchemist: Sorcerer', both nodes are transforming in each case.

According to the knowledge graph, Nuclear Alchemist is a transforming-subclass of transforming-class Baba Yaga with a full membership, such that each conceptual manifestation of Nuclear Alchemist, with respect to attributes/ properties, is at least 100% similar to each conceptual manifestation of Baba Yaga in the context of the concept of Baba Yaga. In other words, for each conceptual manifestation of Nuclear Alchemist, among all properties that the manifestation possesses, there exist a subset of properties that fulfills the 'at least 100% similarity in the context of the concept of Baba Yaga' condition when compared with the properties of the corresponding manifestation—which can be any among all possible manifestations—of the transforming-concept Baba Yaga. According to the knowledge graph, Nuclear Alchemist is a transforming-subclass of transforming-class Sorcerer with a fuzzy membership, such that each conceptual manifestation of Nuclear Alchemist, with respect to attributes/properties, is at least H % similar to each conceptual manifestation of Sorcerer in the context of the concept of Sorcerer ($C_4$). In other words, for each conceptual manifestation of Nuclear Alchemist, among all properties that the manifestation possesses, there exist a subset of properties that fulfills the 'at least H % similarity in the context of the concept of Sorcerer' condition when compared with the properties of the corresponding manifestation—which can be any among all possible manifestations— of the transforming-concept of Sorcerer. Lastly, according to the knowledge graph, t-Alberto Balsalm is at least Q % similar to a Nuclear Alchemist in the context of the concept of Nuclear Alchemist ($C_5$), i.e. in the context of being a Nuclear Alchemist. In other words, for each manifestation of t-Alberto Balsalm, among all properties that the manifestation possesses, there exist a subset of properties that fulfills the 'at least Q % similarity in the context of the concept of Nuclear Alchemist' condition when compared with the properties of the corresponding conceptual manifestation— which can be any among all possible manifestations—of the transforming-concept of Nuclear Alchemist. In other words, each manifestation of t-Alberto Balsalm, with respect to the attributes/properties of Nuclear Alchemist, such as knowledge and skills of a person with respect to nuclear alchemistry, is at least Q % similar to any conceptual manifestation of Nuclear Alchemist. N.B.: Nuclear Alchemist, Sorcerer and Baba Yaga are—obviously—'bounded t-concepts' or 'bounded t-classes'.

Figure 18:
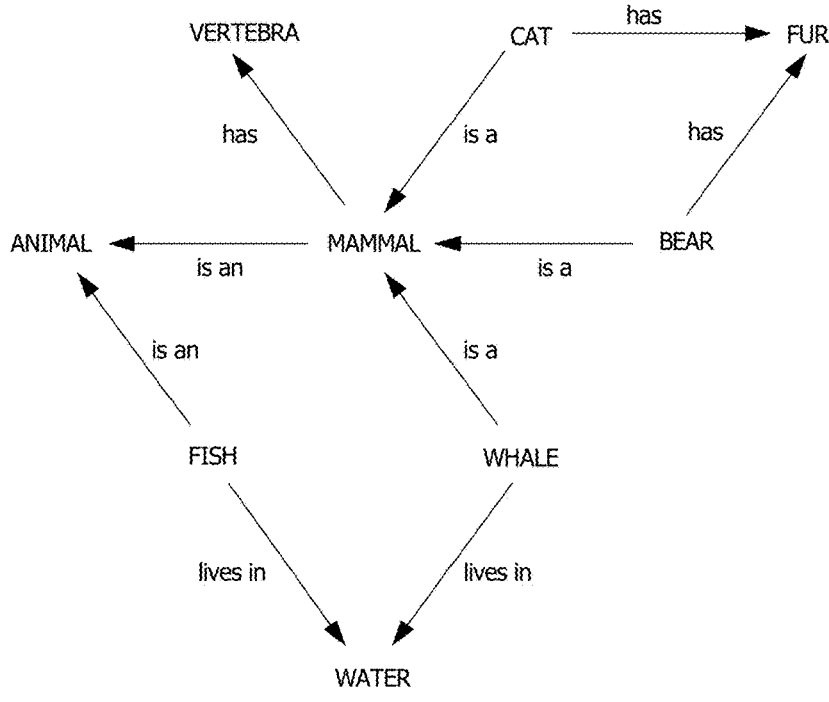
FIG. 18 is an example semantic network, i.e., knowledge graph, involving—semi-arbitrarily chosen—concepts and their relations, constructed according to the conventional ontological models.

FIG. 18 is an example conventional semantic network, i.e., knowledge graph, involving—semi-arbitrarily chosen—concepts (classes) and their relations, constructed according to the conventional ontological models. Said arbitrarily chosen semantic network is presented in order to demonstrate a transition to a semantic network that involves transforming-concepts besides conventional concepts. According to the semantic network in FIG. 18, 'Cat is a Mammal'; 'Cat has a Fur'; 'Bear is a Mammal'; 'Bear has Fur'; 'Mammal is an Animal'; 'Mammal has Vertebra'; 'Whale is a Mammal'; 'Whale lives in Water'; 'Fish is an Animal'; and 'Fish lives in Water'.

Figure 19:
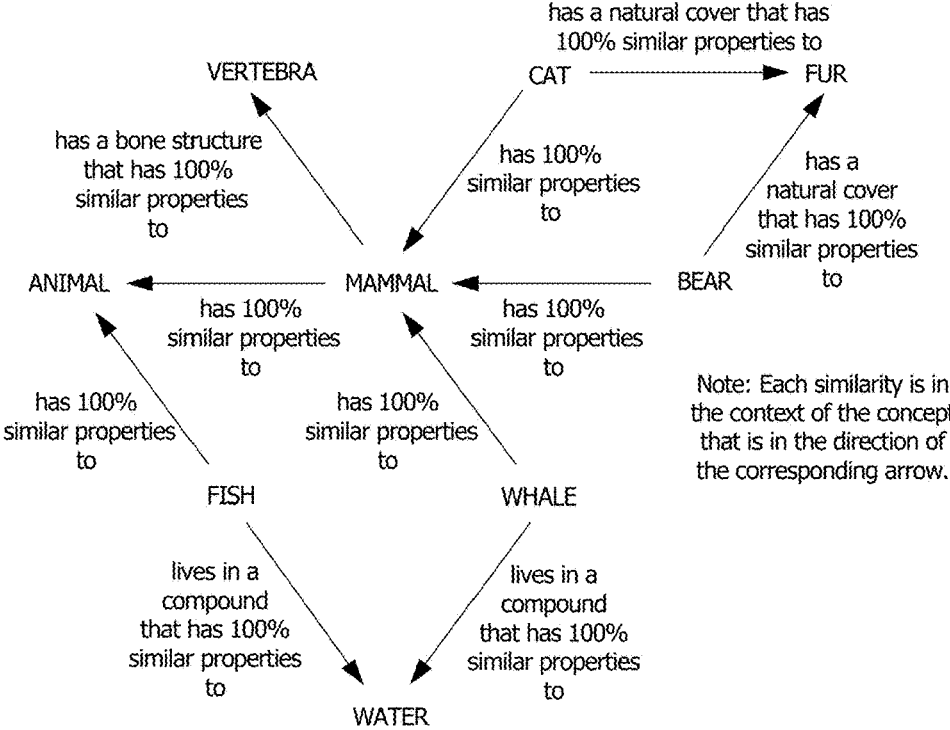
FIG. 19 is another representation of the same semantic network presented at FIG. 18.

FIG. 19 is another representation of the same semantic network presented at FIG. 18. As can be seen, previous statements are replaced with new statements that have exactly the same meaning but involving similarity ratios— which are naturally % 100. 'Cat is a Mammal' is now 'Cat has 100% similar properties to Mammal'; 'Cat has Fur' is now 'Cat has a natural cover that has 100% similar properties to Fur'; 'Bear is Mammal' is now 'Bear has 100% similar properties to Mammal'; 'Bear has Fur' is now 'Bear has a natural cover that has 100% similar properties to Fur'; 'Mammal is an Animal' is now 'Mammal has 100% similar properties to Animal'; 'Mammal has Vertebra' is now 'Mammal has a bone structure that has 100% similar properties to Vertebra'; 'Whale is a Mammal' is now 'Whale has 100% similar properties to Mammal'; 'Whale lives in Water' is now 'Whale lives in a compound that has 100% similar properties to Water'; 'Fish is an Animal' is now 'Fish has 100% similar properties to Animal'; and 'Fish lives in Water' is now 'Fish lives in a compound that has 100% similar properties to Water'. N.B.: In principle, if the context of similarity is not stated for a relationship between two concepts A→B, then A is considered to have x % similar properties to B in the context of B. Thus, for FIGS. 19, 20 and 21 each similarity is in the context of the concept that is in the direction of the corresponding arrow-unless indicated otherwise.

Figure 20:
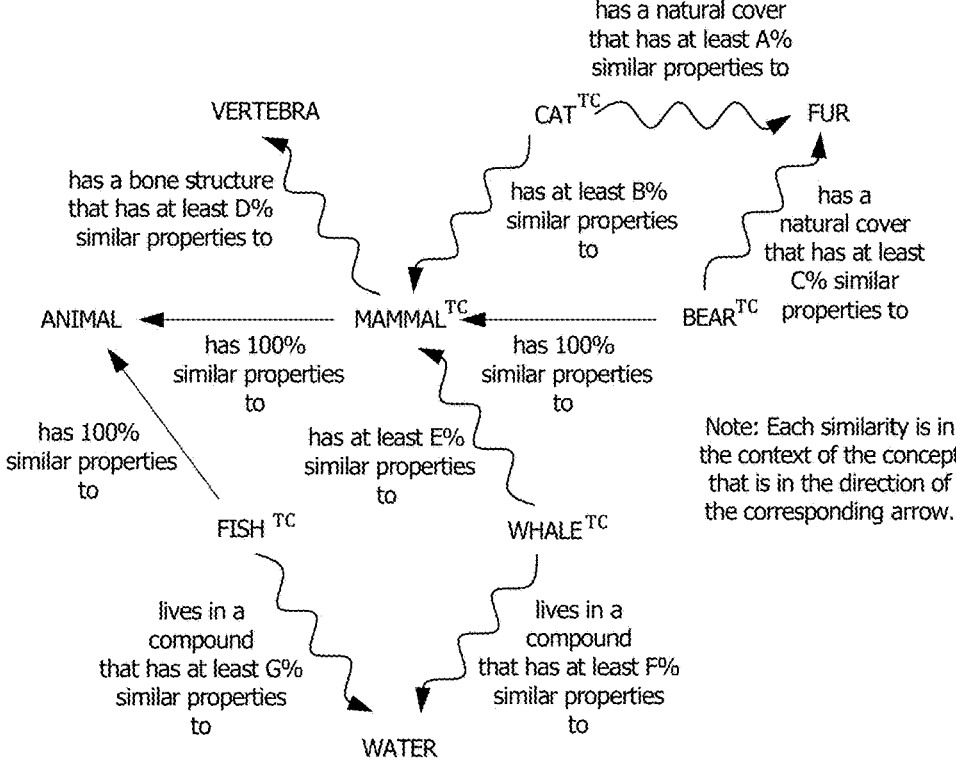
FIG. 20 is an example semantic network—created by modifying the semantic network presented at FIG. 18—involving t-concepts and their relations according to the disclosed ontological model, wherein the t-concepts are the exemplary transforming correspondences of the concepts presented at FIG. 18.

FIG. 20 is an example semantic network—created by modifying the semantic network presented at FIG. 18—involving t-concepts and their relations according to the disclosed ontological model, wherein the t-concepts are the exemplary transforming correspondences of the concepts presented at FIG. 18. The semantic network in FIG. 19, which is semantically equal to the semantic network presented at FIG. 18, is altered such that the concepts Cat, Bear, Mammal, Whale, and Fish have become transforming concepts—indicated with "TC" at the upper right corner of the identifier. According to the semantic network: 't-Cat has at least B % similar properties to t-Mammal'; 't-Cat has a natural cover that has at least A % similar properties to Fur'; 't-Bear has 100% similar properties to t-Mammal'; 't-Bear has a natural cover that has at least C % similar properties to Fur'; 't-Mammal has 100% similar properties to Animal'; 't-Mammal has a bone structure that has at least D % similar properties to Vertebra'; 't-Whale has at least E % similar properties to t-Mammal'; 't-Whale lives in a compound that has at least F % similar properties to Water'; 't-Fish has 100% similar properties to Animal'; and 't-Fish lives in a compound that has at least G % similar properties to Water'; where 't-class A has at least S % similar properties to t-class B' means that 'based on a predefined universal rule for similarity comparison (e.g., a particular model based on the previously disclosed similarity comparison rules/methods) each conceptual manifestation of A, with respect to attributes/properties, is at least S % similar to any conceptual manifestation of B, among all properties that the conceptual manifestation of A possesses.

Figure 21:
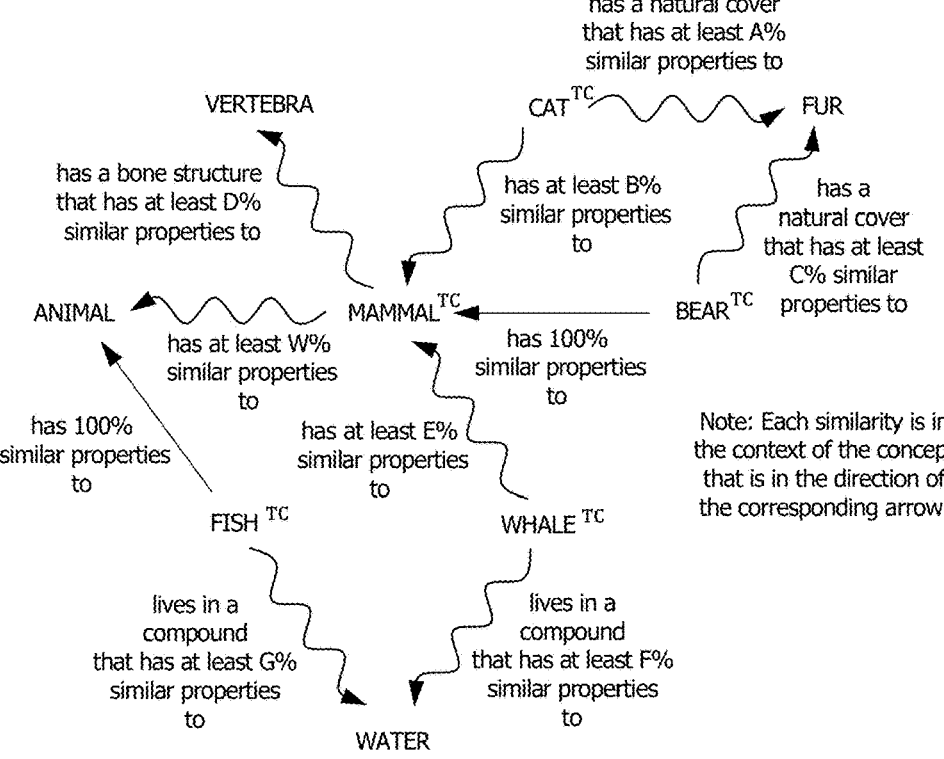
FIG. 21 is a slightly altered version of the example semantic network presented at FIG. 20.

FIG. 21 is a slightly altered version of the example semantic network presented at FIG. 20. The relationship between t-Mammal and Animal is altered such that the statement 't-Mammal has 100% similar properties to Animal' has become 't-Mammal has at least W % similar properties to Animal'. As can be seen, a class is only a special case of the corresponding family of transforming classes wherein each member of the family is defined by a similarity threshold. Further, the similarity threshold may be constant or variable such as a function of time or a set of functions applied based on certain events.

Figure 22:
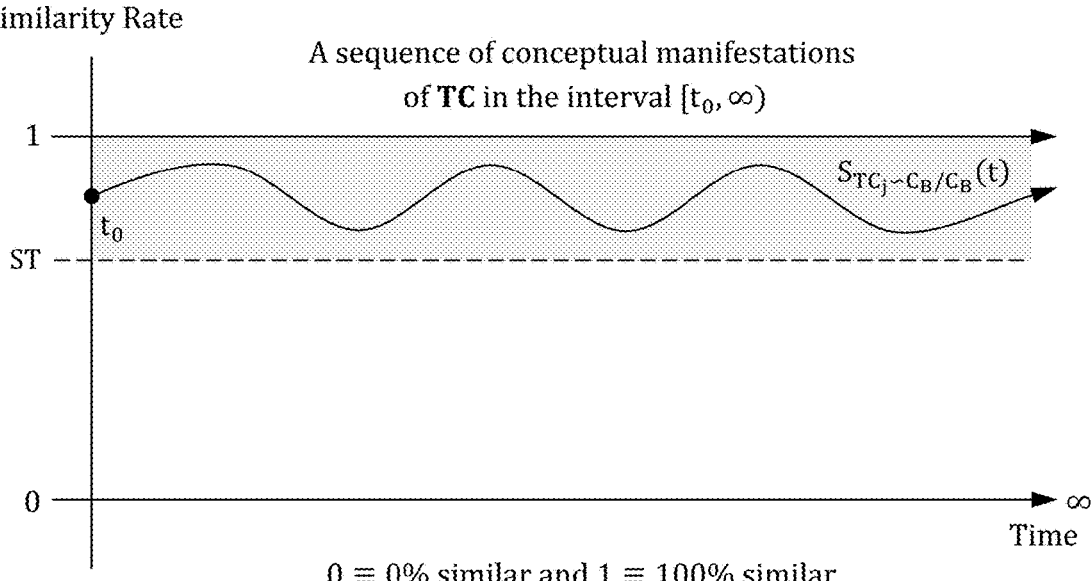
FIG. 22 is a hypothetical similarity function of a transforming-concept (TC) that is a transforming-subclass of a reference concept—or base-concept—($C_B$) in the context of the same reference concept—or base-concept—($C_B$)

FIG. 22 is a hypothetical similarity function of a transforming-concept (TC) that is a transforming-subclass of a reference concept—or base-concept—($C_B$) in the context of the same reference concept—or base-concept—($C_B$), where the similarity function may be an interpolation of the outcomes of comparisons of conceptual manifestations in the interval $[t_0, \infty)$. The example similarity function represents $j^{th}$ arbitrary sequence of conceptual manifestations among J number (#) of all possible sequences of conceptual manifestations that TO may generate in the interval $[t_0, \infty)$. More concretely, $S_{TC_j \sim C_B/C_B}(t)$ represents the similarity rate between the $j^{th}$ sequence of conceptual manifestations of TC and the reference concept $C_B$ in the context of $C_B$ with respect to time, where $TC_j$ represents an arbitrary sequence ($j^{th}$ sequence) among all sequences of conceptual manifestations that can be generated within the contextual boundaries $0 \le S_{TC_j \sim C_B/C_B}(t) \le 1$ in that certain period of time. N.B.: The notation a~b/c reads as 'similarity rate of a to b in the context of c'. According to the similarity function, TC is $100 \times S_{TC_j \sim C_B/C_B}(t)$ % similar to $C_B$ in the context of $C_B$ at a given time while TC is defined for $ST \le S_{TC_j \sim C_B/C_B}(t) \le 1$, where $j = 1,2,3, \ldots, J$, in the interval $[t_{initial}, t_{final}]$, and ST is the similarity threshold defining the minimum similarity limit that cannot be exceeded by TC. Therefore, TC is defined to be a transforming-subclass of $C_B$ for the boundaries ST and 1 (the grey area). As also shown in the graph, the similarity function $S_{TC_j \sim C_B/C_B}(t)$ oscillates between 1 and ST and never exceeds ST in the interval $[t_0, \infty)$. Further, besides TC, any manifestation of any other transforming-concept that meets said conditions is also defined to be a transforming-subclass of a reference concept ($C_B$) in the context of the same reference concept—or base-concept—($C_B$). Thus, the rule $ST \le S_{TC_j \sim C_B/C_B}(t) \le 1$ becomes a universal rule for defining transforming-subclasses of concepts. Further, the rule $ST \le S_{TC_j \sim C_B/C_B}(t) \le 1$ may be expanded to become $ST \le S_{TC_j \sim TC_B/TC_B}(t) \le 1$, defining a transforming-subclass ($TC_j$) of a reference transforming-concept ($TC_B$) in the context of the same reference transforming-concept—or base transforming—concept—($TC_B$).

Referring again to FIG. 21 with respect to Transforming-Classes/Transforming-Subclasses in the context of the Disclosed Similarity Functions and Inequalities: According to the semantic network: 't-Cat has at least B % similar properties to t-Mammal' is 'B/100≤ $S_{(t\text{-}cat) \sim (t\text{-}mammal)/(t\text{-}mammal)}(t) \le 1$'; 't-Cat has a natural cover that has at least A % similar properties to Fur' is 'A/100≤$S_{(t\text{-}cat's \quad natural \quad cover) \sim (fur)/(fur)}(t) \le 1$'; 't-Bear has 100% similar properties to t-Mammal' is '$S_{(t\text{-}bear) \sim (t\text{-}mammal)/(t\text{-}mammal)}(t) = 1$'; 't-Bear has a natural cover that has at least C % similar properties to Fur' is 'C/100≤$S_{(t\text{-}bear's \; natural \; cover) \sim (fur)/(fur)}(t) \le 1$'; 't-Mammal has at least W % similar properties to Animal' is 'W/100≤$S_{(t\text{-}mammal) \sim (animal)/(animal)}(t) \le 1$'; 't-Mammal has a bone structure that has at least D % similar properties to Vertebra' is 'D/100≤$S_{(t\text{-}mammal's \; bn.strctr.) \sim (vert.)/(vert.)}(t) \le 1$'; 't-Whale has at least E % similar properties to t-Mammal' is 'E/100≤$S_{(t\text{-}whale) \sim (t\text{-}mammal)/(t\text{-}mammal)}(t) \le 1$'; 't-Whale lives in a compound that has at least F % similar properties to Water' is 'F/100≤$S_{(t\text{-}whale's \; environment) \sim (water)/(water)}(t) \le 1$; 't-Fish has 100% similar properties to Animal' is '$S_{(t\text{-}fish) \sim (animal)/(animal)}(t) = 1$'; and 't-Fish lives in a compound that has at least G % similar properties to Water' is 'G/100≤$S_{(t\text{-}fish's \; environment) \sim (water)/(water)}(t) \le 1$'.

Figure 23:
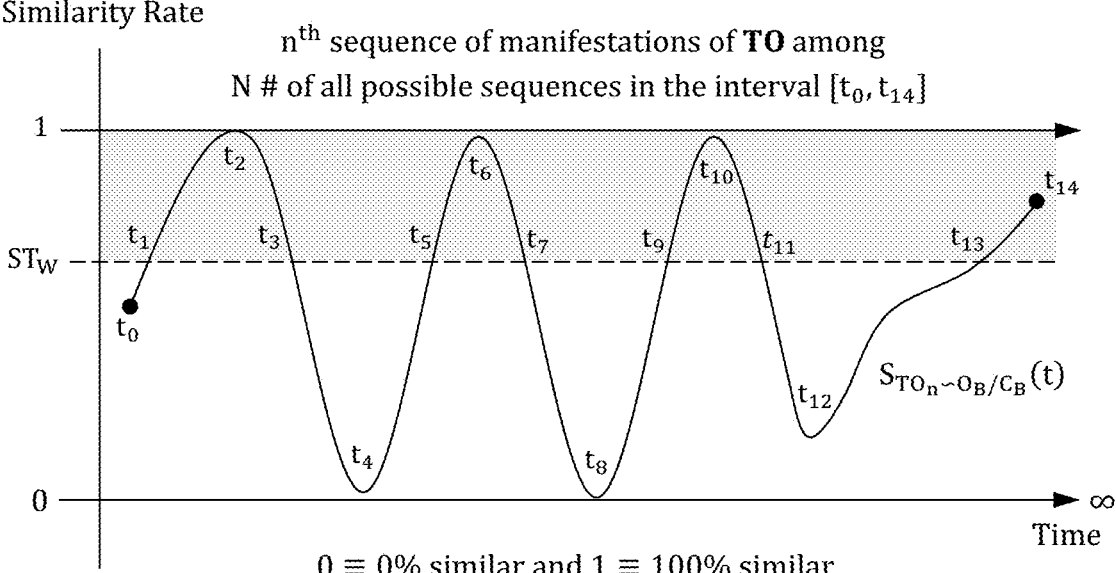
FIG. 23 is a hypothetical similarity function of a transforming-object (TO) with respect to a reference object—or base object—($O_B$) in the context of a base-concept—or base-class—($C_B$)
Figure 27:
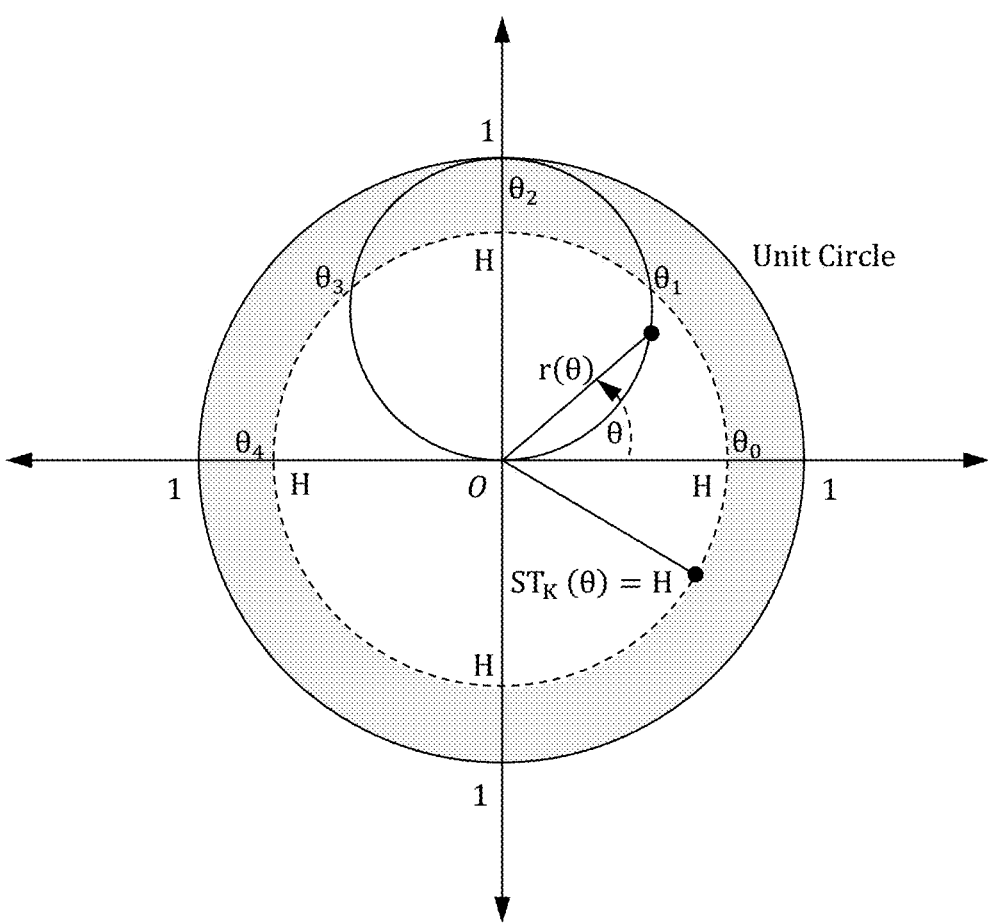
FIG. 27 is an example similarity equation of a particular sequence of manifestations ($TO_2$) of a transforming object (TO) with respect to a reference concept —or base-concept—($C_B$) in the context of the same reference concept—or base-concept—($C_B$) in the polar coordinate system.

FIGS. 23 and 24 are similarity functions of two different hypothetical transforming-objects with respect to a reference object and a reference concept respectively. FIG. 25 is a similarity function of a hypothetical transforming-concept with respect to a reference concept. FIGS. 26 and 27 are similarity functions of two different hypothetical transforming-objects with respect to corresponding reference concepts in the cartesian coordinates and polar coordinates respectively.

FIG. 23 is a hypothetical similarity function of a transforming-object (TO) with respect to a reference object—or base-object—($O_B$) in the context of a base-concept—or base-class—($C_B$), where the similarity function may be an interpolation of the outcomes of comparisons of manifestations in the interval $[t_0, t_{14}]$. The example similarity function represents $n^{th}$ arbitrary sequence of manifestations among N number (#) of all possible sequences of manifestations that TO may generate in the time interval $[t_0, t_{14}]$. More concretely, given that all manifestations belong to the transforming object TO in particular, $S_{TO_n \sim O_B/C_B}(t)$ represents the similarity rate between the $n^{th}$ sequence of manifestations of TO and the reference object Op in the context of the base-concept $C_B$ with respect to time, where $TO_n$ represents an arbitrary sequence ($n^{th}$ sequence) among all sequences of manifestations that can be generated within the contextual boundaries $0 \le S_{TO_n \sim O_B/C_B}(t) \le 1$ in that certain period of time. According to the similarity function, for $t_0 \le t \le t_{14}$, TO is $100 \times S_{TO_n \sim O_B/C_B}(t)$ % similar to $O_B$ in the context of $C_B$ while TO is defined for $0 \le S_{TO_n \sim O_B/C_B}(t) \le 1$, where $n = 1,2,3, \ldots, N$ in the interval $[t_{initial}, t_{final}]$. The first manifestation occurs at to and the last manifestation occurs at $t_{14}$. The similarity rate oscillates between 1 and 0, peaking at $t_2$ thus becoming 1 and bottoming out at $t_8$ becoming 0. Further, TO is defined to be associated with $O_B$ for $ST_W \le S_{TO_n \sim O_B/C_B}(t) \le 1$ where $ST_W$ is the similarity threshold defining the minimum similarity limit for the establishment of the association. $ST_W$ may have any reel value for $0 \le ST_W \le 1$ including dynamic values, thus $ST_W$ itself may also be defined as a function, or a parametric equation, etc., such as an event-based function, or a rule based parametric equation. According to the FIG. 23, any manifestation that falls into the area that is bounded by $ST_W$ and 1 (the grey area) is defined to be associated with $O_B$, thus TO is defined to be associated with $O_B$ for the intervals $[t_1, t_3]$, $[t_5, t_7]$, $[t_9, t_{11}]$, and $[t_{13}, t_{14}]$. Further, besides TO, any manifestation of any other t-object that meets said conditions is also defined to be associated with $O_B$. Thus, the rule $ST_W \le S_{TO_n \sim O_B/C_B}(t) \le 1$ becomes a universal rule for establishing associations between objects. Indeed, according to various embodiments, the rule '$ST_W \le S_{TO_n \sim O_B/C_B}(t) \le 1$' corresponds to the rule that is embedded with each super-object with respect to the establishment of associations with various objects where $TO_n$ corresponds to any encountered object, $ST_W$ (or ST without an index) corresponds to the similarity threshold, $O_B$ corresponds to the root-object, and $C_B$ corresponds to the base-concept or base-class (such as a certain function of a certain type of object) that determines the context of the similarity comparison to be executed between an encountered object and the root-object. Further, the rule '$ST_W \leq S_{TO_{n-OB}/C_B}(t) \leq 1$' may be expanded to become '$ST_W \leq S_{TO_n \sim TO_B/T_C}(t) \leq 1$', to be used for establishing associations between encountered objects ($TO_n$) and root-transforming-objects ($TO_B$) in the context of base-transforming-concepts ($TC_B$).

FIG. 24 is a hypothetical similarity function of a transforming-object (TO) with respect to a reference concept—or base-concept—($C_B$) in the context of the same reference concept—or base-concept—($C_B$), where the similarity function may be an interpolation of the outcomes of comparisons of manifestations in the interval $[t_0, t_6]$. The example similarity function represents $k^{th}$ arbitrary sequence of manifestations among K number (#) of all possible sequences of manifestations that TO may generate in the interval $[t_0, t_6]$. More concretely, given that all manifestations belong to the transforming object TO in particular, $S_{TO_k-C_B/C_B}(t)$ represents the similarity rate between the $k^{th}$ sequence of manifestations of TO and the reference concept $C_B$ in the context of $C_B$ with respect to time, where $TO_k$ represents an arbitrary sequence ($k^{th}$ sequence) among all sequences of manifestations that can be generated within the contextual boundaries $0 \leq S_{TO_k-C_B/C_B}(t) \leq 1$ in that certain period of time. According to the similarity function, for to $\leq t \leq t_6$, TO is $100 \times S_{TO_k-C_B/C_B}(t)$ % similar to $C_B$ in the context of $C_B$ while TO is defined for $0 \leq S_{TO_k-C_B/C_B}(t) \leq 1$, where k=1,2,3, . . . , K in the interval $[t_{initial}, t_{final}]$. The first manifestation occurs at to and the last manifestation occurs at $t_6$. The similarity rate oscillates smoothly between $t_0$ to $t_3$ and turns sharply into a linear decline at $t_4$. Further, TO is defined to be associated with $C_B$ for $ST_L \leq S_{TO_k-C_B/C_B}(t) \leq 1$ where $ST_L$ is the similarity threshold defining the minimum similarity limit for the establishment of the association. $ST_L$ may have any reel value for $0 \leq ST_L \leq 1$ including dynamic values, thus $ST_L$ itself may also be defined as a function, or a parametric equation, etc., such as an event-based function, or a rule based parametric equation. According to the FIG. 24, any manifestation that falls into the area that is bounded by $ST_L$ and 1 (the grey area) is defined to be associated with $C_B$, thus TO is defined to be associated with $C_B$ for the intervals $[t_1, t_2]$ and $[t_3, t_5]$. Further, besides TO, any manifestation of any other transforming-object that meets said conditions is also defined to be associated with $C_B$. Thus, the rule $ST_L \leq S_{TO_k-C_B/C_B}(t) \leq 1$ becomes a universal rule for establishing associations between objects and concepts. Consequently, the rule '$ST_L - \leq S_{TO_k-C_B/C_B}(t) \leq 1$' may be used as a general rule—such as embedded with a super-object—for establishing an association between an object and a concept where $TO_k$ corresponds to any encountered object, $ST_L$ corresponds to the similarity threshold, $C_B$ corresponds to any root-concept and also the context of the similarity comparison to be executed between an encountered object and the root-concept. Further, the rule $ST_L \leq S_{TO_k-C_B/C_B}(t) \leq 1$ may be expanded to become $$ST_L \leq S_{TO_k \sim C_{B_1}/C_{B_2}}(t) \leq 1$$

where $TO_k$ corresponds to any encountered object, $ST_L$ corresponds to the similarity threshold, $C_{B_1}$ corresponds to any root-concept and $C_{B_2}$ corresponds to any concept that determines the context of the similarity comparison to be executed between an encountered object and the root-concept. Further, the rule '$ST_L \leq S_{TO_k-C_B/C_B}(t) \leq 1$' may be expanded to become '$ST_L \leq S_{TO_k-TC_B/TC_B}(t) \leq 1$', to be used for establishing associations between encountered objects ($TO_k$) and root-transforming-concepts ($TC_B$) in the context of the same root-transforming-concepts ($TC_B$).

FIG. 25 is a hypothetical similarity function of a transforming-concept (TC) with respect to a reference concept—or base-concept—($C_B$) in the context of the same reference concept—or base-concept—($C_B$), where the similarity function may be an interpolation of the outcomes of comparisons of conceptual manifestations in the interval $[t_0, t_7]$. The example similarity function represents $m^{th}$ arbitrary sequence of conceptual manifestations among M number (#) of all possible sequences of conceptual manifestations that TO may generate in the interval $[t_0, t_7]$. More concretely, given that all conceptual manifestations belong to the transforming concept TC in particular, $S_{TC_m-C_B/C_B}(t)$ represents the similarity rate between the $m^{th}$ sequence of conceptual manifestations of TC and the reference concept $C_B$ in the context of $C_B$ with respect to time, where $TC_m$ represents an arbitrary sequence ($m^{th}$ sequence) among all sequences of conceptual manifestations that can be generated within the contextual boundaries $0 \leq S_{TC_m-C_B/C_B}(t) \leq 1$ in that certain period of time. According to the similarity function, for $t_0 \leq t \leq t_7$, TC is $100 \times S_{TC_m-C_B/C_B}(t)$ % similar to $C_B$ in the context of $C_B$ while TC is defined for $0 \leq S_{TC_m-C_B/C_B}(t) \leq 1$, where m=1,2,3, . . . , M in the interval $[t_{initial}, t_{final}]$. The first conceptual manifestation occurs at to and the last conceptual manifestation occurs at $t_7$. The similarity rate oscillates between 1 and 0, peaking at $t_2$ thus becoming 1 and bottoming out at $t_4$ becoming 0. Further, TC is defined to be associated with $C_B$ for $ST_j \leq S_{TC_m-C_B/C_B}(t) \leq 1$ where $ST_j$ is the similarity threshold defining the minimum similarity limit for the establishment of the association. $ST_j$ may have any reel value for $0 < ST_j \leq 1$ including dynamic values, thus $ST_j$ itself may also be defined as a function, or a parametric equation, etc., such as an event-based function, or a rule based parametric equation. According to the FIG. 25, any conceptual manifestation that falls into the area that is bounded by $ST_j$ and 1 (the grey area) is defined to be associated with $C_B$, thus TC is defined to be associated with $C_B$ for the intervals $[t_1, t_3]$ and $[t_5, t_6]$. Further, besides TC, any manifestation of any other transforming-concept that meets said conditions is also defined to be associated with $C_B$. Thus, the rule $ST_j \leq S_{TC_m-C_B/C_B}(t) \leq 1$ becomes a universal rule for establishing associations between concepts. Consequently, the rule '$ST_j \leq S_{TC_m-C_B/C_B}(t) \leq 1$' may be used as a general rule—such as embedded with a super-concept, i.e., a conceptual super-object—for establishing an association between a concept and another concept where $TC_m$ corresponds to any encountered or envisioned concept, $ST_j$ corresponds to the similarity threshold, $C_B$ corresponds to any root-concept and also the context of the similarity comparison to be executed between an encountered or envisioned concept and the root-concept. Further, the rule $ST_j \leq S_{TC_m-C_B/C_B}(t) \leq 1$ may be expanded to become $$ST_J \leq S_{TC_m \sim C_{B_1}/C_{B_2}}(t) \leq 1$$

where $TC_m$ corresponds to any encountered or envisioned concept, $ST_j$ corresponds to the similarity threshold, $C_{B_1}$ corresponds to any root-concept and $C_{B_2}$ corresponds to any concept that determines the context of the similarity comparison to be executed between an encountered or envisioned concept and the root-concept. Further, the rule '$ST_j \leq S_{TC_m \sim C_B/C_B}(t) \leq 1$' may be expanded to become '$ST_j \leq S_{TC_m \sim TC_B/TC_B}(t) \leq 1$', to be used for establishing associations between encountered or envisioned concepts ($TC_m$) and root-transforming-concepts ($TC_B$) in the context of the same root-transforming-concepts ($TC_B$).

Last but not least, the disclosed example—at FIG. 23—of an arbitrary similarity function of a transforming-object (TO) with respect to a reference object ($O_B$) in the context of a base-concept ($C_B$) may be expanded—in accordance with the disclosed principles—in such a way that the reference object ($O_B$) may be a reference transforming object ($TO_B$) and/or the base-concept ($C_B$) may be a base transforming concept ($TC_B$). Further, the disclosed example—at FIG. 24—of an arbitrary similarity function of a transforming-object (TO) with respect to a reference concept ($C_B$) may be expanded—in accordance with the disclosed principles—in such a way that the reference concept ($C_B$) may be a reference transforming concept ($TC_B$). Further, the disclosed example—at FIG. 25—of an arbitrary similarity function of a transforming-concept (TC) with respect to a reference concept ($C_B$) may be expanded—in accordance with the disclosed principles—in such a way that the reference concept ($C_B$) may be a reference transforming concept ($TC_B$).

FIG. 26 is an example similarity function of a particular sequence of manifestations ($TO_1$) of a transforming object (TO) with respect to a reference concept ($C_B$) in the context of the same reference concept ($C_B$) in the cartesian coordinate system. The similarity function $S_{TO_1 \sim C_B/C_B}(t) = 1/(t - t_1)$ represents the interpolation of the outcomes of the comparisons of manifestations in the interval $[t_0, t_3]$. In the cartesian coordinate system as similarity→∞ then similarity rate→100%, therefore—according to the example function—the right limit of the similarity rate $S_{TO_1 \sim C_B/C_B}(t)$ at $t_1$ is 100% similar. Similarly, as similarity→∞ then similarity rate→0%, therefore-according to the example function—the left limit of the similarity rate $S_{TO_1 \sim C_B/C_B}(t)$ at $t_1$ is 0%. According to the FIG. 26, $S_{TO_1 \sim C_B/C_B}(t)$ is defined for $-\infty < S_{TO_1 \sim C_B/C_B}(t) \leq S_{TO_1 \sim C_B/C_B}(t_0)$, $S_{TO_1 \sim C_B/C_B}(t_3) \leq S_{TO_1 \sim C_B/C_B}(t) < \infty$, and $t_0 \leq t < t_1 < t \leq t_3$. For $t_0 \leq t < t_1 < t \leq t_3$, $TO_1$ is $100 \times S_{TO_1 \sim C_B/C_B}(t)$ % similar to $C_B$ in the context of $C_B$. Further, $TO$ is defined to be associated with $C_B$ for $ST_K \leq S_{TO_n \sim C_B/C_B}(t) \leq 1$ where $ST_K$ is the similarity threshold defining the minimum similarity limit for the establishment of the association, while the integer variable n may have any value from 1 to N where N represents the total number of all possible sequences of manifestations that TO may generate in the interval $[t_0, t_3]$. According to the FIG. 26, any manifestation that falls into the area that is bounded by $ST_K$ and ∞ (the grey area) is defined to be associated with $C_B$, thus sequence #1 of manifestations of TO in the interval $[t_0, t_3]$, i.e., $TO_1$, is defined to be associated with $C_B$ in the interval $(t_1, t_2)$.

FIG. 27 is an example similarity equation of a particular sequence of manifestations ($TO_2$) of a transforming object (TO) with respect to a reference concept ($C_B$) in the context of the same reference concept ($C_B$) in the polar coordinate system. The similarity equation $S_{TO_2 \sim C_B/C_B}(\theta) = r(\theta) = \sin\theta$, represents the interpolation of the outcomes of the comparisons of manifestations in the interval $[\theta_0, \theta_4]$ where the angle $\theta$ represents time. According to the FIG. 27, $S_{TO_2 \sim C_B/C_B}(\theta)$ is defined for $0 \leq S_{TO_2 \sim C_B/C_B}(\theta) \leq 1$ and $0 \leq \theta \leq \pi$. For $\theta_0 \leq \theta \leq \theta_4$, $TO_2$ is $100 \times S_{TO_2 \sim C_B/C_B}(\theta)$ % similar to $C_B$ in the context of $C_B$. Further, TO is defined to be associated with $C_B$ for $ST_K(\theta) \leq S_{TO_n \sim C_B/C_B}(\theta) \leq 1$ where $ST_K(\theta)$ is the similarity threshold defining the minimum similarity limit for the establishment of the association, while the integer variable n may have any value from 1 to N where N represents the total number of all possible sequences of manifestations that TO may generate in the interval $[\theta_0, \theta_4]$. According to the FIG. 27, any manifestation that falls into the area that is bounded by $ST_K(\theta) = H$ and 1 (the grey area) is defined to be associated with $C_B$, thus sequence #2 of manifestations of TO in the interval $[\theta_0, \theta_4]$, i.e., $TO_2$, is defined to be associated with $C_B$ in the interval $[\theta_1, \theta_3]$.

In conclusion, by utilizing the concept of t-objects and t-concepts, any object or concept that may exist within certain contextual boundaries, including those that does not yet exist, i.e., uninvented things, may be—albeit indirectly—processed in a fuzzy manner to a certain extend. Thus, for example, super-objects comprising event based strategic applications may also be developed proactively for future encounters, etc.

Disclosed Ontological Model '$ST_W \leq S_{TO_n \sim O_B/C_B}(t) \leq 1$' in the context of Super-Objects:

According to the various embodiments, the ontological model '$ST_W \leq S_{TO_n \sim O_B/C_B}(t) \leq 1$' corresponds to the association rule of a super-object with respect to the establishment of associations with analogous objects that are encountered in an environment. In this context, with respect to a super-object, $TO_n$ corresponds to any encountered object instead of the $n^{th}$ sequence of manifestations of a transforming-object, $ST_W$ corresponds to the similarity threshold of said super-object, $O_B$ corresponds to the root-object of said super-object, and $C_B$ corresponds to the base-concept that determines the context of the similarity comparison to be executed between an encountered object and the root object of said super-object. For clarity, let $TO_n$ to be the $n^{th}$ individual object identified among all encountered objects in an environment with respect to the association process of a super-object, 'W' to be the identifier of said super-object, $ST_W$ or ST in short to be the similarity threshold of said super-object, $O_B$ to be the root-object of said super-object, $C_B$ to be the context of said super-object. In this context, $TO_n \sim O_B/C_B$ represents the comparison of a super-object with an encountered object, which reads as 'comparison of $TO_n$ with $O_B$ in the context of $C_B$', S in $S_{TO_n \sim O_B/C_B}$ represent the comparison is a similarity comparison, $S_{TO_n \sim O_B/C_B}$ represents the similarity rate, and $ST_W \leq S_{TO_n \sim O_B/C_B} \leq 1$ represents the condition for establishing an association between said super-object and the encountered object with respect to the similarity rate $S_{TO_n \sim O_B/C_B}$ that is measured in that process, which reads as 'encountered object $TO_n$ is defined to be associated with super-object W if and only if the similarity rate between $TO_n$ and $O_B$ in the context of $C_B$ is more than or equal to the similarity threshold $ST_W$'. N.B.: According to the disclosed framework, all objects are considered transforming objects-even if they are not. N.B.: Transforming-objects and transforming-concepts represent the dynamic uncertainty in a physical and conceptual system respectively. N.B.: With respect to order of operations A~B/C is (A~B)/C therefore $ST \leq S_{TO_n \sim O_B/C_B} \leq 1$ is $ST \leq S_{(TO_n \sim O_B)/C_B} \leq 1$. Example Methods for Identifying the Context ($C_B$), Root-Object ($O_B$), and Similarity Threshold (ST) of a Super-Object:

FIG. 28 is the flowchart diagram 2700 illustrating an example process that includes steps with respect to identifying the context ($C_B$), root-object ($O_B$), and similarity threshold (ST) of a super-object.

The process begins with an interaction of a system user—for example through a client of the system—with one or more object/s in an environment where the objects may be a wide variety of singular elements and/or clusters of interrelated elements. Further, the objects in the environment may be digital or physical or both, such as objects of the Internet of Things (IoT).

At 2702, the system receives a selection of the user that comprises a cluster of various objects that are selected purposefully or randomly among a plurality of objects in the environment. According to the embodiments, a selected cluster may be contextually and structurally complex and may involve collections of distant and even irrelevant objects. For example, in the case of the Internet, the cluster may comprise both 'singular elementary objects with very basic functions' and 'subclusters of interrelated elementary objects with very complex functions' and those elements/ subclusters may be from irrelevant and contextually distant websites. Next, the system receives a set of instructions, i.e., procedures, developed by the user with respect to the selected cluster in order to process/manipulate the cluster. According to the embodiments, the instruction set, i.e., the procedures, may be developed by the user with the assistance of the system or completely independent of the system, while they may be basic or complex depending on the manipulated cluster and the procedures related with them.

As a result of the process 2702, the system receives a set of instructions developed by a user with respect to a cluster of objects that are selected by the user.

At 2704, the system analyzes, classifies, and clusters the elements of the selected cluster to identify each subcluster of interrelated elements in rank order—including each element as a $0^{th}$ order cluster—according to distinctive attributes, functions, and interrelationship. Next, for each identified subcluster, i.e., each identified element or cluster of interrelated elements, the system generates an analogue reference based on the identified attributes, functions, and interrelationship. In one embodiment, the step 2704 is executed right after the sub-step of receiving the selection of the user at 2702, since the step 2704 does not involve processing the instruction set developed by the user with respect to the selected cluster.

As a result of the process 2704, the system semantically identifies each subcluster in rank order and assigns an analogue reference in this context.

At 2706, based on the analogue references generated at 2704, and the set of instructions received at 2702, the system analyzes the process developed by the user with respect to the selected cluster and conceptualizes the user generated process, i.e., extracts the context of the process in-depth, thus identifies the context ($C_B$) of the prospective super-object. According to various embodiments, the context ($C_B$) comprises the extracted function and/or distinctive attributes of each subcluster involved in the process including the interrelationship in terms of functions and/or distinctive attributes within the context of the user generated process. N.B.: But not within the context of the cluster itself, since it may be no longer valid in the context of the user generated process), while comprising the function and/or distinctive attributes of each object involved in the set of instructions that manipulate the cluster, such as functions/methods of a computer program and non-executable content with respect to the instruction set. In other words, the interaction between the 'objects of the cluster' and the 'objects of the set of instructions' constitutes the base of the context of the 'user generated process', i.e., 'user generated application'. Further, depending on the complexity of the selected cluster and/or the complexity of the set of instructions with respect to the cluster, the user generated process may be represented by multiple subclusters and/or subsets of instructions to be processed in coordination. For example, the user generated process may be divided into sub-processes where each subset of instructions may be embedded with a super-object that is associated with the corresponding subcluster. In this process, each super-object to which the process is distributed operates in coordination with the others, for example, event-based rules—which may be embedded within the rule-base of each super-object—may define the order of execution of the instructions-whenever needed, according to the embodiments.

As a result of the process 2706, the system conceptualizes a user generated process (i.e., user generated application) with respect to an object cluster (thus the process becomes a concept, i.e., class) and identifies the context ($C_B$) of the respective prospective super-object.

At 2708, based on the context ($C_B$) identified at 2706, and the analogue references generated at 2704 the system constructs a model of the selected cluster. Next, the system associates any essential content—if any—with the constructed model and generates the root-object ($O_B$) of the prospective super-object. According to an embodiment, first, the system eliminates subclusters that are not involved in the process thus the selected cluster becomes free of any redundant subclusters. Next, the system conceptualizes the remaining cluster in accordance with the context ($C_B$) and extracts a model from said cluster while identifying any content of the remaining cluster that is essential to be included in/conveyed with the root-object. An essential content may be, for example, an image, a text, a link, etc. that should be partially or completely contained in the root-object. Next the system includes the essential content into the model and re-generates analogue references accordingly, thus, the system generates the root-object ($O_B$) of the prospective super-object, according to the embodiment.

As a result of the process 2708, the system constructs a model of the selected cluster—which includes all essential contents with respect to the execution of the user generated set of instructions—and generates the root-object ($O_B$) of the respective prospective super-object.

At 2710, based on the root-object ($O_B$) generated at 2708 and the context ($C_B$) identified at 2706, the system determines the similarity threshold (ST) of the prospective super-object in accordance with the operational needs and/or preferences with respect to the execution of the user generated set of instructions. The role of the similarity threshold (ST) within the ontological model '$ST \leq S_{TO_n \sim O_B/C_B} \leq 1$' may be considered as the mathematical representation of intuition—or at least a major component of it—thus, may be considered as one of the most prominent features of the disclosed subject matter. More precisely,—as further described in detail in the following sections—the ability of a system to optimize the similarity threshold that is used in the process of establishing associations with encountered objects—based on recognition of certain analogies relative to a certain root-object within a certain context—may be interpreted as the analogue of the ability of intuition for the same task and conditions. N.B.: In the following sections, it is also explained in detail that a 'similarity threshold' assigned for an association rule is not a value that remain constant, but a dynamic value that is further revised for the improvement of the optimization in each process/cycle. In principle, similarity threshold within the context of said ontological model ($ST \leq S_{TO_n \sim O_B/C_B} \leq 1$) represents a value in the region between two critical boundaries: the lower boundary ($L_{BD}$) and the upper boundary ($U_{BD}$). Within the context of a process with respect to a root-object, the lower boundary is the similitude rate of the least similar object (to the root-object) that is adequate for the realization of the process among all adequate objects. In other words, lower boundary value ensures that there exists at least one adequate object among all objects possessing the similitude rate of the lower boundary. Below this boundary there exists no adequate object. N.B.: Nevertheless, any value below this boundary—including zero, i.e., disparateness—may still be assigned as the similarity threshold depending on the needs of the implication. Within the context of a process with respect to a root-object, the upper boundary is the similitude rate of the most similar object (to the root-object) that is inadequate for the realization of the process among all inadequate objects. In other words, upper boundary value ensures that there exists at least one inadequate object among all objects possessing the similitude rate of the upper boundary. Above this boundary there exists no inadequate object, i.e., all objects are adequate for the realization of the process. N.B.: Nevertheless, any value above this boundary—including 1—may still be assigned as the similarity threshold depending on the needs of the implication. For example, lower boundary value may be assigned as the similarity threshold (ST) representing the borderline rate of similitude to a root-object ($O_B$) with respect to the execution of an instruction set—represented with the context ($C_B$)—that is initially designed and developed for manipulating the root-object ($O_B$), such as a user generated application or any operation with respect to the root-object ($O_B$). In various embodiments, according to the model $ST \leq S_{TO_n - O_B/C_B} \leq 1$, as similarity threshold ST approaches to the lower boundary, the coverage of the 'set of adequate objects'—manifested by the model—increases while the probability of success—in arbitrary encounters that satisfy the condition of association—decreases. Similarly, as similarity threshold ST approaches to the upper boundary, the probability of success—in arbitrary encounters that satisfy the condition of association—increases while the coverage of the 'set of adequate objects'—manifested by the model—decreases. In other words, setting the similarity threshold ST larger than the 'upper boundary' guarantees success for all matches, but excludes other adequate objects that fall below the 'upper boundary'—if any—from the process, thus decreases the coverage of the set of adequate objects manifested by the model. On the other hand, since all objects below the 'lower boundary' are inadequate, setting the similarity threshold ST smaller than the 'lower boundary' does not further increase the coverage of the set of adequate objects manifested by the model, but further decrease the probability of success—in arbitrary encounters that satisfy the condition of association—due to the increased probability of inadequate object matching. In this context, it can be deduced that optimal efficiency, i.e., optimal similarity threshold, may fall somewhere in between the lower and upper boundaries, i.e., $L_{BD} \leq ST \leq U_{BD} + \varepsilon$, and the values of $L_{BD}$, $U_{BD}$, and ST depends on the relevant process particularly. According to various embodiments, in an environment where all objects are interactable, optimal similarity threshold ($ST_{OP}$) is defined as the value that provides the highest probability of success to encounter with an adequate object among all objects that satisfy the condition of association (which reaches its maxima at $U_{BD} < ST$) while also providing the widest coverage for the set of adequate objects (which reaches its maxima at $ST \leq L_{BD}$). Consequently, fulfilling the association rule $ST \leq S_{TO_n - O_B/C_B} \leq 1$, i.e., the establishment of an association, does not necessarily ensure the realization of the respective task unless $S_{TO_n - O_B/C_B}$ is identified to be above the upper boundary or ST is set to be larger than the upper boundary, i.e., $U_{BD} < ST$. In principle, if similarity threshold (ST) is arbitrarily chosen then for any encountered object TO, where $S_{TO_n - O_B/C_B}$ is identified to be more than or equal to the respective similarity threshold but less than 1, the respective task: i) may be fully processed; ii) may be partially processed; or iii) may not be processed at all. In various embodiments, the system identifies the lower and upper boundaries in order to determine the critical domain where the optimal or near optimal similarity threshold (ST) values of a prospective super-object are located by utilizing statistical learning techniques including machine learning algorithms. Next, the system further processes the critical domain to determine the exact similarity threshold (ST), according to the embodiments.

As a result of the process 2710, the system determines the similarity threshold (ST) of the prospective super-object. N.B.: Further processing of partially processable cases is proposed as a part of the process 2800.

Referring again to Process 2710 with respect to Determinability of Critical Boundaries and the Optimal Value of Similarity Threshold in Finite Sets: In a universe where any interaction is precisely observable and perceivable, if the set of all possible outcomes of all permutations and/or all combinations of interactions between elements and/or clusters of interrelated elements is 'finite' then within the context of the disclosed ontological model $ST \leq S_{TO_n - O_B/C_B} \leq 1$, the lower and upper boundaries and the optimal similarity threshold value (ST) of a prospective super-object may be precisely determinable. In one embodiment, in order to identify the lower and upper boundaries, and the optimal similarity threshold with respect to a certain process (e.g., a user generated application), via utilizing the disclosed methods and systems while utilizing state-of-the-art simulation techniques-when needed: At 2710/A1, the system inter-manipulates all elements and/or all clusters of interrelated elements existing in the respective universe; At 2710/A2, the system identifies each possible object in the universe based on all possible outcomes of permutations and/or combinations of interactions between the existing elements and/or clusters of interrelated elements; At 2710/A3, the system identifies the similarity rate and adequacy of each object with respect to the realization of the process. Thus, the system may precisely identify the lower and upper boundaries, i.e., the critical domain, and the optimal value of similarity threshold that lies in that interval, based on the extracted data and information, according to the embodiment. According to another embodiment, the system executes the above process (2710/A1, 2710/A2, 2710/A3) only for a sample of the elements and/or clusters of interrelated elements existing in the universe in order to train machine-learning/deep-learning models. Further the system may specially include some distinctive samples to the dataset in order to optimize the training. Thus, by compromising the precise determination of critical boundaries and the optimal value of similarity threshold and allowing a degree of uncertainty, the system may still operate reliably—which is indeed essential for the type of environments disclosed below.

Referring again to Process 2710 with respect to Determinability of Critical Boundaries and the Optimal Value of Similarity Threshold in Infinite Sets: In a universe where any interaction is precisely observable and perceivable, if the set of all possible outcomes of all permutations and/or all combinations of interactions between elements and/or clusters of interrelated elements is 'infinite' then within the context of the disclosed ontological model $ST \leq S_{TO_n - O_B/C_B} \leq 1$, the lower and upper boundaries and the optimal similarity threshold value (ST) of a prospective super-object may be determinable within a degree of uncertainty. In one embodiment, in order to identify the lower and upper boundaries, and the optimal similarity threshold with respect to a certain process (e.g., a user generated application), via utilizing the disclosed methods and systems and while utilizing state-of-the-art machine-learning/deep-learning techniques: At 2710/B1, the system selects a subset from the set of all elements and/or all clusters of interrelated elements existing in the respective universe in order to train machine learning models; At 2710/B2, the system inter-manipulates the elements and/or clusters of interrelated elements belonging to the selected subset; At 2710/B3, the system identifies each possible object in the subset based on all possible outcomes of permutations and/or combinations of interactions between the existing elements and/or clusters of interrelated elements of the subset, At 2710/B4, the system identifies the similarity rate and adequacy of each object with respect to the realization of the process; At 2710/B5, the system trains machine-learning/deep-learning models based on the extracted data and information. Thus, the system may identify the lower and upper boundaries, i.e., the critical domain, and the optimal value of similarity threshold that lies in that interval—within a degree of uncertainty—by artificial intelligence—based on training appropriate machine-learning/deep-learning models. In this context, as the number of completed tasks increases the training dataset gets larger and more complex, thus, the degree of uncertainty with respect to the determination of lower and upper boundaries and the optimal value of similarity threshold that lies in that interval decreases, according to the embodiment.

Referring again to Process 2710 with respect to Deciding on the Value of Similarity Threshold: As shown in the above processes, the lower critical boundary value $L_{BD}$, the upper critical boundary value $U_{BD}$ and the optimal similarity threshold value $ST_{OP}$—which exists in the interval $[L_{BD}, U_{BD}+\varepsilon]$—are dependent variables, depending on the parameters 'root-object $O_B$' and 'context $C_B$', within the context of the ontological model $ST \leq S_{TO_n-O_B/C_B} \leq 1$. Thus, for each $O_B$, $C_B$ pair in the context of the ontological model $ST \leq S_{TO_n-O_B/C_B} \leq 1$, there exist a particular domain that includes particular critical values including a value providing the optimal similarity threshold that the system may—precisely or approximately—determine and set as the similarity threshold ST. Last but not least, based on those inherently existing critical values, the system may further perform optimization—for example in accordance with the operational needs with respect to the execution of a user generated set of instructions—and may determine the similarity threshold (ST) of a prospective super-object accordingly. Nevertheless, the similarity threshold may also be randomly or arbitrarily assigned, for example for purely experimental purposes.

Referring again to Process 2710 with respect to the Recap of the Whole Process: Based on the root-object ($O_B$) generated at 2708 and the context ($C_B$) identified at 2706, the system determines the critical boundaries, i.e., lower critical boundary ($L_{BD}$) and upper critical boundary ($U_{BD}$), and the optimal similarity threshold ($ST_{OP}$) of the prospective super-object. In some embodiments, the system solely focuses on identifying the optimal similarity threshold $ST_{OP}$ by utilizing the described methods with respect to identifying the critical boundaries and/or by utilizing other viable methods available. Next, based on the lower critical boundary ($L_{BD}$), and/or upper critical boundary ($U_{BD}$), and/or optimal similarity threshold ($ST_{OP}$) determined and— also—the assessment of operational needs, deciding on the similarity threshold (ST). Thus, the system identifies the association rule of the prospective super-object represented by the model $ST \leq S_{TO_n-O_B/C_B} \leq 1$.

Following the execution of the step 2710 the system embeds the context ($C_B$), the root-object ($O_B$), and the similarity threshold (ST) with the prospective super-object—along with other essential information- and stores the prospective super-object in a storage medium—such as by recording it in a database. Thus, the prospective super-object becomes a super-object.

As a result of the process 2700 the system generates a super-object while identifying the association rule '$ST \leq S_{TO_n-O_B/C_B} \leq 1$' for the establishment of an association between said super-object and an encountered object ($TO_n$).

FIG. 29 is the flowchart diagram 2800 illustrating an example process that includes steps with respect to identifying associations between objects and super-objects based on the association rule '$ST \leq S_{TO_n-O_B/C_B} \leq 1$' and executing the corresponding set of instructions accordingly in an environment comprising both digital and physical objects including resources of various data networks.

At 2802, the system analyzes, classifies, and clusters elements to semantically identify each object, i.e., each singular element and each cluster of interrelated elements, according to distinctive attributes, functions, and interrelationship. Next, for each identified object—including each singular element—the system generates an analogue reference $TO_n$ based on the extracted attributes, functions, and interrelationship, where the integer variable 'n' represents a sequence of numbers in which each number is assigned respectively to the identified objects in the environment (2804).

Referring again to Process 2802 with respect to Specific Contents Conveyed: According to various embodiments, even specific, i.e., not generic, contents (such as the video of 'Alien—1979 Theatrical Cut') conveyed by objects (such as, a video player belonging to a streaming website) may be defined as components of a process, thus may be identified as a component in the context of the attributes and functions of the conveying objects themselves (e.g., the video player). For example, said object above may be identified as 'a video player with certain attributes and certain functions including the function of conveying the full video of Alien—1979 Theatrical Cut, existing in the $N^{th}$ page of the website M'. Furthermore, standalone specific contents in the form of singular elements, such as a contextually undefinable unique web image that solitarily exists in a web environment may also be defined as a component of a process. For example, said web image may be identified as 'a contextually unidentified image with certain attributes and sole function of conveying itself as sampled and embedded herein for reference, existing in the $L^{th}$ page of the website M'. Last but not least, similar to the specific contents, the same principle is also applicable to specific events. For example, an object similar to the video player above may be defined as 'a video player with certain attributes and certain functions including the function of conveying the full video of Snowpiercer—2013 Theatrical Cut and making the video available for viewing in the US immediately after the first snowfall in the Sierra Nevada range until the first sky-pilot blooms on Mount Whitney, existing in the $K^{th}$ page of the website J'. Furthermore, this example also sets a precedent with respect to the conceptualization of events. For example, the event of 'the first snowfall in the Sierra Nevada in 2020' can be conceptualized as 'first snowfall' in the context of the region 'Sierra Nevada' and the year '2020'. N.B.: Therefore, since events—including the most specific ones—can be conceptualized then the disclosed mechanics can be structured—solely—upon objects and classes excluding the events.

At 2806, based on the analogue references—represented by $TO_n$—generated at 2804, the system compares each object with each super-object based on the association rule represented by the model $ST \leq S_{TO_n\text{-}O_B/C_B} \leq 1$ and establishes associations with the objects that fulfil the corresponding condition. In one embodiment the system utilizes machine learning for preliminary analysis of objects in order to optimize the process, such as by eliminating the irrelevant objects beforehand in order to gain speed in the process 2806.

At 2808, for each association established at 2806, the system compares each associated pair in the context of executing the corresponding instruction set and extracts the difference of each object—represented by $TO_n$ within the model—with the corresponding root-object—represented by $O_B$ within the model—of the corresponding super-object in said context. According to the embodiments, the step 2808 also includes utilizing the previous comparisons executed at 2806 of $TO_n$ and $O_B$ pairs.

At 2810, based on the differentials identified at 2808 and auxiliary resources related to the adaptation process of user generated applications—such as predefined adaptation rules or multimodal LLMs that are included in the system—, the system adapts each instruction set—that is initially developed for the corresponding root-object of the corresponding super-object—for the corresponding analogous object ($TO_n$) that is associated with the corresponding super-object at 2806—which may be either the most recent state or a viable analogue of the corresponding root-object—and executes the corresponding set of instructions for each analogous object ($TO_n$) that is associated with the corresponding super-object in the environment.

Referring again to Process 2810 with respect to Strategies related to Conditions that are Partially Satisfied due to Missing, Incompatible, or Insufficient Components of Associated Objects and/or Loss of Components of Associated Objects during a Process: In principle, once an object or a cluster of objects is associated with a super-object, conditions for the execution of a task may be partially satisfied due to missing, incompatible, or insufficient components of the associated objects and/or loss of components of the associated objects during a process. In other words, the system may partially realize a given task—such as the execution of a user generated application—due to—for example—a missing content, and/or an incompatible attribute and/or an insufficient function of an associated object with respect to the execution of the related procedures/operations. In order to facilitate the description, referring all to as 'missing components'; In the process of dealing with missing components, the system may attempt to i) dynamically create the missing components if possible, for example by creating an object that possess those missing properties, and/or ii) search accessible alternative sources in the environment in order to identify and associate the missing components, for example by identifying and associating an object that possess those missing properties. According to an embodiment, upon determination of the adaptation procedures—at 2810—with respect to the execution of a user generated application embedded with a super-object that is associated with an object or a cluster of objects, via utilizing disclosed methods and systems as well as state-of-the-art techniques: At 2810/1, the system identifies one or more missing components if any, such as a missing function or a certain content that is essential to fully perform the task; At

2810/2, the system dynamically generates components (objects) in order to compensate the missing components—if possible—and/or dynamically scans accessible environments for alternative objects that may compensate the missing components and/or dynamically creates composite objects from multiple objects collected from various environments and further modifies them according to the executional needs—if needed; At 2810/3, if succeeded, the system executes the task, else re-executes steps 2810/1, and 2810/2 in order to identify new ways or resources for the compensation of the missing components and the execution of the task; At 2810/4, during the process of execution of the user generated application if one or more components (objects) become unavailable or non-existing then the system re-executes the steps 2810/1, 2810/2, and 2810/3, according to the embodiment.

Referring again to Process 2810 with respect to Partial Execution of a User Generated Application: In essence, the system identifies each sub-process with respect to elements and/or clusters of interrelated elements, i.e., sub-clusters of the root-object, based on the context ($C_B$) and root-object ($O_B$). Next, the system identifies sub-process priority (i.e., order of importance of each independent sub-process) of the user-generated process based on the context ($C_B$). For example, most essential sub-processes having the highest rank, while least essential (e.g., relatively negligible) sub-processes having the lowest rank. Or, for example, prerequisite sub-processes having higher ranks than the corresponding conditional processes while corequisite processes having the same rank. Next, based on the order of importance of the sub-processes, the system prioritizes the sub-clusters of the root-object ($O_B$), i.e., identifies the priority of elements and clusters of interrelated elements. For example, the system may assign a weight coefficient for each element and each cluster of interrelated elements, with 1 being the most essential and with 0 being the least essential, e.g., relatively negligible. Based on weight coefficients assigned, the system and/or the developer of the respective user generated application may determine adaptation rules with respect to partial execution of the application. According to an embodiment, upon determination of the adaptation procedures—at 2810—with respect to the execution of a user generated application embedded with a super-object that is associated with an object or a cluster of objects, via utilizing disclosed methods and systems as well as the relevant state-of-the-art techniques: At 2810/B1, the system partially executes the user generated application according to the weight coefficients assigned.

As a result of the process 2800, the system identifies associations between super-objects and objects—among a set of encountered objects—and executes the each of the corresponding procedures, i.e., the each of the corresponding user generated applications that are embedded with the super-objects. In case of an alteration detected in one or more of the objects existing in the environment, all sub processes are executed in sequential order starting at 2802 and ending at 2810. According to various embodiments, in order to optimize the re-execution of the process 2800 in response to alterations, first the system preliminarily analyses the altered objects only and based on the previous information (e.g., previously extracted analogue references) determines the possible scope of the contextual effects of the alterations, i.e., identifies unaltered objects that may be affected contextually due to the altered objects. Thus, the system isolates the affected objects from the rest. Next, the system re-executes the process 2800 for the isolated objects—fully or partially depending on the needs—according to the embodiments.

Revisiting Transforming-Objects with respect to Processes 2700 and 2800: With respect to the execution of processes 2700 and 2800 for a transforming object, i.e., the embodiment of a transforming concept, the transition is straight forward and can be briefly described by an example. Consider the hypothetical example of a complex mechanical transforming system that transforms within the context of 'internal combustion engines' and a user generated process with respect to 'integrating a turbo charger to any suitable internal combustion engine encountered', wherein each manifestation of the transforming-object may vary from a gas turbine to a Wankel, from a Wankel to a piston engine, from a piston engine to a rocket engine including not yet invented—but possible—sub-classes in between. In this hypothetical example, i) the context of 'internal combustion engine' defines the boundaries of the transformations of the transforming-object (TO), ii) each possible manifestation of the transforming-object defines each possible encounter with the transforming-object that may be represented by an integer variable ($TO_n$), iii) the process of 'integrating a turbo charger' defines the context ($C_B$), and iv) the target object 'suitable internal combustion engine' with respect to the process defines the root-object ($O_B$).

Revisiting the Ontological Model '$ST \leq S_{TO_n - O_B/C_B} \leq 1$': The ontological model '$ST \leq S_{TO_n - O_B/C_B} \leq 1$' may be considered as a high-pass filter that passes objects with a similarity higher than a certain cutoff similarity, i.e., ST, and—depending on the quality of the execution of the relevant operations—eliminates or attenuates objects with similarities lower than the cutoff similarity, i.e., ST. Similarly said ontological model may be extended to act as a low-pass or band-pass filter by altering the upper and lower boundaries. For example, '$0 \leq S_{TO_n - O_B/C_B} \leq ST$' may be considered as a low-pass-filter that passes objects with a dissimilarity higher than a certain cutoff similarity, i.e., ST, and eliminates—or attenuates—objects with similarities higher than the cutoff similarity, i.e., ST. Or, '$ST_L \leq S_{TO_n - O_B/C_B} \leq ST_H$' may be considered as a band-pass-filter that allows through objects in a specified band of similarities between a lower cutoff similarity, i.e., $ST_L$, and a higher cutoff similarity, i.e., $ST_H$, and blocks objects with similarities above or below this band. In various embodiments, the system utilizes low-pass, high-pass and band-pass ontological models in order to execute complex tasks.

Similarity Control of a Transforming-Object based on Manipulation of the Transforming-Object:

FIG. 30 is a block diagram illustrating an example feedback control system with respect to controlling the similarity of a transforming-object ($TO_n$) relative to a reference object ($O_B$) in the context of a base concept ($C_B$) via manipulating the transforming-object. The block diagram represents the control system as a whole including the process as a component of the control mechanism itself. According to various embodiments, the example control system comprises: i) a comparator that compares setpoint $r(t) = ST_W$ and process variable $y(t) = S_{TO_n - O_B/C_B}(t)$ and identifies error $e(t) = ST_W - S_{TO_n - O_B/C_B}(t)$; ii) a 'proportional-integral-derivative' compensator that compensates the error $e(t)$ and generates control input $$u(t) = K_p S_{TO_n \sim O_B/C_B}(t) + K_i \int_0^t S_{TO_n \sim O_B/C_B}(T)dT + K_d dS_{TO_n \sim O_B/C_B}(t)/dt,$$

wherein $K_p$, $K_i$, $K_d$ are non-negative coefficients for the proportional, integral, and derivative terms respectively; iii) a process—aka plant—that manipulates a t-object ($TO_n$) according to the control input $u(t)$, wherein $TO_n$ is assumed to be manipulatable and the index n denotes any of the manipulatable transforming-objects that exist in the relevant universe; and iv) a feedback process that identifies the process variable $y(t) = S_{TO_n \sim O_B/C_B}(t)$, which is the output of the manipulation process—or equally the most recent state of the t-object. The control system may process digital, physical and hybrid t-objects and may utilize any of the disclosed methods and/or systems in any combination with respect to the operations especially related to the main process (i.e., the plant), feedback process, comparator and compensator according to the embodiments.

FIG. 31 is a graph representation of a hypothetical time response of a control system with respect to controlling the similarity of a transforming-object ($TO_n$) relative to a reference object ($O_B$) in the context of a base concept ($C_B$) via manipulating the transforming-object. According to the figure, $TO_n$ is $100 \times S_{TO_n \sim O_B/C_B}(t)$ % similar to $O_B$ in the context of $C_B$ while $TO_n$ is defined for $0 \leq S_{TO_n \sim O_B/C_B}(t) \leq 1$. At to, the setpoint $r(t)$ (shown with dash lines) is set to zero while the similarity rate of $TO_n$—relative to $O_B$ in the context of $C_B$, i.e., $y(t)$—is also zero. For the interval $[t_0, t_1)$, the process variable—or output—$y(t) = S_{TO_n \sim O_B/C_B}(t)$ is always zero wherein each feedback process, i.e., each similarity comparison process to identify the output, is assumed to be occurring over infinitesimal time intervals, i.e., each $\Delta t \to 0$. Therefore, it can be deduced that the transforming-object $TO_n$ stays unchanged relative to $O_B$ in the context of $C_B$ for $[t_0, t_1)$. However, that does not mean that $TO_n$ does not alter in that interval at all, it means that $TO_n$ does not alter relative to $O_B$ in the context of $C_B$. The interval $[t_1, t_3)$ is the transient phase. At $t_1$, $r(t) = 0$ becomes $r(t) = ST_W$, forming a step change in the setpoint and the control system begins manipulating TO, according to the control input $u(t)$ generated immediately after identifying the change in $y(t)$, i.e., generating the non-zero error $e(t)$. The control system manipulates $TO_n$ according to the control input, assuming that each manipulation process at each cycle also occurs over infinitesimal time intervals, i.e., each $\Delta t \to 0$. Following that, $y(t) = S_{TO_n \sim O_B/C_B}(t)$ increases overtime progressively by continuous manipulations, for example by additive or subtractive modifications, while the effects of the inherent alterations of $TO_n$ manifesting themselves. Thus, the process variable $y(t) = S_{TO_n \sim O_B/C_B}(t)$ exceeds the setpoint $r(t) = ST_W$, peaks at $t_2$, oscillates for a while—while damping down—and stabilizes at $t_3$. N.B.: Establishing the stability of a t-object also depends on the nature of that t-object, further, a controlled transforming-object in steady state may become unstable depending on its nature.

FIG. 32 is the flowchart diagram 3200 illustrating a cycle of an example process that includes steps with respect to similarity control of a transforming-object ($TO_n$) relative to a reference-object ($O_B$), in the context of a base-concept ($C_B$), for a setpoint ($ST_W$). According to an embodiment, the each of the control parameters i.e., proportional $K_p$, integral $K_i$, and derivative $K_d$, of the control system presented at FIG. 30, are preset individually according to the characteristics of the t-object and the control system itself, further they are tuned during the process for optimizing their effect on the process while the setpoint—or reference—is being set as a variable, e.g. a function of time, instead of a constant value. The process 3200 loops for k=1, 2, 3 . . . , K, wherein 1 is the first cycle and K is the last cycle of the control system, while $\Delta t$ is the time period for the processing of each step, i.e., 3202, 3204, 3206, 3208, and assumed to be infinitely small, i.e., $\Delta t \rightarrow 0$.

Feedback Process: At 3202, for $TO_n$ relative to $O_B$ in the context of $C_B$, identifying the similarity rate of $$TO_n\,|_{Cy_{k-1}}, \text{ i.e., } y\,|_{Cy_{k-1}} = S_{TO_n|Cy_{k-1} \sim O_B/C_B},$$

wherein the positive integer k is the index of the cycle, i.e., $k=1,2,3, \ldots, K$, $Cy_0$ (at $k=1$) denotes the very beginning of the first cycle, i.e., the beginning of the step 3202, and $TO_{n|Cy_{k-1}}$ denotes a derivative of $TO_n$ generated by the control system at $(k-1)^{th}$ cycle, i.e., $Cy_{k-1}$. Similarly, zero$^{th}$ cycle (at $k=1$) denotes the very beginning of the first cycle. For example, at the first cycle where $k=1$, $TO_{n|Cy_{k-1}}$ is $TO_{n|Cy_0}=TO_n$, i.e., denoting the original t-object $TO_n$ itself. N.B.: Since the control process is at the very beginning of the first step of the first cycle, there is no output $(y|_{Cy_{k-1}})$ of the main process/plant of the control system at that phase yet.

Comparator: At 3204, for $r(t)=ST_W$, identifying the error for cycle k, i.e., $el_{Cy_k}$, by subtracting the similarity rate (i.e., the system output if $k>1$, or $S_{TO_n-O_B/C_B}$ if $k=1$) from the value of the setpoint, i.e., $el_{Cy_k}=ST_W-S_{(TO_n-O_B/C_B)}|_{Cy_{k-1}}$.

Compensator: At 3206, for $el_{Cy_k}=ST_W-S_{(TO_n-O_B/C_B)|Cy_{k-1}}$, identifying the control input for cycle k, wherein the control input $ul_{Cy_k}$=proportional output (P)+integral output (I)+differential output (D); and wherein $P=K_p el_{Cy_k}$ for $k\geq 1$; $I=K_i$ $((el_{Cy_k}-el_{Cy_{k-1}})/2+el_{Cy_{k-1}})\Delta t$ for $k>1$, $el_{Cy_k}\geq el_{Cy_{k-1}}$ or $K_i((el_{Cy_{k-1}}-el_{Cy_k})/2+el_{Cy_k})\Delta t$, for $k>1$, $el_{Cy_{k-1}}>el_{Cy_k}$; $D=K_d$ $(el_{Cy_k}-el_{Cy_{k-1}})/\Delta t$ for $k>1$. N.B.: Alternatively, or in addition, a compensator may comprise any other appropriate control function to process error e(t) other than PID.

Main Process/Plant: At 3208, for $ul_{Cy_k}$=proportional output (P)+integral output (I)+differential output (D) manipulating the transforming-object $TO_{n|Cy_{k-1}}$ for cycle k in order to increase or decrease the similarity rate relative to $O_B$ in the context of $C_B$, according to the control input $ul_{Cy_k}$ and generating t-object $TO_{n|Cy_k}$ as the $k^{th}$ derivative of $TO_n$. N.B.: At the first cycle where $k=1$, t-object $TO_{n|Cy_1}$ is the $1^{st}$ derivative of $TO_n$, which may be denoted with $TO_n'$, or at the second cycle where $k=2$, t-object $TO_{n|Cy_2}$ is the $2^{nd}$ derivative of $TO_n$, which may be denoted with $TO_n''$. According to the embodiments, the system determines how to modify, i.e., manipulate, the previously modified t-object $TO_{n|Cy_{k-1}}$ in the current cycle $Cy_k$ based on the control input $ul_{Cy_k}$ that provides information about the magnitude and direction of the prospective modification. For example, depending on the instantaneous value, rate of change and acceleration of the control input $ul_{Cy_k}$, the system may modify the t-object $TO_{n|Cy_{k-1}}$ by additions or subtractions of elementary-objects or clusters of elementary-objects with small, medium or large size effects on the modification of the t-object, wherein those elementary-objects may exist in the repository of the control system or somewhere else in reach, or may be created by the control system itself via utilizing other systems and resources. In this process the system may utilize predictive methods for interpreting the control input e(t) in the interval $t_1$ to $t_k$ and calculating the likely impact of a modification—such as the impact of the addition of an elementary-object—on the outcome, such as predictive modelling, or deep learning, according to the embodiments.

As a result of the process 3208 the system completes one cycle $(Cy_k)$ of the control process of the modified—or if $k=1$ about to be modified—t-object $(TO_{n|Cy_{k-1}})$ and loops to step 3202 for $k=k+1$.

Converting a Method Involving T-Objects to a Method Involving T-Concepts:

Because objects are instances of concepts, the rules that apply to t-objects are also applicable to t-concepts. Therefore, virtually any method applicable to t-objects is also applicable to t-concepts since any t-concept may be defined to obey the laws of nature that apply to their physical counterparts or obey the rules that are defined for their digital t-object counterparts or obey the rules that are combinations thereof. For example, according to the embodiments, the process of 'controlling the similarity of a t-concept relative to a reference-concept in the context of a base-concept via manipulating the t-concept' is virtually the same process as the process of controlling the similarity of a t-object relative to a reference-object in the context of a base-concept via manipulating the t-object'. More concretely, said process comprises the following subprocesses: a) identifying the similarity rate of $TC_{n|Cy_{k-1}}$ for the $k^{th}$ cycle, wherein $TC_n$ is a concept that is selected to be manipulated in order to control its similarity relative to a reference-concept—such as a root-concept—$RC_B$ in the context of a base-concept $C_B$ for a setpoint r(t) while k is the index of the cycle, $Cy_k$ is $k^{th}$ cycle, and $TC_{n|Cy_{k-1}}$ is the derivative of the $TC_n$ generated in the $k-1^{st}$ cycle while $k\geq 1$ and $TC_{n|Cy_0}=TC_n$; b) identifying the error $el_{Cy_k}$ according to the setpoint r(t) for the $k^{th}$ cycle; c) identifying the control input $ul_{Cy_k}$ according to the error $el_{Cy_k}$ for the $k^{th}$ cycle; d) manipulating $TC_{n|Cy_{k-1}}$ in order to increase or decrease the similarity relative to $RC_B$ in the context of $C_B$ according to the control input $ul_{Cy_k}$ and generating $TC_{n|Cy_k}$ as the $k^{th}$ derivative of $TC_n$ for the $k^{th}$ cycle; and e) re-executing the whole process, i.e., $a\rightarrow b\rightarrow c\rightarrow d\rightarrow e$, for the $k=k+1^{st}$ cycle. As can be seen, the process is the same process with some minor modifications such as: i) the ontological model '$ST\leq S_{TO_n-O_B/C_B}\leq 1$' becomes '$ST\leq S_{TC_n \sim RC_B/C_B}\leq 1$' wherein t-concept $TC_n$ corresponds to t-object $TO_n$ and reference concept $RC_B$ corresponds to reference object $O_B$; and ii) the concept of 'super-object' becomes the concept of 'super-concept', while the concept of 'root-object' becomes the concept of 'root-concept. In conclusion, virtually any method that is appliable for objects and/or t-objects are also appliable for concepts and/or t-concepts with minor modifications.

It can be argued that if all the information is known about an object, then that object can be accurately conceptualized, however the opposite is not true—i.e., not all concepts can be physically realized. Similarly, not all methods involving t-concepts may be converted to methods involving t-objects. For example, a t-concept that does not obey the laws of nature may not be represented by a physical t-object. Or more interestingly, a t-concept may possess such extraordinary properties and behave according to such extraordinary rules that it may not be represent by a digital t-object, i.e., may not be simulated within the context of a digital universe based on digital objects/digital t-objects and their relations. Furthermore, there may be physical t-objects that may not be represented/simulated by digital objects/digital t-objects. For example, theoretical feasibility of digitally simulating a singularity covered by an event horizon—with 100% accuracy—may be debatable. Or in general, theoretical feasibility of digitally simulating any process involving infinitely or infinitesimally small physical quantities such as time intervals that are shorter than the Planck time—with 100% accuracy—may be debatable due to the absurdity of trying to simulate a process that inherently may not involve any events. For instance, consider the process of a particle crossing the event horizon of a blackhole resulting in an increase in mass in the nucleus. It may be argued that such an event is happening right at the event horizon not beyond the event horizon, thus it may be concluded that since there is no event occurring at the core, there is no process to be simulated at the core. However there still must be a transition phase that occurs at the event horizon that may involve smaller than Planck unit physical quantities relating to the process by which the particle is absorbed, i.e., a transitional process for a particle crossing the event horizon by which the particle becomes a part of singularity while increasing the mass of the core and the surface area of the event horizon. Furthermore, since the surface area of the event horizon increases by the absorption of that particle, it may be concluded that the shrinkage of that particle may not be infinite, i.e., a non-zero quantity that is smaller than the Planck length, therefore there may be also a fundamental unit of length in the singularity similar to that of the Planck length outside the event horizon of the singularity. The exact opposite of this example may be the initial singularity that is theorized to be existed before the Planck Epoch, which yields the contradiction that if no process may occur in singularity than how the universe managed to pass to the phase of Planck Epoch from the initial singularity. N.B.: Irregardless, the proof of any singularity may also be the refutation of the Simulation Hypothesis assuming that digital computation—therefore digital simulation—may only occur outside of the event horizon. Examples can be augmented to support the proposition that there may be physical processes that are theoretically impossible to digitally simulate. Nevertheless, digital-objects may be used to simulate physical t-objects or t-concepts in many useful ways. Indeed, digital-objects—and especially digital web-objects—may be considered as great resources for evaluating the concept of t-objects due to their programmability for dynamic uncertainty in various forms such as complex transformations that can occur gradually over time or complex alterations that can occur rapidly or abruptly during interactions. N.B.: Rules that determine the behavior of a certain t-concept does not have to be based on physical, mathematical or any other known principes including the logical principles as long as they are precisely defined.

Recap of the Processes related to the Disclosed Ontological Model '$ST \leq S_{TO_n \sim O_B/C_B}(t) \leq 1$' in the context of Super-Objects:

A) According to various embodiments, the process of 'associating—already existing—super-objects with other objects, including adapting and executing each of the corresponding set of instructions' comprises the following subprocesses: A1) analyzing, classifying, and clustering digital and/or physical elementary objects that exist in an environment to identify each of the finitely many objects according to distinctive attributes, functions, and interrelationship, wherein each of said objects is either a singular elementary object or a cluster of interrelated elementary objects that presents on or connected to a data network as a resource of that data network; A2) generating, for each of the identified objects, an analogue reference $TO_n$, each of the analogue references uniquely identifying a corresponding one of the identified objects according to the extracted attributes, functions, and interrelationship; A3) comparing each of the identified objects ($TO_n$) with each of the super-objects based on the association rule represented by the ontological model $ST \leq S_{TO_n \sim O_B/C_B} \leq 1$, wherein $O_B$ is the root-object, $C_B$ is the context, and ST is the similarity threshold; A4) establishing associations with the analogous objects that fulfil the corresponding condition; A5) comparing each of the associated objects ($TO_{n|assoc}$) with the root-object ($O_B$) of the corresponding super-object to identify the difference in the context of the execution of the corresponding instruction set; and A6) adapting each instruction set for the corresponding analogous object ($TO_{n|assoc}$) based on the difference identified and executing the corresponding instruction set of each super-object, according to the embodiments.

Note1: Regarding A1, an object may be digital or physical or any combination thereof, while being a resource of the data network that they are presented on or connected to, such as being a resource of the Internet of Things. Note2: Regarding A1 and A6, in the process of collecting data of objects and/or manipulating those that involve physical components, the system may utilize intermediary automated systems that comprise sensors, actuators, controllers, etc., such as robot agents working for the system to collect data and/or manipulate said type of objects. Note3: Regarding A2, the index n denotes any of the identified objects that exists in a particular environment as one of the consecutive numbers n=1, 2, 3, . . . . N, wherein N is the total number of the objects that exist in that environment. Note4: Regarding A5, the conditional index n|assoc. denotes any of the associated objects that is a member of the set of identified objects that exist in an environment.

B) According to various embodiments, the process of 'generating a super-object' comprises the following subprocesses: B1) receiving a selection of a user that comprises a cluster of various objects that are selected purposefully or randomly among a plurality of digital and/or physical objects in an environment including an instruction set developed—by the user or a 3$^{rd}$ party user—with respect to the selected cluster in order to manipulate the cluster, wherein each of said objects is either a singular elementary object or a cluster of interrelated elementary objects that presents on or connected to a data network as a resource of that data network; B2) analyzing, classifying, and clustering elementary objects of the selected cluster to identify each of the objects according to distinctive attributes, functions, and interrelationship; B3) generating, for each of the identified objects, an analogue reference, each of the analogue references uniquely identifying a corresponding one of the identified objects according to the extracted attributes, functions, and interrelationship; B4) analyzing, based on the analogue references generated, the instruction set with respect to the selected cluster to extract the context of the process, i.e., conceptualizing the process, and identifying the context '$C_B$ of the prospective super-object; B5) constructing, based on the context '$C_B$ identified and the analogue references generated, a model of the selected cluster that includes any essential content and generating the root-object '$O_B$ of the prospective super-object; B6) determining, based on the root-object '$O_B$ generated and the context '$C_B$ identified, the lower critical boundary '$L_{BD}$, and/or the upper critical boundary '$U_{BD}$, and/or the optimal similarity threshold '$ST_{OP}$ of the prospective super-object; B7) deciding on the similarity threshold '$ST$, based on the lower critical boundary '$L_{BD}$, and/or upper critical boundary '$U_{BD}$, and/or optimal similarity threshold '$ST_{OP}$ determined and based on the assessment of operational needs; B8) identifying, based on the context '$C_B$, root-object '$O_B$, and similarity threshold '$ST$, the association rule of the prospective super-object as '$ST \leq S_{TO_n \sim 'O_B/'C_B} \leq 1$; and B9) storing the identified association rule '$ST \leq S_{TO_n \sim 'O_B/'C_B} \leq 1$ of the prospective super-object including any other essential content to generate the corresponding super-object, according to the embodiments.

Note1: Regarding B1, a user maybe human or machine or combinations thereof, such as hybrid-intelligent agents. Note2: Regarding B2, according to the embodiments, any system can be conceptualized based on attributes, functions, and interrelationship, e.g., relations between sub-objects. Note3: Regarding B4, B5, B6, B7, B8, and B9, inverted comma on the left side of a parameter is to indicate the particularity of that parameter with respect to the super-object that is being developed.

C) According to various embodiments, the process of 'controlling the similarity of a t-object relative to a reference-object in the context of a base-concept via manipulating the t-object' comprises the following subprocesses: C1) identifying the similarity rate of $TO_{n|Cy_{k-1}}$ for the $k^{th}$ cycle, wherein $TO_n$ is a digital or physical object that is selected to be manipulated in order to control its similarity relative to a reference-object—such as a root-object—$O_B$ in the context of a base-concept $C_B$ for a setpoint r(t) while k is the index of the cycle, $Cy_k$ is $k^{th}$ cycle, and $TO_{n|Cy_{k-1}}$ is the derivative of the $TO_n$ generated in the $k-1^{st}$ cycle while k≥1 and $TO_{n|Cy_0}=TO_n$; C2) identifying the error $e|_{Cy_k}$ according to the setpoint r(t) for the $k^{th}$ cycle; C3) identifying the control input $u|_{Cy_k}$ according to the error $e|_{Cy_k}$ for the $k^{th}$ cycle; C4) manipulating $TO_{n|Cy_{k-1}}$ in order to increase or decrease the similarity relative to $O_B$ in the context of $C_B$ according to the control input $u|_{Cy_k}$ and generating $TO_{n|Cy_k}$ as the $k^{th}$ derivative of $TO_n$ for the $k^{th}$ cycle; and C5) re-executing the whole process, i.e., C1→C2→C3→C4→C5, for the k=k+1st cycle.

N.B.: Regarding C, according to the embodiments, Process A or B may further comprise utilizing the process C partially or fully in the process of maintaining an association between a super-object and an object or establishing an association with an object that partially satisfies the condition of the corresponding association rule.

According to the embodiments, Process A further comprises: A7) executing the corresponding set of instructions of a super-object partially if executing the instruction set fully is not possible; A8) identifying a missing sub-object that is the cause of a partial execution with respect to an associated super-object; A9) identifying a partial association rule $ST'≤S_{TO_n\sim O_B/C_B}≤1$ with respect to the missing sub-object; A10) searching in alternative environments to identify and associate with an analogous object that fulfils the condition; A11) re-adapting the instruction set in accordance with the analogous object that replaces the missing sub-object; A12) executing—fully—the instruction set; A13) storing data/information with respect to the association, adaptation, and execution processes of each of the corresponding super-objects; and A14) optimizing further the similarity threshold (ST) of each of the super-objects as corresponding data/information accumulates. Lastly, Sub-Process A3, wherein comparing each identified object ($TO_n$) with each super-object further comprises optimizing the process by preliminarily identifying objects that are irrelevant enough to be excluded from the comparison process in the first place, according to the embodiments.

Note1: Regarding A7, alternatively the system may bring the process to a partially executable level and stay on hold without executing the instruction set until the missing sub-object is found. Note2: Regarding A9, derivative symbol is chosen to indicate—obviously not the rate of change but—the contextual relation of the parameters of a partial association rule of a super-object to the parameters of the association rule of said super-object. Note3: Regarding A10, alternative environments may be—for example—other resources hosting various other resources such as a website that hosts various other web pages—which host various other web-objects—, or other physical environments that host various other physical resources that are connected to the data network that the system is connected to, such as a fully-automated manufacturing plant, etc.

Comparison of the Disclosed Ontological Model with the State-of-the-Art:

According to the first examination report of the U.S. patent application Ser. No. 16/886,265—filed May 28, 2020, published Sep. 17, 2020, now U.S. Pat. No. 11,625,448—with respect to 35 U.S. Code § 103, the inventive step that provides the patentability is determined to be the process of 'establishing an association between a pair of objects by comparing similarities of those objects within a certain context and associating the pair if the similarity rate determined in that context exceeds a predefined threshold of similarity wherein the context is determined by the structure of the corresponding uniform element identifier (UVEI)'. Said process—which has been developed to overcome the problem of dynamic uncertainty in complex information systems—involves the concept of a fuzzy semantic relation based on analogies between an object and a family of objects wherein the family of objects are defined for a domain of similarities between a certain similarity threshold and 1, i.e., [ST, 1] for 0<ST≤1, and designated by the corresponding context based on the corresponding rules that apply to the objects. N.B.: The determination of said process as the inventive step in the first examination also provided the required feedback to focus the research on that direction—which has enabled the technique to be further developed, and the relevant CIP patent applications have been filed in the process accordingly.

With respect to the developments in the relevant field—primarily in the field of uncertainty management in information processing—'Similarity Fuzzy Semantic Networks' is introduced by Castro et al.,—published Jun. 19, 2022—as a new knowledge representation model. Ref: Castro et al., 2022, *'Similarity Fuzzy Semantic Networks and Inference'/ Artificial Intelligence and Soft Computing, ICAISC* 2022, Springer. According to Castro et al. (2022), 'Similarity Fuzzy Semantic Networks' consist of fuzzy semantic networks with a specific family of semantic relations between objects or concepts, which is named as 'Similarity Semantic Relations'. According to Castro et al. (2022), similarity semantic relations are fuzzy semantic relations that represent that two objects or two concepts are similar in some sense or aspect in a certain degree: A is-similar-in-sense-D: α B, [Sec. 4.1, Eq. (8)] wherein D may be any topic or aspect, and it represents the assertion that objects or concepts A and B are similar in the sense D in α degree [Castro et al., 2022, Sec. 4.1]. Next, Castro et al., (2022) introduces the 'Meta-Relations' with respect to 'similarity fuzzy semantic networks'. Because Castro et al., (2022) consider the 'similarity fuzzy semantic networks' as an extension of the conventional 'fuzzy semantic networks', they consider both analogical and non-analogical semantic relations (i.e., edges or links of the network) as second order concepts of a singular semantic network and define the semantic relations between them as second order semantic relations while naming them as meta-relations, i.e., relations about relations. In this context, Castro et al., (2022) introduces the meta-relations between 'senses' and 'semantic relations' of the network based on the fact that for every sense D, each concept must have a fuzzy neighborhood of similar concepts in sense D, wherein those semantic relations that are related to sense D may be transmitted by 'similarity-in-sense-D' [Castro et al., 2022, Sec. 4.2]. In this context, Castro et al., (2022) introduce a meta-relation to be used for 'similarity inference', i.e., a relation that goes from domain-specific semantic relations to is-similar-in-sense-D relations; 'relationS isrelated-to: γ senseD', [Sec. 4.2, Eq. (9)] representing the assertion that relationS is related to senseD and thus, it can be transmitted by is-similar-in-sense-D [Castro et al., 2022, Sec. 4.2]. Next, Castro et al. (2022) introduce the 'Similarity Inference' and the 'Similarity Inference Rule' as a new kind of reasoning based on similarity. In this context, Castro et al. (2022) propose that new knowledge may be extracted upon propagation of semantic relations through the is-similar-in-sense-D by means of the 'Similarity Inference Rule': '{A is-similar-in-sense-D: $\alpha$ B; B relationS: $\beta$ C; relationS is-related-to: γ senseD}→A relationS: (γ*t($\alpha$,$\beta$) C' [Sec. 4.3, Eq. (10)] wherein t is a triangular norm, i.e., t-norm [Castro et al., 2022, Sec. 4.3].

Below is the comparison of the 'Similarity Fuzzy Semantic Networks' with the disclosed ontological model. The structure of semantic relations determines the structure of the ontological model. According to Castro et al., (2022), 'Similarity Semantic Relations', i.e., similarity fuzzy semantic relations, represent that two objects or two concepts are similar in some sense or aspect in a certain degree: A is-similar-in-sense-D: $\alpha$ B, wherein D may be any topic or aspect, and it represents the assertation that objects or concepts A and B are similar in the sense D in $\alpha$ degree [Castro et al., 2022]. The equivalent of the 'similarity fuzzy semantic relations' in the form with the notation that is used in this disclosure corresponds to the equality $S_{A \sim B/D} = \alpha$, wherein A and B are objects or concepts, D is a concept that determines the context, and a is the degree of relation between A and B in the context of concept D in the basis of analogies. In contrast, a semantic relation in the context of the disclosed ontological model may be the inequality $\alpha_L \leq S_{(TA \sim B)/D} \leq \alpha_H$, wherein TA is an unbounded t-object or t-concept, B is an object or concept, D is a concept—or an object to be conceptualized to become a concept—that determines the context, $\alpha_L$ is the lower similarity threshold, $\alpha_H$ is the upper similarity threshold, and the similarity interval $[\alpha_L, \alpha_H]$ is the domain of relation between TA and B in the context of concept D in the basis of analogies—which corresponds to a family of objects or concepts that are asserted to be the manifestations of TA. N.B.: In said example ontological model, in addition to TA, the reference object or concept B and/or the context D may further be defined as bounded t-objects or t-concepts while defining $\alpha_L$ and/or $\alpha_H$—for example—as a function of time—although $\alpha_H$=1 is expected to be the most commonly used. Overall, the equality $S_{(A \sim B)/D} = \alpha$ is indeed only a special case of the inequality $\alpha_L \leq S_{(TA \sim B)/D} \leq \alpha_H$; wherein A is—inherently—a manifestation of—unbounded—TA while the lower and upper similarity thresholds are defined to be equal ($\alpha_L = \alpha_H = \alpha$). In other words, 'TA→A' and '$\alpha_L = \alpha_H = \alpha$' yields the inequality to become the equality $\alpha \leq S_{(A \sim B)/D} \leq \alpha = S_{(A \sim B)/D} = \alpha$, and which shows that the ontological model 'similarity fuzzy semantic networks' is actually a special case of the disclosed ontological model.

Referring again to the above comparison in the context of bounded and unbounded t-objects and t-concepts: As stated before, unlike a bounded t-object or t-concept that transforms within contextual boundaries, such as boundaries of the quantum mechanics or logic, an unbounded t-object or t-concept that transforms without any contextual boundaries, i.e., transforms within the context of the whole universe to which it belongs, such as boundaries of the physical universe or the entire mathematics. In other words, an unbounded t-object or t-concept represents all possible objects or concepts that can be manifested in the corresponding universe respectively. Further, the general concept of 'transforming-entities' may be introduced as an entity that involve both t-object and t-concept properties, wherein unbounded t-entity may be defined as an entity that transforms within the context of all possible universes, thus involving both the existence and non-existence of everything. On the other hand, unlike an unbounded t-object or t-concept, the contextual boundaries of a bounded t-object or t-concept inherently and indirectly influences the context of the relation in the inequality $\alpha_L \leq S_{(TA \sim B)/D} \leq \alpha_H$. For example, consider the difference between a t-ball transforming in the context of all ball games and a t-ball that transforms in the context of only billiard games according to the rules set by the World Confederation of Billiards Sports—such as dimensional tolerances, colors, weight, etc. Such a difference with respect to self-induced contexts of t-objects or t-concepts inherently and indirectly influence the context of relations besides the context that the similarity comparison is executed. In conclusion, it may be deduced that the more self-induced context of a t-object or t-concept extends its boundaries the less influence it has on the context of a relation.

Referring again to the above comparison in the context of uncertainty representation: The former semantic relation further represents the degree of uncertainty between two objects or concepts based on their similarities within a certain context, wherein the degree of uncertainty is inversely correlated with $\alpha$, i.e., degree of relation stated by the equality $S_{A \sim B/D} = \alpha$. In short, as a increases the degree of uncertainty—which may be represented by $\mu$—decreases, thus, $\alpha \to 1 \Rightarrow \mu \to 0$. The latter semantic relation further represents the degree of 'dynamic uncertainty' between an object or concept and a t-object or t-concept based on their similarities within a certain context, wherein the dynamic uncertainty is induced by the t-object or t-concept, and the degree of dynamic uncertainty—which may be represented by $\Delta\mu$—is inversely correlated with the length of the interval $[\alpha_L, \alpha_H]$ or $|\alpha_L - \alpha_H|$, i.e., domain of the relation stated by the inequality $\alpha_L \leq S_{(TA \sim B)/D} \leq \alpha_H$,—which may be represented by $\Delta\alpha|_{\alpha_L}$ denoting the domain $\alpha_L + \Delta\alpha$. In short, as $\Delta\alpha$ increases the degree of dynamic uncertainty $\Delta\mu$, thus, $\Delta\alpha \to 1 \Rightarrow \Delta\mu \to 0$. N.B.: The family of alternating objects or concepts represented by a t-object or t-concept may be continuous or discrete wherein—for the latter—the total number of objects or concepts may be finitely or infinitely many. For example, digital t-objects that are resources of the Web may comprise only discreate objects—which may be finitely or infinitely many. For the case of a t-object that involves infinitely many objects, a web page that randomly generate an integer between −∞ and +∞ at each rendering may be considered—assuming that the web and the web page exist forever.

Referring again to the 'Similarity Fuzzy Semantic Networks and Inference' [Castro et al., 2022] with respect to adaptation of the 'Similarity Inference' and 'Similarity Inference Rule' to the disclosed ontological model: To recap, in the context of the disclosed ontological model, for each similarity relation there exists a context that defines the boundaries and the basis of the corresponding similarity relation. Said context may be any concept from the 'uniform visual element identifier' (UVEI) to the 'rules of physics'—wherein the former conveys a conceptualization of a visual element based on a certain rule, while the latter conveys the physical properties of the universe. The concept of a context that provides a basis of comparison i.e., a reference-context, is a fundamental component of the disclosed ontological model-indeed it is logically impossible to compare the similarity of two things without any basis of comparison. Thus, a 'reference-context'—or 'sense' as Castro et al., (2022) names it-constitutes the backbone of a relation based on analogies. Castro et al., (2022) proposes to include those to the inference mechanisms that are already being used for conventional semantic relations by considering analogical semantic relations—or 'similarity semantic relations' as they name it—also as second-order concepts—similar to that of the conventional semantic relations—and by defining the interrelationship among those relations—i.e., both analogical and conventional relations—as second order relations, i.e., meta-relations. In this context, according to Castro et al., (2022) the relation 'relationS is-related-to: γ senseD' is a meta-relation wherein 'relationS' is fuzzily related to 'senseD' in γ degree [Castro et al., 2022, Sec. 4.2]. Said meta-relation may be adapted to the disclosed ontological model as 'relationS is-related-to: $\Delta\gamma|_{\gamma_L}$ senseD' wherein 'relationS' is fuzzy-dynamically related to 'senseD' for any degree in the domain $\Delta\gamma|_{\gamma_L}$. Finally, Castro et al., (2022) propose the 'Similarity Inference Rule': '{A is-similar-in-sense-D: α B; B relationS: β C; relationS is-related-to: γ senseD}→A relationS: (γ*t(α,β) C' [Sec. 4.3, Eq. (10)] wherein t is a triangular norm, i.e., t-norm [Castro et al., 2022, Sec. 4.3]. Said 'Similarity Inference Rule' may be adapted to the disclosed ontological model as: '{A is-similar-in-sense-D: $\Delta\alpha|_{\alpha_L}$ B; B relations: $\Delta\beta|_{\beta_L}$ C; relations is-related-to: $\Delta\gamma|_{\gamma_L}$ senseD}→A relationS: $(\Delta\gamma|_{\gamma_L}*t(\Delta\alpha|_{\alpha_L}, \Delta\beta|_{\beta_L})$ C' wherein t is a triangular norm. Thus, the 'Similarity Inference Rule' may become the 'Generalized Similarity Inference Rule' and which may be utilized in processes involving similarity inference with respect to dynamically-fuzzy semantic relations based on analogies. N.B.: A non-similarity-based—conventional—derivative of the disclosed ontological model 'Dynamically-Fuzzy Semantic Networks/Relations' is also disclosed during the above argumentations.

Conclusions: i) 'Similarity Fuzzy Semantic Networks' is a special case of the disclosed ontological model; ii) Said adaptations with respect to meta-relations and similarity inference extent the scope of the disclosed ontological model 'dynamically-fuzzy semantic networks/relations based on analogies' to a universal ontological model that involves all semantic relations (e.g., 'crisp semantic relations', 'fuzzy semantic relations', 'analogically fuzzy semantic relations', etc.) such that any semantic relation may be considered as a special case of the disclosed ontological model in conjunction with the non-similarity-based—conventional—derivative 'Dynamically-Fuzzy Semantic Networks/Relations'. For example, dynamically-fuzzy semantic relation B relations: $\Delta\beta|_{\beta_L}$ C' becomes a fuzzy semantic relation 'B relationS: $\beta C$' for $\Delta\beta$→0 and $\beta_L$=β. Or, the same dynamically-fuzzy semantic relation 'B relationS: $\Delta\beta|_{\beta_L}$ C' becomes a crisp semantic relation 'B relationS: C' for $\Delta\beta$→0 and $\beta_L$=1; iii) The concept of dynamically-fuzzy—or dynamically uncertain—systems and relations may be further—self—applied to the disclosed ontological model in such a way that it may cover all the constants and variables comprised in the model. For example, in the dynamically-fuzzy semantic relation 'B relationS: $\Delta\beta|_{\beta_L}$ C', $\Delta\beta$ and $\beta_L$ may be further defined to be dynamically-fuzzy. Thus, even more complex systems involving dynamic uncertainty may be defined/modelled.

Assessment of Utilizing the Disclosed Ontological Model 'Dynamically-Fuzzy Semantic Networks/Relations based on Analogies' as a Generalized Ontological Model for Explaining Everything:

The possibility of utilizing the described ontological model as a fundamental framework that involves all the essential components—from Bayesian Statistics to conventional Fuzzy Semantics—for constructing the theory of everything—such as by creating digital simulations to evaluate hypothetical complex systems involving uncertainty or dynamic-uncertainty—is also assessed. Briefly, in essence, combining the concept of dynamic-uncertainty and the concept of analogies in semantics yields to encapsulation of enormous amounts of valuable and comprehensive information in a single semantic relation package, wherein the valuability is mostly induced by the identification of analogies between entities within certain contexts—which are inherently representations of universal facts in the context of analogies- and the comprehensiveness is mostly induced by the establishment of dynamically-fuzzy relations on the basis of relational bandwidths instead of relational degrees. In this context, said ontological model involves an enormous potential with respect to explaining things, such as explaining the underlying mechanics behind the causes and effects of physical or digital events. N.B.: Which inherently induce a computational cost function that grows exponentially as the quality and quantity of the relations increase.

With respect to the assessment of the importance of analogies in the context of explaining underlaying mechanisms of things; Consider the—highly simplified—example of a non-similarity-based—conventional—semantic network involving seven nodes that represent a dice and six individual sides (or faces) of that dice, wherein each edge (relation) that connects the dice to a face conveys the expected value of observing the corresponding face with respect to the each roll of the dice—and which is identified to be ⅙ for all faces based on pure observation. Further assume that said knowledge is extracted by two dimensional creatures with no perception of 3 dimensions. It is clear that said relations explain nothing with respect to the underlying mechanisms that regulate the relations between those nodes, i.e. each face of the dice. As is, said semantic network explains noting about the underlying mechanism of the phenomenon unless an explanation is theorized and injected into the semantic network—and which may become a very complex task as the semantic network grows and expands. However, consider a semantic network wherein each face pair of the dice is further compared based on their similarities in the context of their shapes and sizes. This time, the edges between the nodes, i.e., the relations between the faces of the dice, conveys the information of 'exact geometrical similarity', i.e., identicality, and which is indeed the needed critical knowledge with respect to the underlying mechanism that causes the observed outcome of a dice. In conclusion, analogies may be the key for explaining the reality and further they may be the essence of the interactions between the intuition and consciousness of a brain.

N.B.: Because the 2-dimensional—massless—creatures may not be able to collect data about the mass of the dice, the effect of distribution of mass, i.e. the role of center of gravity, on the outcome may be only observable through the deviations in the probability distribution of the dice. However, although they may never be able perceive the acting factor, they may still be able to come up with a good theory that explains the underlaying mechanism of that deviations since they have already obtained a grasp about the significant effects of the geometry in the system.

Examples of Possible Industrial Implementations

Implementation of the Envisioned Semantic Web Infrastructure for Superimposed Interactions (SWISI): The envisioned infrastructure (SWISI) promises to provide a steady and consistent interaction environment upon web-environments in exchange for the cost of the processing load on the system. Through the infrastructure both human and machine users may develop and deploy networks of intelligent modular sub-systems in the form of interoperable super-objects that dynamically manipulate web-objects to perform complex web-based tasks in complex and dynamic web environments in a stable and sustainable manner—irrespective of the complexity or dynamicity of alterations such as rapidly-developing radical transformations. In addition, users may further re-arrange those modular sub-systems in a multi-layered manner to enhance or customize the processes while interacting with already deployed sub-systems or interacting with each other through those sub-systems that act as network links. Consequently, providing such an infrastructure with such advanced capabilities may trigger an inevitable transformation of the entire Web—including its users—into an evolutionary system that inherently creates an infinite variety of constantly evolving fully-automated networks of modular sub-systems for multifarious industrial applications—which may be even considered as the informatical industrial revolution.

Comparison of the Superimposed Interaction Framework (SIF) with the Current Web-Based Interaction Paradigms with respect to Extracting Semantics of Web Resources: The current paradigms are aiming on deciphering the semantics of the entire Web as much as possible by collecting data—such as by web crawling—and processing that data to extract the semantics of contents while mostly excluding the structural semantics of the interfaces that convey those contents—thus passing over the contextual semantics of the whole. In essence, this approach—although constitutes a proven strategy for search engines or similar processes—is not feasible in terms of establishing complex networks of interoperable automated agents that manipulate web resources especially due to the dynamic uncertainty induced by the chaotic nature of the resources—including the resources that are known to be absolutely static. However, Superimposed Interaction Framework (SIF) aims on deciphering the semantics of resources only during interactions iteratively in real-time in an object-aware manner, i.e., extracting the whole contextual semantics of a target web resource by dynamically revealing both the semantics of contents and the interfaces that convey those contents in real-time—such as identifying the role/function of each object including each functional interrelationship among those objects. In essence, this approach considers the Web not as an environment of documents but as an environment of complex and dynamic interfaces conveying complex and dynamic contents. This strategy inherently extents the scope of the framework from digital resources to physical resources therefore covering also the Internet of Things or the Internet of Everything.

Improving other Web-Based Interaction Paradigms by utilizing the Envisioned Semantic Web Infrastructure for Superimposed Interactions (SWISI): An infrastructure provided to deliver on the promise of the SIF may further be utilized for the improvement of existing web-based interaction concepts. In essence, virtually any web-based interaction concept may benefit from the SIF especially in the context of dynamic uncertainty or problems induced in relation to dynamic uncertainty. Consider the concepts that have failed to reach their full potential from 'web annotations' to 'user-script based augmented browsing' or 'decentralization' to 'API conformity', SWISI may elevate those concepts to a super-dimension where they can reach their true potential, such as, in the form of 'dynamic associations that establish adaptive task-oriented interactions between web-objects of uncoordinated remote servers' or in the form of 'interoperating super-objects that function as dynamic integration APIs to provide robust coalitions between web environments provided by unrelated- and even rival-servers'.

Expected Impact on the Industry and Society:

Ensuring such an interaction capability may have an enormous impact on the industry resulting in shifts from the current interaction paradigms—therefore making the disclosure a disruptive technology. For example, in addition to the fully automatic deployment and maintenance facilities that it may provide, the envisioned infrastructure may also provide a low-code/no-code application development environment where layman users—besides expert users—may develop, arrange, and deploy—maintenance-free—intelligent modular sub-systems. Thus, the infrastructure may pave the way for the development of an enormous variety of unprecedented modular sub-systems created by masses. For example, any component of a website may be modified in order to improve the corresponding services. Or, components of even rival websites may be virtually integrated to facilitate incoordination, such as for real-time data extraction or mining. Or, a real-time evaluation and signalization mechanism may be formed, where existing or circulating contents are automatically identified, marked and flagged to indicate the presence of a remarkable condition—such as fake, suspicious or doctored news-wherever they appear. N.B.: For example, users may further involve into the discussion about a flagged content by either supporting or challenging the evidence provided by the automated agent or interact with each other about that content right on the spot—such as by posting or commenting their arguments—, regardless of technical and structural limitations or limitations imposed through administrative regulations—such as unfair moderation or censorship—of the websites where the suspicious or controversial content appears.

Consequently, it may be realistic to assume that in the long run the envisioned infrastructure may even result on a shift from the current social interaction paradigms. For example, since the envisioned infrastructure (SWISI) inherently provides users with the ability to connect and interact with each other through any content of any web-resource—that exists or connected to the internet including physical resources of IoT—, the whole Web may function as a global platform where independent decentralized social networks may be ignited wherever and whenever needed. Therefore, the infrastructure may pave the way for web-wide social networking without borders and thus may even make the existing centralized monopolistic platforms, such as Facebook™, Twitter™, Instagram™ etc., redundant in the long run, by extending the borders of interaction far beyond their scope. All in all, a totally new industry may thus be formed that is capable of creating unprecedented radical solutions, while autonomous environments flourish within the initiative of users. Last but not least, employing such an infrastructure may not only pave the way for the emergence of radical solutions that may transform the industry, but also may pave the way for the emergence of autonomous environments that may transform the society. Through such environments, ordinary internet users may become publishers and broadcasters anywhere on the Web, or may become web developers and service providers throughout the Web, or may just become nodes of a web-wide social network without borders- and echo chambers.

Ethical, Legal, and Fair Use Issues of Industrial Implementations: In essence, an infrastructure constructed based on the methods and systems described herein may provide unparalleled capabilities to its users. In this context, some user generated applications may exceed the limitations dictated by the laws of the regions where they are applied. To eliminate any ethical and legal problem that may arise on behalf of the infrastructure provider, the envisioned infrastructure may administratively operate similarly to an 'application infrastructure provider' (AIP). In this context, the infrastructure acts as an intermediary only (similar to that of web hosting or cloud service providers), where all responsibility regarding services provided through the infrastructure may be on developers and/or service providers both legally and ethically. Accordingly, all kinds of violations and their consequences including legal sanctions may solely bind the developers and/or service providers. Nevertheless, the infrastructure provider may still impose restrictions in order to regulate the services to be provided by developers and/or service providers within the scope of regional laws and universal ethics including ethics in AI.

Note1: Within the scope of SIF, even a simple static web page has an enormously rich interactivity potential regardless of its popularity. Such a development may truly liberate social interactivity from the bounds of social media websites by providing an unbounded social interaction alternative webwide and thus may deeply affect websites/webpages that are currently idle, especially in terms of an increase in demand. Indeed, it may be questioned that 'why someone should express himself or herself on a $3^{rd}$ party intermediary platform about a subject, instead of expressing himself or herself right on the source of the subject matter when applicable'. Note2: Employing SWISI may further influence various fields of science and technology with also the idiosyncratic 'big data' that it may collect and accumulate. For example, SWISI may automatically collect complete data/information for each interaction process within the system, such as complete data/information about each software development and deployment process including the processes by which users interact with these applications, thus may pave the way for the accumulation of a big data of comprehensive processes. Note3: SWISI may further utilize deep learning and said collected big data of comprehensive processes for creating and conceptualizing content and application ideas by itself.

Example Cases:

The example cases below—which are presented through hypothetical developer users—may be realized through an infrastructure (SWISI) provided for both individual and corporate enterprises who may develop and deploy their own applications to provide services within the scope of the interaction options of SIF. As mentioned above, the infrastructure may be operated in a similar way to an application infrastructure provider (AIP) such as in the form of a cloud service that provides the computing and operational infrastructure for developing, deploying, and managing enterprise class applications, while the infrastructure provider is exempted from legal and ethical liability related to the activities of individual or corporate service providers.

Example Case for Evaluation of Information: The Wikipedia™ website provides an internal evaluation mechanism by which wiki users may evaluate any bit of information e.g., a word, a sentence, a paragraph, a picture, a video, an audio, etc., of a wiki article right on the spot, by marking, linking, reporting, annotating, opening up a discussion, offering an alternative etc. In this context, Wikipedia™ may develop and deploy its own 'Superimposed Wikipedia Application' through the envisioned infrastructure in order to extend this particular service webwide and enable wiki users to evaluate any information on any web page right on the spot. Similarly, fact checking organizations like BBC, AFP, Le Monde™, etc. may develop and deploy their own 'Fact Checking Superimposed Applications' through the envisioned infrastructure for automatically detecting suspicious news items anywhere on the web (e.g., detecting their source pages, circulating link previews, quotations, etc.) and automatically flagging wherever they appear, including highlighting the disputable fragments and opening them up for public discussion and expert evaluation right on the spot. Similarly, a superimposed application for criticism may be developed and system users may criticize all kinds of information existing/circulating at the web via superimposed critical posts whose scoring and ranking may be based on quality, e.g., critical thinking, rather than on quantity, e.g., popularity. In such a mechanism, 'critical thinking' may be defined as an 'intellectually disciplined process of actively and skillfully conceptualizing, applying, analyzing, synthesizing, and/or evaluating information gathered from, or generated by, observation, experience, reflection, reasoning, or communication, as a guide to belief and action.' In this context, publishers may be expected to create posts conforming to the critical thinking criteria where they support analytical, positive, or negative criticism by concrete evidence. Such a mechanism may also contribute greatly to the dissemination of critical intelligence and skepticism. Uncensored analytical criticism directly at the very source may reduce social/massive reaction time and increase the quality feedback, thus enhancing overall intelligence.

Example Case for Social Networking: Social network platforms, such as Facebook™, enables users to create and publish their own interactive posts. A post appears on the author's Facebook page, while circulating on the news feed of other users' Facebook pages. In this context, Facebook™ may develop and deploy its own 'Superimposed Facebook Application' through the envisioned infrastructure in order to extend this particular service web wide and enable Facebook users to publish interactive posts in relation to any information on any web page right on the spot. For example, a Facebook user may initiate a discussion on an article of the constitution on the website of the Supreme Court of the United States or criticize a portion of a research paper published on the website of Harvard Medical School. Further, users may interact and socialize with each other through these posts thus they may build a web-wide social network without borders. In this context, the noticeability of users—who provide content on the Web—may be greatly enhanced. For example, an able critic may get noticed by millions—at the very source of the subject matter or information—by associating his/her own article on top of the article of a popular columnist in a global news website, e.g., New York Times™, Le Monde™, Die Welt™ etc. If liked, the user may gain followers and may be able to expand his/her presence worldwide through his/her own superimposed network. Similarly, any other social networking website like Twitter™, Instagram™, Reddit™, etc. or any online video platform like YouTube™, Vimeo™, Dailymotion™, etc., may develop and deploy its own 'Superimposed Application' through the envisioned infrastructure to extend its services radically, such as enabling its users to become publishers or broadcasters anywhere on the Web right on the spot.

Example Case for Improvement of Services: Enterprise service provider ESPA™ develops browser extensions, plugins, addons and various other applications for improvement of services and integration of websites. For some cases ESPA™ utilizes integration codes—such as APIs—provided by the websites. However, for most of the cases ESPA™ cannot utilize such codes since either they do not meet the needs, or they do not exist. In such cases experts of ESPA™ manually interpret each target web page to be processed/ manipulated and develop tailored applications in order to provide the targeted services. In the ongoing process, whenever a serviced web page is altered contextually and/or structurally, a maintenance expert manually interprets the alterations of that page and adapts the corresponding application/s according to the alterations. Because of all these inadequacies, ESPAT is able to offer only relatively simple applications with limited competence. However, ESPA™ may develop, deploy, and manage any application through the envisioned infrastructure in order to semi-automatically develop and automatically deploy said applications and automatically maintain the services that they provide, without the need of integration APIs. Further, by the competencies gained including the contextual adaptation ability with the automation provided by the envisioned infrastructure, ESPA™ may expand the scope of the services and develop much more competent applications. Besides, instead of tailored applications that are designed particularly for target web pages, ESPA™ may develop smart applications that are designed to fit similar websites contextually. For example, ESPA™ may develop a 'one size fits all' application package for online video platforms (e.g., YouTube™, Vimeo™ Dailymotion™, etc.) such that the pack comprises an application that manipulates video player interfaces for improvement of their features (e.g., by integrating an effects filter, a 2D to 3D convertor, a video editor for creating and sharing audio-visual commentaries, a star rating system for evaluating video content, etc.) including visually modifying the interfaces by integrating virtual controls (e.g., adding control buttons, displays, etc.), and another application that manipulates link previews of recommended videos (e.g., for displaying star ratings of corresponding videos). Moreover, ESPA™ may introduce non-generic dynamic interfaces such as lists, tables, forms, etc. to the system according to their roles/functions. Thus, ESPA™ may develop and deploy particular applications that manipulate and/or utilize system-defined unique interfaces for improvement of services and/ or integration of websites. For example, ESPA™ may develop an application that automatically collects data from bus, railway, and airline websites to provide users with better route alternatives (e.g., the cheapest or the fastest route combination) without the need for any manual or semi-automatic maintenance against any kind of alterations made by said websites. Further, ESPA™ may share these alternatives directly on said websites instead of presenting them on an external website, and even may create a second-hand online ticket market upon them for users who want to sell/buy already purchased tickets.

Example Case for Industrial Processes: Boeing Corporation utilizes various automation tools for various processes such as tools for Supervisory Control and Data Acquisition (SCADA), Manufacturing Resource Planning (MRP-II), Enterprise Resource Planning (ERP), etc. Most of these tools are centralized and server-based computing systems, accordingly, some of them are web-based technologies. In this context, Boeing may deploy the system for its own intranet and make the system work on web-based automation systems, thus may enable employees to associate/ integrate contents and features within certain limitations in accordance with these systems and corresponding processes. For example, both blue-collar and white-collar employees— such as manual workers, technicians, engineers, researchers, etc.—from various fields and units can be encouraged to review, criticize, and improve functions of the corresponding automation systems in accordance with their field of expertise—within certain limits. For example, a technician—such as an aircraft structures technician working in the fuselage construction process—may criticize a certain function of the automation system that operates in his/her field of duty—such as a poorly designed interface of an MRP-II or SCADA system. And in response to that criticism, a colleague of his/hers—such as an aerospace engineer working in the same process—may develop and deploy an application that improves the interface in the context of that criticism. Thus, employees may autonomously contribute to the improvement and optimization of the processes by developing and deploying sub-systems that are virtually integrated into the automation systems, without any direct interference and completely independent of software developers. In the long run, accepted and useful applications may be permanently embedded in the system by the software developers. In addition, for industrial processes, strict limits may be set accordingly, so that interactions do not put production processes at risk.

Example Case for E-commerce: Individual entrepreneurs and software developers Ayse and Levent may develop, deploy, and manage an application that provides a superimposed e-commerce network on web-resources. For example, via the application, posts that includes goods or services in accordance with the context of web pages and/or web-objects may be published, such as by e-commerce websites or local businesses. For example, a post may be published in relation with a service presented in corporate websites (e.g., IBM™, Microsoft™, Google™, etc.), or in relation with a product existing in major e-commerce websites (e.g., Amazon.com, Alibaba.com, Walmart.com, etc.). Thus, small, and medium scale service providers or e-commerce enterprises including local businesses may compete against large scale major/global corporations virtually through the superimposed e-commerce network provided by the infrastructure. Further, system users themselves may become sellers of goods and providers of services anywhere on the web. For example, a local micro business or an individual seller may offer the advantage of possessing a niche product or proposing a niche service or offering a fast & free delivery option—which can be unbeatable when compared to the base e-commerce website (e.g., Amazon.com), thus, the target user may prefer the local business or individual seller. In general, a superimposed e-commerce network may pave the way for fair competition of the small to medium scale enterprises against large scale e-commerce websites worldwide. Also, services regarding e-commerce websites that are provided by independent websites (e.g., fake review analyzing engines/services) may be integrated by the application to the target websites. Thus, Ayse and Levent may create a superimposed e-commerce platform serving to Web users all over the world.

Example Case for Entertainment: Individual entrepreneurs and software developers Lea and Deniz (whom the inventor of the disclosed technology loves more than anything in the universe) may develop, deploy, and manage an application that provides a superimposed entertainment platform, by which both an infrastructure for superimposed games may be provided and a superimposed network that is fully devoted to entertainment may be set up. For example, objects of web pages that contain images may be transformed into virtual graffiti fields through the application so that network users may process/manipulate images if they wish so. Or more interestingly, various intelligent superimposed video games may be designed and developed based on the system's interpretation of web-objects of web-resources, such as an animated character, e.g., Pac-Man™, may digest the ASCII characters of a governmental site within the context of a proposed law while strolling on the web pages and the player (e.g., a government officer, a government sympathizer, etc.) may try to recover the digested ASCII characters. Thus, Deniz (who had motivated the inventor in terms of theorizing the concept of t-objects and t-concepts) and Lea (who has provided the inspiration the inventor needed in his worst times to carry on) may create a super-imposed gaming platform serving to Web users all over the world.

Additional Elaborations:

Elaborations on the Definitions of Some of the Terms and Abbreviations: i) 'User generated contents' and 'user generated software applications' are 'user inputs into the system' referred to as 'user input' or 'super-object'. 'User input' and 'super-object' are terms that have the same meaning and used interchangeably in the specification, drawings, etc., unless indicated otherwise. User inputs, i.e., super-objects, are user generated contents or user generated software applications that are associated with singular elementary objects and/or meaningful clusters of elementary objects. ii) An 'elementary visual object' corresponds to a 'visual element', in this context, a 'meaningful cluster of elementary visual objects' (i.e., a 'cluster of interrelated elementary visual objects') corresponds to a 'cluster of interrelated visual elements' and a 'web-object' corresponds to either an 'elementary web-object' or a 'meaningful cluster of elementary web-objects' (i.e., a 'cluster of interrelated elementary web-objects'). An 'elementary object' corresponds to an 'element', in this context, a 'meaningful cluster of elementary objects' (i.e., a 'cluster of interrelated elementary objects') corresponds to a 'cluster of interrelated elements' and an 'object' corresponds to either an 'elementary object' or a 'meaningful cluster of elementary objects', i.e., a 'cluster of interrelated elementary objects'. N.B.: Conceptually, a 'meaningful cluster of elements' is postulated to be identical to a 'cluster of interrelated elements' based on the assumption that interrelationship reveals meaningfulness. iii) An object may be any digital or physical object including their combinations. For example, an object may be a digital object that contains data and code, wherein data may be in the form of fields (i.e., attributes or properties), and code may be in the form of procedures (i.e., methods)—as in object-oriented programing. Or an object may be a physical object that contains only physical elements, such as a hammer, a table, a revolver, etc. Or an object may be a physical object that contains both mechanical elements and digital elements, such as an embodiment of a physical system comprising a digital control system (e.g., an electric vehicle, a jet engine, a nuclear fusion reactor, etc.). Lastly, any identifiable object that is present on or connected to the World Wide Web is a web-object. In other words, a web-object is any object that is a resource of the Web. In this context a web-resource is a web-object unless it is not an abstract web-resource. iv) The term 'context' is used in the meaning of 'the interrelated conditions in which something exists or occurs' (Ref: Merriam-Webster Dictionary) or 'the circumstances that form the setting for an event, statement, or idea, and in terms of which it can be fully understood and assessed' (Ref: Oxford Languages). In this regard, the term 'contextual' is used in the meaning of 'about context', but also in the meaning of 'content wise', 'related to content', etc. v) The terms: 'identifying', 'determining', 'extracting', 'detecting', etc. have been used in a similar sense and may be used interchangeably unless indicated otherwise. vi) An 'interacted object' or a 'previously interacted object' is an 'object that is associated with one or more super-object'. vii) In the context of Superimposed Interactions, a 'user inter-action with a web-object' is the user's input to the system as a result of the process of generating and associating a super-object with that web-object such as all executable and non-executable content developed, arranged, linked, enclosed, etc. by the user including all information created by the system with respect to that user input, i.e., super-object-unless indicated otherwise. viii) The interaction cycle of a super-object with a non-interactive object can be exemplified as follows: Consider a static and non-interactive web page that conveys a-static and non-interactive-content for web users; Next, assume that some of these users are reacting to said content via super-objects; Next, assume that the reacted web page itself is now reacting to those super-objects either via/through super-objects or by altering its content and so forth. ix) The term 'analogy' is used in the meaning of 'a correspondence or partial similarity' or 'a comparison between one thing and another'. The term 'analogue' is used in the meaning of 'a thing seen as comparable to another' and depending on the context also used in the meaning of 'representation by a continuously variable quantity instead of binary'. x) The terms 'property' and 'attribute' are used synonymously, meaning 'a quality or feature regarded as a characteristic or inherent part of someone or something'. xi) The term 'informatical' is used in the meaning of 'related to or based on representation and processing of information' which is proposed herein as a more general alternative to the term 'digital' in the context of universes—or elements of those universes—wherein the information may not be represented in forms of binary numbers. In this context, for example, a digital-object is an informatical-object, however, an informatical-object may be or may not be a digital-object. xii) 'Superimposing' is defined herein as the combined process of (a) associating a super-object with an element or a cluster of elements of a web-resource; (b) identifying a previously interacted 'element or a cluster of elements' or a suitable analogue of that 'element or cluster of elements'; (c) re-associating the corresponding super-object; and (d) executing that super-object according to the corresponding element or cluster of elements while adapting the executional procedures to the current state of the initially interacted 'element or a cluster of elements' or the suitable analog of that initial 'element or cluster of elements'. xiii) Superimposed Interactions or formerly named as Superimposed Communication is defined herein as the interactions with respect to superimposing, and 'Superimposed Networking' is defined herein as the networking based on superimposing. xiv) A superimposed application is a cluster of one or more super-objects developed to execute a certain web-based task. Similarly, a superimposed content is a cluster of one or more 'passive' super-objects.

Referring again to Elaborations on the Definitions of Some of the Terms and Abbreviations: i) A 'user input' should not be confused with web page activity such as detecting a pointing device input on a visual element field, clicking a button with the pointing device, operating a pull-down menu, and/or other operations by a user on a rendered web page and/or visual element that do not involve user generated input. However, said web page activity or any kind of user activity—including interpretations of physical activity, such as sentiment analysis of users—may also be collected, encapsulated, and used as data inputs with respect to a super-object. Furthermore, in principle, any kind of input, such as live camera streams or signal outputs of industrial sensors, may be used to generate user generated contents or used as data inputs and/or references for user generated software applications. ii) The previously used term 'Superimposed Communication' is replaced with the term 'Superimposed Interaction' due to the fact that the disclosed methods and systems—including the parent patented application—are about interactions beyond communications. Nevertheless, both terms have the same meaning and can be used interchangeably. iii) The previously used term 'relationships' is replaced with the term 'relations' due to grammatical preferences. Nevertheless, both terms have the same meaning and can be used interchangeably. iv) The term 'alteration' is used in the meaning of any kind of change such as adjustments, modifications, transformations, additions, deletions, etc., that may occur progressively or abruptly both contextually and structurally. v) A superimposed application—which is also a user generated software application associated with a web-object—is a structure comprising one or more super-objects. Similarly, a superimposed content—which is a user generated content associated with a web-object—is a special case of a superimposed application that has a null set of instructions. Thus, a superimposed content is also a super-object or more precisely, a 'passive super-object'. vi) Super-objects may be developed by human users, or machine users, or by the system itself, or any combination thereof collectively. vii) The system may provide its own APIs developed to communicate with 'machine users' (i.e., other computer systems), thereby enabling machine users to have the capabilities available to 'human users' and beyond. viii) An information space is the set of concepts, and relations among them, held by an information system. ix) Within the context of this disclosure, the extent of the concept of 'web-object' is not limited with the components of web pages in contrast to the typical use of the term. In essence, web-objects are components or clusters of components of digital or physical web-resources present on or connected to the Web including APIs. In other words, a web-object is any object that is a resource of the Web, and not limited with the objects of web pages. On the other hand, a web-object is not the equivalent of a web-resource since 'abstract resources' are also considered as web-resources according to the universally accepted definition of the concept of 'web-resource'. However, a digital or physical representation of a concept, such as a mathematical formula stored as text in a PDF file, or stored as writing on physical paper, is considered as a web-object according to the subject-matter. Thus, the concept of web-object also comprises abstract resources indirectly. x) Although digital web-objects are usually components of websites/web pages, they can also be digital components of physical web-objects, such as a program embedded in a robot that is connected to the IoT. xi) Because interaction with—only—digital web-objects exclude physical web-objects, the remaining interactable web-resources in this context are assumed to be websites/web pages or contents or components of websites/web pages of some sort even if they are not.

Elaborations on the Comparison of Super-Objects with Web Annotations in the context of Establishing Associations between Web-Objects: According to the World Wide Web Consortium (W3C) standards, a web annotation is a set of connected resources—typically including a body and target—and conveys that the body is related to the target. In essence, a web annotation conveys the information that a particular object is related to another particular object in an object-based manner. Unlike a web annotation, a super-object conveys a model of a relationship—including the reason of that relationship—between a body and a root-object in an object-oriented manner—i.e., involving abstraction, inheritance, polymorphism and encapsulation—to be used as a reference to establish dynamic associations during encounters with similar objects. More concretely, a super-object conveys: i) a reference for an analogy—generated in the context of the task of said super-object—comprising one or more of the attributes, such as functions and other distinctive properties, of a root-object that is used to identify similar web-objects to be associated with; and ii) a set of instructions—developed in relation to the root-object—for dynamically processing analogous web-objects—including predefined rules to be used in the process of determining the adaptation procedures. In this context, in the process of re-establishing an association of a super-object with a suitable web-object in a variable target environment, the analogue reference conveyed is compared with the recently extracted analogue references of the web-objects for identifying similarities—postulated to be valid within predefined similarity thresholds—during the rendering and/or scanning of that target environment—such as a singular web page or multiple pages of various websites—by—for example—a client. Once an association is established then the adaptation procedures are determined based on the interpretation of the difference between the representations, i.e., 'the analogue reference of the root object' and 'the analogue reference of the associated web-object' at the moment of encounter. For example, unlike web annotations, since there is no target object to search for, there are no residual super-objects or—more importantly—false associations and executions. Such instabilities are inherent in the paradigm of web annotations, for example in the form of false annotations or orphan—i.e., residual—annotations due to the object-based searching, such as in between DOM states. To sum up; Determination of conditions for maintaining or terminating an association between two objects is a multi-layered ontological problem. In contrast, the disclosed approach neither relies on establishing object-based links, nor on object-based adaptation and processing, rather, relies on object-aware analogue links and object-aware adaptation and processing—probably a much more natural 'human brain like' linking and adaptation mechanism. Thus, when compared with the state-of-the-art, said approach does not involve web crawling, scraping, or archiving web resources; keeping track of states and activities; recording and re-constructing intended previous versions of document object models to identify the correct representations, etc. But more interestingly, because a model of a relationship-between a body and a root object—is used as a reference to establish associations during encounters with similar objects, any segment identifier, e.g., URIs of objects, may be totally excluded from the process of establishing and maintaining associations. Furthermore, in theory, even the URLs of web pages or websites may be eliminated and thus the conventional resource identifiers may be totally ignored.

Additional Statements:

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects (of any kind), and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively, or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The invention claimed is:

1. A method comprising:

receiving a selection by a user that comprises a cluster of various objects that are selected purposefully or randomly among a plurality of informatical and/or physical objects in an environment including an instruction set developed by the user or a $3^{rd}$ party user with respect to the selected cluster in order to process the cluster, wherein each of said objects is either a singular elementary object or a cluster of interrelated elementary objects presented on or connected to a data network as a resource of said data network;

analyzing, classifying, and clustering singular elementary objects of the selected cluster to identify sub-clusters of interrelated elementary objects in rank order (including each singular elementary object as a $zero^{th}$-order cluster), to identify each of the objects according to distinctive attributes, functions, and interrelationship;

generating, for each of the identified objects, an analogue reference, each of the analogue references uniquely identifying a corresponding one of the identified objects according to the extracted attributes, functions, and interrelationship, wherein generating the analogue reference comprises generating an analogue reference for each identified sub-cluster identified in rank order;

analyzing, based on the analogue references generated, the instruction set with respect to the selected cluster to extract the context of the process, thereby conceptualizing the process, and identifying the context $^1C_B$ of the prospective super-object;

constructing, based on the context $^1C_B$ identified and the analogue references generated, a model of the selected cluster that includes any essential content and generating, according to that model, the root-object $^1O_B$ of the prospective super-object;

determining, based on the root-object $'O_B$ generated and the context $'C_B$ identified, the lower critical boundary $'L_{BD}$, the upper critical boundary $'U_{BD}$, and the optimal similarity threshold $'ST_{OP}$ of the prospective super-object, wherein a lower critical boundary $L_{BD}$ is defined as a similarity rate, measured in the context $C_B$ with respect to the root-object $O_B$, of the least similar object that is adequate for the realization of the respective process among all adequate objects in the universe to which the object belongs, and an upper critical boundary $U_{BD}$ is defined as a similarity rate, measured in the context $C_B$ with respect to the root-object $O_B$, of the most similar object that is inadequate for the realization of the respective process among all inadequate objects in the universe to which the object belongs, and an optimal similarity threshold $ST_{OP}$ is defined as a similarity rate, measured in the context $C_B$ with respect to the root-object $O_B$, that provides (i) the highest probability of success of encountering an adequate object among all objects that satisfy the condition of association, while also providing (ii) the widest coverage for the set of adequate objects, wherein $[0, L_{BD})$ defines a domain in which all objects are inadequate, and $(U_{BD}, 1]$ defines a domain in which all objects are adequate, and $(L_{BD}, U_{BD})$ defines a critical domain in which an encountered object is either adequate or inadequate for realization of the respective process, wherein, within the respective universe, $L_{BD}$, $U_{BD}$, and $ST_{OP}$ are dependent variables on the root-object $O_B$ and the context $C_B$, such that for each $(O_B, C_B)$ pair there exists a particular critical domain bounded by inherently existing particular critical values, including a value providing the optimal similarity threshold $ST_{OP}$, wherein determining the lower critical boundary $'L_{BD}$, the upper critical boundary $'U_{BD}$, and the optimal similarity threshold $'ST_{OP}$ further comprising:

(i) selecting a subset from the set of all singular elementary objects and/or all clusters of interrelated elementary objects existing in the respective universe;

(ii) determining, for each of a plurality of objects $(TO_n)$, a corresponding similarity rate represented by $S_{TO_n\sim'O_B/'C_B}$, measured in the comparison process between the object and the root-object $'O_B$ in the context $'C_B$, represented by $TO_n\sim'O_B/'C_B$, and an adequacy or inadequacy determination indicative of whether the instruction set successfully realizes the respective process;

(iii) training at least one machine learning model using the similarity rates and the adequacy or inadequacy determinations; and (iv) using said machine learning model to determine at least one of: the lower critical boundary $'L_{BD}$, the upper critical boundary $'U_{BD}$, or the optimal similarity threshold $'ST_{OP}$ of a prospective super-object;

deciding on the similarity threshold $'ST$, in accordance with the operational needs, based on the critical domain bounded by the lower critical boundary $'L_{BD}$, and the upper critical boundary $'U_{BD}$, and the optimal similarity threshold $'ST_{OP}$ determined, wherein the probability of success in arbitrary encounters that satisfy the condition of association increases as $'ST$ approaches $'U_{BD}$, and setting $'ST$ larger than $'U_{BD}$ guarantees success for all matches, and the coverage for the set of adequate objects increases as $'ST$ approaches $'L_{BD}$ and reaches its maxima at $'L_{BD}$, such that setting $'ST$ smaller than $'L_{BD}$ does not further increase the coverage, while the optimal similarity threshold $'ST_{OP}$ provides the optimal efficiency for the $O_B$–$C_B$ pair by providing (i) the highest probability of success to encounter an adequate object among all objects that satisfy the condition of association and (ii) the widest coverage for the set of adequate objects;

identifying, based on the context $'C_B$, root-object $'O_B$, and similarity threshold $'ST$, the association rule of the prospective super-object as $'ST \le S_{TO_n\sim'O_B/'C_B} \le 1$, wherein $TO_n$ is a transforming object, postulated to transform unpredictably between manifestations, appearances, or observations, thereby representing dynamic uncertainty and vagueness induced by such transformations, and wherein the index n denotes an nth individual object identified among encountered objects in the environment;

embedding, with the prospective super-object, the context $'C_B$, the root-object $'O_B$, and the similarity threshold $'ST$, and storing the prospective super-object, including any other essential content, to generate the corresponding super-object; and setting the association rule $'ST \le S_{TO_n\sim'O_B/'C_B} \le 1$ for establishing association between the super-object and an encountered transforming object $TO_n$;

revisiting the environment;

analyzing, classifying, and clustering informatical and/or physical elementary objects that exist in an environment to identify each of the finitely many objects according to distinctive attributes, functions, and interrelationship, wherein each of said objects is either a singular elementary object or a cluster of interrelated elementary objects presented on or connected to a data network as a resource of said data network;

generating, for each of the identified objects $(TO_n)$, an analogue reference, each of the analogue references uniquely identifying a corresponding one of the identified objects according to the extracted attributes, functions, and interrelationship, wherein each of said identified objects is treated as a transforming-object, even if the identified object is not a transforming-object;

comparing each of the identified transforming objects $(TO_n)$ with a stored super-object by comparing (i) an analogue reference generated for $TO_n$ with (ii) an analogue reference of the root-object (O_B) in context (C_B), to determine the similarity rate $S_{TO_n-O_B/C_B}$, and evaluating whether $S_{TO_n-O_B/C_B}$ satisfies the association rule $ST \le S_{TO_n-O_B/C_B} \le 1$, wherein $O_B$ is the root-object, $C_B$ is the context, and ST is the similarity threshold stored with the super-object;

establishing an association with an analogous transforming object $(TO_n)$ that fulfils the corresponding condition;

comparing the associated transforming object $(TO_n)$ with the root-object $(O_B)$ of the super-object to identify the difference in the context of the execution of the instruction set; and adapting, based on the difference identified, the instruction set for the corresponding analogous transforming object $(TO_n)$ and executing the instruction set.

2. The method of claim 1, further comprising controlling the similarity rate $(S_{TO_n-O_B/C_B})$ of the associated transforming object $(TO_n)$ relative to the root-object $O_B$, in the context $C_B$, for a setpoint r(t), wherein controlling comprises:

(i) identifying the similarity rate of $TO_{n|Cy_{k-1}}$ for the $k^{th}$ cycle, wherein $TO_n$ is an informatical or physical object that is selected to be manipulated in order to control its similarity relative to the root-object $O_B$ in the context of $C_B$ for a setpoint r(t) while k is the index of the cycle, $Cy_k$ is the $k^{th}$ cycle, and $TO_{n|Cy_{k-1}}$ is the derivative of the $TO_n$ generated in the $(k-1)^{th}$ cycle, while $k \geq 1$ and $TO_{n|Cy_0} = TO_n$;

(ii) identifying the error $el_{Cy_k}$ according to the setpoint r(t) for the $k^{th}$ cycle;

(iii) identifying the control input $ul_{Cy_k}$ according to the error $el_{Cy_k}$ for the $k^{th}$ cycle;

(iv) manipulating $TO_{n|Cy_{k-1}}$ in order to increase or decrease the similarity rate ($S_{TO_n \sim O_B/C_B}$) relative to $O_B$ in the context of $C_B$ according to the control input $ul_{Cy_k}$ and generating $TO_{n|Cy_k}$ as the $k^{th}$ derivative of $TO_n$ for the $k^{th}$ cycle; and (v) re-executing the whole process for the $(k+1)^{th}$ cycle, wherein said controlling maintains the similarity rate of the associated object relative to the root-object $O_B$ in the context $C_B$ at the setpoint r(t), via manipulating the associated object, as the associated object alters.

3. The method of claim 2, wherein identifying the control input $ul_{Cy_k}$ further comprises identifying, by a proportional—integral—derivative controller, a proportional output P, an integral output I, and a differential output D based on the error $el_{Cy_k}$, such that $ul_{Cy_k} = P+I+D$, wherein $P = K_p el_{Cy_k}$ for $k \geq 1$, $I = K_i((el_{Cy_k} - el_{Cy_{k-1}})/2 + el_{Cy_{k-1}})\Delta t$, $k > 1$, $el_{Cy_k} \geq el_{Cy_{k-1}}$, $I = K_i((el_{Cy_{k-1}} - el_{Cy_k})\Delta t$, $k > 1$, $el_{Cy_{k-1}} > el_{Cy_k}$, and $D = K_d(el_{Cy_k} - el_{Cy_{k-1}})/\Delta t$ for $k > 1$, wherein the proportional, integral, and derivative control parameters ($K_p$, $K_i$, $K_d$) are preset individually according to characteristics of the associated object and tuned during the controlling, and wherein the setpoint r(t) is a function of time.

4. The method of claim 2, wherein manipulating $TO_{n|Cy_{k-1}}$ further comprises performing at least one additive or subtractive modification to at least one singular elementary object and/or at least one cluster of interrelated elementary objects of $TO_{n|Cy_{k-1}}$, and wherein manipulating further comprises estimating an effect of the at least one additive or subtractive modification on the similarity rate $S_{TO_n \sim O_B/C_B}$ using predictive modelling and/or a deep learning model.

5. The method of claim 1, further comprising:

storing data/information with respect to the association, adaptation, and execution processes of each of the corresponding super-objects; and optimizing further the similarity threshold (ST) of each of the super-objects as corresponding data/information accumulates.

6. The method of claim 5, wherein optimizing further the similarity threshold of each of the super-objects further comprises adjusting the similarity threshold within a critical domain bounded by a lower critical boundary $L_{BD}$ and an upper critical boundary $U_{BD}$ corresponding to a root-object $O_B$ and a context $C_B$ of the respective super-object, and wherein optimizing further comprises updating the similarity threshold, as the stored data/information accumulates, to increase a probability of success of encountering an adequate object among objects that satisfy a condition of association while maintaining coverage for a set of adequate objects.

7. The method of claim 1, further comprising executing the corresponding instruction set of a super-object partially if executing the instruction set fully is not possible, or alternatively bringing the respective process to a partially executable level and staying on hold without executing the instruction set until a missing sub-object/component is identified and compensated.

8. The method of claim 7, further comprising:

identifying a missing sub-object/component that is the cause of a partial execution with respect to an associated super-object;

identifying a partial association rule $ST' \leq S_{TO_n \sim O_B/C_B} \leq 1$ with respect to the missing sub-object/component;

searching in alternative environments to identify and associate with an analogous object that fulfils the condition;

re-adapting the instruction set in accordance with the analogous object that replaces the missing sub-object/component; and executing the instruction set fully.

9. The method of claim 8, wherein compensating for the missing sub-object/component further comprises dynamically creating an object possessing properties of the missing sub-object/component and/or creating a composite object from a plurality of objects collected from a plurality of environments, and further modifying the created object or the composite object according to execution needs, and wherein, if executing the instruction set fully remains not possible, the method further comprises re-executing the identifying, searching, associating, and re-adapting steps until executing the instruction set fully becomes possible.

10. The method of claim 7, wherein executing the instruction set partially further comprises identifying sub-processes associated with sub-clusters of the selected cluster, determining a priority order of the sub-processes and/or assigning weight coefficients to elementary objects or sub-clusters according to essentiality, and partially executing the instruction set according to the priority order and/or the weight coefficients.

11. The method of claim 1, wherein prior to evaluating whether each identified transforming object ($TO_n$) satisfies the association rule $ST \leq S_{TO_n \sim O_B/C_B} \leq 1$, the method further comprises preliminarily identifying one or more objects that are irrelevant enough to be excluded from the association-rule evaluation.

12. The method of claim 1, wherein selecting a subset from the set of all singular elementary objects and/or all clusters of interrelated elementary objects existing in the respective universe further comprising inter-manipulating the singular elementary objects and/or clusters of interrelated elementary objects belonging to the selected subset, and identifying each possible object in the subset based on all possible outcomes of permutations and/or combinations of interactions between the existing singular elementary objects and/or clusters of interrelated elementary objects of the subset, wherein the respective universe is one in which any interaction is precisely observable and perceivable, and wherein, when the selected subset is finite, the all possible outcomes comprise a finite set of outcomes, and wherein inter-manipulating comprises manipulating the objects of the subset with respect to each other through permutations and/or combinations of interactions that occur between the objects of the subset, such that each possible object is represented by an outcome of at least one of said permutations and/or combinations of interactions.

13. A system comprising:

one or more processors; and memory storing instructions that, when executed by the one or more processors, cause the system to:

receive a selection by a user that comprises a cluster of various objects that are selected purposefully or randomly among a plurality of informatical and/or physical objects in an environment including an instruction set developed by the user or a $3^{rd}$ party user with respect to the selected cluster in order to process the cluster, wherein each of said objects is either a singular elementary object or a cluster of interrelated elementary objects presented on or connected to a data network as a resource of said data network;

analyze, classify, and cluster singular elementary objects of the selected cluster to identify sub-clusters of interrelated elementary objects in rank order (including each singular elementary object as a zeroth-order cluster), to identify each of the objects according to distinctive attributes, functions, and interrelationship;

generate, for each of the identified objects, an analogue reference, each of the analogue references uniquely identifying a corresponding one of the identified objects according to the extracted attributes, functions, and interrelationship, wherein generating the analogue reference comprises generating an analogue reference for each identified sub-cluster identified in rank order;

analyze, based on the analogue references generated, the instruction set with respect to the selected cluster to extract the context of the process, thereby conceptualizing the process, and identifying the context $'C_B$ of the prospective super-object;

construct, based on the context $'C_B$ identified and the analogue references generated, a model of the selected cluster that includes any essential content and generate, according to that model, the root-object $'O_B$ of the prospective super-object;

determine, based on the root-object $'O_B$ generated and the context $'C_B$ identified, the lower critical boundary $'L_{BD}$, the upper critical boundary $'U_{BD}$, and the optimal similarity threshold $'ST_{OP}$ of the prospective super-object, wherein a lower critical boundary $L_{BD}$ is defined as a similarity rate, measured in the context $C_B$ with respect to the root-object $O_B$, of the least similar object that is adequate for the realization of the respective process among all adequate objects in the universe to which the object belongs, and an upper critical boundary $U_{BD}$ is defined as a similarity rate, measured in the context $C_B$ with respect to the root-object $O_B$, of the most similar object that is inadequate for the realization of the respective process among all inadequate objects in the universe to which the object belongs, and an optimal similarity threshold $ST_{OP}$ is defined as a similarity rate, measured in the context $C_B$ with respect to the root-object $O_B$, that provides (i) the highest probability of success of encountering an adequate object among all objects that satisfy the condition of association, while also providing (ii) the widest coverage for the set of adequate objects, wherein $[0, L_{BD})$ defines a domain in which all objects are inadequate, and $(U_{BD}, 1]$ defines a domain in which all objects are adequate, and $(L_{BD}, U_{BD})$ defines a critical domain in which an encountered object is either adequate or inadequate for realization of the respective process, wherein, within the respective universe, $L_{BD}$, $U_{BD}$, and $ST_{OP}$ are dependent variables on the root-object $O_B$ and the context $C_B$, such that for each $(O_B, C_B)$ pair there exists a particular critical domain bounded by inherently existing particular critical values, including a value providing the optimal similarity threshold $ST_{OP}$, wherein determining the lower critical boundary $'L_{BD}$, the upper critical boundary $'U_{BD}$, and the optimal similarity threshold $'ST_{OP}$ further comprising:

(i) selecting a subset from the set of all singular elementary objects and/or all clusters of interrelated elementary objects existing in the respective universe;

(ii) determining, for each of a plurality of objects $(TO_n)$, a corresponding similarity rate represented by $S_{TO_n\sim'O_B/'C_B}$, measured in the comparison process between the object and the root-object $'O_B$ in the context $'C_B$, represented by $TO_n\sim'O_B/'C_B$, and an adequacy or inadequacy determination indicative of whether the instruction set successfully realizes the respective process;

(iii) training at least one machine learning model using the similarity rates and the adequacy or inadequacy determinations; and (iv) using said machine learning model to determine at least one of: the lower critical boundary $'L_{BD}$, the upper critical boundary $'U_{BD}$, or the optimal similarity threshold $'ST_{OP}$ of a prospective super-object;

decide on the similarity threshold $'ST$, in accordance with the operational needs, based on the critical domain bounded by the lower critical boundary $'L_{BD}$, and the upper critical boundary $'U_{BD}$, and the optimal similarity threshold $'ST_{OP}$ determined, wherein the probability of success in arbitrary encounters that satisfy the condition of association increases as $'ST$ approaches $'U_{BD}$, and setting $'ST$ larger than $'U_{BD}$ guarantees success for all matches, and the coverage for the set of adequate objects increases as $'ST$ approaches $'L_{BD}$ and reaches its maxima at $'L_{BD}$, such that setting $'ST$ smaller than $'L_{BD}$ does not further increase the coverage, while the optimal similarity threshold $'ST_{OP}$ provides the optimal efficiency for the $O_B$–$C_B$ pair by providing (i) the highest probability of success to encounter an adequate object among all objects that satisfy the condition of association and (ii) the widest coverage for the set of adequate objects;

identify, based on the context $'C_B$, root-object $'O_B$, and similarity threshold $'ST$, the association rule of the prospective super-object as $'ST \leq S_{TO_n\sim'O_B/'C_B} \leq 1$, wherein $TO_n$ is a transforming object, postulated to transform unpredictably between manifestations, appearances, or observations, thereby representing dynamic uncertainty and vagueness induced by such transformations, and wherein the index n denotes an nth individual object identified among encountered objects in the environment;

embed, with the prospective super-object, the context $'C_B$, the root-object $'O_B$, and the similarity threshold $'ST$, and store the prospective super-object, including any other essential content, to generate the corresponding super-object; and set the association rule $'ST \leq S_{TO_n\sim'O_B/'C_B} \leq 1$ for establishing association between the super-object and an encountered transforming object $TO_n$;

revisit the environment;

analyze, classify, and cluster informatical and/or physical elementary objects that exist in an environment to identify each of the finitely many objects according to distinctive attributes, functions, and interrelationship, wherein each of said objects is either a singular elementary object or a cluster of interrelated elementary objects presented on or connected to a data network as a resource of said data network;

generate, for each of the identified objects $(TO_n)$, an analogue reference, each of the analogue references uniquely identifying a corresponding one of the identified objects according to the extracted attributes, functions, and interrelationship, wherein each of said identified objects is treated as a transforming-object, even if the identified object is not a transforming-object;

compare each of the identified transforming objects $(TO_n)$ with a stored super-object by comparing (i) an analogue reference generated for $TO_n$ with (ii) an analogue reference of the root-object (O_B) in context (C_B), to determine the similarity rate $S_{TO_n-O_B/C_B}$, and evaluating whether $S_{TO_n-O_B/C_B}$ satisfies the association rule $ST \leq S_{TO_n-O_B/C_B} \leq 1$, wherein $O_B$ is the root-object, $C_B$ is the context, and ST is the similarity threshold stored with the super-object;

establish an association with an analogous transforming object ($TO_n$) that fulfils the corresponding condition;

compare the associated transforming object ($TO_n$) with the root-object ($O_B$) of the super-object to identify the difference in the context of the execution of the instruction set; and adapt, based on the difference identified, the instruction set for the corresponding analogous transforming object ($TO_n$) and execute the instruction set.

14. The system of claim 13, wherein the instructions further cause the system to control the similarity rate ($S_{TO_n-O_B/C_B}$) of the associated transforming object ($TO_n$) relative to the root-object $O_B$, in the context $C_B$, for a setpoint r(t), wherein controlling comprises:

(i) identifying the similarity rate of $TO_{n|Cy_{k-1}}$ for the $k^{th}$ cycle, wherein $TO_n$ is an informatical or physical object that is selected to be manipulated in order to control its similarity relative to the root-object $O_B$ in the context of $C_B$ for a setpoint r(t) while k is the index of the cycle, $Cy_k$ is the $k^{th}$ cycle, and $TO_{n|Cy_{k-1}}$ is the derivative of the $TO_n$ generated in the $(k-1)^{th}$ cycle, while $k \geq 1$ and $TO_{n|Cy_0} = TO_n$;

(ii) identifying the error $el_{Cy_k}$ according to the setpoint r(t) for the $k^{th}$ cycle;

(iii) identifying the control input $ul_{Cy_k}$ according to the error $el_{Cy_k}$ for the $k^{th}$ cycle;

(iv) manipulating $TO_{n|Cy_{k-1}}$ in order to increase or decrease the similarity rate ($S_{TO_n-O_B/C_B}$) relative to $O_B$ in the context of $C_B$ according to the control input $ul_{Cy_k}$ and generating $TO_{n|Cy_k}$ as the $k^{th}$ derivative of $TO_n$ for the $k^{th}$ cycle; and (v) re-executing the whole process for the $(k+1)^{th}$ cycle, wherein said controlling maintains the similarity rate of the associated object relative to the root-object $O_B$ in the context $C_B$ at the setpoint r(t), via manipulating the associated object, as the associated object alters.

15. The system of claim 14, wherein the instructions further cause the system to identify the control input $ul_{Cy_k}$, wherein identifying the control input $ul_{Cy_k}$ further comprises identifying, by a proportional-integral-derivative controller, a proportional output P, an integral output I, and a differential output D based on the error $el_{Cy_k}$, such that $ul_{Cy_k} = P+I+D$, wherein $P = K_p el_{Cy_k}$ for $k \geq 1$, $I = K_i((el_{Cy_k}-el_{Cy_{k-1}})/2+el_{Cy_{k-1}}) \Delta t$, $k > 1$, $el_{Cy_k} \geq el_{Cy_{k-1}}$; $I = K_i((el_{Cy_{k-1}}-el_{Cy_k})/2+el_{Cy_k}) \Delta t$, $k > 1$, $el_{Cy_{k-1}} > el_{Cy_k}$, and $D = K_d(el_{Cy_k}-el_{Cy_{k-1}})/\Delta t$ for $k > 1$, wherein the proportional, integral, and derivative control parameters ($K_p$, $K_i$, $K_d$) are preset individually according to characteristics of the associated object and tuned during the controlling, and wherein the setpoint r(t) is a function of time.

16. The system of claim 14, wherein the instructions further cause the system to manipulate $TO_{n|Cy_{k-1}}$, wherein manipulating $TO_{n|Cy_{k-1}}$ further comprises performing at least one additive or subtractive modification to at least one singular elementary object and/or at least one cluster of interrelated elementary objects of $TO_{n|Cy_{k-1}}$, and wherein manipulating further comprises estimating an effect of the at least one additive or subtractive modification on the similarity rate $S_{TO_n-O_B/C_B}$ using predictive modelling and/or a deep learning model.

17. The system of claim 13, wherein the instructions further cause the system to:

store data/information with respect to the association, adaptation, and execution processes of each of the corresponding super-objects; and optimize further the similarity threshold (ST) of each of the super-objects as corresponding data/information accumulates.

18. The system of claim 17, wherein the instructions further cause the system to optimize further the similarity threshold of each of the super-objects, wherein optimizing further comprises adjusting the similarity threshold within a critical domain bounded by a lower critical boundary $L_{BD}$ and an upper critical boundary $U_{BD}$ corresponding to a root-object $O_B$ and a context $C_B$ of the respective super-object, and wherein optimizing further comprises updating the similarity threshold, as the stored data/information accumulates, to increase a probability of success of encountering an adequate object among objects that satisfy a condition of association while maintaining coverage for a set of adequate objects.

19. The system of claim 13, wherein the instructions further cause the system to execute the corresponding instruction set of a super-object partially if executing the instruction set fully is not possible, or alternatively bringing the respective process to a partially executable level and staying on hold without executing the instruction set until a missing sub-object/component is identified and compensated.

20. The system of claim 19, wherein the instructions further cause the system to:

identify a missing sub-object/component that is the cause of a partial execution with respect to an associated super-object;

identify a partial association rule $ST' \leq S_{TO_n-O_B/C_B} \leq 1$ with respect to the missing sub-object/component;

search in alternative environments to identify and associate with an analogous object that fulfils the condition;

re-adapt the instruction set in accordance with the analogous object that replaces the missing sub-object/component; and execute the instruction set fully.

21. The system of claim 20, wherein the instructions further cause the system to compensate for the missing sub-object/component, wherein compensating for the missing sub-object/component further comprises dynamically creating an object possessing properties of the missing sub-object/component and/or creating a composite object from a plurality of objects collected from a plurality of environments, and further modifying the created object or the composite object according to execution needs, and wherein, if executing the instruction set fully remains not possible, the instructions further cause the system to re-execute the identifying, searching, associating, and re-adapting steps until executing the instruction set fully becomes possible.

22. A non-transitory computer readable medium storing instructions executable by a processor, the computer readable medium comprising:

instructions executable with the processor to:

receive a selection by a user that comprises a cluster of various objects that are selected purposefully or randomly among a plurality of informatical and/or physical objects in an environment including an instruction set developed by the user or a 3rd party user with respect to the selected cluster in order to process the cluster, wherein each of said objects is either a singular elementary object or a cluster of interrelated elementary objects presented on or connected to a data network as a resource of said data network;

analyze, classify, and cluster singular elementary objects of the selected cluster to identify sub-clusters of interrelated elementary objects in rank order (including each singular elementary object as a zeroth-order cluster), to identify each of the objects according to distinctive attributes, functions, and interrelationship;

generate, for each of the identified objects, an analogue reference, each of the analogue references uniquely identifying a corresponding one of the identified objects according to the extracted attributes, functions, and interrelationship, wherein generating the analogue reference comprises generating an analogue reference for each identified sub-cluster identified in rank order;

analyze, based on the analogue references generated, the instruction set with respect to the selected cluster to extract the context of the process, thereby conceptualizing the process, and identifying the context $'C_B$ of the prospective super-object;

construct, based on the context $'Cp$ identified and the analogue references generated, a model of the selected cluster that includes any essential content and generate, according to that model, the root-object $'O_B$ of the prospective super-object;

determine, based on the root-object $'O_B$ generated and the context $'C_B$ identified, the lower critical boundary $'L_{BD}$, the upper critical boundary $'U_{BD}$, and the optimal similarity threshold $'ST_{OP}$ of the prospective super-object, wherein a lower critical boundary $L_{BD}$ is defined as a similarity rate, measured in the context $C_B$ with respect to the root-object $O_B$, of the least similar object that is adequate for the realization of the respective process among all adequate objects in the universe to which the object belongs, and an upper critical boundary $U_{BD}$ is defined as a similarity rate, measured in the context $C_B$ with respect to the root-object $O_B$, of the most similar object that is inadequate for the realization of the respective process among all inadequate objects in the universe to which the object belongs, and an optimal similarity threshold $ST_{OP}$ is defined as a similarity rate, measured in the context $C_B$ with respect to the root-object $O_B$, that provides (i) the highest probability of success of encountering an adequate object among all objects that satisfy the condition of association, while also providing (ii) the widest coverage for the set of adequate objects, wherein $[0, L_{BD})$ defines a domain in which all objects are inadequate, and $(U_{BD}, 1]$ defines a domain in which all objects are adequate, and $(L_{BD}, U_{BD})$ defines a critical domain in which an encountered object is either adequate or inadequate for realization of the respective process, wherein, within the respective universe, $L_{BD}$, $U_{BD}$, and $ST_{OP}$ are dependent variables on the root-object $O_B$ and the context $C_B$, such that for each $(O_B, C_B)$ pair there exists a particular critical domain bounded by inherently existing particular critical values, including a value providing the optimal similarity threshold $ST_{OP}$, wherein determining the lower critical boundary $'L_{BD}$, the upper critical boundary $'U_{BD}$, and the optimal similarity threshold $'ST_{OP}$ further comprising:

(i) selecting a subset from the set of all singular elementary objects and/or all clusters of interrelated elementary objects existing in the respective universe;

(ii) determining, for each of a plurality of objects ($TO_n$), a corresponding similarity rate represented by $S_{TO_n\sim'O_B/'C_B}$, measured in the comparison process between the object and the root-object $'O_B$ in the context $'C_B$, represented by $TO_n\sim'O_B/'C_B$, and an adequacy or inadequacy determination indicative of whether the instruction set successfully realizes the respective process;

(iii) training at least one machine learning model using the similarity rates and the adequacy or inadequacy determinations; and (iv) using said machine learning model to determine at least one of: the lower critical boundary $'L_{BD}$, the upper critical boundary $'U_{BD}$, or the optimal similarity threshold $'ST_{OP}$ of a prospective super-object;

decide on the similarity threshold $'ST$, in accordance with the operational needs, based on the critical domain bounded by the lower critical boundary $'L_{BD}$, and the upper critical boundary $'U_{BD}$, and the optimal similarity threshold $'ST_{OP}$ determined, wherein the probability of success in arbitrary encounters that satisfy the condition of association increases as $'ST$ approaches $'U_{BD}$, and setting $'ST$ larger than $'U_{BD}$ guarantees success for all matches, and the coverage for the set of adequate objects increases as $'ST$ approaches $'L_{BD}$ and reaches its maxima at $'L_{BD}$, such that setting $'ST$ smaller than $'L_{BD}$ does not further increase the coverage, while the optimal similarity threshold $'ST_{OP}$ provides the optimal efficiency for the $O_B$–$C_B$ pair by providing (i) the highest probability of success to encounter an adequate object among all objects that satisfy the condition of association and (ii) the widest coverage for the set of adequate objects;

identify, based on the context $'C_B$, root-object $'O_B$, and similarity threshold $'ST$, the association rule of the prospective super-object as $'ST \leq S_{TO_n\sim'O_B/'C_B} \leq 1$, wherein $TO_n$ is a transforming object, postulated to transform unpredictably between manifestations, appearances, or observations, thereby representing dynamic uncertainty and vagueness induced by such transformations, and wherein the index n denotes an nth individual object identified among encountered objects in the environment;

embed, with the prospective super-object, the context $'C_B$, the root-object $'O_B$, and the similarity threshold $'ST$, and store the prospective super-object, including any other essential content, to generate the corresponding super-object; and set the association rule $'ST \leq S_{TO_n\sim'O_B/'C_B} \leq 1$ for establishing association between the super-object and an encountered transforming object $TO_n$;

revisit the environment;

analyze, classify, and cluster informatical and/or physical elementary objects that exist in an environment to identify each of the finitely many objects according to distinctive attributes, functions, and interrelationship, wherein each of said objects is either a singular elementary object or a cluster of interrelated elementary objects presented on or connected to a data network as a resource of said data network;

generate, for each of the identified objects ($TO_n$), an analogue reference, each of the analogue references uniquely identifying a corresponding one of the identified objects according to the extracted attributes, functions, and interrelationship, wherein each of said identified objects is treated as a transforming-object, even if the identified object is not a transforming-object;

compare each of the identified transforming objects ($TO_n$) with a stored super-object by comparing (i) an analogue reference generated for $TO_n$ with (ii) an analogue reference of the root-object (O_B) in context (C_B), to determine the similarity rate $S_{TO_n-O_B/C_B}$, and evaluating whether $S_{TO_n-O_B/C_B}$ satisfies the association rule $ST \leq S_{TO_n-O_B/C_B} \leq 1$, wherein $O_B$ is the root-object, $C_B$ is the context, and ST is the similarity threshold stored with the super-object;

establish an association with an analogous transforming object ($TO_n$) that fulfils the corresponding condition;

compare the associated transforming object ($TO_n$) with the root-object ($O_B$) of the super-object to identify the difference in the context of the execution of the instruction set; and adapt, based on the difference identified, the instruction set for the corresponding analogous transforming object ($TO_n$) and execute the instruction set.

23. The non-transitory computer readable medium of claim 22, wherein the computer readable medium further comprises instructions executable with the processor to control the similarity rate ($S_{TO_n-O_B/C_B}$) of the associated transforming object ($TO_n$) relative to the root-object $O_B$, in the context $C_B$, for a setpoint r(t), wherein controlling comprises:

(i) identifying the similarity rate of $TO_{n|Cy_{k-1}}$ for the $k^{th}$ cycle, wherein $TO_n$ is an informatical or physical object that is selected to be manipulated in order to control its similarity relative to the root-object $O_B$ in the context of $C_B$ for a setpoint r(t) while k is the index of the cycle, $Cy_k$ is the $k^{th}$ cycle, and $TO_{n|Cy_{k-1}}$ is the derivative of the $TO_n$ generated in the $(k-1)^{th}$ cycle, while $k \geq 1$ and $TO_{n|Cy_0} = TO_n$;

(ii) identifying the error $el_{Cy_k}$ according to the setpoint r(t) for the $k^{th}$ cycle;

(iii) identifying the control input $ul_{Cy_k}$ according to the error $el_{Cy_k}$ for the $k^{th}$ cycle;

(iv) manipulating $TO_{n|Cy_{k-1}}$ in order to increase or decrease the similarity rate ($S_{TO_n-O_B/C_B}$) relative to $O_B$ in the context of $C_B$ according to the control input $ul_{Cy_k}$ and generating $TO_{n|Cy_k}$ as the $k^{th}$ derivative of $TO_n$ for the $k^{th}$ cycle; and (v) re-executing the whole process for the $(k+1)^{th}$ cycle, wherein said controlling maintains the similarity rate of the associated object relative to the root-object $O_B$ in the context $C_B$ at the setpoint r(t), via manipulating the associated object, as the associated object alters.

24. The non-transitory computer readable medium of claim 23, wherein the computer readable medium further comprises instructions executable with the processor to identify the control input $ul_{Cy_k}$ wherein identifying the control input $ul_{Cy_k}$ further comprises identifying, by a proportional—integral—derivative controller, a proportional output P, an integral output I, and a differential output D based on the error $el_{Cy_k}$, such that $ul_{Cy_k} = P+I+D$, wherein $P=K_p el_{Cy_k}$ for $k \geq 1$, $I=K_i((el_{Cy_k}-el_{Cy_{k-1}})/2+el_{Cy_{k-1}})\Delta t$, $k>1$, $el_{Cy_{k-1}}$, $I=K_i$ $(el_{Cy_{k-1}}-el_{Cy_k})/2+el_{Cy_{k-1}})\Delta t$, $k>1$, $el_{Cy_{k-1}}>el_{Cy_k}$; and $D=K_d(el_{Cy_k}-el_{Cy_{k-1}})/\Delta t$ for $k>1$, wherein the proportional, integral, and derivative control parameters ($K_p$, $K_i$, $K_d$) are preset individually according to characteristics of the associated object and tuned during the controlling, and wherein the setpoint r(t) is a function of time.

25. The non-transitory computer readable medium of claim 23, wherein the computer readable medium further comprises instructions executable with the processor to manipulate $TO_{n|Cy_{k-1}}$ wherein manipulating $TO_{n|Cy_{k-1}}$ further comprises performing at least one additive or subtractive modification to at least one singular elementary object and/or at least one cluster of interrelated elementary objects of $TO_{n|Cy_{k-1}}$, and wherein manipulating further comprises estimating an effect of the at least one additive or subtractive modification on the similarity rate $S_{TO_n-O_B/C_B}$ using predictive modelling and/or a deep learning model.

26. The non-transitory computer readable medium of claim 22, wherein the computer readable medium further comprises instructions executable with the processor to:

store data/information with respect to the association, adaptation, and execution processes of each of the corresponding super-objects; and optimize further the similarity threshold (ST) of each of the super-objects as corresponding data/information accumulates.

27. The non-transitory computer readable medium of claim 26, wherein the computer readable medium further comprises instructions executable with the processor to optimize further the similarity threshold of each of the super-objects, wherein optimizing further comprises adjusting the similarity threshold within a critical domain bounded by a lower critical boundary $L_{BD}$ and an upper critical boundary $U_{BD}$ corresponding to a root-object $O_B$ and a context $C_B$ of the respective super-object, and wherein optimizing further comprises updating the similarity threshold, as the stored data/information accumulates, to increase a probability of success of encountering an adequate object among objects that satisfy a condition of association while maintaining coverage for a set of adequate objects.

28. The non-transitory computer readable medium of claim 22, wherein the computer readable medium further comprises instructions executable with the processor to execute the corresponding instruction set of a super-object partially if executing the instruction set fully is not possible, or alternatively bringing the respective process to a partially executable level and staying on hold without executing the instruction set until a missing sub-object/component is identified and compensated.

29. The non-transitory computer readable medium of claim 28, wherein the computer readable medium further comprises instructions executable with the processor to:

identify a missing sub-object/component that is the cause of a partial execution with respect to an associated super-object;

identify a partial association rule $ST' \leq S_{TO_n-O_B/C_B} \leq 1$ with respect to the missing sub-object/component;

search in alternative environments to identify and associate with an analogous object that fulfils the condition;

re-adapt the instruction set in accordance with the analogous object that replaces the missing sub-object/component; and execute the instruction set fully.

30. The non-transitory computer readable medium of claim 29, wherein the computer readable medium further comprises instructions executable with the processor to compensate for the missing sub-object/component, wherein compensating for the missing sub-object/component further comprises dynamically creating an object possessing properties of the missing sub-object/component and/or creating a composite object from a plurality of objects collected from a plurality of environments, and further modifying the created object or the composite object according to execution needs, and wherein, if executing the instruction set fully remains not possible, the computer readable medium further comprises instructions executable with the processor to re-execute the identifying, searching, associating, and re-adapting steps until executing the instruction set fully becomes possible.

* * * * *